United States Patent
Kanapathippillai et al.

(12) 
(10) Patent No.: US 6,732,203 B2
(45) Date of Patent: May 4, 2004

(54) SELECTIVELY MULTIPLEXING MEMORY COUPLING GLOBAL BUS DATA BITS TO NARROWER FUNCTIONAL UNIT COUPLING LOCAL BUS

(75) Inventors: Ruban Kanapathippillai, Dublin, CA (US); Kumar Ganapathy, Palo Alto, CA (US); Thu Nguyen, Saratoga, CA (US); Siva Venkatraman, San Jose, CA (US); Earle F. Philhower, III, Union City, CA (US); Manoj Mehta, Laguna Hills, CA (US); Kenneth Malich, Norco, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/109,826

(22) Filed: Mar. 29, 2002

(65) Prior Publication Data

US 2003/0056134 A1 Mar. 20, 2003

Related U.S. Application Data

(63) Continuation-in-part of application No. 10/076,966, filed on Feb. 15, 2002, and a continuation-in-part of application No. 10/056,393, filed on Jan. 24, 2002, and a continuation-in-part of application No. 10/047,538, filed on Jan. 14, 2002, and a continuation-in-part of application No. 09/652,556, filed on Aug. 31, 2000, now Pat. No. 6,539,096, and a continuation-in-part of application No. 09/652,100, filed on Aug. 30, 2000, now Pat. No. 6,408,376, and a continuation-in-part of application No. 09/652,593, filed on Aug. 30, 2000, and a continuation-in-part of application No. 09/494,609, filed on Jan. 31, 2000, now Pat. No. 6,598,155, and a continuation-in-part of application No. 09/494,608, filed on Jan. 31, 2000, now Pat. No. 6,446,195.

(60) Provisional application No. 60/280,800, filed on Apr. 2, 2001, provisional application No. 60/271,139, filed on Feb. 23, 2001, provisional application No. 60/271,279, filed on Feb. 24, 2001, and provisional application No. 60/271,282, filed on Feb. 23, 2001.

(51) Int. Cl.[7] ............................................. G06F 13/38
(52) U.S. Cl. ......................... 710/66; 710/307; 712/33
(58) Field of Search ....................... 710/66, 307; 712/33

(56) References Cited

U.S. PATENT DOCUMENTS

| | | | | |
|---|---|---|---|---|
| 5,293,381 A | * | 3/1994 | Choy | 370/476 |
| 5,590,287 A | * | 12/1996 | Zeller et al. | 710/307 |
| 5,630,106 A | * | 5/1997 | Ishibashi | 345/533 |
| 5,764,950 A | * | 6/1998 | Ishizaki | 710/307 |
| 5,901,294 A | * | 5/1999 | Tran et al. | 710/107 |
| 6,557,084 B2 | * | 4/2003 | Freerksen et al. | 711/147 |

* cited by examiner

Primary Examiner—Kenneth S. Kim
(74) Attorney, Agent, or Firm—Blakely, Sokoloff, Taylor & Zafman LLP

(57) ABSTRACT

In one embodiment, a bus multiplexer is between a memory and a functional unit of the integrated circuit. An input of the bus multiplexer couples to a global bus having a bit width. A local bus having a lesser bit width couples to an output of the bus multiplexer. The bus multiplexer selectively multiplexes bits of data on the global bus onto bits of the local bus. In another embodiment, an integrated circuit comprises a memory, a global bus, and a functional unit coupled together. The functional unit includes a bus multiplexer with an input coupled to the global bus, and a local bus coupled to an output of the bus multiplexer. The bus width of the local bus is less than that of the global bus. The bus multiplexer selects data from a subset of bits of the global bus to couple onto the bits of the local bus.

35 Claims, 64 Drawing Sheets

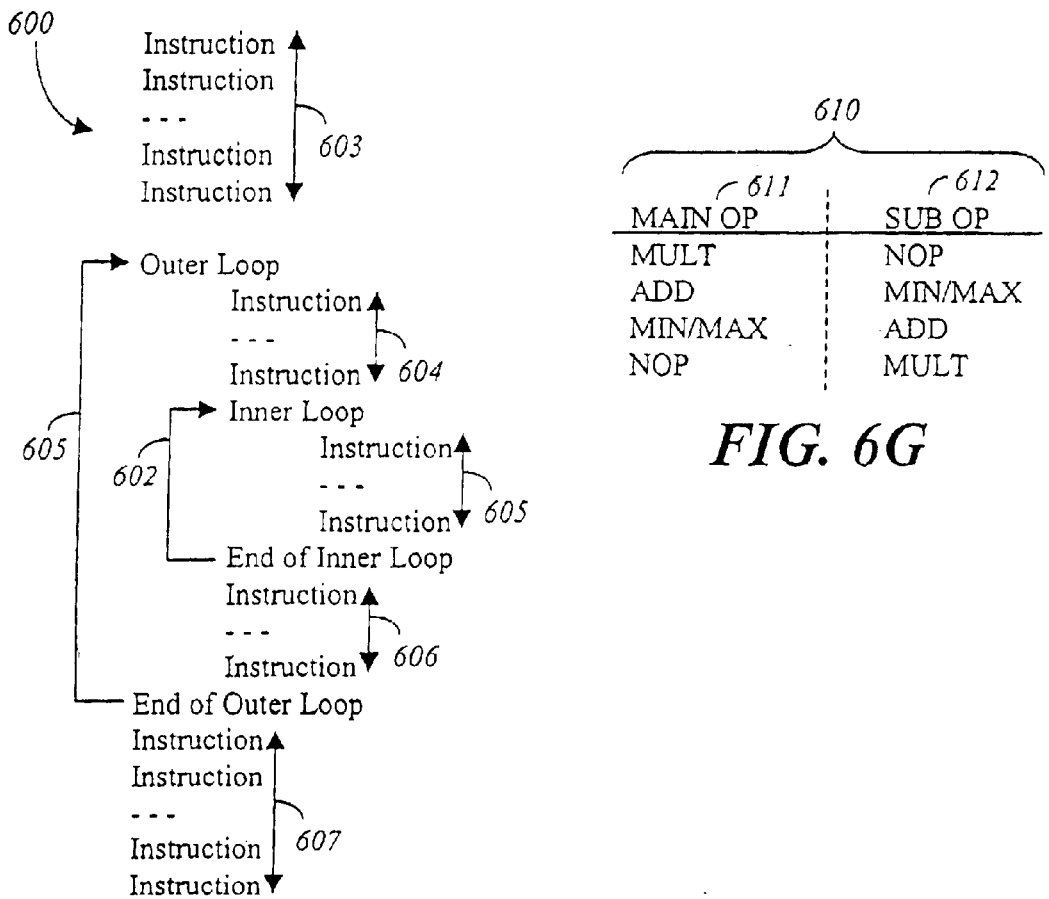

6-bit operand specifier:

A 6-bit specifier is used in DSP extended instructions to access memory and register operands.

| 5 | 4 | 3 | 2 | 1 | 0 |
|---|---|---|---|---|---|

M/R

| 0 | 0 | ac-page | | ereg |
|---|---|---|---|---|
| 0 | 1 | gpr:0-r15 | | GPR |
| 1 | | ptr(r0)to(r15) | off | Mem[ptr{0-15}]II PTR[0-15]+=offset1/offset2  Always postupdate |

This allows access to data memory, ereg and GPR

- Bit 5=1:Use rX(X:0-7) register to obtain effective memory address and post-modify the
  ptr field by one of two possible offsets specified in rX registers.
  dmem[ptr], ptr=ptr+offset1, if off=0
                  ptr=ptr+offset2, if off=1

- Bit 5=0:Access ac-page or GPR

If Bit-4 is set to 0, then bits 3:0 control access to the general-purpose register file (r0-15) or to execution unit registers.

| GPR | GPR Intr page | ac-page | ac intr page | ereg-Shadow DSP |
|---|---|---|---|---|
| R0 | R0 | A0 | A0_I | A0 |
| R1 | R1 | A1 | A1_I | A1 |
| R2 | R2 | T | T | T |
| R3 | R3 | TR | TR | TR |
| R4 | R4 | | | |
| R5 | R5 | | | |
| R6 | R6 | | | |
| R7 | R7 | | | |
| R8 | R8 | | | SX1 |
| R9 | R9 | | | SX1s |
| R10 | R10 | | | SX2 |
| R11 | R11 | | | SX2s |
| R12 | R12_i | | | SY1 |
| R13 | R13_i | | | SY1s |
| R14 | R14_i | | | SY2 |
| R15 | R15_i | | | SY2s |

*FIG. 6C*

4-bit operand specifier:
Memory operands: (rX) specifies an access out of the data memory to the extension unit for the function that needs to be performed. The address for the access is specified in the rX register in the general register file that hold the 14-bit pointer (16K of addressing) to memory, 5-bit signed offset or a 3-bit unsigned offset that can post-modify the address. In addition, each pointer is typed for efficient SIMD processing and includes a permute control for rearranging data elements of a vector on the fly. The "podi" core can deal with 4-element 16-bit real vectors or complex data directly. This ability to manipulate memory data directly reduces the instruction width greatly and allows efficient signal processing.

(rX): Memory Address Registers

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| type | | | | cb | | x | permute | | | off1:(0-7) | | | off0:(-16 to 15) | | | | | ptr: pointer | | | | | | | | | | | | | |

*Fig. 6D*

For shadow DSP instructions, the 3-bit specifier for operands is defined as follows:

| 2 | 1 | 0 | |
|---|---|---|---|
| 0 | 0 | 0 | A0 |
| 0 | 0 | 1 | A1 |
| 0 | 1 | 0 | T |
| 0 | 1 | 1 | TR |
| 1 | 0 | 0 | SX1 |
| 1 | 0 | 1 | SX1s |
| 1 | 1 | 0 | SX2 |
| 1 | 1 | 1 | SX2s |

EREG1

| 2 | 1 | 0 | |
|---|---|---|---|
| 0 | 0 | 0 | A0 |
| 0 | 0 | 1 | A1 |
| 0 | 1 | 0 | T |
| 0 | 1 | 1 | TR |
| 1 | 0 | 0 | SY1 |
| 1 | 0 | 1 | SY1s |
| 1 | 1 | 0 | SY2 |
| 1 | 1 | 1 | SY2s |

EREG2

Only the shadow DSP instructions can see the above modified page of execution unit registers.

*FIG. 6E*

5-bit operand specifier:

The 5-bit specifier includes the 4-bit specifier for general data operands and the special purpose registers. It is used in RISC instructions.

| 4 | 3 | 2 | 1 | 0 |
|---|---|---|---|---|
| 0 | spr:s0-s15 | | | |
| 1 | gpr:r0-r15 | | | |

|    | SPR<br>SPR | Intr page<br>SPR intr page |          |
|----|------------|----------------------------|----------|
| 0  | fu-ctl     | fu-ctl_I                   |          |
| 1  | a-type     | a-type_I                   |          |
| 2  | ps-ctl     | ps-ctl                     |          |
| 3  | t-type     | t-type                     |          |
| 4  | pl-ctl     | pl-ctl                     |          |
| 5  | cb-ctl     | cb-ctl_I                   |          |
| 6  | shuffle    | shuffle                    |          |
| 7  | lo-ptr     | lo-ptr                     |          |
| 8  | status     | status_I                   |          |
| 9  | loop-ctl   | loop-ctl                   |          |
| 10 | pcr        | pcr                        | stack(8) |
| 11 | reserved   | reserved                   |          |
| 12 | reserved   | reserved                   |          |
| 13 | reserved   | reserved                   |          |
| 14 | reserved   | reserved                   |          |

NOTE: All SPR registers are reset to all zeros at power on reset except for the PCR register.

FIG. 6F

DSP instructions

| | 39 | 38 | 37 | 36 | 35 | 34 | 33 32 31 30 29 28 27 26 25 | 24 | 23 | 22 | 21 | 20 | |
|---|---|---|---|---|---|---|---|---|---|---|---|---|---|
| Multiply | 1 | 0 | 0 | PS | S' | | SX  SY | V/S | SA DA | \multicolumn{3}{c}{Sub-op} | |
| | | | | | | | da=sx*sy | | | 0 | 0 | 0 | Nop |
| | | | | | | | da=(sx*sy)+sa | | | 0 | 0 | 1 | Add |
| | | | | | | | da=(sx*sa)+sy | | | 0 | 1 | 0 | Add |
| | | | | | | | da=(sx*sy)+sa | | | 0 | 1 | 1 | Sub |
| | | | | | | | da=(sx*sa)+sy | | | 1 | 0 | 0 | Sub |
| | | | | | | | da=min(sx*sy,sa) | | | 1 | 0 | 1 | Min |
| | | | | | | | da=min(sx*sa,sy) | | | 1 | 1 | 0 | Min |
| | | | | | | | da=max(sx*sy,sa) | | | 1 | 1 | 1 | Max |
| Add | 1 | 0 | 1 | PS | +/- | | SX  SY | V/S | SA DA | \multicolumn{3}{c}{Sub-op} | |
| | | | | | | | da=sx+sy | | | 0 | 0 | 0 | Nop |
| | | | | | | | da=sx+sy+sa | | | 0 | 0 | 1 | Add |
| | | | | | | | da=sx+sy; sa=sx+sy; | | | 0 | 1 | 0 | AddSub |
| | | | | | | | da=(sx+sy)*sa | | | 0 | 1 | 1 | Mul |
| | | | | | | | da=-(sx+sy)*sa | | | 1 | 0 | 0 | MulN |
| | | | | | | | da=min(sx+sy,sa) | | | 1 | 0 | 1 | Min |
| | | | | | | | da=max(sx+sy,sa) | | | 1 | 1 | 0 | Max |
| | | | | | | | da=ssum(sa)  (sx,sy unused) | | | 1 | 1 | 1 | CombAdd |
| Extremum | 1 | 1 | 0 | PS | x/n | | SX  SY | V/S | SA DA | \multicolumn{3}{c}{Sub-op} | |
| | | | | | | | da=ext(sx,sy) | | | 0 | 0 | 0 | Nop |
| | | | | | | | da=ext(sx,sy,sa) | | | 0 | 0 | 1 | Ext |
| | | | | | | | da=ext(sx,sa)*sy | | | 0 | 1 | 0 | Mul |
| | | | | | | | da=-ext(sx,sa)*sy | | | 0 | 1 | 1 | MulN |
| | | | | | | | da=ext(sx,sa)+sy | | | 1 | 0 | 0 | Add |
| | | | | | | | da=ext(sx,sa)-sy | | | 1 | 0 | 1 | Sub |
| | | | | | | | ext(sa,da) ?1=sx,tr=sy,lcs=lc | | | 1 | 1 | 0 | amax |
| type-match | 1 | 1 | 0 | PS | 0 | | SX  SY | x  x  x | | 1 | 1 | 1 | |
| | 1 | 1 | 0 | PS | 0 | x x x x | x x x x | x x x | | 1 | 1 | 1 | |
| Permute | 1 | 1 | 0 | PS | 1 | | Type  SY | 0 | ereg | 1 | 1 | 1 | Permute |
| Reserved | 1 | 1 | 1 | PS | x | | SX  SY | SA | DA V/S | \multicolumn{3}{c}{Sub-op} | |

FIG. 6H

Control and specifier Extensions

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|

Mul: | 0 | Pred | PL | Sxt | Syt | Rnd | Lt | S' | S' | S' | 0 | SA | DA | abs | 0 | 0 |

Add: | 0 | Pred | PL | Sxt | Syt | Lt | Sub-ext | 0 | SA | DA | abs | 0 | 0 |

Sub-ext variants:
- +/- +/- +/- x  — Nop (uadd)
- x V/S Rnd Fp  — Mul/MulN
- tr/ctl Gx Fp  — Min/Max Ext: | 0 | Pred | PL | Sxt | Syt | tr-ctl | Gx | Sub-ext | 0 | SA | DA | abs | 0 | 0 |

Sub-ext variants:
- Lt Fp  — Add/sub
- Rnd V/S  — Mul

| 0 | Pred | PL | Sxt | Syt | Pctl1 | 0 | ereg | Pctl | 0 | 0 |

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|

| 0 | Pred | PL | x | Type:SX | Type:SY | 0 | SA | DA | x | 0 | 1 |  Type override
| 0 | Pred | PL | Psx | Permute:SX | Permute:SY | 0 | SA | DA | Psy | 1 | 0 |  permute override
| 0 | Pred | I/R | I/R | prX | Offset:SX | Offset:SY | 0 | SA | DA | prY | 1 | 1 |  Offset override

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|

| 0 | Op | PL | op | SA | ereg1 | DA | ereg2 | 1 | SA | DA | Sub-op | nop:
| 1 | 1 | 0 | PL | 0 | x | x | x | Rnd | x | x | x | x | 0 | SA | DA | 1 | 1 | 1 |

FIG. 61

Control instructions

| | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|
| add,sub | L | Pred | | 0 | 0 | 0 | RX | | | | RY | | | | | RZ | | | +/- | 0 | |
| max,min | L | Pred | | 0 | 0 | 0 | RX | | | | RY | | | | : | RZ | | | X/N | 1 | |
| Shift | L | Pred | | 0 | 0 | 1 | RX | | | | UI4 | | | | : | RZ | | | UI2 | R/L | <Bit1,Bits9-6> |
| Logic | L | Pred | | 0 | 1 | 0 | RX | | | | RY | | | | | RZ | | | &, | &1 | ==UI5 (Shift |
| Mux | L | Pred | | 0 | 1 | 1 | RX | | | | RY | | | | | RZ | | | Pd | 0 | Amount) |
| mov | L | Pred | | 0 | 1 | 1 | RX | | | | DZ | | | | Rxt | Dzl | 0 | 0 | 0 | 1 | |
| addi | L | Pred | | 0 | 1 | 1 | SI4 | | | | DZ | | | | x | x | 1 | 0 | 0 | 1 | |
| mov2erg | L | Pred | | 0 | 1 | 1 | RX | | | | unit | | ereq | | qd | | type | 1 | 0 | 1 | |
| l.dm | L | Pred | | 0 | 1 | 1 | RX | | | | DZ1 | | | | | DZ2 | | | 1 | 1 | |
| Set4bits | L | Pred | | 1 | 0 | 0 | UI4:POS | | | | RZ | | | | Rzt | | UI4 | | | 0 | |
| Set2bits | L | Pred | | 1 | 0 | 0 | UI4:POS | | | | RZ | | | | Rzt | UI2 | | 0 | 0 | 1 | |
| Setbit | L | Pred | | 1 | 0 | 0 | UI4:POS | | | | RZ | | | | Rzt | UI1 | UI1 | 1 | 0 | 1 | <Bit3,Bits13- |
| Movi | L | Pred | | 1 | 0 | 0 | SI8 | | | | | | | | | RZ | | | 1 | 1 | 10>==UI5 POS |
| Jmp | L | Pred | | 1 | 0 | 1 | SI9 | | | | | | | | 0 | PRED | | | 0 | 0 | |
| Call | L | Pred | | 1 | 0 | 1 | SI9 | | | | | | | | 1 | PRED | | | 0 | 0 | |
| Loop | L | Pred | | 1 | 0 | 1 | UI5:Lcount | | | | UI5:Lsize | | | | | UI2:Lst | | | 0 | 1 | |
| Jmpi | L | Pred | | 1 | 0 | 1 | RX | | | | x | x | x | x | x | 0 | PRED | | 1 | 0 | |
| Calli | L | Pred | | 1 | 0 | 1 | RX | | | | x | x | x | x | x | 1 | PRED | | 1 | 0 | |
| Loopi | L | Pred | | 1 | 0 | 1 | RX | | | | x | | UI5:Lsize | | | UI2:Lst | | | 1 | 1 | |
| Test | L | Pred | | 1 | 1 | 0 | RX | | | | RY | | | | PZ | | | =,<,> | | 0 | |
| Testbit | L | Pred | | 1 | 1 | 0 | RX | | | | UI5 | | | | PZ | | B | 0 | | 1 | |
| Andp, orp | L | Pred | | 1 | 1 | 0 | Pa | | Pb | | Pc | | | | PZ | | & | 1 | | 1 | |
| Load | L | Pred | | 1 | 1 | 1 | MX | | | | RZ | | | | Ext | | | 0 | 0 | 0 | |
| Store | L | Pred | | 1 | 1 | 1 | MZ | | | | RZ | | | | Ext | | | 1 | 0 | 0 | |
| eLoad | L | Pred | | 1 | 1 | 1 | MX | | | | RY | | | | 1 | 1 | 1 | 0 | 0 | 0 | |
| eStore | L | Pred | | 1 | 1 | 1 | MZ | | | | RY | | | | 1 | 1 | 1 | 1 | 0 | 0 | |
| Extended | L | Pred | | 1 | 1 | 1 | Bits 27:16 | | | | | | | | | | | | 1 | 0 | |
| Logic2 | L | Pred | | 1 | 1 | 1 | RX | | | | RY/RZ | | | | Rxt | Ryt | &,1,&,1 | | 0 | 1 | |
| mov-erg | L | Pred | | 1 | 1 | 1 | unit | | ereq | | RZ | | | | qd | | Sft | 0 | 1 | 1 | |
| Crb | L | Pred | | 1 | 1 | 1 | RX | | | | RZ | | | | s/m | 0 | 0 | 1 | 1 | 1 | |
| Ponty | L | Pred | | 1 | 1 | 1 | RX | | | | PZ | | | O/E | 0 | 1 | 0 | 1 | 1 | 1 | |
| Stm | L | Pred | | 1 | 1 | 1 | MZ | | | | RX | | | | 1 | 1 | 0 | 1 | 1 | 1 | |
| Abs | L | Pred | | 1 | 1 | 1 | RX | | | | RZ | | | | 0 | 0 | 1 | 1 | 1 | 1 | |
| Neg | L | Pred | | 1 | 1 | 1 | RX | | | | RZ | | | | 0 | 1 | 1 | 1 | 1 | 1 | |
| Div-step | L | Pred | | 1 | 1 | 1 | RX | | | | RZ | | | | 1 | 0 | 1 | 1 | 1 | 1 | |
| Test&Set | L | Pred | | 1 | 1 | 1 | RX | | | | PZ | | | 0 | 1 | 1 | 1 | 1 | 1 | | |
| Reserved | L | Pred | | 1 | 1 | 1 | | | | | 0 | 0 | 1 | 1 | 1 | 1 | 1 | 1 | 1 | 1 | |
| Return | L | Pred | | 1 | 1 | 1 | Pred | | I-ctl | | 0 | 1 | 0 | 1 | 1 | 1 | 1 | 1 | 1 | 1 | |
| Zero-ac | L | Pred | | 1 | 1 | 1 | ac # | | | | 1 | 1 | 0 | 1 | 1 | 1 | 1 | 1 | 1 | 1 | |
| eSync | L | Pred | | 1 | 1 | 1 | RZ | | | | 0 | 1 | 1 | 1 | 1 | 1 | 1 | 1 | 1 | 1 | |
| Swi | L | Pred | | 1 | 1 | 1 | UI3 | | | 0 | 1 | 1 | 1 | 1 | 1 | 1 | 1 | 1 | 1 | 1 | |
| Nop | L | Pred | | 1 | 1 | 1 | UI3 | | | 1 | 1 | 1 | 1 | 1 | 1 | 1 | 1 | 1 | 1 | 1 | |

Extended Control

| | Bits 13:2 of upper half (39:20) | | | | | | | | | | | | | | | | | | | | | | | |
|---|---|---|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 19 | 18 | 17 | 16 | 15 | 14 | 13 | 12 | 11 | 10 | 9 8 7 6 | 5 4 3 2 1 0 | |
| Insert/Extract | RX | | | | RZ | | | | 0 | 0 | 0 | 0 | 0 | x | x | 0 | Rxt | Rzt | I/E | R/I | R/l | Offset:Ui5 | Length:Ui5 | 0 |
| Inserti | Ui4 length | | | | RX | | | | 0 | 0 | 0 | 0 | 0 | x | x | 0 | Rzt | | Ui5 Position | | | | | | | | Imm10 | x | RY | RY | 0 |
| Shift | | | | | RZ | | | | 0 | 0 | 0 | 1 | 0 | x | x | 0 | Rzt | | 0 | U/S | 1 | | | Shift Ui5 | | | | | | | | | RY | A/L | Lt | R/L | 0 | Fill | 1 | Fill: Sign/Zero |
| Rotate | | | | | RZ | | | | 0 | 0 | 0 | 1 | 0 | x | rxl | 0 | rzh | rzl | 0 | | | | | | | ryh | | | | | | | | | Shift Ui5 | | 1 | x | R/L | 1 | 1 | |
| | Ui7 | | | | | | | | 0 | 0 | 0 | 0 | 0 | x | x | 0 | x | x | 1 | | | | | ryh | | | | | | | | | Ui15 | | | | | | | | |
| jmp, call | Ui4 outer LC | | | | Ui4 inner LC | | | | 0 | 0 | 0 | 1 | 0 | Pred | | | Ui1 | Ui4 outer Lsize | | | Ui4 inner Lsize | | | | | | | Ui2 C-Ls Ui4 inner Lstart | | | | 0 | Bit 15 is continuation of inner LC |
| dloop | | | | | RY | | | | 0 | 0 | 0 | 1 | 0 | x | exit | 0 | x | Ui4 outer Lsize | | | Ui4 inner Lsize | | | | | | | Ui2 C-Ls Ui4 inner Lstart | | | | 1 | |
| mult | | | | | RY | | | | 0 | 0 | 1 | 1 | 0 | x | x | 0 | 0 | rxh md ryh | | | x | +/- | | | | | | RZ | | | | i/f rzh rzl s/u | | | | 0 | |
| add/sub | | | | | RY | | | | 0 | 0 | 1 | 1 | 0 | x | x | 0 | 0 | rxh rxl ryh ryl | | | x | +/- | | | | | | RZ | | | | 1 | rzh rzl | x | x | 0 | |
| Reserved | | | | | | | | | 0 | 0 | 0 | 0 | 0 | x | x | 0 | 1 | x | x | | | x | x | &i | | | | x | | | | x | | x | | 0 | |
| logicp | | | | | PZ | | | | 0 | 0 | 1 | 0 | 0 | =><, | | | 1 | I/F I/F I/F | | | | &i | | | | | PV | | | | x | | x | | 1 | andp,orp, andorp, orandp, pz=(px relop py) relop pv) |
| Testi | | | | | PZ | | | | 0 | 0 | 0 | 1 | 0 | x | x | 0 | 0 | | | | | | | | | | | Imm16 | | | | PY | | | | | |
| Movi | RZ | | | | D | | | | 0 | 0 | 0 | 1 | 0 | x | x | 0 | 0 | 0 | 1 | | | | | | | | | Imm16 | | | | | | | | | |
| loadi | Fill | | | | D | | | | H/L | 0 | 0 | 1 | 0 | x | x | 0 | 0 | 1 | | | | | | | | | | Imm14 | | | | | | | | | |
| storei | Type | | | | RZ | | | | 0 | 1 | 1 | 1 | 0 | x | x | 0 | Rzt | 0 | Type | | | | | | | | | Imm14 | | | | | | | | | |
| loadt | Type | | | | RX | | | | 0 | 1 | 1 | 1 | 0 | x | x | 0 | Rzt | 1 | Type | | | | | | | | | | | | | Si10 | | | | | |
| storet | RX | | | | RZ | | | | 0 | 1 | 1 | 1 | 0 | x | x | 0 | 0 | 0 | | | | | | | | | | | | | | Si10 | | | | | |
| Addi/subi | M7 | | | | RZ | | | | 1 | 0 | +/- | 0 | 0 | L1 s/u | | | 0 | | | | | | | | | | | Imm16 | | | | | | | | | |
| mini,maxi | RX | | | | RZ | | | | 1 | 0 | X/N | 0 | 0 | x | x | 0 | | | | | | | | | | | | Imm16 | | | | | | | | | |
| andi,on | RX | | | | RZ | | | | 1 | 1 | &i | H/L | 0 | x | x | 0 | | | | | | | | | | | | Imm16 | | | | | | | | | |

FIG. 6L-1

Shift:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | | opcode | | | | | SX | | | | | | DZ | | | | | | Amount | | | | | | | | PL | PS | Lt | Rot | Fill | A/L | | 1 | 0 | Shift |
| Group | | Pred | | | | opcode | | | | | SX | | | | | | DZ | | | | | | Amount | | | | | | | | Position | | | | | I/E | 0 | 1 | Insert/extract |
| Group | | Pred | | Imm2 | | opcode | | | | | | | | | | | | | Imm14 | | | | | | Length | | | | | | Position | | | | | | 1 | 0 | Setbits |

Immediate:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | op | | DZ | | | | opcode | | | SX | | | | | | | | | | | | | | | | | Imm16 | | | | | | | | | | | |
| Group | | | | | | opcode | | | | | | | SX | | | | DZ | | | | | | | Imm32 | | | | | | | | | | | | | | | |

Subop: MOV ADD SUB MIN MAX AND OR

Test:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | | opcode | | | | | SX | | | | | | | | SY | | | | | | DPz | | | | Subop | | | | | | | | | | |

Branch:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | | opcode | | | | | | | | | | | | | Imm20 | | | | | | | | | | | | | | | | | | | | |

Misc:

| Data Type | | SP Configuration |
|---|---|---|
| 1 x 4 R | 39 - 32 \| 31 \| 30 - 28 \| 27 — 0<br>\| Guard \| S \| Data \| Zeroes \|<br>⎵ 4 Bits | ≈ 1 x 40 |
| 1 x 8 R | 39 - 32 \| 31 \| 30 - 24 \| 23 — 0<br>\| Guard \| S \| Data \| Zeroes \|<br>⎵ 8 Bits | ≈ 1 x 40 |
| 1 x 16 R | 39 - 32 \| 31 \| 30 — 16 \| 15 — 0<br>\| Guard \| S \| Data \| Zeroes \|<br>⎵ 16 Bits | ≈ 1 x 40 |
| 1 x 32 R | 39 - 32 \| 31 \| 30 — 0<br>\| Guard \| S \| Data \|<br>⎵ 32 Bits | ≈ 1 x 40 |
| 1 x 40 R | 39 — 0<br>\| Data \|<br>⎵ 40 Bits<br>SXA 550 or SYA 554 | ≈ 1 x 40 |

FIG. 12B

| Data Type | | SP Configuration |
|---|---|---|
| 1 x 4 R | 15 - 12 11 — 0<br>\| Data \| Zeroes \|<br>   4 Bits | ≈ 1 x 16 |
| 1 x 8 R | 15 - 8 7 — 0<br>\| Data \| Zeroes \|<br>   8 Bits | ≈ 1 x 16 |
| 1 x 16 R | 15 — 0<br>\| Data \|<br>   16 Bits | ≈ 1 x 16 |
| 1 x 32 R | 15 — 0<br>\| Data $Hw_u(31:16)$ \|<br>   16 Bits | ≈ 1 x 16 |
| 1 x 40 R | 16 — 0<br>\| Data $Hw_u(31:16)$ \|<br>   16 Bits<br>   16 Bits<br>SXM 552A – 552B<br>or<br>SYM 556A – 556B | ≈ 1 x 16 |

Data Type    SP Configuration

SXM *552A*, SXM *552B*, SXM *552C*, and SXM *552D*
or
SYM *556A*, SYM *556B*, SYM *556C*, and SYM *556D*

| | |
|---|---|
| Operand 1 Data Type: | $N_1 \times S_1$ R |
| Operand 2 Data Type: | $N_2 \times S_2$ R |
| Type Matching R: | Max ($N_1$ or $N_2$) × Max ($S_1$ or $S_2$) R |

Fig. 13A

| | |
|---|---|
| Operand 1 Data Type: | $N_1 \times S_1$ C |
| Operand 2 Data Type: | $N_2 \times S_2$ C |
| Type Matching C: | Max ($N_1$ or $N_2$) × Max ($S_1$ or $S_2$) C |

Fig. 13B

| | |
|---|---|
| Operand 1 Data Type: | $N_1 \times S_1$ R |
| Operand 2 Data Type: | $N_2 \times S_2$ C |
| Type Matching R+C: | Max ($N_1$ or $N_2$) × Max ($S_1$ or $S_2$) C |

|  | 1x16 real | 2x16 real | 1x16 cmpx | 4x16 real | 2x16 cmpx | 1x32 real | 2x32 real | 1x32 cmpx | 4x32 real | 2x32 cmpx | 1x40 real | 2x40 real | 1x40 real | 4x40 real | 2x40 cmpx |
|---|---|---|---|---|---|---|---|---|---|---|---|---|---|---|---|
| 1x16 real | 1 unit | | | | | | | | | | | | | | |
| 2x16 real | 2 unit | 2 unit | | | | | | | | | | | | | |
| 1x16 cmpx | 2 unit | | 4 unit | | | | | | | | | | | | |
| 4x16 real | 4 unit | | | 4 unit | | | | | | | | | | | |
| 2x16 cmpx | 4 unit | | | | 4 unit | | | | | | | | | | |
| 1x32 real | 2 unit | | | | | 2 unit | | | | | | | | | |
| 2x32 real | 4 unit | | | | | | 4 unit | | | | | | | | |
| 1x32 cmpx | 4 unit | | | | | | | 4 unit | | | | | | | |
| 4x32 real | | | | | | | | | | | | | | | |
| 2x32 real | | | | | | | | | | | | | | | |
| 1x32 cmpx | | | | | | | | | | | | | | | |
| 4x32 real | | | | | | | | | | | | | | | |
| 2x32 real | | | | | | | | | | | | | | | |
| 1x40 real | | | | | | | | | | | | | | | |
| 2x40 real | | | | | | | | | | | | | | | |
| 1x40 real | | | | | | | | | | | | | | | |
| 4x40 real | | | | | | | | | | | | | | | |
| 2x40 real | | | | | | | | | | | | | | | |

| | 1x16 real | 2x16 real | 1x16 cmpx | 4x16 real | 2x16 cmpx | 1x32 real | 2x32 real | 1x32 cmpx | 4x32 real | 2x32 cmpx | 1x40 real | 2x40 real | 1x40 real | 4x40 real | 2x40 cmpx |
|---|---|---|---|---|---|---|---|---|---|---|---|---|---|---|---|
| 1x16 real | 1 unit | | | | | | | | | | | | | | |
| 2x16 real | 2 unit | 2 unit | | | | | | | | | | | | | |
| 1x16 cmpx | | | | | | | | | | | | | | | |
| 4x16 real | 4 unit | | | 4 unit | | | | | | | | | | | |
| 2x16 cmpx | | | | | | | | | | | | | | | |
| 1x32 real | 1 unit | 2 unit | | | | 1 unit | 2 unit | | | | | | | | |
| 2x32 real | 4 unit | 2 unit | | | | 4 unit | 2 unit | | | | | | | | |
| 1x32 cmpx | | | | | | | | | 4 unit | | | | | | |
| 4x32 real | 4 unit | | | 4 unit | | 4 unit | | | 4 unit | | | | | | |
| 2x32 cmpx | | | | | | | | | | | | | | | |
| 1x40 real | 1 unit | 2 unit | | | | 1 unit | 2 unit | | 4 unit | | 1 unit | 2 unit | | | |
| 2x40 real | 2 unit | 2 unit | | | | 2 unit | 2 unit | | 4 unit | | 4 unit | 2 unit | | | |
| 1x40 real | 4 unit | | | 4 unit | | 4 unit | | | 4 unit | | 1 unit | 2 unit | | | |
| 4x40 real | 4 unit | | | 4 unit | | 4 unit | | | 4 unit | | | | | 4 unit | |
| 2x40 real | | | | | | | | | | | | | | | |

Data Type: N x S(R/C)

FIG. 17

(rX): Memory Address Registers

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| type | | | | cb | | permute | | | | off1:(0-7) | | | | off0:(-16 to 15) | | | | | ptr: pointer | | | | | | | | | | | | |

Data Type 1801
- 0000: 1x16 real
- 0001: 2x16 real
- 0010: 1x16 complex
- 0011: 4x16 real
- 0100: 1x32 real
- 0101: 2x32 real
- 0110: 1x32 complex
- 0111: 2x16 complex
- 1000: 4x32 real
- 1001: 2x32 complex
- 1010: 1x40 real
- 1011: 2x40 real
- 1100: 1x40 complex
- 1101: 4x40 real (only for local add unit operations)
- 1110: 2x40 complex (only for local add unit operations)
- 1111: Reserved

Where $SX_{ab}$ : S=Source; a=delay; b= SP unit number(e.g. SP3,SP2 SP1,SP0; or termed U3,U2,U1,U0)

---

$Y' = [\ SY_{10},\ SY_{11},\ SY_{12},\ SY_{13}\ ]$ $Y'' = [\ SY_{20},\ SY_{21},\ SY_{22},\ SY_{23}\ ]$

Where $SY_{ab}$ : S=Source; a=delay; b= SP unit number(e.g. SP3,SP2,SP1, SP0; or termed U3,U1,U0)

FIG. 22A $$\text{FIR Filter} \quad \begin{bmatrix} X_0 \\ X_1 \\ \vdots \\ X_N \end{bmatrix} * \begin{bmatrix} Y_0 \\ \vdots \\ Y_N \end{bmatrix} = X_0 Y_0 + X_1 Y_1 \cdots X_N Y_N$$

| Primary Stage | Primary Stage Computations | | | |
|---|---|---|---|---|
| Cycle # | SP0 | SP1 | SP2 | SP3 |
| 1 | $X_0 Y_0$ + | $X_1 Y_1$ + | $X_2 Y_2$ + | $X_3 Y_3$ |
| 2 | $X_4 Y_4$ + | $X_5 Y_5$ + | $X_6 Y_6$ + | $X_7 Y_7$ |
| 3 | $X_8 Y_8$ + | $X_9 Y_9$ + | $X_{10} Y_{10}$ + | $X_{11} Y_{11}$ |
| N | $X_{N-3} Y_{N-3}$ + | $X_{N-2} Y_{N-2}$ + | $X_{N-1} Y_{N-1}$ + | $X_N Y_N$ |

$$\begin{bmatrix} X_1 \\ \vdots \\ X_{N+1} \end{bmatrix} * \begin{bmatrix} Y_0 \\ \vdots \\ Y_N \end{bmatrix}$$
(Shuffle X' Left by one)

| Shadow Stage | Shadow Stage Computations | | | |
|---|---|---|---|---|
| Cycle # | SP0' | SP1' | SP2' | SP3' |
| 1 | No operation | | | |
| 2 | No operation | | | |
| 3 | $X_1 Y_0$ + | $X_2 Y_1$ + | $X_3 Y_2$ + | $X_4 Y_3$ |
| 4 | $X_5 Y_4$ + | $X_6 Y_5$ + | $X_7 Y_6$ + | $X_8 Y_7$ |
| N+2 | $X_{N-2} Y_{N-3}$ + | $X_{N-1} Y_{N-2}$ + | $X_N Y_{N-1}$ + | $X_{N+1} Y_N$ |

Subsequent Cycles

| Primary Stage | | Shadow Stage | |
|---|---|---|---|
| Cycle # N+1 ⋮ 2N | $\begin{bmatrix} X_2 \\ \vdots \\ X_{N+2} \end{bmatrix} * \begin{bmatrix} Y_0 \\ \vdots \\ Y_N \end{bmatrix}$ | Cycle # N+3 ⋮ N+5 | $\begin{bmatrix} X_3 \\ \vdots \\ X_{N+3} \end{bmatrix} * \begin{bmatrix} Y_0 \\ \vdots \\ Y_N \end{bmatrix}$ |
| N+4 ⋮ 3N | $\begin{bmatrix} X_4 \\ \vdots \\ X_{N+4} \end{bmatrix} * \begin{bmatrix} Y_0 \\ \vdots \\ Y_N \end{bmatrix}$ | N+5 ⋮ N+7 | $\begin{bmatrix} X_5 \\ \vdots \\ X_{N+5} \end{bmatrix} * \begin{bmatrix} Y_0 \\ \vdots \\ Y_N \end{bmatrix}$ |

FIG. 22B

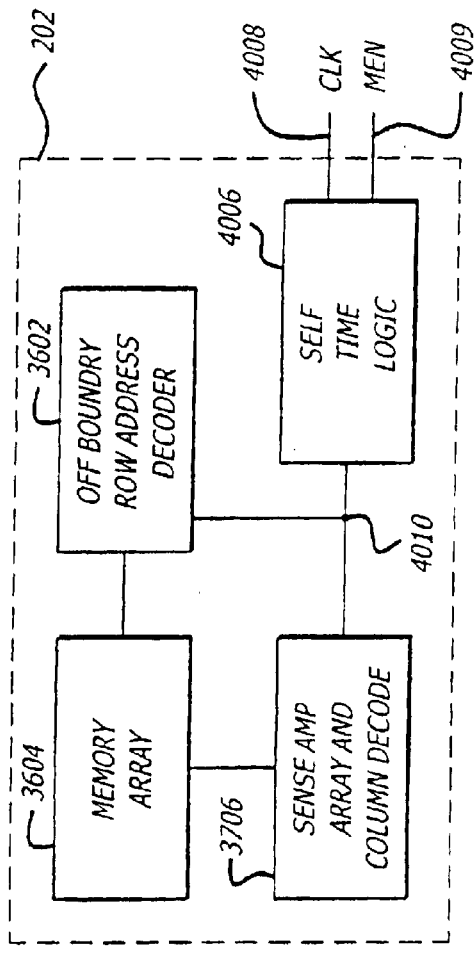
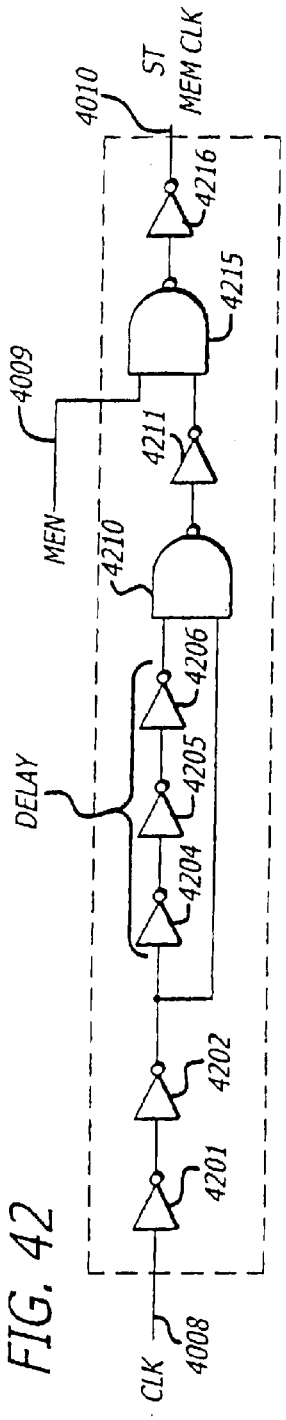
FIG. 40
FIG. 42
FIG. 43

SELECTIVELY MULTIPLEXING MEMORY COUPLING GLOBAL BUS DATA BITS TO NARROWER FUNCTIONAL UNIT COUPLING LOCAL BUS

CROSS REFERENCE TO RELATED APPLICATIONS

This non-provisional United States (U.S.) patent application claims the benefit of U.S. Provisional Application No. 60/280,800 filed on Apr. 2, 2001 by inventors Ruban Kanapathippillai et al entitled "METHOD AND APPARATUS FOR POWER REDUCTION IN A DIGITAL SIGNAL PROCESSOR INTEGRATED CIRCUIT".

This application is also a continuation-in-part and claims the benefit of:

U.S. application Ser. No. 09/494,608, filed Jan. 31, 2000 by Ganapathy et al, now issued U.S. Pat. No. 6,446,195; U.S. application Ser. No. 09/652,100, filed Aug. 30, 2000 by Ganapathy et al, now issued U.S. Pat. No. 6,408,376; U.S. application Ser. No. 09/652,593, filed Aug. 30, 2000 by Ganapathy et al; U.S. application Ser. No. 09/652,556, filed Aug. 31, 2000 by Ganapathy et al, now issued U.S. Pat. No. 6,557,096; U.S. application Ser. No. 09/494,609, filed Jan. 31, 2000 by Ganapathy et al, now issued U.S. Pat. No. 6,598,155; U.S. patent application Ser. No. 10/056,393, entitled "METHOD AND APPARATUS FOR RECONFIGURABLE MEMORY", filed Jan. 24, 2002 by Venkatraman et al which claims the benefit of U.S. Provisional Patent Application No. 60/271,139, filed Feb. 23, 2001; U.S. patent application Ser. No. 10/076,966 entitled "METHOD AND APPARATUS FOR OFF BOUNDARY MEMORY ACCESS", filed Feb. 15, 2002 by Nguyen et al which claims the benefit of U.S. Provisional Patent Application No. 60/271,279, filed Feb. 24, 2001; and, U.S. patent application Ser. No. 10/047,538 entitled "SELF-TIMED ACTIVATION LOGIC FOR MEMORY", filed Jan. 14, 2002 by Nguyen et al which claims the benefit of U.S. Provisional Patent Application No. 60/271,282, filed Feb. 23, 2001; all of which are to be assigned to Intel, Corporation.

FIELD OF THE INVENTION

The invention relates generally to the field of conserving power in integrated circuit devices. More particularly, the invention relates to power reduction design and circuitry in a digital signal processing integrated circuit.

BACKGROUND OF THE INVENTION

Power consumption in an integrated circuit can be caused by many factors, including the power required to switch parasitic capacitance in the wiring of an integrated circuit. The equation for computing average power dissipated in a capacitor each time that it is switched is $$P = \frac{1}{2} CV^2 F.$$

There are a number of well known ways to reduce power consumption in an integrated circuit. One well known way is to reduce the power supply voltage that is provided to the integrated circuit. Another well known way is to reduce the frequency F at which circuitry and any capacitance is switched. Usually this is done by shutting off clocks to certain clocked circuitry in unnecessary functional blocks.

As integrated circuits have become functionally more complex, it has become ever more important to reduce power consumption. This is particularly important in integrated circuits with many transistors, wide data buses and large memory arrays. Access to a memory array that stores operands may be very frequent, particularly in digital signal processing applications so it is important to reduce power consumption in these instances.

Power reduction is important in order to reduce the heating of the integrated circuit to avoid damage and lower packaging costs for the integrated circuit.

BRIEF DESCRIPTION OF THE DRAWINGS

The features of embodiments of the invention will become apparent from the following detailed description in which:

FIG. 6A is an exemplary instruction sequence illustrating a program model for DSP algorithms employing an instruction set architecture (ISA) according to one embodiment of the invention.

FIG. 6B is a chart illustrating a pair of bits that specify differing types of dyadic DSP instructions of the ISA according to one embodiment of the invention.

FIG. 6C lists a set of addressing instructions, and particularly shows a 6-bit operand specifier for the ISA, according to one embodiment of the invention.

FIG. 6D shows an exemplary memory address register according to one embodiment of the invention.

FIG. 6E shows an exemplary 3-bit specifier for operands for use by shadow DSP sub-instructions according to one embodiment of the invention.

FIG. 6F illustrates an exemplary 5-bit operand specifier according to one embodiment of the invention.

FIG. 6G is a chart illustrating the permutations of the dyadic DSP instructions according to one embodiment of the invention.

FIGS. 6H and 6I show a bitmap syntax for exemplary 20-bit non-extended DSP instructions and 40-bit extended DSP instructions, and particularly shows the 20-bit shadow DSP sub-instruction of the single 40-bit extended shadow DSP instruction, according to one embodiment of the invention.

FIG. 6J illustrates additional control instructions for the ISA according to one embodiment of the invention.

FIG. 6K lists a set of extended control instructions for the ISA according to one embodiment of the invention.

FIGS. 6L-1 and 6L-2 lists a set of 40-bit DSP instructions for the ISA according to one embodiment of the invention.

FIG. 12A is a chart of real data types and their alignment for the adders of the signal processing units.

FIG. 12B is a chart of real data types and their alignment for the multipliers of the signal processing units.

FIG. 13A is a chart illustrating data type matching for a real pair of operands.

FIG. 13B is a chart illustrating data type matching for a complex pair of operands.

FIG. 13C is a chart illustrating data type matching for a real operand and a complex operand.

FIG. 14 is an exemplary chart illustrating data type matching for the multipliers of the signal processing units.

FIG. 15A is an exemplary chart illustrating data type matching for the adders of the signal processing units for scalar addition.

FIG. 15B is an exemplary chart illustrating data type matching for the adders of the signal processing units for vector addition.

FIG. 17 is the general data type format for an operand of the instruction set architecture of the invention.

FIG. 18 is an exemplary bitmap for a control register illustrating data typing and permuting of operands.

FIG. 19 is an exemplary chart of possible data types of operands that can be selected.

FIG. 22A illustrates delayed data values x', x", y' and y" used in implementing the Shadow DSP instruction according to one embodiment of the invention.

FIG. 22B illustrates primary stage computations and shadow stage computations performed by signal processor units (SPs) in implementing a finite impulse response (FIR) filter according to one embodiment of the invention.

FIG. 40 is a detailed functional block diagram the local data memory of FIG. 3 including an embodiment of the invention.

FIG. 42 is a detailed functional block diagram of the self time logic for an embodiment of the invention.

FIG. 43 is a waveform diagram illustrating the self timed memory clock generated by the self time logic of FIG. 42.

Like reference numbers and designations in the drawings indicate like elements providing similar functionality. A letter after a reference designator number represents an instance of an element having the reference designator number.

DETAILED DESCRIPTION OF THE INVENTION

Figure 1A:
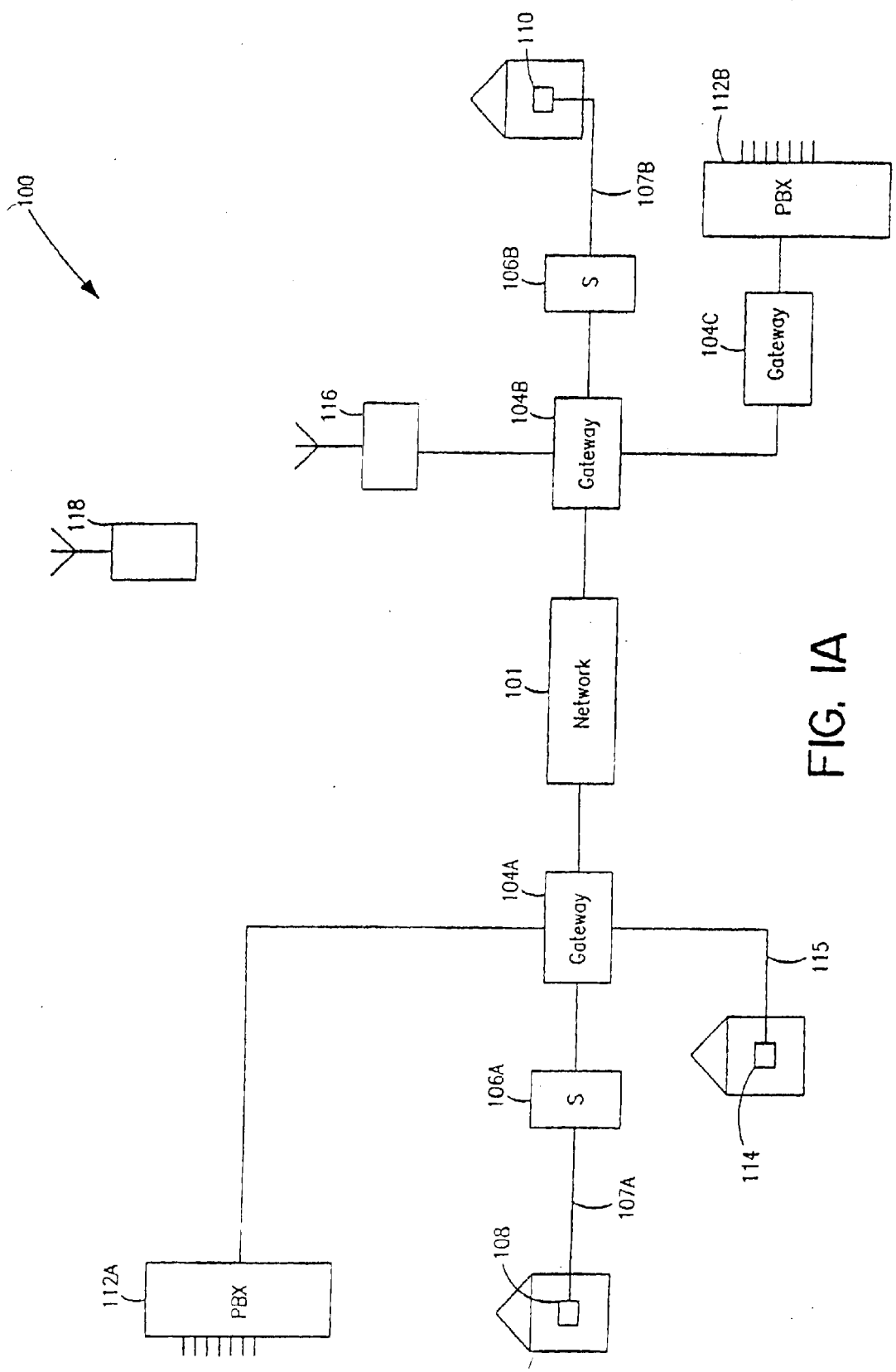
FIG. 1A is a block diagram of a system utilizing the invention.

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention. Furthermore, the invention will be described in particular embodiments but may be implemented in hardware, software, firmware or a combination thereof.

The invention utilizes various techniques to reduce power consumption in digital signal processing (DSP) integrated circuits. These power reduction techniques include architectural techniques, micro-architectural techniques, and circuit techniques and can be generally applied to other types of integrated circuits and just not DSP integrated circuits.

The architectural techniques include how the instruction set of digital signal processing integrated circuits are designed as well as the top level functionality. The digital signal processing integrated circuit of the invention includes a RISC processor for setup and teardown of digital signal processing and one or more DSP units to perform the actual digital signal processing on data operands. The invention has an instruction set with separate RISC and DSP instructions which are utilized in a unified RISC/DSP pipeline. When a RISC instruction is executed, DSP instructions are not. When a DSP instruction is executed, RISC instructions are not. The invention functionally swaps between control by the RISC and data processing by the DSP units. This functional swapping between control and data processing reduces the amount of switching by data busses at a time and the number of components that are active. When the RISC instructions are active, the DSP data path logic and address, and data buses are not switching and therefor the overall power consumption of the integrated circuit is reduced. Because data busses typically are wide (e.g. 64 bits) in digital signal processors to process more information in parallel, by reducing the switching of signals thereon, power can be conserved. The data buses can contribute to as much as sixty percent (60%) of the overall power consumed in a DSP integrated circuit.

Micro architectural techniques to reducing power consumption include data busing schemes, gated clocking, instruction loop buffering, memory clustering and reusing data paths to eliminate additional circuitry that would otherwise be needed.

The busing scheme used in the invention reduces power by a reduction of in the switching capacitance of the global data buses. Global data buses trunks are appropriately partitioned into smaller data bus limbs without affecting cycle time or frequency of the digital signal processing provided by the DSP units. Flexible data typing, permutation and type matching activates only the number of bits in a bus (i.e. the bus width) which are needed for performing computations.

Gated clocking is provided in the invention on an instruction by instruction basis. Each instruction can shut down different parts of the logic circuitry to reduce switching. The unified instruction pipeline is deeper for DSP instructions than RISC instruction.

The invention provides a loop buffer for instruction loop buffering. For program loops of a given size, the instructions are stored locally into a loop buffer when the instructions in the loop are executed the first time. Subsequent iterations of the loop are performed by using instructions stored in the loop buffer. Executing instructions from the loop buffer avoids accessing memory for the instruction in order to reduce power consumption.

Digital signal processors include internal memory for storing instructions and operands. The invention provides an internal memory accessible by each digital signal processing unit and is commonly referred to as a global memory. The internal memory can be can partitioned into memory clusters including separate parallel data buses and address buses. While a specific cluster is active, the other memory clusters are inactive and remain in their prior state. This reducing signal switching on buses and reduces accesses to memory of the inactive memory clusters.

Each of the digital signal processing units includes shadow DSP functional units or blocks in additional to main DSP functional units or blocks. Operands used by the main DSP units for DSP computations, as well as their results, are stored in one or more registers local to the shadow DSP units. The main DSP units and the shadow DSP units can share the same operands in different cycles. An operand does not need to be re-read from memory for use by the shadow DSP units. There is no memory access to obtain operands for the shadow DSP units because the operands are already available locally in the localized registers. Therefore, power is conserved by avoiding memory access of operands and bus state transitions over data buses into the shadow DSP units that would otherwise be needed.

Circuit techniques to reduce power consumption include self-timed memory access circuitry, memory access data typing, and off boundary memory access decoding.

Self-timed memory access circuitry reduces the time needed to store data into and read data out of memory cells in a memory array. The self-time memory access circuitry can be made to have a low dependency on the frequency, voltage or manufacturing process of the digital signal processing integrated circuit.

In local data memories for the digital signal processing units, the memory is organized into sixteen bit word sizes and has the flexibility to selectively access one to four sixteen bit words together at one time. A program written by a programmer can choose how many sixteen bit words are to be read from memory in one access. If only one word is to be read only sixteen bits may need to change state. If two words are to be read, only thirty-two (32) bits may need to change state. If three words are selected to be read, only forty-eight (48) bits may need to change state. If four words are selected to be read, then sixty-four (64) bits need to change state. By providing selective data type access to a memory, only those signal lines needed are switched and the unaccessed portions of memory and the respective signal lines remain at a steady state in order to avoid consuming power.

Off boundary access decoding allows a single read or write access into memory across memory boundaries. This avoids an extra memory access typically needed to acquire data over a memory boundary. An off boundary access decoder allows sixty four bits of data in sixteen bit increments to be accessed in memory from any starting memory location. Only one address decoding cycle in an off boundary address decoder is needed to acquire data across memory boundaries.

By making some assumptions relative to the operation of the digital signal processing integrated circuit, estimates of power savings can be made. Assume for example that one third of executed instructions are RISC instructions and two thirds are DSP instructions. Assume that sixty percent of the DSP units area is utilized for buses or logic circuitry with forty percent utilized for spacing requirements. Assume further that eighty percent of the total average power in the integrated circuit is utilized by the DSP units. With these assumptions in mind, these power reduction techniques can approximately result in a fifteen percent (15%) power savings in DSP units with another ten to twelve percent (10%–12%) power savings in overall power consumption across an entire digital signal processing integrated circuit.

Multiple application specific signal processors (ASSPs) having the instruction set architecture of the invention are provided within gateways in communication systems to provide improved voice and data communication over a packetized network. Each ASSP includes a serial interface, a buffer memory and four core processors in order to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units 300. The RISC ISA is a register based architecture including 16-registers within the register file 413, while the DSP ISA is a memory based architecture with efficient digital signal processing instructions. The instruction word for the ASSP is typically 20 bits but can be expanded to 40-bits to control two instructions to the executed in series or parallel, such as two RISC control instruction and extended DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor of the type where D=[(A op1 B) op2 C] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The invention efficiently executes these dyadic DSP instructions by means of the instruction set architecture and the hardware architecture of the application specific signal processor.

Referring now to FIG. 1A, a voice and data communication system 100 is illustrated. The system 100 includes a network 101 which is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A, 104B, and 104C in order to packetize the information received for transmission across the network 101. A gateway is a device for connecting multiple networks and devices that use different protocols. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104C, respectively. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DS0 input to gateway 104B. At each of the gateways 104A, 104B and 104C, incoming signals are packetized for transmission across the network 101. Signals received by the gateways 104A, 104B and 104C from the network 100 are depacketized and transcoded for distribution to the appropriate destination.

Figure 1B:
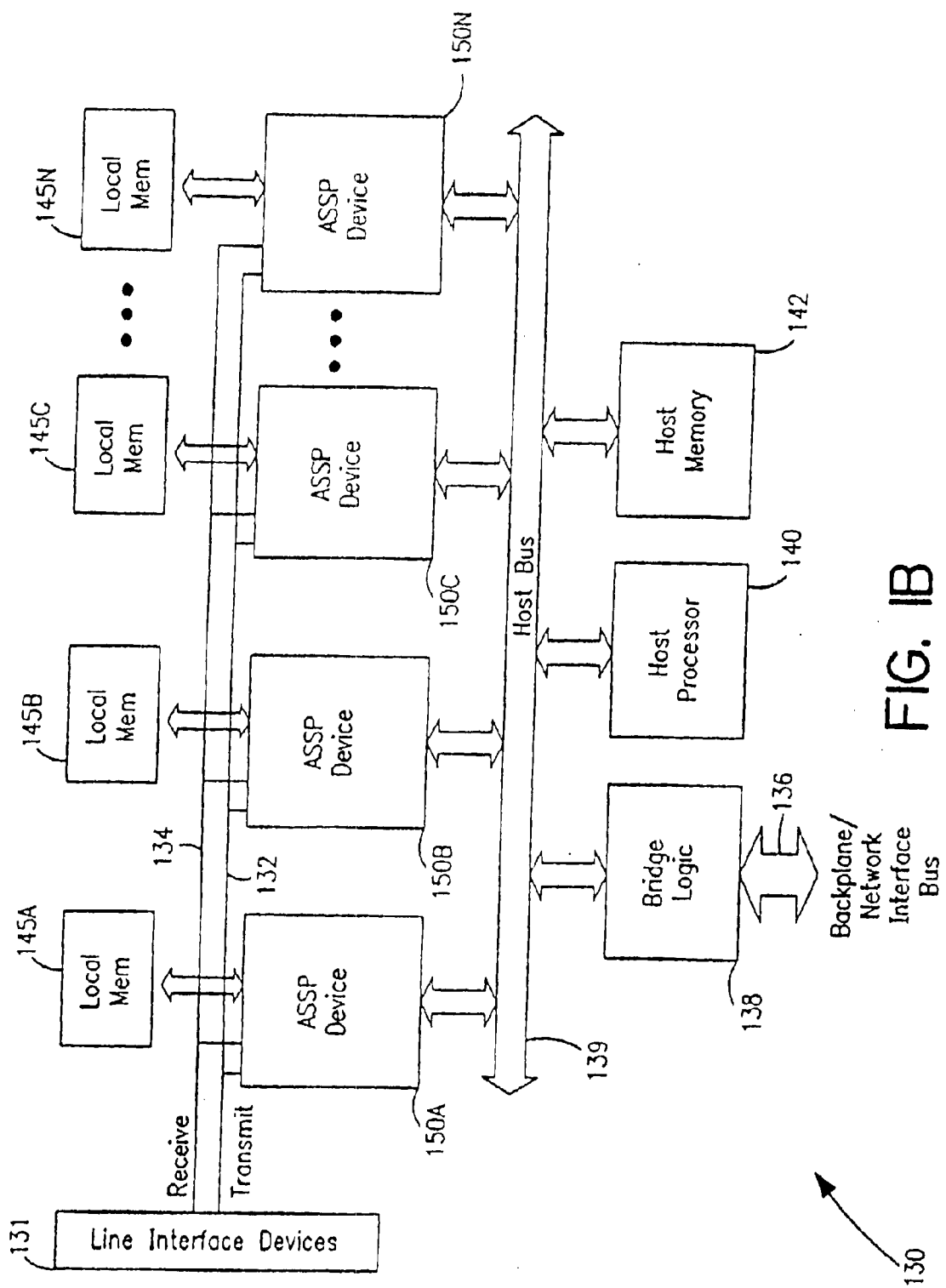
FIG. 1B is a block diagram of a printed circuit board utilizing the invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 100. In interfacing to the network 101, the line interface devices packetize data for transmission out on the network 100 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
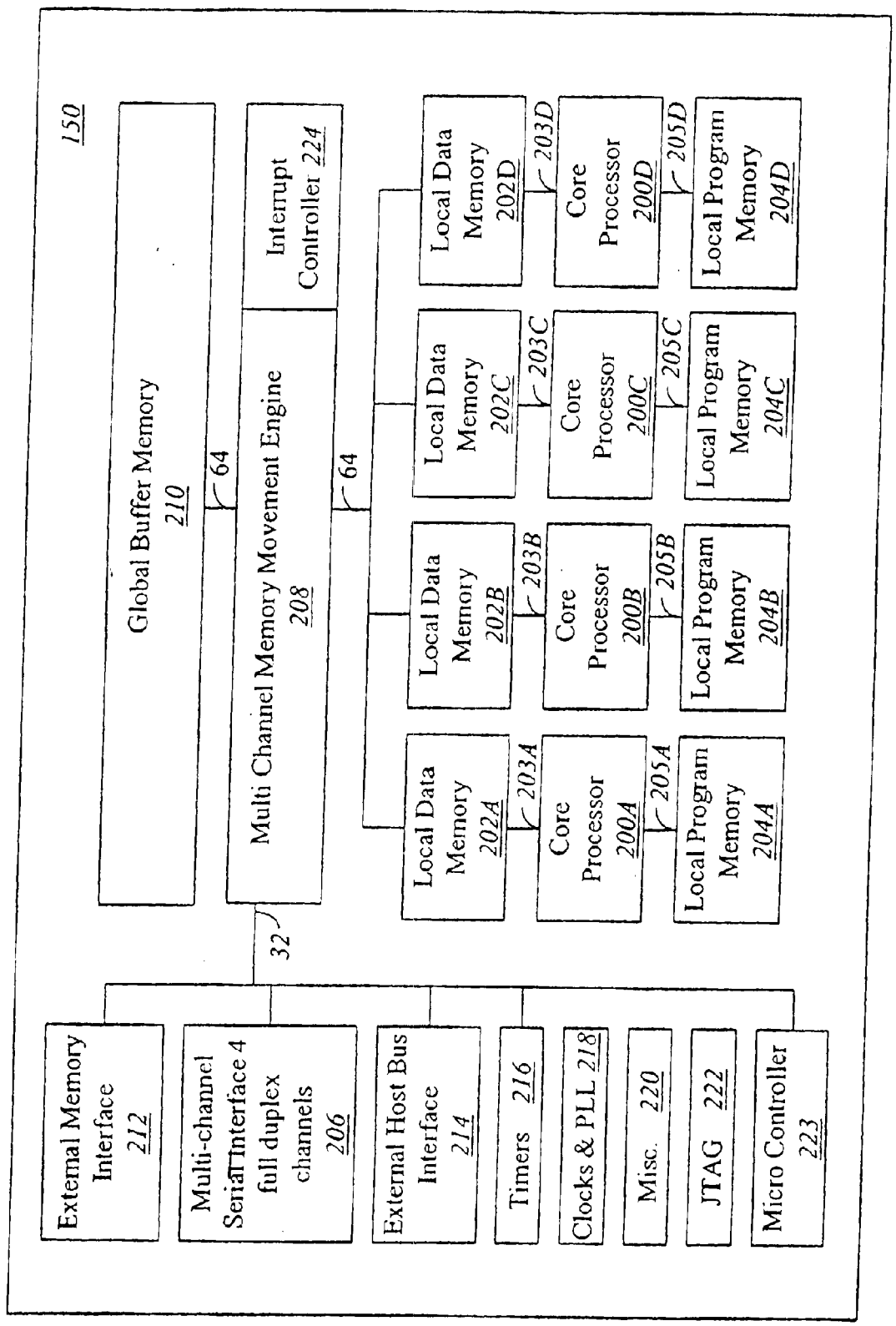
FIG. 2 is a block diagram of the Application Specific Signal Processor (ASSP) of the invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D through buses 203A–203D. Each of the core processors 200A–200D is also respectively coupled to a program memory 204A–204D through buses 205A–205D respectively. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B. Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Figure 3:
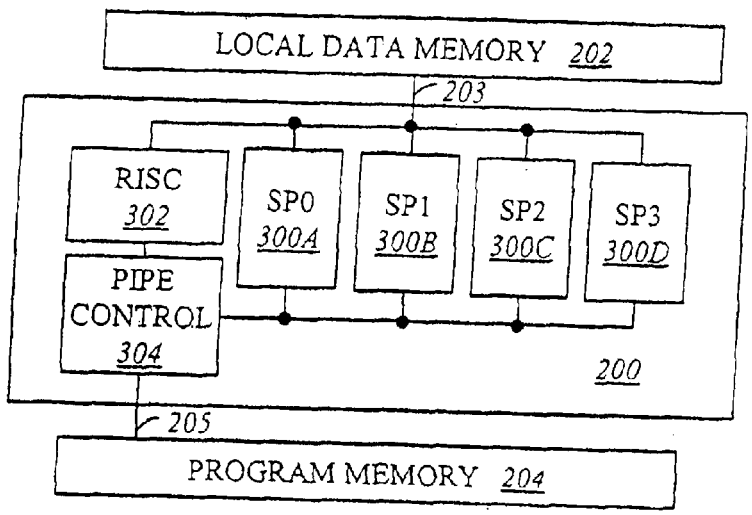
FIG. 3 is a block diagram of an instance of the core processors within the ASSP of the invention.

Referring now to FIG. 3, a block diagram of the core processor 200 is illustrated coupled to its respective data memory 202 through buses 203 and program memory 204 through buses 205. Core processor 200 is the block diagram for each of the core processors 200A–200D. Data memory 202 and program memory 204 refers to a respective instance of data memory 202A–202D and program memory 204A–204D, respectively. Buses 203 and 205 refers to a respective instance of buses 203A–203D and 205A–205D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level.

Program memory 204 couples to the pipe control 304 which includes an instruction buffer that acts as a local loop cache. The instruction buffer in the preferred embodiment has the capability of holding four instructions. The instruction buffer of the pipe control 304 reduces the power consumed in accessing the main memories to fetch instructions during the execution of program loops.

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory, resulting in very efficient data processing. Thus, the instruction set architecture of the invention having a 20 bit instruction word, which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 4:
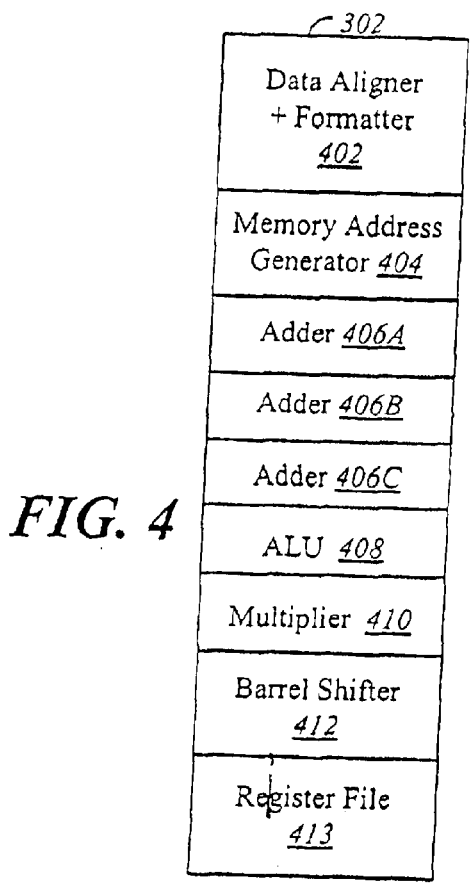
FIG. 4 is a block diagram of the RISC processing unit within the core processors of FIG. 3.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Figure 5A:
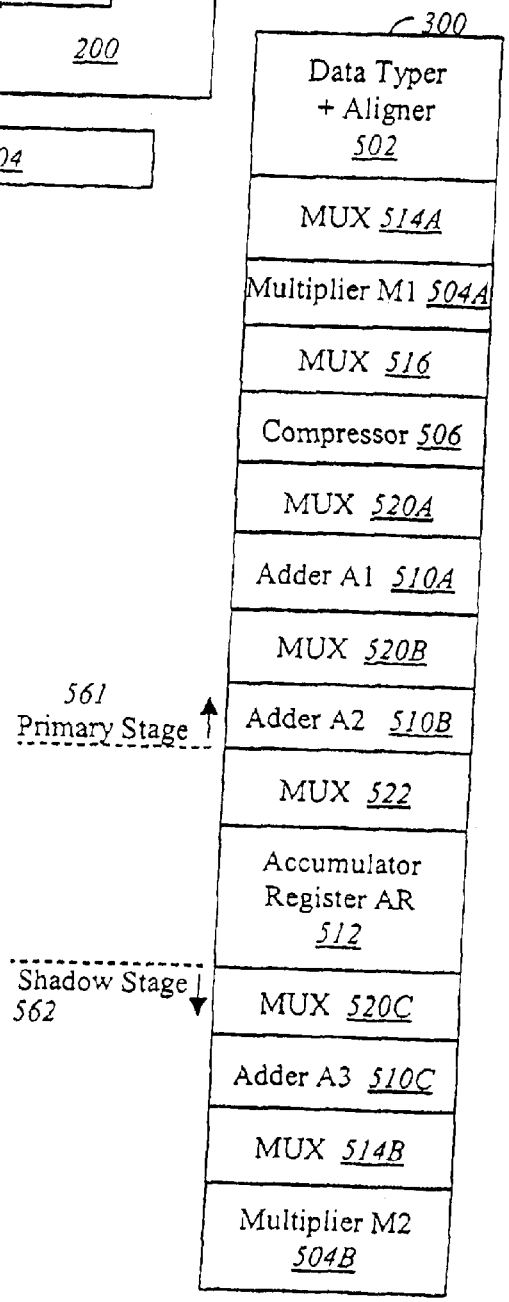
FIG. 5A is a block diagram of an instance of the signal processing units within the core processors of FIG. 3.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Program memory 204 couples to the pipe control 304 that includes an instruction buffer that acts as a local loop cache. The instruction buffer in the preferred embodiment has the capability of holding four instructions. The instruction buffer of the unified RISC/DSP pipe controller 304 reduces the power consumed in accessing the main memories to fetch instructions during the execution of program loops.

Figure 5B:
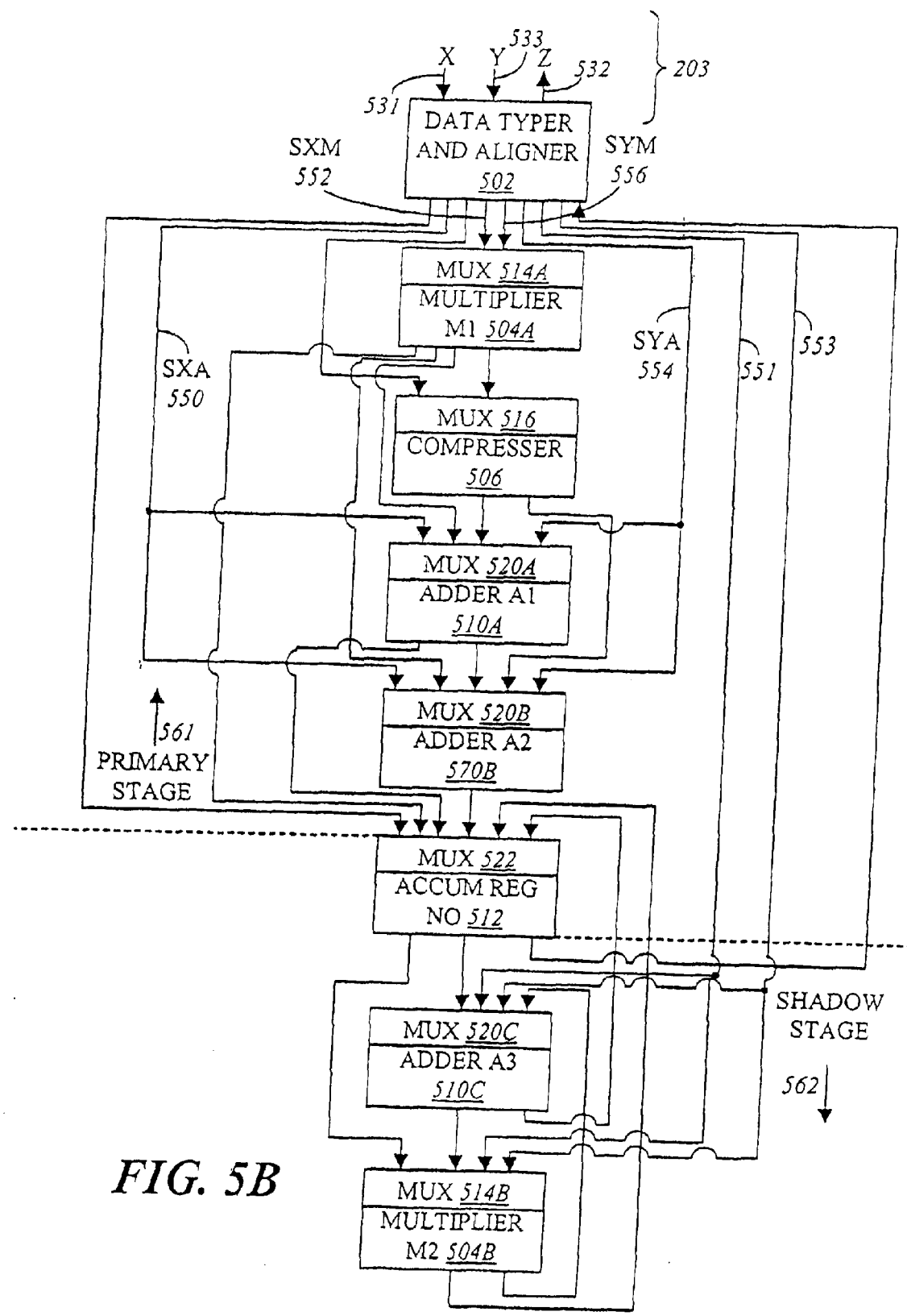
FIG. 5B is a more detailed block diagram of FIG. 5A illustrating the bus structure of the signal processing unit.

Referring now to FIG. 5B, a more detailed block diagram of the functional blocks and the bus structure of the signal processing unit 300 is illustrated. Flexible data typing is possible because of the structure and functionality provided in each signal processing unit. The buses 203 to data memory 202 include a Z output bus 532 and an X input bus 531 and a Y input bus 533.

Output signals are coupled out of the signal processor 300 on the Z output bus 532 through the data typer and aligner 502. Input signals are coupled into the signal processor 300 on the X input bus 531 and Y input bus 533 through the data typer and aligner 502. Two operands can be loaded in parallel together from the data memory 202 into the signal processor 300, one on each of the X bus 531 and the Y bus 533.

Internal to the signal processor 300, the SXM bus 552 and the SYM bus 556 couple between the data typer and aligner 502 and the multiplier M1 504A for two sources of operands from the X bus 531 and the Y bus 533 respectively. The SXA bus 550 and the SYA bus 554 couple between the data typer and aligner 502 and the adder A1 510A and between the data typer and aligner 502 and the adder A2 510B for two sources of operands from the X bus 531 and the Y bus 533 respectively. In the preferred embodiment, the X bus 531 and the Y bus 533 is sixty four bits wide while the SXA bus 550 and the SYA bus 554 is forty bits wide and the SXM bus 552 and the SYM bus 556 is sixteen bits wide. Another pair of internal buses couples between the data typer and aligner 502 and the compressor 506 and between the data typer and aligner 502 and the accumulator register AR 512. While the data typer and aligner 502 could have data busses coupling to the adder A3 510C and the multiplier M2 504B, in the preferred embodiment it does not in order to avoid extra data lines and conserve area usage of an integrated circuit. Output data is coupled from the accumulator register AR 512 into the data typer and aligner 502 over yet another bus.

Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512. Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

Instruction Set Architecture

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the invention to DSP algorithmic structures is a balance between ease of implementation, processing efficiency, and programmability of DSP algorithms. The ISA of the invention provides for data movement operations, DSP/arithmetic/logical operations, program control operations (such as function calls/returns, unconditional/conditional jumps and branches), and system operations (such as privilege, interrupt/trap/hazard handling and memory management control).

Referring now to FIG. 6A, an exemplary instruction sequence 600 is illustrated for a DSP algorithm program model employing the instruction set architecture of the invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions that are typically infrequently executed. Instructions 604 are typically to provide the setup for the inner loop 602, other control through 2×20 control instructions, dual loop setup, and offset extensions for pointer backup. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing units 300 in a single instruction multiple data execution mode, memory access for operands, dyadic DSP operations, and other DSP functionality through the 20/40 bit DSP instructions of the ISA of the invention. Because instructions 605 are so often repeated, significant improvement in operational efficiency may be had by providing the DSP instructions, including general dyadic instructions and dyadic DSP instructions, within the ISA of the invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC control instructions or DSP instructions to be executed in series or parallel, such as a RISC control instruction executed in parallel with a DSP instruction, or a 40 bit extended RISC control instruction or DSP instruction.

The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40-bit DSP instruction that extends the capabilities of a 20-bit dyadic DSP instruction by providing powerful bit manipulation.

These instructions are for accelerating calculations within the core processor 200 of the type where D=[(A op1 B) op2 C] and each of "op1" and "op2" can be a multiply, add or extremum (min/max) class of operation on the three operands A, B, and C. The ISA of the ASSP 150 that accelerates these calculations allows efficient chaining of different combinations of operations. Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bits 39 and 19 indicating the type of instruction. After fetching, the instruction is grouped into two sections of 20 bits each for execution of operations.

Referring to FIG. 6B, in the case of 20-bit RISC control instructions with parallel execution (bit 39=0, bit 19=0), the two 20-bit sections are RISC control instructions that are executed simultaneously. In the case of 20-bit RISC control instructions for serial execution (bit 39=0, bit 19=1), the two 20-bit sections are RISC control instructions that are executed serially. In the case of 20-bit DSP instructions for serial execution (bit 39=1, bit 19=1), the two 20-bit sections are DSP instructions that are executed serially.

In the case of 40-bit extended DSP instructions (bit 39=1, bit 19=0), the two 20 bit sections form one extended DSP instruction and are executed simultaneously. This 40-bit DSP instruction has two flavors: 1) Extended: a 40-bit DSP instruction that extends the capabilities of a 20-bit dyadic DSP instruction—the first 20 bit section is a DSP instruction and the second 20-bit section extends the capabilities of the first DSP instruction and provides powerful bit manipulation instructions, i.e., it is a 40-bit DSP instruction that operates on the top row of functional unit (i.e. the primary stage 561) with extended capabilities; and 2) Shadow: a single 40-bit DSP instruction that includes a pair of 20-bit dyadic sub-instructions: a primary DSP sub-instruction and a shadow DSP sub-instruction that are executed simultaneously, in which, the first 20-bit section is a dyadic DSP instruction that executes on the top row of functional units (i.e. the primary stage 561), while the second 20-bit section is also a dyadic DSP instruction that executes on the bottom row of functional units (i.e. the shadow stage 562) according to one embodiment of the invention. In a preferred embodiment, the distinction between the "Extended" and "Shadow" flavor is made by bit 5 of the 40-bit DSP instruction being set to "0" for "Extended" and to "1" for "Shadow."

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands within the data memory 202, the register file 413 of the RISC 302, or the registers within the accumulator 512, a 6-bit specifier is used in the DSP 40-bit extended instructions to access operands in memory and registers.

FIG. 6C shows an exemplary 6-bit operand specifier according to one embodiment of the invention. Of the six bit specifier used in the extended DSP instructions, the MSB (Bit 5) indicates whether the access is a memory access or register access. In this embodiment, if Bit 5 is set to logical one, it denotes a memory access for an operand. If Bit 5 is set to a logical zero, it denotes a register access for an operand.

If Bit 5 is set to 1, the contents of a specified register (rX where X: 0–7) are used to obtain the effective memory address and post-modify the pointer field by one of two possible offsets specified in one of the specified rX registers. FIG. 6D shows an exemplary memory address register according to one embodiment of the invention.

If Bit 5 is set to 0, Bit 4 determines what register set has the contents of the desired operand. If Bit-4 is set to 1, the remaining specified bits control access to the general purpose file (r0–r15) within the register file 413. If Bit-4 is set to 0, then the remaining specified bits 3:0 control access to the general purpose register file (r0–r15) within the register file 413, the accumulator registers 512 of the signal processing units 300, or to execution unit registers. The general purpose file (GPR) holds data or memory addresses to allow RISC or DSP operand access. RISC instructions in general access only the GPR file. DSP instructions access memory using GPR as addresses.

FIG. 6E shows an exemplary 3-bit specifier for operands for use by shadow DSP instructions only. It should be noted that in one exemplary embodiment, each accumulator register 512 of each signal processing unit 300 includes registers: A0, A1, T, and TR as referenced in FIGS. 6C and 6E. The registers A0 and A1 can be used to hold the result of multiply and arithmetic operations. The T register can be used for holding temporary data and in min-max searches like trellis decoding algorithms. The TR registers records which data value gave rise to the maximum (or minimum). When the values SX1, SX2, SY1, and SY2 are specified in the ereg fields, control logic simply selects the specified delayed data for the shadow stages of each SP without shuffling. When the values SX1s, SX2s, SY1s, SY2s are specified in the ereg fields, these values designate controls specified in a shuffle control register that determine how control logic will control shadow selectors within the data typer and aligners (DTABs) 502 of each of the signal processing units (SPs) 300 to pick delayed data held in delayed data registers for use by shadow stages of the SPs as will be discussed in greater detail later.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently.

FIG. 6F illustrates an exemplary 5-bit operand specifier according to one embodiment of the invention that includes the 4-bit specifier for general data operands and special purpose registers (SPR). The 5-bit operand specifier is used in RISC control instructions.

It should be noted that the preceding bit maps for operand specifiers to access registers and memory illustrated in FIGS. 6B–6F are only exemplary, and as should be appreciated by one skilled in the art, any number of bit map schemes, register schemes, etc., could be used to implement the invention.

DSP Instructions

There are four major classes of DSP instructions for the ASSP 150 these are:

1) Multiply (MULT): Controls the execution of the main multiplier connected to data buses from memory.

Controls: Rounding, sign of multiply

Operates on vector data specified through type field in address register

Second operation: Add, Sub, Min, Max in vector or scalar mode

2) Add (ADD): Controls the execution of the main-adder

Controls: absolute value control of the inputs, limiting the result

Second operation: Add, add-sub, mult, mac, min, max

3) Extremum (MIN/MAX): Controls the execution of the main-adder

Controls: absolute value control of the inputs, Global or running max/min with T register, TR register recording control Second operation: add, sub, mult, mac, min, max 4) Misc: type-match and permute operations.

All of the DSP instructions control the multipliers 504A–504B, adders 510A–510C, compressor 506 and the accumulator 512, the functional units of each signal processing unit 300A–300D. The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

Efficient DSP execution is improved by the hardware architecture of the invention. In this case, efficiency is improved in the manner that data is supplied to and from data memory 202, to and from the RISC 302, and to and from the four signal processing units (SPs) 300 themselves (e.g. the SPs can store data themselves within accumulator registers), to feed the four SPs 300 and the DSP functional units therein, via the data bus 203. The data bus 203 is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data. In the preferred embodiment, when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

DYADIC DSP Instructions

All DSP instructions of the instruction set architecture of the ASSP 150 are dyadic DSP instructions within the 20-bit or 40-bit instruction word. A dyadic DSP instruction informs the ASSP in one instruction and one cycle to perform two operations.

FIG. 6G is a chart illustrating the permutations of the dyadic DSP instructions. The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the invention can be generalized to combining any pair of basic DSP operations to provide very powerful dyadic instruction combinations. Compound DSP operational instructions can provide uniform acceleration for a wide variety of DSP algorithms not just multiply-accumulate intensive filters.

The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

40-BIT Extended Instruction Word: Extended/Shadow

In the 40 bit instruction word, the type of extension from the 20 bit instruction word falls into five categories:

1) Control and Specifier extensions that override the control bits in mode registers 2) Type extensions that override the type specifier in address registers 3) Permute extensions that override the permute specifier for vector data in address registers 4) Offset extensions that can replace or extend the offsets specified in the address registers 5) Shadow DSP extensions that control the shadow stage 562 (i.e. the lower rows of functional units) within a signal processing unit 300 to accelerate block processing.

In the case of a 40-bit extended DSP instruction words (bit 39=1, bit 19=0), execution is based on the value of Bit 5 (0=Extended/1=Shadow). If an extended instruction is set by the value of bit 5, the first 20-bit section is a DSP instruction and the second 20-bit section extends the capabilities of the first DSP instruction, i.e., it is a 40-bit DSP instruction that executes on the top row of functional DSP units within the signal processing units 300. The 40-bit control instructions with the 20 bit extensions allow a large immediate value (16 to 20 bits) to be specified in the instruction and powerful bit manipulation instructions.

If a shadow instruction is set by the value of bit 5, the first 20-bit section is a dyadic DSP instruction that executes on the top row of functional units (the primary stage), while the second 20-bit section is another dyadic DSP instruction that executes on the second row of functional units (the shadow stage).

Efficient DSP execution is provided with the single 40-bit Shadow DSP instruction that includes a pair of 20-bit dyadic sub-instructions: a primary dyadic DSP sub-instruction and a shadow dyadic DSP sub-instruction. Since both the primary and the DSP sub-instruction are dyadic they each perform two DSP operations in one instruction cycle. These DSP operations include the MULT, ADD, MIN/MAX, and NOP operations as previously described. Referring again to FIG. 5B, the first 20 bits, i.e. the primary dyadic DSP sub-instruction, controls the primary stage 561 of signal processing unit 300, which includes the top functional units (adders 510A and 510B, multiplier 504A, compressor 506), that interface to data busses 203 (e.g. x bus 531 and y bus 533) from memory, based upon current data.

The second 20 bits, i.e. the shadow dyadic DSP sub-instruction, controls the shadow stage 562, which includes the bottom functional units (adder 510C and multiplier 504B), simultaneously with the primary stage 561. The shadow stage 562 uses internal or local data as operands such as delayed data stored locally within delayed data registers of each signal processing unit or data from the accumulator.

The top functional units of the primary stage 561 reduce the inner loop cycles in the inner loop 602 by parallelizing across consecutive taps or sections. The bottom functional units of the shadow stage 562 cut the outer loop cycles in the outer loop 601 in half by parallelizing block DSP algorithms across consecutive samples. Further, the invention efficiently executes DSP instructions utilizing the 40-bit Shadow DSP instruction to simultaneously execute the primary DSP sub-instructions (based upon current data) and shadow DSP sub-instructions (based upon delayed locally stored data) thereby performing four operations per single instruction cycle per signal processing unit.

Efficient DSP execution is also improved by the hardware architecture of the invention. In this case, efficiency is improved in the manner that data is supplied to and from data memory 202 to feed the four signal processing units 300 and the DSP functional units therein. The data bus 203 is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data. In the preferred embodiment, when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

As previously described, in one embodiment of the invention, a single 40-bit Shadow DSP instruction includes a pair of 20-bit dyadic sub-instructions: a primary dyadic DSP sub-instruction and a shadow dyadic DSP sub-instruction. Since both the primary and the DSP sub-instruction are dyadic they each perform two DSP operations in one instruction cycle. These DSP operations include the MULT, ADD, MIN/MAX, and NOP operations as previously described. The first 20-bit section is a dyadic DSP instruction that executes on the top row of functional units (i.e. the primary stage 561) based upon current data, while the second 20-bit section is also a dyadic DSP instruction that executes, simultaneously, on the bottom row of functional units (i.e. the shadow stage 562) based upon delayed data locally stored within the delayed data registers of the signal processing units or from the accumulator. In this way, the invention efficiently executes DSP instructions by simultaneously executing primary and shadow DSP sub-instructions with a single 40-bit Shadow DSP instruction thereby performing four operations per single instruction cycle per SP.

The Shadow DSP Instruction

Referring now to FIGS. 6H and 6I, bitmap syntax for exemplary 20-bit non-extended and 40-bit extended DSP instructions is illustrated. As previously discussed, for the 20-bit non-extended instruction word the bitmap syntax is the twenty most significant bits of a forty bit word while for 40-bit extended DSP instruction the bitmap syntax is an instruction word of forty bits. Particularly, FIGS. 6H and 6I taken together illustrate an exemplary 40-bit Shadow DSP instruction. FIG. 6H illustrates bitmap syntax for a 20-bit DSP instruction, and more particularly, the first 20-bit section of the primary dyadic DSP sub-instruction. FIG. 6I illustrates the bitmap syntax for the second 20-bit section of a 40-bit extended DSP instruction and more particularly, under "Shadow DSP", illustrates the bitmap syntax for the shadow dyadic DSP sub-instruction. Note that for the 40-bit shadow instruction to be specified bit 39=1, bit 19=0, and bit 5=1.

As shown in FIG. 6H, the three most significant bits (MSBs), bits numbered 37 through 39, of the primary dyadic DSP sub-instruction (i.e. the first 20-bit section) indicates the MAIN OP instruction type while the SUB OP is located near the end of the primary dyadic DSP sub-instruction at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected. In the case of MULT as the MAIN OP, the SUB OPs are 000 for NOP, 001 or 010 for ADD, 100 or 011 for a negative ADD or subtraction, 101 or 110 for MIN, and 111 for MAX. The bitmap syntax for other MAIN OPs and SUB OPs can be seen in FIG. 6H.

As shown in FIG. 6I, under "Control and specifier Extensions", the lower twenty bits of the control extended dyadic DSP instruction, i.e. the extended bits, control the signal processing unit to perform rounding, limiting, absolute value of inputs for SUB OP, or a global MIN/MAX operation with a register value.

Particularly, as shown in FIG. 6I under "Shadow DSP", instruction bits numbered 14, 17, and 18, of the shadow dyadic DSP sub-instruction indicate the MAIN OP instruction type while the SUB OP is located near the end of the shadow dyadic DSP sub-instruction at bits numbered 0 through 2. In one embodiment, the MAIN OP instruction codes and the SUB OP codes can be the same as previously described for the primary dyadic DSP sub-instruction. However, it will be appreciated by those skilled in the art that the instruction bit syntax for the MAIN OPs and the SUB OPs of the primary and shadow DSP sub-instructions of the Shadow DSP instruction are only exemplary and a wide variety of instruction bit syntaxes could be used. Further, FIG. 6I shows the ereg1 (bits 10–12) and ereg2 (bits 6–8) fields, which as previously discussed, are used for selecting the data values to be used by the shadow stages, as will be discussed in more detail later.

The bitmap syntax of the dyadic DSP instructions can be converted into text syntax for program coding. Using the multiplication or MULT as an example, its text syntax for multiplication or MULT is (vmul|vmuln).(vadd|vsub|vmax|sadd|ssub|smax) da, sx, sa, sy [,(ps0|ps1)]

The "vmul|vmuln" field refers to either positive vector multiplication or negative vector multiplication being selected as the MAIN OP. The next field, "vadd|vsub|vmax sadd|ssub|smax", refers to either vector add, vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[, (ps0|ps1)]" refers to pair selection of keyword PS0 or PS1 specifying which are the source-destination pairs of a parallel-store control register.

Figure 6L-1:
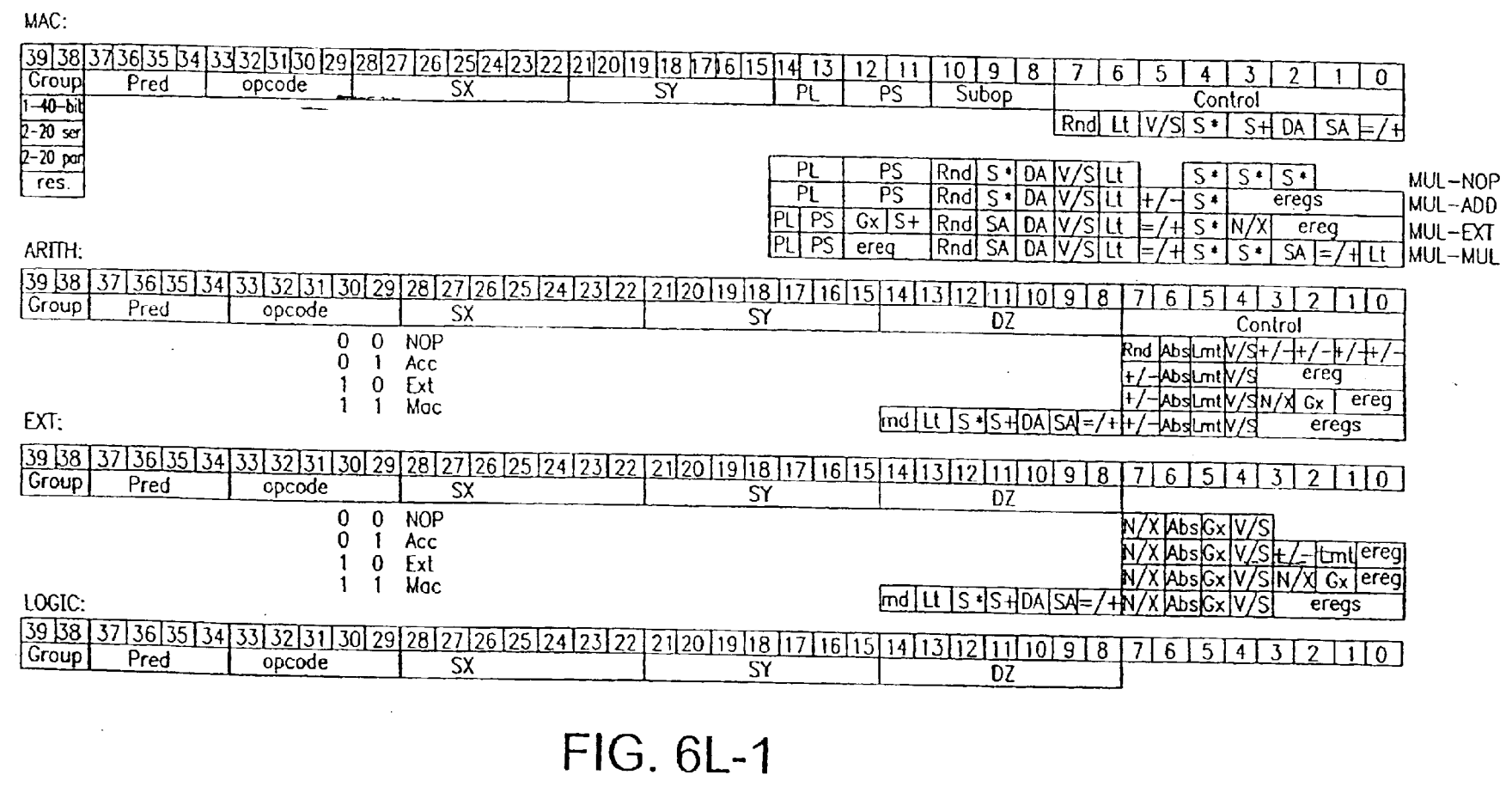

FIG. 6J illustrates additional control instructions for the ISA according to one embodiment of the invention. FIG. 6K illustrates a set of extended control instructions for the ISA according to one embodiment of the invention. FIG. 6L illustrates a set of 40-bit DSP instructions for the ISA according to one embodiment of the invention.

Unified RISC/DSP Pipeline Controller

Figure 7:
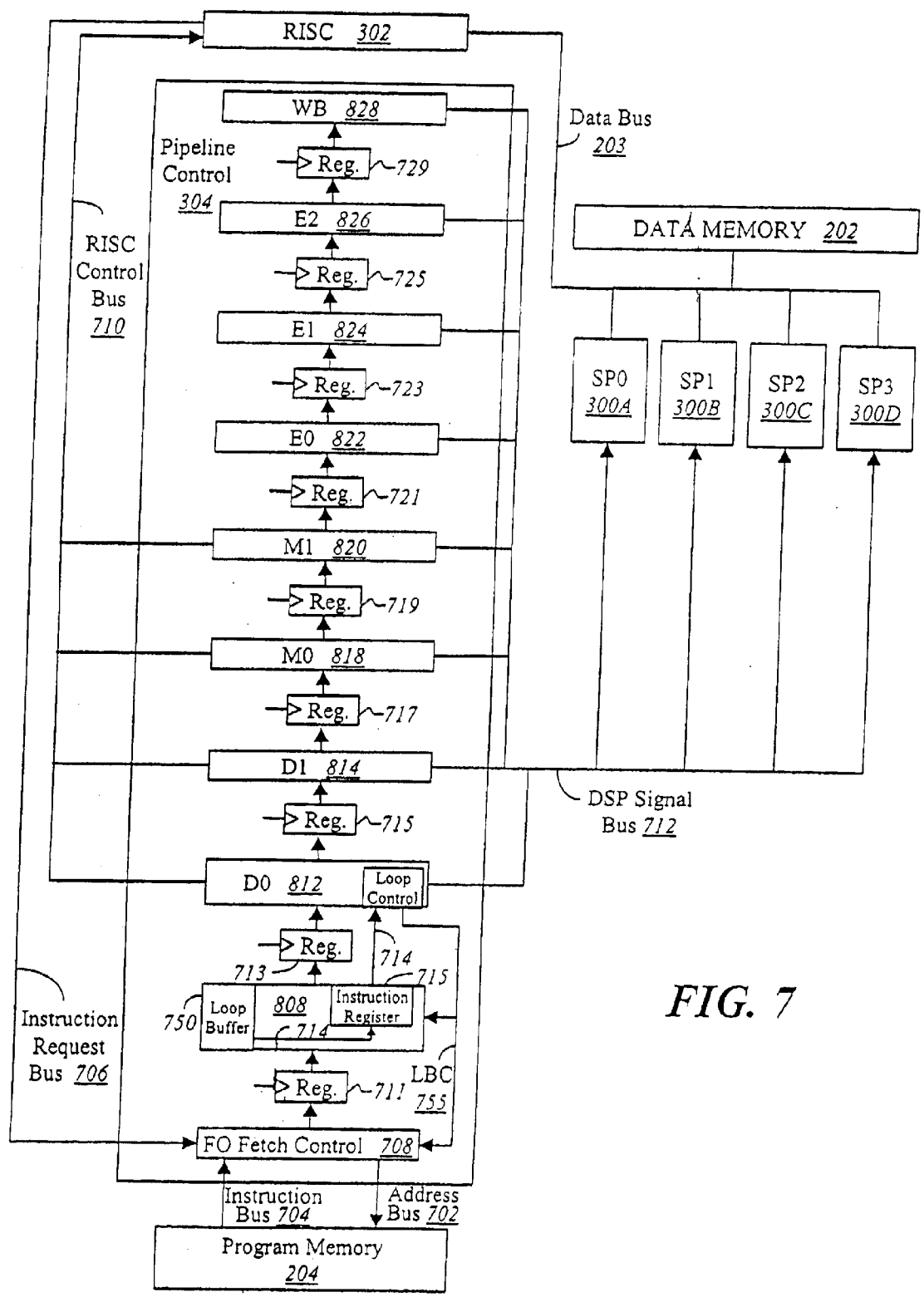
FIG. 7 is a functional block diagram illustrating an exemplary architecture for a unified RISC/DSP pipeline controller according to one embodiment of the invention.

FIG. 7 is a functional block diagram illustrating an exemplary architecture for a unified RISC/DSP pipeline controller 304 according to one embodiment of the invention. In this embodiment, the unified RISC/DSP pipeline controller 304 controls the execution of both reduced instruction set computer (RISC) control instructions and digital signal processing (DSP) instructions within each core processor of the ASSP.

As shown in FIG. 7, the unified RISC/DSP pipeline controller 304 is coupled to the program memory 204, the RISC control unit 302, and the four signal processing units (SPs) 300. The unified pipeline controller 304 is coupled to the program memory 204 by the address bus 702 and the instruction bus 704. The program memory 204 stores both DSP instructions and RISC control instructions. The RISC 302 transmits a request along the instruction request bus 706 to the FO Fetch control stage 708 of the unified pipeline controller 304 to fetch a new instruction. FO Fetch control stage 708 generates an address and transmits the address onto the address bus 702 to address a memory location of a new instruction in the program memory 204. The instruction is then signaled onto to the instruction bus 704 to the FO Fetch control stage 708 of the unified pipeline controller 304.

The unified RISC/DSP pipeline controller 304 is coupled to the RISC control unit 302 via RISC control signal bus 710. The unified pipeline controller 304 generates RISC control signals and transmits them onto the RISC control signal bus 710 to control the execution of the RISC control instruction by the RISC control unit 302. Also, as previously described, the RISC control unit 302 controls the flow of operands and results between the signal processing units 300 and data memory 202 via data bus 203.

The unified RISC/DSP pipeline controller 304 is coupled to the four signal processing units (SPs) 300A–300D via DSP control signal bus 712. The unified pipeline controller 304 generates DSP control signals and transmits them onto the DSP control signal bus 712 to control the execution of the DSP instruction by the SPs 300A–300D. The signal processing units execute the DSP instruction using multiple data inputs from the data memory 202, the RISC 302, and accumulator registers within the SPs, delivered to the SPs along data bus 203. By utilizing the single unified RISC/DSP pipeline controller 304 of the invention to control the execution of both RISC control instructions and DSP instructions, the hardware and power requirements are reduced for the signal processor resulting in increased operational efficiency.

Figure 8A:
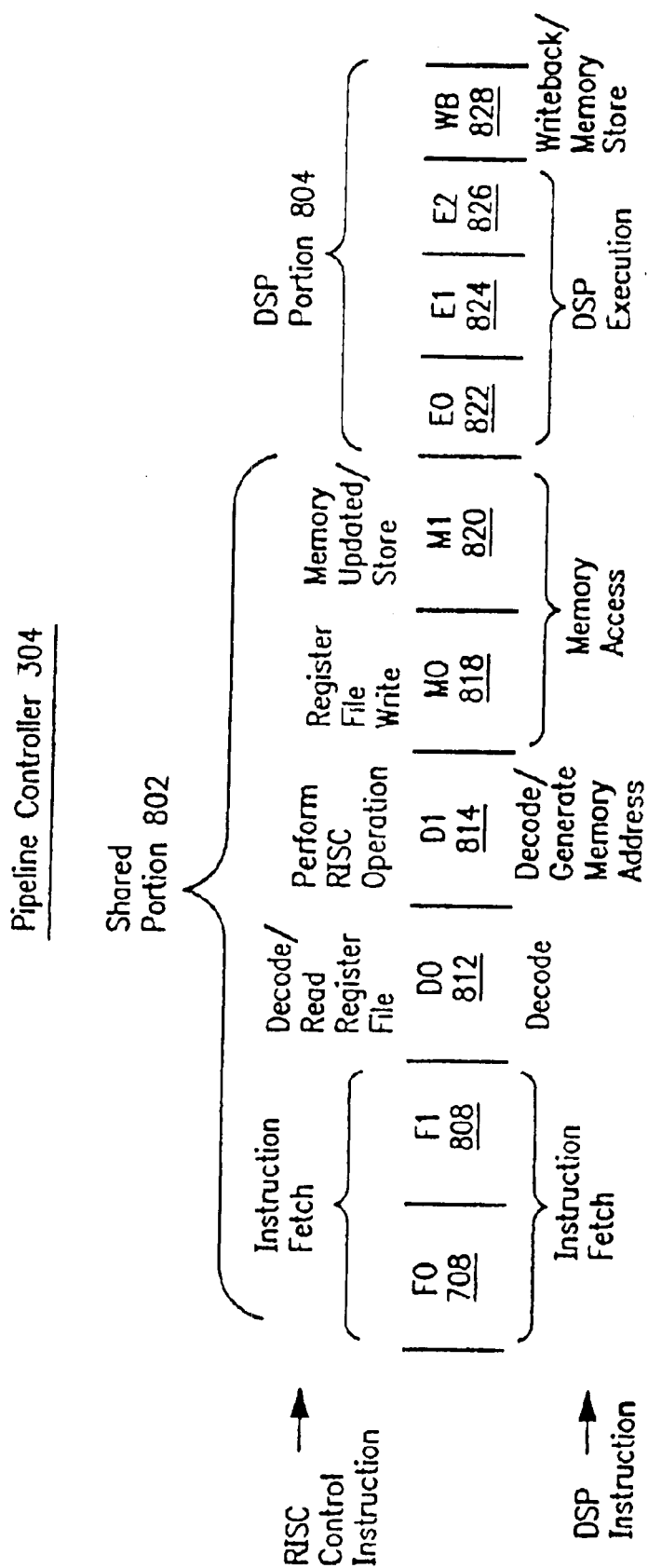
FIG. 8A is a diagram illustrating the operations occurring in different stages of the unified RISC/DSP pipeline controller according to one embodiment of the invention.
Figure 8B:
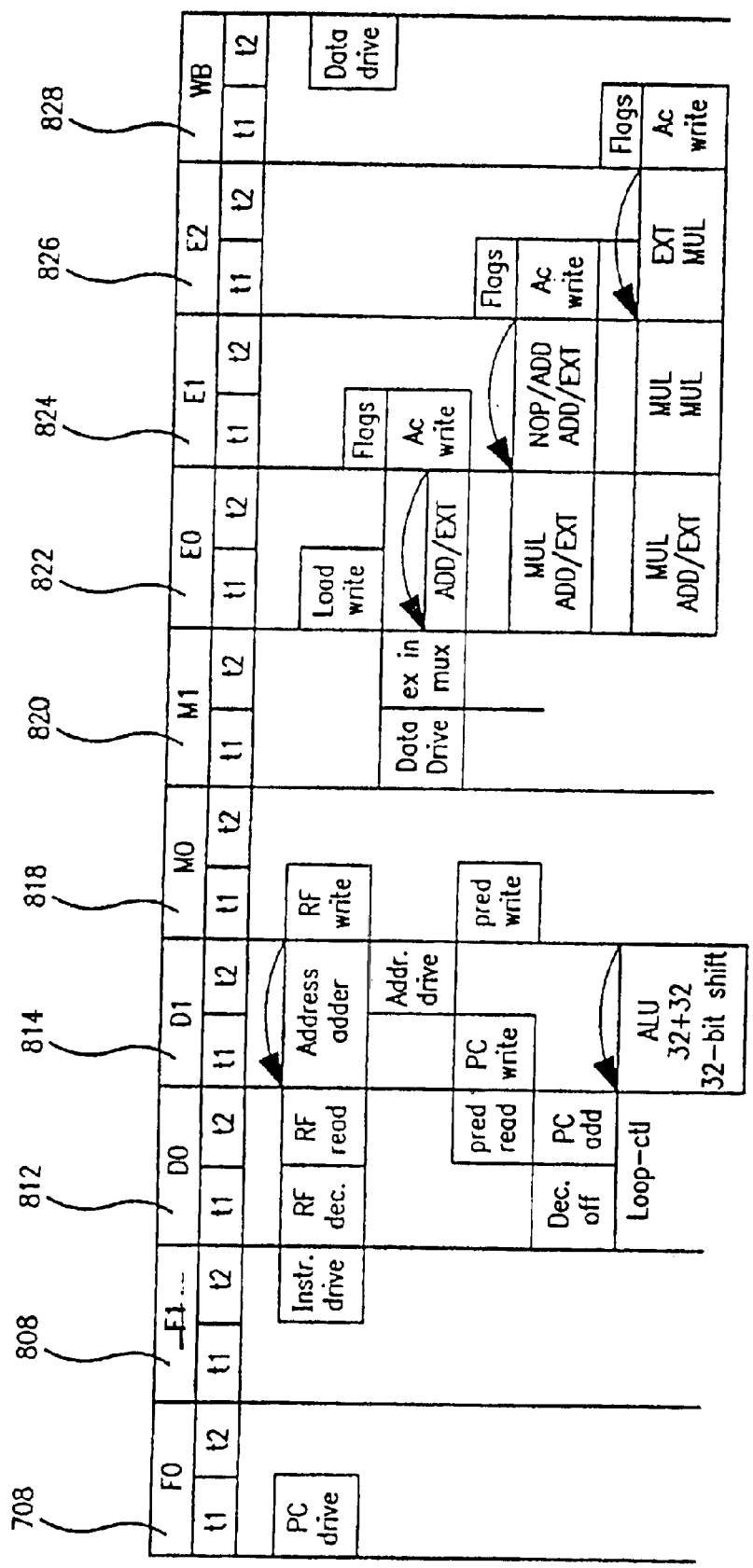
FIG. 8B is a diagram illustrating the timing of certain operations for the unified RISC/DSP pipeline controller of FIG. 8A according to one embodiment of the invention.

Referring to FIGS. 8A and 8B, in conjunction with FIG. 7, the inner stages of the unified RISC/DSP pipeline controller will now be discussed. FIG. 8A is a diagram illustrating the operations occurring in different stages of the unified RISC/DSP pipeline controller according to one embodiment of the invention. FIG. 8B is a diagram illustrating the timing of certain operations for the unified RISC/DSP pipeline controller of FIG. 8A according to one embodiment of the invention.

As illustrated in FIG. 8A, the unified RISC/DSP pipeline controller 304 is capable of executing both RISC control instructions and DSP instructions. The RISC control instruction is executed within a shared portion 802 of the unified pipeline controller 304 and the digital signal processing instruction is executed within the shared portion 802 of the unified pipeline and within a DSP portion 804 of the unified pipeline.

The unified pipeline controller 304 has a two-stage instruction fetch section including a F0 Fetch control stage 708 and a F1 Fetch control stage 808. As previously discussed, the RISC 302 transmits a request along the instruction request bus 706 to the F0 Fetch control stage 708 to fetch a new instruction. The F0 Fetch control stage 708 generates an address and transmits the address onto the address bus 702 to address a memory location of a new instruction in the program memory 204. The DSP or RISC control instruction is then signaled onto the instruction bus 704 to the F0 Fetch control stage 708 and is stored within pipeline register 711. As should be appreciated, all of the pipeline registers are clocked to sequentially move the instruction down the pipeline. Upon the next clock cycle of the pipeline, the fetched instruction undergoes further processing by the F1 Fetch control stage 808 and is stored within instruction pipeline register 713. By the end of the F1 Fetch control stage 808 a 40-bit DSP or RISC control instruction has been read and latched into the instruction pipeline register 713. Alternatively, the instruction can be stored within instruction register 715 for loop buffering of the instruction as will be discussed later. Also, a program counter (PC) is driven to memory.

The unified RISC/DSP pipeline controller 304 has a two stage Decoder section including a D0 decode stage 812 and a D1 decode stage 814 to decode DSP and RISC control instructions. For a DSP instruction, upon the next clock cycle, the DSP instruction is transmitted from the instruction pipeline register 713 to the D0 decode stage 812 where the DSP instruction is decoded and DSP control signals are generated and transmitted via DSP control signal bus 712 to the SPs 300 to control the execution of the DSP instruction by the SPs. The decoded DSP instruction is then stored in pipeline register 717.

Upon the next clock cycle, the DSP instruction is transmitted from the pipeline register 717 to the D1 decode stage 814 where the DSP instruction is further decoded and DSP control signals are generated and transmitted via DSP control signal bus 712 to the SPs 300 to control the execution of the DSP instruction by the SPs. The decoded DSP instruction is then stored in pipeline register 719. The D1 decode stage 814 also generates memory addresses for use by the SPs and can generate DSP control signals identifying which SPs should be used for DSP tasks. Also, a new program counter (PC) is driven to program memory 204.

For a RISC control instruction, upon the next clock cycle, the RISC control instruction is transmitted from the instruction pipeline register 713 to the D0 decode stage 812 where the RISC control instruction is decoded and RISC control signals are generated and transmitted via RISC control signal bus 710 to the RISC 302 to control the execution of the RISC control instruction by the RISC 302. The decoded RISC control instruction is then stored in pipeline register 717. The D0 decode stage 812 also decodes register specifiers for general purpose register (GPR) access and reads the GPRs of the register file 413 of the RISC 302.

Upon the next clock cycle, the RISC control instruction is transmitted from the pipeline register 717 to the D1 decode stage 814 where the RISC control instruction is further decoded and RISC control signals are generated and transmitted via RISC control signal bus 710 to the RISC 302 to control the execution of the RISC control instruction by the RISC 302 and, particularly, to perform the RISC control operation. The decoded RISC control instruction is then stored in pipeline register 719. Also, a new program counter (PC) is driven to program memory 204.

The unified RISC/DSP pipeline controller 304 has a two-stage memory access section including a M0 memory access stage 818 and a M1 memory access stage 820 to provide memory access for DSP and RISC control instructions. For a DSP instruction, upon the next clock cycle, the decoded DSP instruction is transmitted from the pipeline register 719 to the M0 memory stage 818 where the DSP instruction undergoes processing and DSP control signals are generated and transmitted via DSP control signal bus 712 to the SPs 300 to control the execution of the DSP instruction by the SPs. Particularly, the DSP control signals provide memory access for the SPs by driving data addresses to data memory 202 for requesting data (e.g. operands) from data memory 202 for use by the SPs. The processed DSP instruction is then stored in pipeline register 721.

Upon the next clock cycle, the processed DSP instruction is transmitted from the pipeline register 721 to the M1 memory stage 820 where the DSP instruction undergoes processing and DSP control signals are generated and transmitted via DSP control signal bus 712 to the SPs 300 to control the execution of the DSP instruction by the SPs. Particularly, the DSP control signals provide memory access for the SPs by driving previously addressed data (e.g. operands) back from data memory 202 to the SPs for use by the SPs for executing the DSP instruction. The processed DSP instruction is then stored in pipeline register 723.

For a RISC control instruction, upon the next clock cycle, the decoded RISC control instruction is transmitted from the pipeline register 719 to the M0 memory stage 818 where the RISC control instruction undergoes processing and RISC control signals are generated and transmitted via RISC control signal bus 710 to the RISC 302 to control the execution of the RISC control instruction by the RISC 302. Particularly, General Purpose Register (GPR) writes are performed to the register file 413 of the RISC 302 to update the registers after the prior performance of the RISC control operation. The processed RISC control instruction is then stored in pipeline register 721.

Upon the next clock cycle, the processed RISC control instruction is transmitted from the pipeline register 721 to the M1 memory stage 820 where the RISC control instruction undergoes processing and RISC control signals are generated and transmitted via RISC control signal bus 710 to the RISC 302 to control the execution of the RISC control instruction by the RISC 302. Particularly, memory (e.g. data memory 203) or registers (e.g. GPR) are updated, for example, by Load or Store instructions. This completes the control of the execution of the RISC control instruction by the unified RISC/DSP pipeline controller 304.

The unified RISC/DSP pipeline controller 304 has a three-stage execution section including an E0 execution stage 822, an E1 execution stage 824, and an E2 execution stage 824 to provide DSP control signals SPs 300 to control the execution of the DSP instruction by the SPs. The three execution stages generally provide DSP control signals to the SPs 300 to control the functional units of each SP (e.g. multipliers, adders, and accumulators, etc.), previously discussed, to perform the DSP operations, such as multiply and add, etc., of the DSP instruction.

Starting with the E0 execution stage 822, upon the next clock cycle, the processed DSP instruction is transmitted from the pipeline register 723 to the E0 execution stage 822 where the DSP instruction undergoes execution processing and DSP control signals are generated and transmitted via DSP control signal bus 712 to the SPs 300 to control the execution of the DSP instruction by the SPs. Particularly, the DSP control signals control the execution of multiply, add, and min-max operations by the SPs. Also, the DSP control signals control the SPs to update the register file 413 of the RISC 302 with Load data from data memory 202. The execution processed DSP instruction is then stored in pipeline register 725.

Upon the next clock cycle, the execution processed DSP instruction is transmitted from the pipeline register 725 to the E1 execution stage 824 where the DSP instruction undergoes execution processing and DSP control signals are generated and transmitted via DSP control signal bus 712 to the SPs 300 to control the execution of the DSP instruction by the SPs. Particularly, the DSP control signals control the execution of multiply, add, (and min-max) operations of the DSP instruction by the SPs. Further, the DSP control signals control the execution of accumulation of vector multiplies and the updating of flag registers by the SPs. The execution processed DSP instruction is then stored in pipeline register 727.

Upon the next clock cycle, the execution processed DSP instruction is transmitted from the pipeline register 727 to the E2 execution stage 826 where the DSP instruction undergoes execution processing and DSP control signals are generated and transmitted via DSP control signal bus 712 to the SPs 300 to control the execution of the DSP instruction by the SPs. Particularly, the DSP control signals control the execution of multiply, min-max operations, and the updating of flag registers by the SPs. The execution processed DSP instruction is then stored in pipeline register 729.

The unified RISC/DSP pipeline controller 304 has a last single WB Writeback stage 828 to write back data to data memory 202 after execution of the DSP instruction. Upon the next clock cycle, the execution processed DSP instruction is transmitted from the pipeline register 729 to the WB Writeback stage 828 where the DSP instruction undergoes processing and DSP control signals are generated and transmitted via DSP control signal bus 712 to the SPs 300 to control the execution of the DSP instruction by the SPs. Particularly, the DSP control signals control the SPs in writing back data to data memory 202 after execution of the DSP instruction. More particularly, in the WB Writeback stage 828, DSP control signals are generated to control the SPs in driving data into data memory from a parallel store operation and in writing data into the data memory. Further, DSP control signals are generated to instruct the SPs to perform a last add stage for saturating adds and to update accumulators from the saturating add operation. This completes the control of the execution of the DSP instruction by the unified RISC/DSP pipeline controller 304.

By utilizing the single unified RISC/DSP pipeline controller 304 of the invention to control the execution of both RISC control instructions and DSP instructions, the hardware and power requirements are reduced for the application specific signal processor (ASSP) resulting in increased operational efficiency. For example, when RISC control instructions are being performed the DSP portion 804 of the unified pipeline controller 304 and the SPs 300 are not utilized resulting in power savings. On the other hand, when DSP instructions are being performed, especially when many DSP instructions are looped, the RISC 302 is not utilized, resulting in power savings.

The unified RISC/DSP pipeline controller 304 melds together traditionally separate RISC and DSP pipelines in a seamless integrated way to provide fine-grained control and parallelism. Also, the pipeline is deep enough to allow clock scaling for future products. The unified RISC/DSP pipeline controller 304 dramatically increases the efficiency of the execution of both DSP instruction and RISC control instructions by a signal processor.

Loop Buffering

Referring again to FIG. 7, loop buffering for the signal processing units 300 will now be discussed. As previously discussed, the unified RISC/DSP pipeline controller 304 couples to the RISC control unit 302 and the program memory 204 to provide the control of the signal processing units 300 in a core processor 200. The unified pipeline controller 304, includes an F0 fetch control stage 708, an F1 fetch control stage 808 and a D0 decoding stage 812 coupled as shown in FIG. 7. The F0 fetch control stage 708 in conjunction with the RISC control unit 302 generate addresses to fetch new instructions from the program memory 204. F1 fetch control stage 808 receives the newly fetched instructions.

F1 fetch control stage 808 includes a loop buffer 750 to store and hold instructions for execution within a loop and an instruction register 715 coupled to the output of the loop buffer 750 to store the next instruction for decoding by the D0 decoding stage 812. The output from the loop buffer 750 can be stored into the instruction register 715 to generate an output that is coupled into the DO decoding stage 812. The registers in the loop buffer 750 are additionally used for temporary storage of new instructions when an instruction stall in a later pipeline stage (not shown) causes the entire execution pipeline to stall for one or more clock cycles. Referring momentarily back to FIG. 6A, the loop buffer 750 stores and holds instructions that are executed during a loop such as instructions 604 and 606 for the outer loop 601 or instructions 605 for the inner loop 602.

Referring again to FIG. 7, each of the blocks 708, 808, and 812 in the unified pipeline controller 304 have control logic to control the instruction fetching and loop buffering for the signal processing units 300 of the core processor 200. The RISC control unit 302 signals to the F0 Fetch control stage 708 to fetch a new instruction. F0 Fetch control stage 708 generates an address on the address bus 702 coupled into the program memory 204 to address a memory location of a new instruction. The instruction is signaled onto the instruction bus 704 from the program memory 204 and is coupled into the loop buffer 750 of the F1 fetch control stage 750. The loop buffer 750 momentarily stores the instruction unless a loop is encountered which can be completely stored therein.

The loop buffer 750 is a first in first out (FIFO) type of buffer. That is, the first instruction stored in the FIFO represents the first instruction output which is executed. If a loop is not being executed, the instructions fall out of the loop buffer 750 and are overwritten by the next instruction. If the loop buffer 750 is operating in a loop, the instructions circulate within the loop buffer 750 from the first instruction within the loop (the "first loop instruction") to the last instruction within the loop (the "last loop instruction"). The depth N of the loop buffer 750 is coordinated with the design of the pipeline architecture of the signal processing units and the instruction set architecture. The deeper the loop buffer 750, the larger the value of N, the more complicated the pipeline and instruction set architecture. In the preferred embodiment, the loop buffer 750 has a depth N of four to hold four dyadic DSP instructions of a loop. Four dyadic DSP instructions are the equivalent of up to eight prior art DSP instructions which satisfies a majority of DSP program loops while maintaining reasonable complexity in the pipeline architecture and the instruction set architecture.

The loop buffer 750 differs from cache memory, which are associated with microprocessors. The loop buffer stores instructions of a program loop ("looping instructions") in contrast to a cache memory that typically stores a quantity of program instructions regardless of their function or repetitive nature. To accomplish the storage of loop instructions, as instructions are fetched from program memory 204, they are stored in the loop buffer and executed. The loop buffer 750 continues to store instructions read from program memory 204 in a FIFO manner until receiving a loop buffer cycle (LBC) signal 755 indicating that one complete loop of instructions has been executed and stored in the loop buffer 750. After storing a complete loop of instructions in the loop buffer 750, there is no need to fetch the same instructions over again to repeat the instructions. Upon receiving the LBC signal 755, instead of fetching the same instructions within the loop from program memory 204, the loop buffer is used to repeatedly output each instruction stored therein in a circular fashion in order to repeat executing the instructions within the sequence of the loop.

The loop buffer cycle signal LBC 755 is generated by the control logic within the D0 decoding stage 812. The loop buffer cycle signal LBC 755 couples to the F1 fetch control stage 808 and the F0 fetch control stage 708. The LBC 755 signals to the F0 fetch control stage 708 that additional instructions need not be fetched while executing the loop. In response the F0 fetch control stage remains idle such that power is conserved by avoiding the fetching of additional instructions. The control logic within the F1 fetch control stage 808 causes the loop buffer 750 to circulate its instruction output provided to the D0 decoding stage 812 in response to the loop buffer cycle signal 755. Upon completion of the loop, the loop buffer cycle signal 755 is deasserted and the loop buffer returns to processing standard instructions until another loop is to be processed.

In order to generate the loop buffer cycle signal 755, the first loop instruction that starts the loop needs to be ascertained and the total number of instructions or the last loop instruction needs to be determined. Additionally, the number of instructions in the loop, that is the loop size, cannot exceed the depth N of the loop buffer 750. In order to disable the loop buffer cycle signal 755, the number of times the loop is to be repeated needs to be determined.

The first loop instruction that starts a loop can easily be determined from a loop control instruction that sets up the loop. Loop control instructions can set up a single loop or one or more nested loops. In the preferred embodiment a single nested loop is used for simplicity. The loop control instructions are LOOP and LOOPi of FIG. 6I for a single loop and DLOOP and DLOOPi of FIG. 6J for a nested loop or dual loops. The LOOPi and DLOOPi instructions provide the loop values indirectly by pointing to registers that hold the appropriate values. The loop control instruction indicates how many instructions away does the first instruction of the loop begin in the instructions that follow. In the invention, the number of instructions that follows is three or more. The loop control instruction additionally provides the size (i.e., the number of instructions) of the loop. For a nested loop, the loop control instruction (DLOOP or DLOOPi) indicates how many instructions away does the nested loop begin in the instructions that follow. If an entire nested loop can not fit into the loop buffer, only the inner loops that do fit are stored in the loop buffer while they are being executed. While the nesting can be N loops, in the preferred embodiment, the nesting is two. Upon receipt of the loop control instruction a loop status register is set up. The loop status register includes a loop active flag, an outer loop size, an inner loop size, outer loop counter value, and inner loop count value. Control logic compares the value of the loop size from the loop status register with the depth N of the loop buffer 750. If the size of the loop is less than or equal to the depth N, when the last instruction of the loop has been executed for the first time (i.e. the first pass through the loop), the loop buffer cycle signal 755 can be asserted such that instructions are read from the loop buffer 750 thereafter and decoded by the D0 decoder 812. The loop control instruction also includes information regarding the number of times a loop is to be repeated. The control logic of the D0 decoder 812 includes a counter to count the number of times the loop of instructions has been executed. Upon the count value reaching a number representing the number of times the loop was to be repeated, the loop buffer cycle signal 755 is deasserted so that instructions are once again fetched from program memory 204 for execution.

Figure 9A:
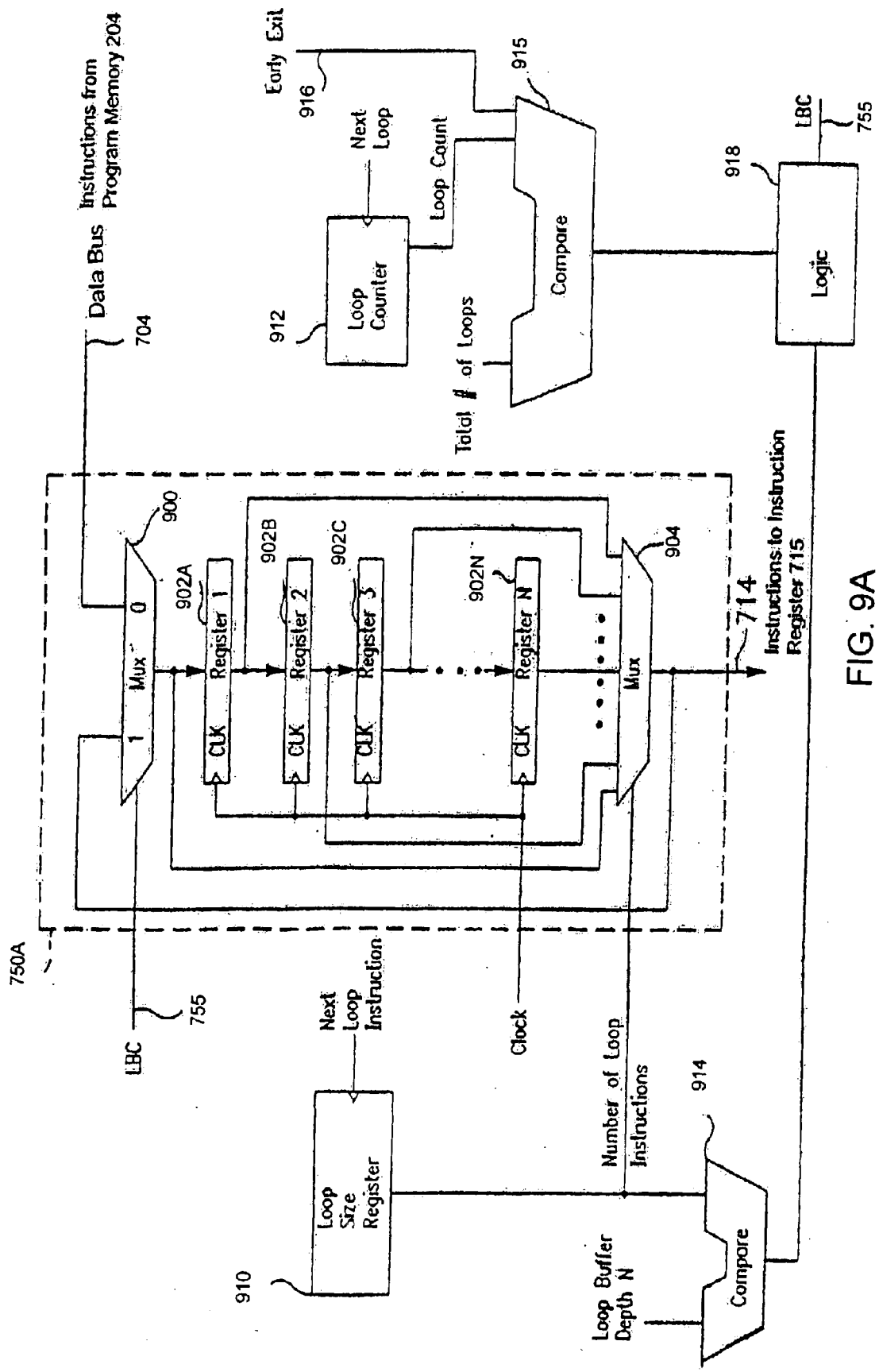
FIG. 9A is a detailed block diagram of the loop buffer and its control circuitry for one embodiment.

Referring now to FIG. 9A, a block diagram of the loop buffer 750A and its control of a first embodiment are illustrated. The loop buffer 750A includes a multiplexer 900, a series of N registers, registers 902A through 902N, and a multiplexer 904. Multiplexer 904 selects whether one of the register outputs of the N registers 902A through 902N or the fetched instruction on data bus 704 from program memory 204 is selected (bypassing the N registers 902A through 902N) as the output from the loop buffer 750. The number of loop instructions controls the selection made by multiplexer 904. If there are no loop instructions, multiplexer 904 selects to bypass registers 902A through 902N. If one loop instruction is stored, the output of register 902A is selected by multiplexer 904 for output. If two loop instructions are stored in the loop buffer 750, the output of register 902B is selected by multiplexer 904 for output. If N loop instructions are stored in the loop buffer 750, the output from the Nth register within the loop buffer 750, the output of register 902N, is selected by multiplexer 904 for output. The loop buffer cycle (LBC) signal 755, generated by the logic 918, controls multiplexer 900 to select whether the loop buffer will cycle through its instructions in a circular fashion or fetch instructions from program memory 204 for input into the loop buffer 750. A clock is coupled to each of the registers 902A through 902N to circulate the instructions stored in the loop buffer 750 through the loop selected by the multiplexers 904 and 900 in the loop buffer 750. By cycling through the instructions in a circular fashion, the loop buffer emulates the fetching process that might ordinarily occur into program memory for the loop instructions. Note that the clock signal to each of the blocks is a conditional clock signal that may freeze during the occurrence of a number of events including an interrupt.

To generate the control signals for the loop buffer 750, the pipe control 304 includes a loop size register 910, a loop counter 912, comparators 914–915, and control logic 918. The loop size register 910 stores the number of instructions within a loop to control the multiplexer 904 and to determine if the loop buffer 750 is deep enough to store the entire set of loop instructions within a given loop. Comparator 914 compares the output of the loop size register 910 representing the number of instructions within a loop with the loop buffer depth N. If the number of loop instructions exceeds the loop buffer depth N, the loop buffer 750 can not be used to cycle through instructions of the loop. Loop counter 912 determines how may loops have been executed using the loop instructions stored in the loop buffer by generating a loop count output. Comparator 915 compares the loop count output from the loop counter 912 with the predetermined total number of loops to determine if the last loop is to be executed.

The loop control also includes an option for early loop exit (i.e., before the loop count has been exhausted) based on the value of a predicate register. The predicate register is typically updated on each pass through the loop by an arithmetic or logical test instruction inside the loop. The predicate register (not shown) couples to the comparator 915 by means of a signal line, early exit 916. When the test sets a FALSE condition in the predicate register signaling to exit early from the loop on early exit 916, the comparator 915 overrides the normal comparison between the loop count the total number of loops and signals to logic 918 that the last loop is to be executed.

Upon completing the execution of the last loop, the loop buffer cycle signal 755 is disabled in order to allow newly fetched instructions to be stored within the loop buffer 750. The control logic 918 accepts the outputs from the comparators 914 and 915 in order to properly generate (assert and deassert) the loop buffer cycle signal LBC 755.

Figure 9B:
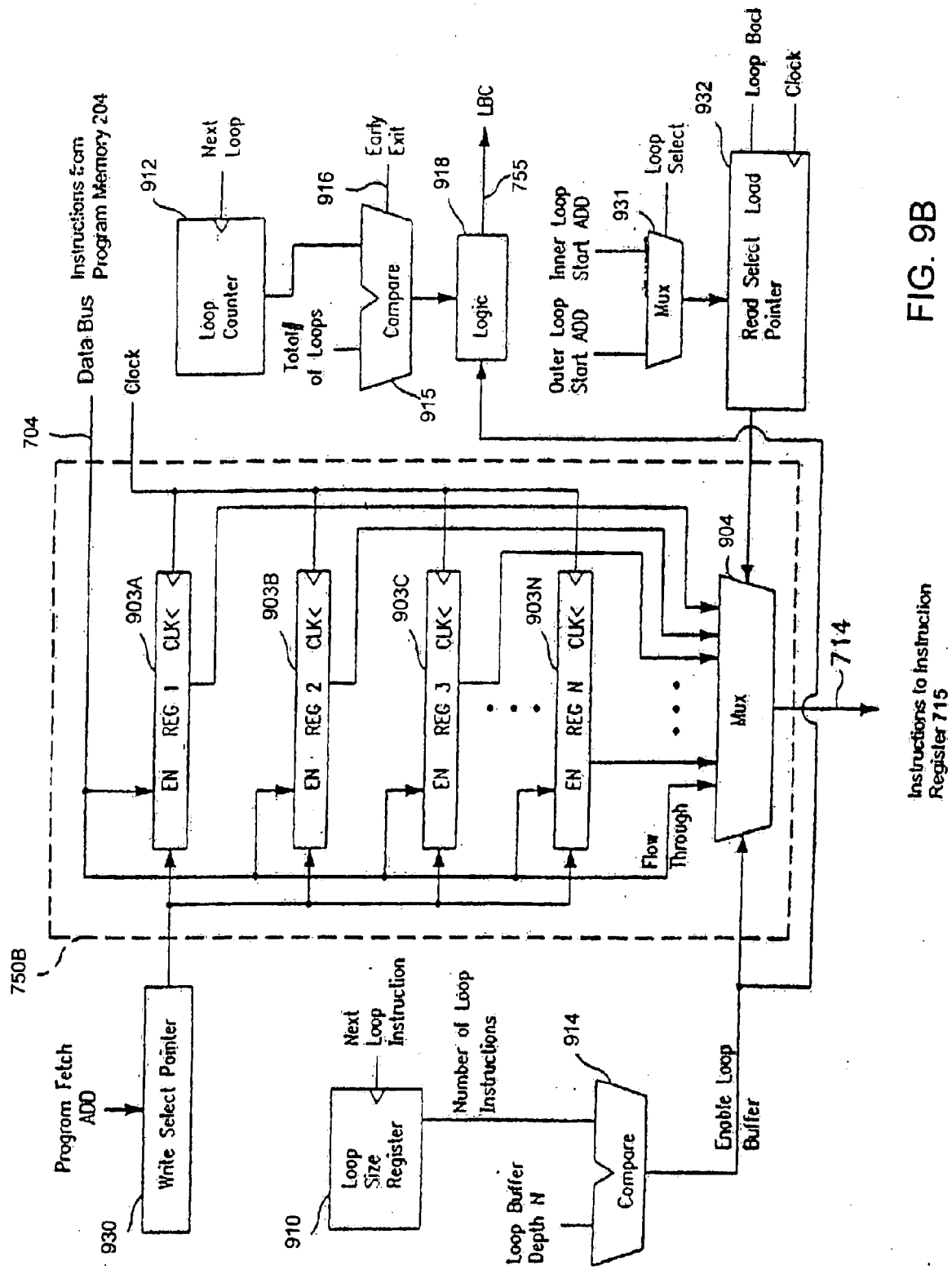
FIG. 9B is a detailed block diagram of the loop buffer and its control circuitry for the preferred embodiment.

Referring now to FIG. 9B, a detailed block diagram of the loop buffer and its control circuitry of a preferred embodiment is illustrated. The loop buffer 750B includes a set of N registers, registers 903A–903N, and the multiplexer 904. The loop buffer 750B is preferable over the loop buffer 750A in that registers 903A–903N need not be clocked to cycle through the instructions of a loop thereby conserving additional power. As compared to the loop buffer 750A and its control illustrated in FIG. 9A, registers 903A–903N replace registers 902A–902N, multiplexer 904 is controlled differently by a read select pointer 932 and the output of the comparator 914, and a write select pointer 930 selectively enables the clocking of registers 903A–903N. The clock signal to each of the blocks is a conditional clock signal that may freeze during the occurrence of a number of events including an interrupt.

The write select pointer 930, essentially a flexible encoder, encodes a received program fetch address into an enable signal to selectively load one of the registers 903A–903N with an instruction during its execution in the first cycle of a loop. The program fetch address is essentially the lower order bits of the program counter delayed in time. As each new program fetch address is received, the write select pointer 930 appropriately enables one of the registers 903A–903N in order as they would be executed in a loop. Once all instructions of a loop are stored within one or more of the registers 903A–903N, the write select pointer 930 disables all enable inputs to the registers 903A–903N until a next loop is ready to be loaded into the loop buffer 750B.

The read select pointer 932, essentially a loadable counter tracking the fetch addresses, is initially loaded with a beginning loop address (outer or inner loop beginning address) at the completion of the first cycle of a loop and incremented to mimic the program counter functioning in a loop. Multiplexer 904 selects the output of one of the registers 903A–903N as its output and the instruction that is to be executed on the next cycle in response to the output from the read select pointer 932. Nested loops (i.e. inner loops) are easily handled by reloading the read select pointer with the beginning address of the nested loop each time the end of the nested loop is encountered unless ready to exit the nested loop.

During the initialization of the loop buffer, when the registers 903A–903N are loaded with instructions, the read select pointer 932 controls the multiplexer 904 such that the instructions ("data") from program memory flow through the loop buffer 750B out to the instruction output 714. The occurrence of a loop control instruction loads the loop size register 910 with the number of instructions within the loop. The comparator 914 compares the number of instructions within the loop with the depth N of the loop buffer 750B. If the number of instructions within the loop exceeds the depth N of the loop buffer, the enable loop buffer signal is not asserted such that the multiplexer 904 selects the flow through input to continue to have instructions flow through the loop buffer 750B for all cycles of the loop. If the total number of instructions from the inner and outer loops do not fit within the depth of the loop buffer 750B, the inner loop may still have its instructions loaded into the loop buffer 750B to avoid the fetching process during the cycle through the inner loop to conserve power.

Upon the completion of loading instructions within the depth of the loop buffer 750B or when an outer loop end is reached and the loop needs to loop back, the read select pointer 932 is loaded by the loop back signal with the outer loop start address through multiplexer 931 and the loop select signal. If an inner loop is nested within the outer loop and the inner loop is supposed to loop back, the multiplexer 931 selects the inner loop start address to be loaded into the read select pointer 932 by the loop select signal when an end of an inner loop is reached.

Data Typing, Aligning and Permuting

In order for the invention to adapt to the different DSP algorithmic structures, it provides for flexible data typing and aligning, data type matching, and permutation of operands. Different DSP algorithms may use data samples having varying bit widths such as four bits, eight bits, sixteen bits, twenty four bits, thirty two bits, or forty bits. Additionally, the data samples may be real or complex. In the preferred embodiment of the invention, the multipliers in the signal processing units are sixteen bits wide and the adders in the signal processing units are forty bits wide. The operands are read into the signal processing units from data memory across the X or Y data bus each of which in the preferred embodiment are sixty four bits wide. The choice of these bit widths considers the type of DSP algorithms being processed, the operands/data samples, the physical bus widths within an integrated circuit, and the circuit area required to implement the adders and multipliers. In order to flexibly handle the various data types, the operands are automatically adapted (i.e. aligned) by the invention to the adder or multiplier respectively. If the data type of the operands differs, than a type matching is required. The invention provides automatic type matching to process disparate operands. Furthermore, various permutations of the operands may be desirable such as for scaling a vector by a constant. In which case, the invention provides flexible permutations of operands.

Referring now to FIG. 17, the general format for the data type of an operand for the invention is illustrated. In the invention, the data type for an operand may be represented in the format of N×SR for a real data type or N×SC for a complex or imaginary data type. N refers to the number of signal processing units 300 to which this given operand should be routed. S indicates the size in bits of the operand. R refers to a real data type. C refers to a complex or imaginary data type having a real and imaginary numeric component. In one embodiment of the invention, the size of the multiplication units is sixteen bits wide and the size of the adders is forty bits wide. In one embodiment of the invention, the memory bus is sixty four bits wide so that an operand being transferred from memory may have a width in the range of zero to sixty four bits.

For multiplicands, the operands preferably have a bit width of multiplies of 4, 8, 16, and 32. For minuend, subtrahends and addends, the forty bit adders preferably have operands having a bit width of multiplies of 4, 8, 16, 32, and 40. In the case that the data type is a complex operand, the operand has a real operand and an imaginary operand. In order to designate the type of operand selected, control registers and instructions of the instruction set architecture include a data type field for designating the type of operand being selected by a user.

Referring now to FIG. 18, an exemplary control register of the instruction set architecture of the invention is illustrated. In FIG. 18, a memory address register 1800 is illustrated for controlling the selection of operands from the data memory 202 to the signal processing units 300. The memory address register 1800 illustrates a number of different memory address registers which are designated in an instruction by a pointer rX. Each of the memory address registers 1800 includes a type field 1801, a CB bit 1802 for circular and bit-reversed addressing support, a permute field 1803, a first address offset 1804, a second zero address offset 1805, and a pointer 1806. The type field 1801 designates the data type of operand being selected. The permute field 1803 of the memory address register 1800 is explained in detail below.

Referring now to FIG. 19, an exemplary set of data types to be selected for operands is illustrated. The data type is encoded as a four bit field in either a control register, such as the memory address register 1800, or a DSP instruction directly selecting an operand from a register or memory location. For example, for the data type field 1801 having a value of 0000, the operand has a data type of 1×16 real. As another example, for the data type field 1801 having a value of 0111, the operand has a 2×16 complex data type.

As yet another example, for the data type field 1801 having a value of 1001, the data type of the operand is a 2×32 complex operand. The data type field 1801 is selected by a user knowing the number of operations that are to be processed together in parallel by the signal processing units 300 (i.e. N of the data type) and the bit width of the operands (i.e. S of the data type).

The permute field in control registers, such as the memory address register 1800, and instructions allows broadcasting and interchanging operands between signal processing units 300. Referring momentarily back to FIG. 3, the X data bus 531, the Y data bus 533, and the Z data bus 532 between the data memory 202 and signal processing units 300 are sixty four bits wide. Because there are four signal processing units 300A–300D, it is often times desirable for each to receive an operand through one memory access to the data memory 202. On other occasions, it maybe desirable for each signal processing unit 300A–300D to have access to the same operand such that it is broadcast to each.

Figure 20:
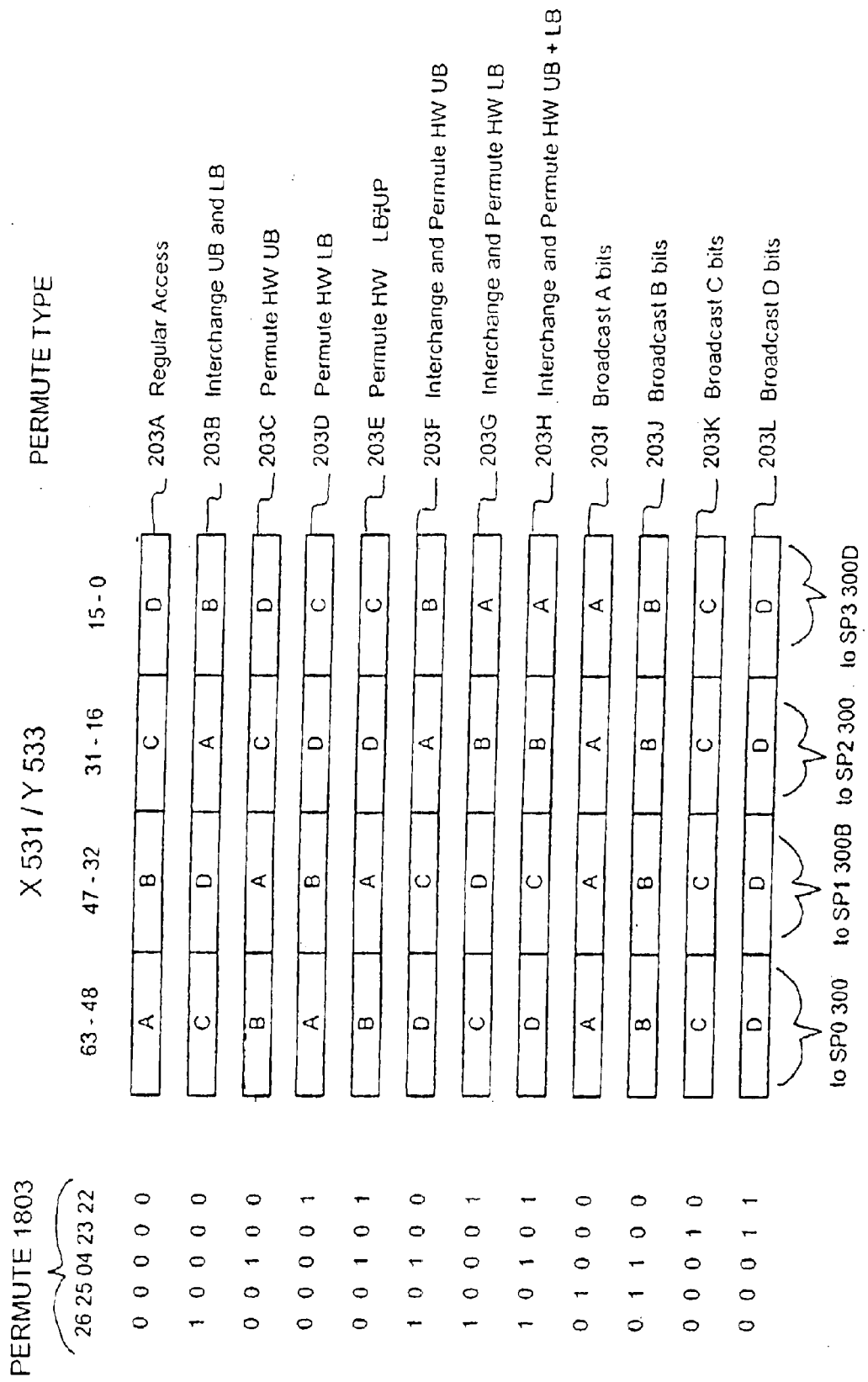
FIG. 20 is an exemplary chart of possible permutations of operands and their respective orientation to the signal processing units.

Referring now to FIG. 20, an exemplary set of permutations to select operands for the signal processing units is illustrated. The permutation in the preferred embodiment is encoded as a five bit field in either a control register, such as permute field 1802 in the memory address register 1800, or a DSP instruction. The permute field provides the capability of designating how 16-bit increments of the 64-bit data bus are coupled into each of the signal processing units 300A–300D. In FIG. 20, the sixty four bits of the X data bus 531/Y data bus 533 (labeled data busses 203 in FIGS. 2–3) can be designated at the top from right to left as 0–15, 16–31, 32–47, and 48–63. The permutation of operands on the data bus for the given permute field is in the center while the permutation type is listed to the right. The data bus permutations in the center are labeled permutations 203A through 203L.

While the data on the respective data bus does not change position, the five bit permute field illustrated to the left of the 64-bit data bus re-arranges how a sixteen bit data field (labeled A, B, C, and D) on the respective data bus is received by each of the signal processing units 300A–300D. This is how the desired type of permutation is selected. That is the right most sixteen bit column can be considered as being coupled into SP3 300D over the permutations. The second column from the right can be considered as being coupled into the signal processing unit SP2 300C over the permutations. The third column from the right can be considered as being coupled into the signal processing unit SP1 300B over the permutations. The left most, fourth column from the right, can be considered as being coupled into the signal processing unit SP0 300A over the permutations.

In a regular access without any permutation corresponding to data bus permutation 203A, bits 0–15 of the data bus are designated as D, bits 16–31 are designated as C, bits 32–47 are designated as B, and bits 48–63 are designated as A. This corresponds to the permute field being 00000 in the first row, permutation 203A, of the chart in FIG. 20. With regular access chosen for each of the signal processing units 300A–300D to the sixty four bit data bus, the sixteen bits labeled A are coupled into SP3 300D for example. The sixteen bits labeled D are coupled into the signal processing unit SP2 300C. The sixteen bits labeled C are coupled into the signal processing unit SP1 300B. The sixteen bits labeled D are coupled into the signal processing unit SP0 300A.

In the permute field, the most significant bit (Bit 26 in FIG. 20) controls whether the bits of the upper half word and the bits of the lower half word of the data bus are interchangeably input into the signal processing units 300. For example as viewed from the point of view of the signal processing units 300A–300D, the data bus appears as data bus permutation 203B as compared to permutation 203A. In this case the combined data fields of A and B are interchanged with the combined data fields C and D as the permutation across the signal processing units. The next two bits of the permute field (Bits 25 and 24 of permute field 1802) determine how the data fields A and B of the upper half word are permuted across the signal processing units. The lowest two bits of the permute field (Bits 23 and 22 of the permute field 1802) determine how the data fields C and D of the lower half word are to be permuted across the signal processing units.

Consider for example the case where the permute field 1803 is a 00100, which corresponds to the permutation 203C. In this case the type of permutation is a permutation on the half words of the upper bits of the data fields A and B. As compared with permutation 203A, signal processing unit SP1 300B receives the A data field and signal processing unit SP0 300A receives the B data field in permutation 203C.

Consider another example where the permute field 1803 is a 00001 bit pattern, which corresponds to the permutation 203D. In this case the type of permutation is a permutation on the half words of the lower bits of the data fields of C and D. the data bus fields of C and D are exchanged to permute half words of the lower bits of the data bus. As compared with permutation 203A, signal processing unit SP3 300D receives the C data field and signal processing unit SP2 300C receives the D data field in permutation 203D.

In accordance with the invention, both sets of upper bits and lower bits can be permuted together. Consider the case where the permute field 1803 is a 00101 bit pattern, corresponding to the permutation 203E. In this case, the permute type is permuting half words for both the upper and the lower bits such that A and B are exchanged positions and C and D are exchanged positions. As compared with permutation 203A, signal processing unit SP3 300D receives the C data field, signal processing unit SP2 300C receives the D data field, signal processing unit SP1 300B receives the A data field and signal processing unit SP0 300A receives the B data field in permutation 203E.

Permutations of half words can be combined with the interchange of upper and lower bits as well in the invention. Referring now to permutation 203F, the permute field 1803 is a 10100 bit pattern. In this case, the upper and lower bits are interchanged and a permutation on the half word of the upper bits is performed such that A and B and C and D are interchanged and then C and D is permuted on the half word. As compared with permutation 203A, signal processing unit SP3 300D receives the B data field, signal processing unit SP2 300C receives the A data field, signal processing unit SP1 300B receives the C data field and signal processing unit SP0 300A receives the D data field in permutation 203F. Referring now to permutation 203G, the permute field 1803 is a 10001 bit pattern. In this case the data bus fields are interchanged and a permutation of the half word on the lower bits is performed resulting in a re-orientation of the data bus fields as illustrated in permutation 203G. Referring now to permutation 203H, the permute field 1803 is a 10101 bit pattern. In this case, the data bus fields are interchanged and a permutation of half words on the upper bits and the lower bits has occurred resulting in a re-orientation of the data bus fields as illustrated in permutation 203H.

Broadcasting is also provided by the permute field as illustrated by permutations 203I, 203J, 203K, and 203L. For example consider permutation 203I corresponding to a permute field 1803 of a 01001 bit pattern. In this case, the data field A is broadcasted to each of the signal processing units 300A–300D. That is each of the signal processing units 300A–300D read the data field A off the data bus as the operand. For the permutation 203J having the permute field of 01100 bit pattern, the data field B is broadcast to each of the signal processing units. For permutation 203K having the permute field of a 00010 bit pattern, the data field C is broadcast to each of the signal processing units 300A–300D. For permutation 203L, the permute field is a 00011 combination and the data field D is broadcast to each of the signal processing units 300A–300D. In this manner various combinations of permutations and interchanging of data bus fields on the data bus can be selected for re-orientation into the respective signal pressing units 300A through 300D.

The Z output bus 532 carries the results from the execution units back to memory. The data on the Z output bus 532 is not permuted, or typed as it goes back to memory. The respective signal processing units 300A–300D drive the appropriate number of data bits (16, 32 or 64) onto the Z output bus 532 depending upon the type of the operations. The memory writes the data received from the Z output bus 532 using halfword strobes which are driven with the data to indicate the validity.

Figure 10:
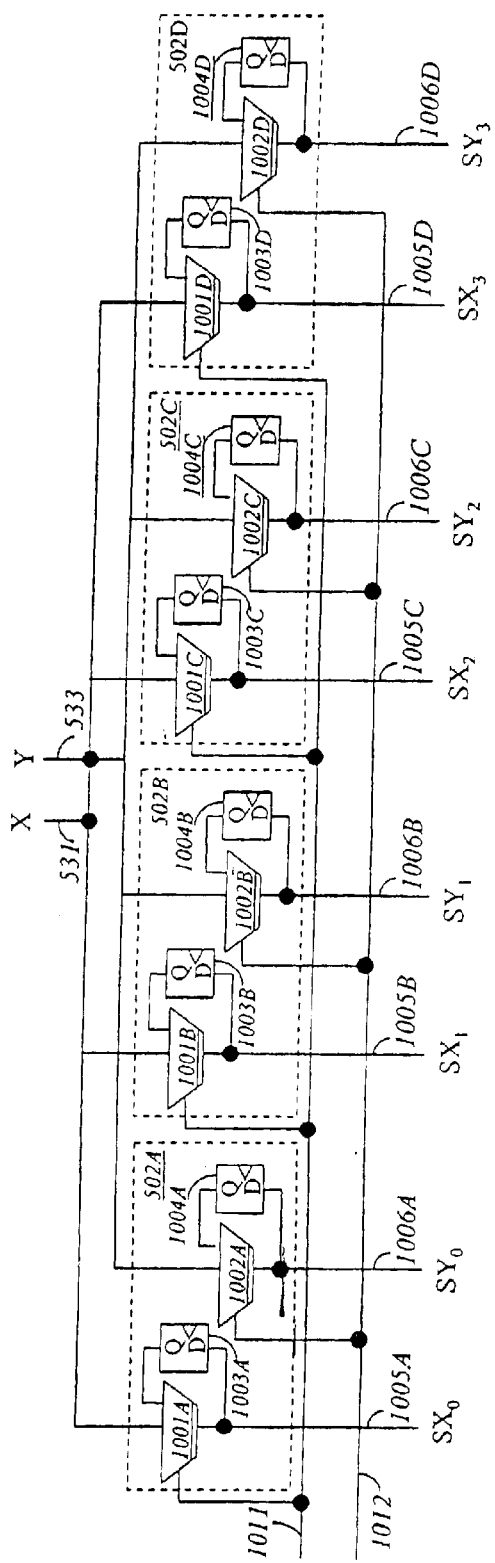
FIG. 10 is a block diagram of a cross sectional block diagram of the data typer and aligner of each signal processing unit of FIG. 3.

Referring now to FIG. 10, a cross-sectional block diagram illustrates the data type and aligners 502A, 502B, 502C and 502D of the signal processing blocks 300A, 300B, 300C and 300D respectively. Each of the data type and aligners 502A, 502B, 502C and 502D includes an instance of a bus multiplexer 1001 for the X bus 531 and a bus multiplexer 1002 for the Y bus 533. For example, the data typer and aligner 502A of signal processing unit SP0 300A includes the bus multiplexer 1001A and the bus multiplexer 1002A. The multiplexer 1001A has an input coupled to the X bus 531 and an output coupled to the SX0 bus 1005A. The bus multiplexer 1002A has an input coupled to the Y bus 533 and an output coupled to the SY0 bus 1006A. A control bus 1011 is coupled to each instance of the bus multiplexers 1001 which provides independent control of each to perform the data typing alignment and any permutation selected for the X bus 531 into the signal processing units. A control signal bus 1011 is coupled into each of the bus multiplexers 1001A–1001D. A control signal bus 1012 is coupled into each of the bus multiplexers 1002A–1002D. The control signal buses 1011 and 1012 provide independent control of each bus multiplexer to perform the data typing alignment and any permutation selected for the X bus 531 and the Y bus 533 respectively into the signal processing units 300. The outputs SX0 bus 1005 and SY0 bus 1006 from each of the bus multiplexers 1001 and 1002 couple into the multiplexers of the adders and multipliers within the respective signal processors 300 for selection as the X and Y operands respectively.

Figure 11:
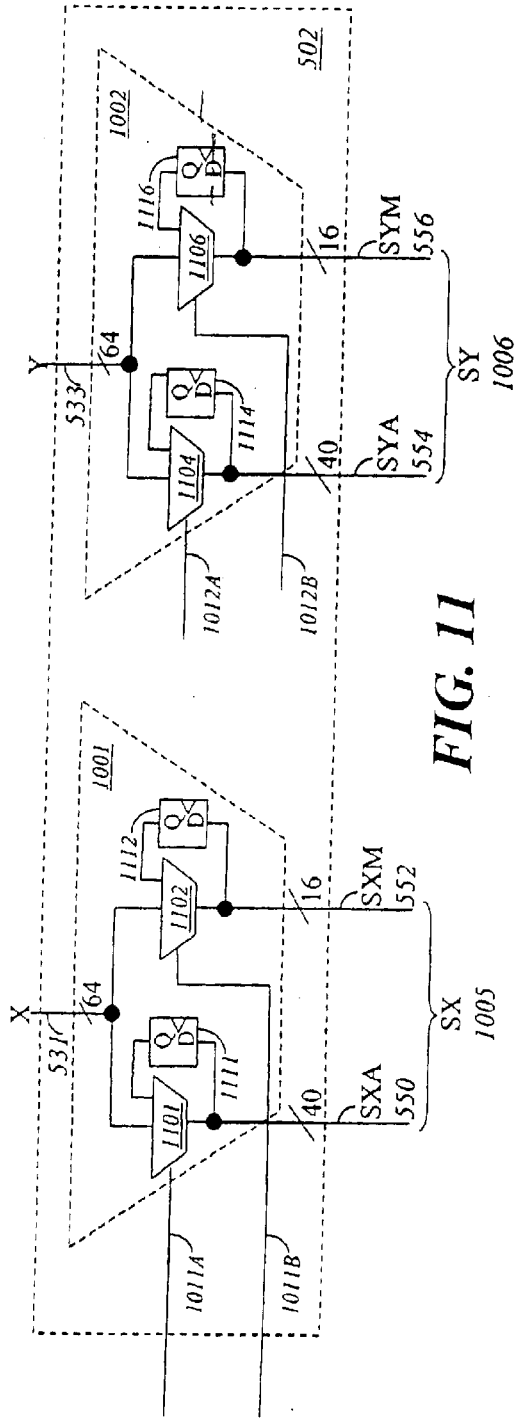
FIG. 11 is a block diagram of the bus multiplexers included in the data typer and aligner of each signal processing unit of FIG. 10.

Referring now to FIG. 11, an instance of each of the bus multiplexer 1001 and 1002 are illustrated labeled 1001 and 1002 respectively. Each instance of the bus multiplexer 1001 includes multiplexers 1101 and 1102 to multiplex data from the X bus 531 onto each SXA bus 550 and SXM bus 552 respectively within each signal processing unit 300. Each instance of the bus multiplexer 1002 includes multiplexers 1104 and 1106 to multiplex data from the Y bus 533 onto each SYA bus 554 and each SYM bus 556 respectively within each signal processing unit 300. In the preferred embodiment, the X bus 531 is sixty four bits wide all of which couple into the multiplexers 1101 and 1102 for selection. In the preferred embodiment, the Y bus 533 is sixty four bits wide all of which couple into the multiplexers 1104 and 1106 for selection. The output SXA 550 of multiplexer 1101 and the output SYA 554 of multiplexer 1104 in the preferred embodiment are each forty bits wide for coupling each into the adder A1 510A and adder A2 510B. The output SXM 552 of multiplexer 1102 and the output SYM 556 of multiplexer 1106 in the preferred embodiment are each sixteen bits wide for coupling each into the multiplier M1 504A. The output buses SXA 550 and SXM 552 form the SX buses 1005 illustrated in FIG. 10 for each signal processing unit 300. The output buses SYA 554 and SYM 556 form the SY buses 1006 illustrated in FIG. 10 for each signal processing unit 300.

The control signal bus 1011 has a control signal bus 1011A which couples into each multiplexer 1101 and a control signal bus 1011B which couples into each multiplexer 1102 for independent control of each. The control signal bus 1012 has a control signal bus 1012A which couples into each multiplexer 1104 and a control signal bus 1012B which couples into each multiplexer 1106 for independent control of each.

Multiplexers 1101 and 1102 in each of the data typer and aligners 502 of each signal processing unit receive the entire data bus width of the X bus 531. Multiplexers 1104 and 1106 in each of the data typer and aligners 502 of each signal processing unit receive the entire data bus width of the Y bus 533. With all bits of each data bus being available, the multiplexers 1101, 1102, 1104, and 1106 can perform the flexible data typing, data alignment, and permutation of operands. In response to the control signals on the control signal buses 1011 and 1012, each of the multiplexers 1101, 1102, 1104, and 1106 independently picks which bits of the X bus 531 or the Y bus 533 to use for the respective operand for their respective signal processor 300, align the bits into proper bit positions on the output buses SXA 550, SXM 552, SYA 554, and SYM 556 respectively for use by sixteen bit multipliers (M1 504A) and forty bit adders (A1 510A and A2 510B).

In the alignment process, the multiplexers 1101, 1102, 1104, and 1106 also insert logical zeroes and/or ones into appropriate bit positions to properly align and provide for sign and guard bit extensions. For example multiplexer 1101A of signal processing unit 300A may select bits 0–15 of the sixty four bits of the X bus 531 as the operand for an adder and multiplex those bits into bit positions 31–16 and insert zeroes in bit positions 0–15 and sign-extend bit 31 into bit positions 32–39 to make up a forty bit operand on the SXA bus 550. To perform permutations, the multiplexers select which sixteen bits (A, B, C, or D) of the sixty four bits of the X bus and Y bus is to be received by the respective signal processing unit 300. For example consider a broadcast of A on the Y bus 533 for a multiplication operation, each of the multiplexers 1106 for each signal processing unit 300 would select bits 0–15 (corresponding to A) from the Y bus 533 to be received by all signal processing units 300 on their respective SYM buses 556.

The multiplexers 1101, 1102, 1104, and 1105 in response to appropriate control signals, automatically convert the number of data bits from the data bus into the appropriate number of data bits of an operand which the adder can utilize. Furthermore in response to appropriate control signals, the multiplexers 1101, 1102, 1104, and 1105 select the appropriate data off the X bus and the Y bus. In order to do so, the multiplexers 1101, 1102, 1104, and 1105 in each signal processing unit operate more like cross point switches where any bit of the X or Y bus can be output into any bit of the SXA, SXM, SYA or SYM buses and logical zeroes/ones can be output into any bit of the SXA, SXM, SYA or SYM buses. In this manner the multiplexers 1101, 1102, 1104, 1106 can perform a permute functionality and align the bits accordingly for use by a 40-bit adder or a 16-bit multiplier.

Referring now to FIGS. 12A–12G, charts of alignment of real and imaginary flexible data types are illustrated for the sixteen bit multipliers and the forty bit adders of the preferred embodiment of the invention. In each row of each chart, the data type is illustrated in the left most column, the output onto one or more of the SXA, SYA, SXM or SYM data buses is illustrated in the center column and the right most column illustrates the equivalent signal processing configuration of the signal processors 300A–300D of a core processor 200 to perform one operation. The data type is illustrated in a vectorized format using the variable N to signify the number of vectors or times that the operand will be used. When the variable N is one, it is expected that one operation will be performed with one set of X and Y operands. When the variable N is two, it is expected that two operations will be performed together in one cycle on two sets of X and Y operands. In any case, two operand data types need to be specified and if there is a mismatch, that is the data types do not match, data type matching needs to occur which is discussed below with reference to FIGS. 13A–13C, 14, and 15.

Data types of 1×4R, 1×8R, 1×16R, 1×32R, 2×4R, 2×8R, 2×16R, 1×4C, 1×8C, 1×16C, 1×32C, 2×4C, 2×8C, and 2×16C for example can all be loaded in parallel into the signal processing units across a 64-bit X and/or Y bus by being packed in four or eight sixteen-bit fields. The full bit width of the data types of 2×32R, 1×40R, and 1×40C can be loaded into the signal processing units together in one cycle if both sixty-four bits of the X and Y bus are used to load two operands during the same cycle. Data types of 2×32C or a higher order may require multiple cycles to load the operands across the 64-bit X and/or Y buses. Additionally, an upper halfword (i.e. sixteen bits) of a 32 or 40 bit operand may be used to match a sixteen bit multiplier for example. In this case the lower bits may be discarded as being insignificant to the operation. Other bit widths of a halfword can be accommodated to match other hardware components of a given bit width. Using halfwords, allows the data types of 2×32R, 1×40R and 1×40C allows the operands to be loaded into fewer signal processing units and avoid carry paths that might otherwise be needed.

Referring now to FIG. 12A, an exemplary chart of the alignment of data types 1×4R, 1×8R, 1×16R, 1×32R, and 1×40R into a forty bit adder is illustrated. The sign bit in each case, with the exception of the forty bit data type of 1×40R, is located in bit 31 of the forty bit data word and coupled into the forty bit adders. The data field in each case is from memory on the X or Y bus or from a register off a different bus.

The four bit data field of a 1×4R data type from the X or Y bus is aligned into bit positions 28–31 with the sign bit in bit 31 of the SXA or SYA bus. The sign bit is included as the most significant bit (MSB) in a 4, 8, 16, or 32 bit word of an operand. Zeros are packed or inserted into the lower significant bits (LSBs) of bits 0–27 of the SXA bus or SYA bus in order to fill in. Guard bits, which contain the extended sign bit 31, are allocated to bits 32–39 of SXA or SYA. In this manner, the 1×4R data type is converted into a forty bit word which is utilized by one of the forty bit adders in a signal processing unit 300 for an addition, subtraction or a min/max operation.

The eight bit data field of the 1×8R data type from the X or Y bus is aligned into bits 24–31 of SXA or SYA with a sign bit in bit 31. Zeros are packed or inserted into the LSBs of bits 0–23. Guard bits, which contain extended sign bit 31, are allocated to bits 32–39. In this manner the 1×8R data type is converted into a forty bit word which is utilized by one of the forty bit adders in a signal processing unit 300 for an addition, subtraction or a min/max operation.

For an 1×16R data type, the 16 bit data field from the X or Y bus is aligned into bits 16–31 with the sign bit being included in bit 31 onto the SXA or SYA bus. Zeros are packed or inserted into the LSBs of bits 0–15 while guard bits are allocated to bits 32–39. In this manner the 1×16R data type is converted into a forty bit word which is utilized by one of the forty bit adders in a signal processing unit 300 for an addition, subtraction or a min/max operation.

For an 1×32R data type, the thirty two bit data field from the X or Y bus is aligned into bits 0–31 with the sign bit included as bit 31. Guard bits, which contain extended sign bit 31, are packed together into bits 32–39 to complete the forty bit word. In this manner 1×32R data type is converted is converted into a forty bit word which is utilized by one of the forty bit adders in a signal processing unit 300 for an addition, subtraction or a min/max operation.

For an 1×40R data type, all forty bits of its data field from the X or Y bus are allocated into bits 0–39 of the SXA or SYA bus such that one adder of a signal processing unit can perform an addition, subtraction or a min/max operation using all forty bits of the data field at a time.

As previously discussed, multiplexers 1101 and 1104 facilitate the conversion of the real data types into 40-bit fields for use by a forty bit adder in a signal processing unit. Each of these multiplexers will switch the data fields to the appropriate bit locations including the sign bit and fill zeros into the unused LSBs and allocate the guard bits as necessary for SXA bus 550 and the SYA bus 554 bus.

Referring now to FIG. 12B, an exemplary chart of the alignment of the real data types 1×4R, 1×8R, 1×16R, 1×32R, and 1×40R into sixteen bit words for sixteen bit multipliers is illustrated. For an 1×4R data type, bits 0–3 of the four bit data field from the X or Y bus is aligned into bit positions 12–15 respectively of the SXM or SYM bus. Zeros are packed or inserted into the lower significant bits (LSBs) of bits 0–11 of the SXA or SYA bus in order to fill in. In this manner, one data sample of the 1×4R data type is converted into a sixteen bit word which is utilized by one of the sixteen bit multipliers in a signal processing unit 300 for a multiplication or MAC operation.

For an 1×8R data type, bits 0–7 of the eight bit data field from the X or Y bus are located in bits 8–15 respectively of the SXM or SYM bus with zeros packed into bits 0–7. In this manner the 1×8R data type is converted into a sixteen bit word for use by one sixteen bit multiplier of one signal processing unit 300.

For an 1×16R data type, bits 0–15 of the sixteen bit data field from the X or Y bus is aligned into bits 0–15 of the SXM or SYM bus such that one signal processing unit can multiply all 16 bits at a time.

For a data type of 1×32R, bits 0–32 of the data field from the X or Y bus are split into two sixteen bit half words. Bits 16–31 are aligned into an upper half word into bit bits 0–15 of the SXM or SYM bus of a signal processing unit 300. In one embodiment, the lower half word of bits 0–15 of the operand are discarded because they are insignificant. In this case, one signal processing unit is utilized to process the sixteen bits of information of the upper half word for each operand. In an alternate embodiment, the lower half word of bits 0–15 may be aligned into bits 0–15 of the SXM or SYM bus of another signal processing unit 300. In this case, two signal processing units are utilized in order to multiply the sixteen bits of information for each half word and the lower order signal processing unit has a carry signal path to the upper order signal processing unit in order to process the 32-bit data field. However, by using an embodiment without a carry signal path between signal processing units, processing time is reduced.

For a data type of 1×40R, bits 0–39 of the forty bit data field from the X or Y bus in one embodiment is reduced to a sixteen bit halfword by discarding the eight most significant bits (MSBs) and the sixteen least significant bits (LSBs). In this case bits 16–31 of the forty bits of the original operand is selected as the multiply operand for one signal processing unit.

As previously discussed, multiplexers 1102 and 1106 facilitate the conversion of the real data types into sixteen bit fields for use by a sixteen bit adders in a signal processing unit. Each of these multiplexers will switch the data fields to the appropriate bit locations including the fill zeros into the unused LSBs as necessary for SXM buses 552A/552B and the SYM buses 556A/556B. Each of the multiplexers 1102 and 1106 perform the permutation operation, the alignment operation, and zero insertion for the respective multipliers in each of the signal processing units 300A–300D.

Referring now to 12C, an exemplary chart of the alignment of the complex data types 1×4C, 1×8C, 1×16C, 1×32C, 1×32C, and 1×40C into one or more forty bit words for one or more forty bit adders is illustrated.

For complex data types at least two signal processing units are utilized to perform the complex computations of the real and imaginary terms. For the forty bit adders, typically one signal processing unit receives the real data portion while another signal processing unit receives the imaginary data portion of complex data type operands.

For an 1×4C data type, bits 0–4 of the real data field are aligned into bits 28–31 respectively with a sign bit in bit position 31 of a first forty bit word. Guard bits are added to bit fields 32–39 while zeros are inserted into bits 0–27 of the first forty bit word. Similarly, bits 0–4 of the imaginary data field are aligned into bits 28–31 respectively with a sign bit in bit position 31 of a second forty bit word. Guard bits are allocated to bits 32–39 while zeros are packed into bits 0–27 of the second forty bit word. In this manner, 1×4C complex data types are converted into two forty bit words as operands for two forty bit adders in two signal processing units.

For an 1×8C data type, bits 0–7 of the real data field from the X or Y bus is located into bit positions 24–31 with a sign bit in bit position 31 of a first forty bit operand on one the SXA or SYA buses. Guard bits are allocated to bit positions 32–39 while zeros are packed into bits 0–23 of the first forty bit operand. Bits 0–7 of the complex data field from the X or Y bus is aligned into bits 24–31 with a sign bit in bit position 31 of a second forty bit operand on another one of the SXA or SYA buses. Guard bits, which are also initially zeroes, are allocated to bit positions 32–39 while zeros are packed into bits 0–23 of the second forty bit operand. In this manner, 1×8C complex data types are converted into two forty bit words as operands for two forty bit adders in two signal processing units.

For an 1×16C data type, bits 0–16 of the real data field from the X or Y bus are aligned into bits 16–31 with a sign bit in bit position 31 for a first forty bit operand on one of the SXA or SYA buses. Guard bits are allocated to bit positions 32–39 with zeros packed into bit positions 0–15 of the first forty bit operand. Similarly, bits 0–16 of the imaginary data field from the X or Y bus are aligned into bits 16–31 including a sign bit in bit 31 for a second forty bit operand onto another one of the SXA or SYA buses. Guard bits are allocated to bit positions 32–39 and zeros are packed into bit position 0–15 of the second forty bit operand on the SXA or SYA bus.

For an 1×32C data type, bits 0–31 of the 32-bits of real data are aligned into bits 0–31 respectively with a sign bit included in bit position 31 of a first forty bit operand on one of the SXA or SYA buses. Guard bits are allocated to bit positions 32–39 for the first forty bit operand. Similarly, bits 0–31 of the imaginary data field are aligned into bit positions 0–31 with the sign bit being bit position 31 of a second forty bit operand on another of the SXA or SYA buses. Guard bits are inserted into bits 32–39 of the second forty bit operand. Thus, the 1×32C data type is converted into two forty bit operands for two forty bit adders of two signal processing units 300 for processing both the imaginary and real terms in one cycle.

For an 1×40C complex data type, bits 0–39 of the real data field from the X or Y bus are aligned into bits 0–39 of a first forty bit operand on one of the SXA or SYA buses for use by one signal processing unit. Bits 0–39 of the imaginary data field from the X or Y bus is aligned into bit positions 0–39 of a second forty bit operand on another of the SXA or SYA buses for use a second signal processing unit such that two signal processing units may be used to process both 40 bit data fields in one cycle.

Figure 12C:
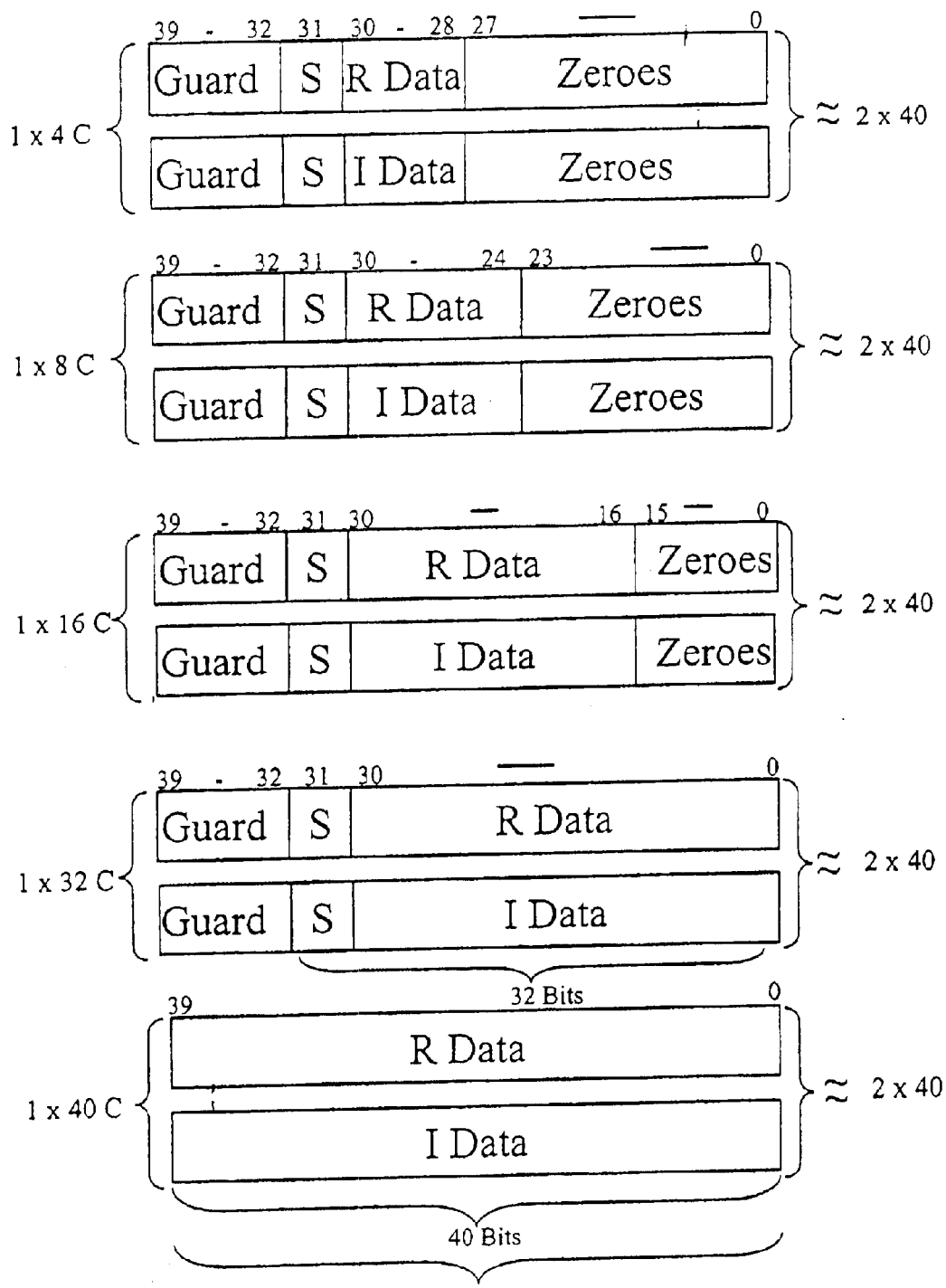
FIG. 12C is a first chart of complex data types and their alignment for the adders of the signal processing units.
Figure 12D:
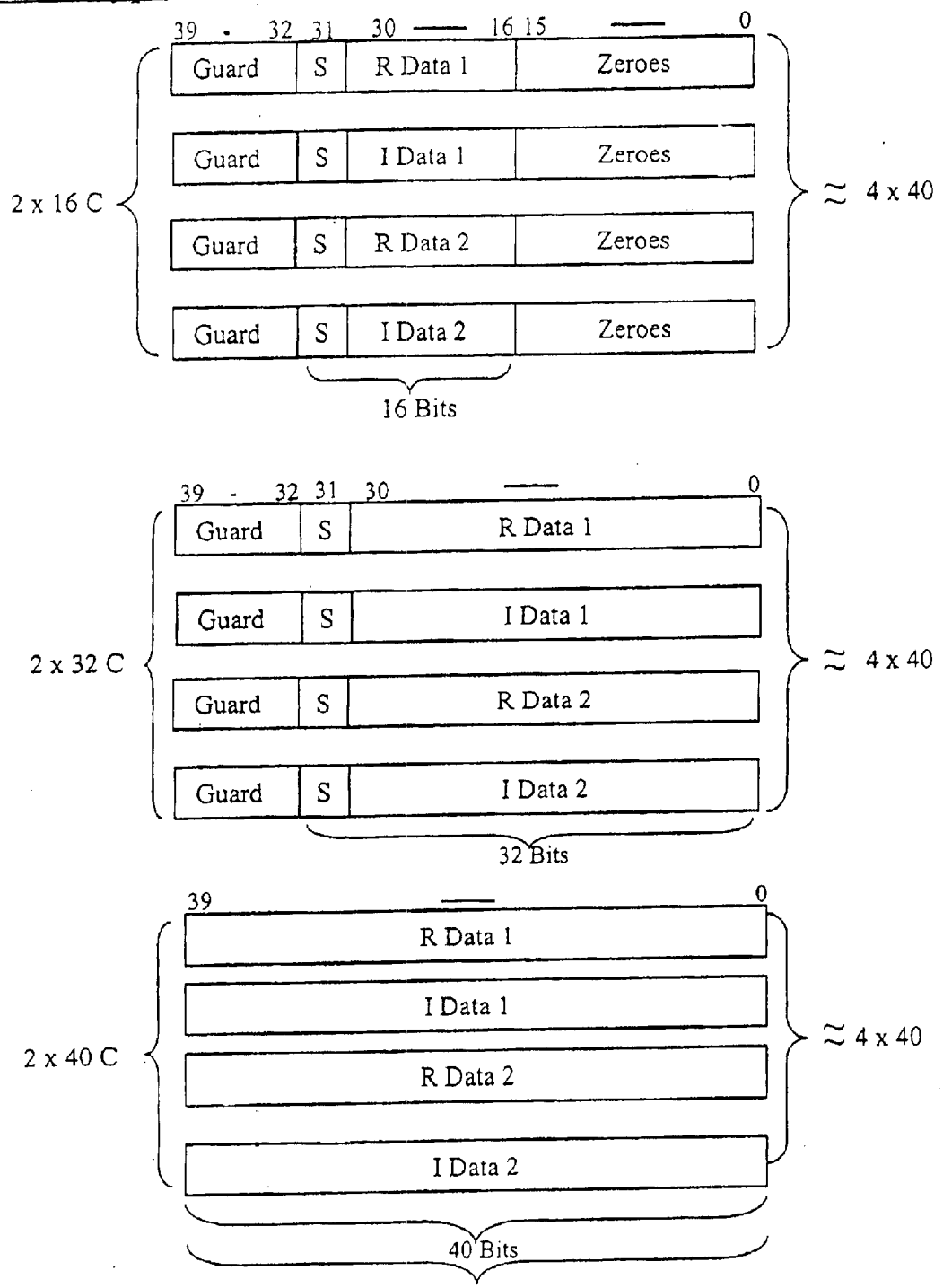
FIG. 12D is a second chart of complex data types and their alignment for the adders of the signal processing units.

Referring now to FIG. 12D, an exemplary chart of the alignment of the complex data types 2×16C, 2×32C, and 2×40C into four forty bit words for four forty bit adders is illustrated. In this case two sets of operands (Data 1 and Data 2) are brought in together in the same cycle having flexible bit widths.

For the 2×16C complex data type, four 16-bit data fields from the X or Y bus are aligned into four forty bit operands, one for each of the signal processing units 300A–300D. Bits 0–15 of the real data field for DATA 1 from the X or Y bus is aligned into bits 16–31 respectively of a first forty bit operand including the sign bit in bit position 31 on one of the SXA or SYA buses for a first signal processing unit. Bits 0–15 of the complex data field for DATA 1 from the X or Y bus are aligned into bits 16–31 respectively of a second forty bit operand including the sign bit in bit position 31 on another of the SXA or SYA buses for a second signal processing unit. Bits 0–15 of the real data field for DATA 2 from the X or Y bus is aligned into bits 16–31 respectively of a third forty bit operand including the sign bit in bit position 31 on yet another one of the SXA or SYA buses for a third signal processing unit. Bits 0–15 of the complex data field for DATA 2 from the X or Y bus are aligned into bits 16–31 respectively of a fourth forty bit operand including the sign bit in bit position 31 on still another of the SXA or SYA buses for a fourth signal processing unit. Zeros are packed into bit positions 0–15 and guard bits are allocated to bits 32–39 in each of the forty bit operands on the four SXA or four SYA buses as shown in FIG. 12D. Thus, the 2×16C complex data type is aligned into four forty bit operands for use by four forty bit adders in four signal processing units.

The 2×32C complex data type and the 2×40C complex data type are aligned into four operands similar to the 2×16 data type but have different bit alignments and insertion of zeros or allocation of guard bits. These bit alignments and zero packing/insertions and guard bit allocations are shown as illustrated in FIG. 12D.

In this manner two 2×SC complex data types, where S is limited by the width of the adder, can be aligned into four operands for use by four adders in four signal processing units 300 to process the complex data types in one cycle.

Figure 12E:
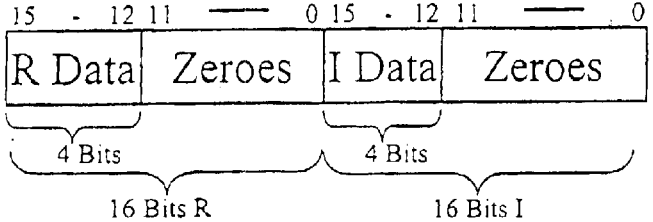
FIG. 12E is a chart of complex data types and their alignment for the multipliers of the signal processing units.

Referring now to FIG. 12E, an exemplary chart of the alignment of the complex data types 1×4C, 1×8C, 1×16C, 1×32C, and 1×40C into one or more sixteen bit words for one or more sixteen bit multipliers is illustrated.

For an 1×4C complex data type, bits 0–3 of the real data field from the X or Y bus is aligned into bits 12–15 respectively of a first sixteen bit operand on one of the SXM or SYM buses as illustrated in FIG. 12E. Bits 0–3 of the imaginary data field from the X or Y bus is aligned into bits 12–15 respectively of a second sixteen bit operand on another one of the SXM or SYM buses.

Bits 0–11 of each of the first and second sixteen bit operands are packed with zeros. In this manner, the each complex element of a 1×4C complex data types is converted into two sixteen bit words as operands for two sixteen bit multipliers in two signal processing units. The 1 by 8C data type and the 1×16C data types are similarly transformed into two sixteen bit operands as is the 1×4C but with different bit alignment as shown and illustrated in FIG. 12E. The complex data types 1×4C, 1×8C, and 1×16C in FIG. 12E utilize two signal processing units and align their respective data bit fields into two sixteen bit words for use by two sixteen bit multipliers in two signal processing units on one cycle.

For a 1×32C complex data type with operands having bits 0–31, the upper half word of bits 16–31 of the real and imaginary parts of each operand are selected and multiplexed from the buses SXM or SYM into two sixteen bit multipliers in one embodiment while the lower half word is discarded. In an alternate embodiment, the upper half word and the lower half word for the real and imaginary parts are multiplexed into four sixteen bit multipliers for multiplication with a carry from the lower half word multiplier to the upper half word multiplier.

For a 1×40C complex data type with operands having bits 0–39, a middle half word of bits 16–31 of the real and imaginary parts of each operand are selected and multiplexed from the buses SXM or SYM into two sixteen bit multipliers in one embodiment while the upper bits 32–39 and the lower half word bits 0–15 are discarded. In an alternate embodiment, the word is separated by the multiplexers across multiple multipliers with carry from lower order multipliers to upper order multipliers for the real and imaginary terms of the complex data type.

Figure 12F:
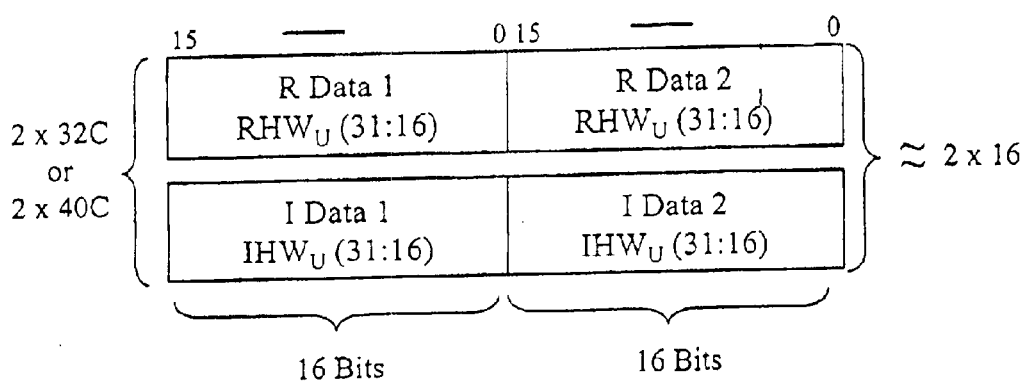
FIG. 12F is a second chart of complex data types and their alignment for the multipliers of the signal processing units.
Figure 12F:
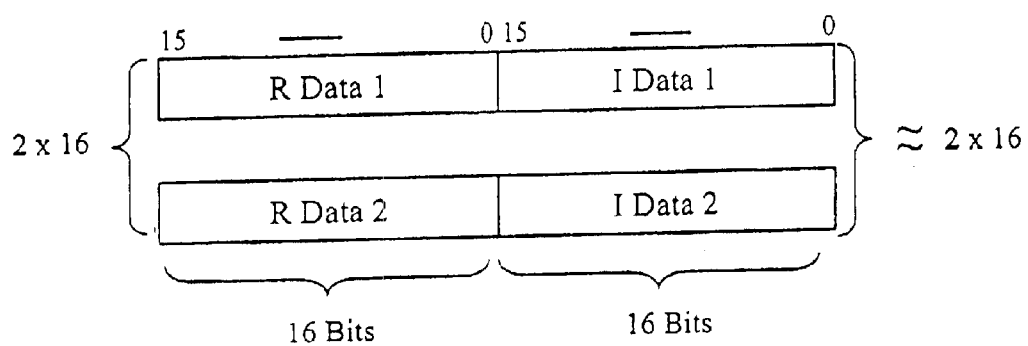

Referring now to FIG. 12F, an exemplary chart of the alignment of the complex data types 2×32C or 2×40C and 2×16C into four sixteen bit words for four sixteen bit multipliers is illustrated.

For 2×32C data types, bits 0–15 of the upper half word of the real data (RHWu) of a first operand on the X or Y bus are aligned into bits 0–15 respectively of a first sixteen bit operand on one of the SXM or SYM buses for a first of the signal processing units and bits 0–15 of the upper half word of the real data field of a second operand from the X or Y bus are aligned into bits 0–15 of a second sixteen bit operand on another one of the SXM or SYM buses for the first signal processing unit. Bits 0–15 of the upper half word (IHWu) of the imaginary data of the first operand on the X or Y bus are aligned into bit positions 0–15 of a third sixteen bit operand on another one of the SXM or SYM buses for a second signal processing unit and bits 0–15 of the upper half of the imaginary data of the second operand on the X or Y bus are aligned into bits 0–15 of a fourth sixteen bit operand on another one of the SXM or SYM buses for the second signal processing unit. Thus, the 2 by 32C complex data type uses two signal-processing units and converts the 32-bit real and imaginary data fields into 16-bit operands for use by the 16-bit multipliers in two signal processing units.

For 2×16C data types, two complex operands can be specified and multiplexed as one across a sixty four bit data bus into two multipliers. In this case, bits 0–15 of real data field of the first operand from the X or Y bus is aligned into bits 0–15 of a first sixteen bit operand on one of the SXM or SYM buses for one signal-processing unit while bits 0–15 of the imaginary data of the first operand on the X or Y bus is aligned into bits 0–15 of a second sixteen bit operand on another of the SXM or SYM buses for a second signal-processing unit. Bits 0–15 of real data field of the second operand on the X or Y bus is aligned into bits 0–15 of a third sixteen bit operand for the first signal processing unit and bits 0–15 of the imaginary data field of the second operand on the X or Y bus is aligned into bits 0–15 of a fourth sixteen bit operand on another one of the SXM or SYM buses for the second signal processing unit. Thus, the 2×16C data type uses four signal processing units to process each of four sixteen bit operands in four 16-bit multipliers in one cycle.

Referring now to FIGS. 13A, 13B and 13C, the general rule for type matching of two operands is illustrated. Generally, data type matching refers to matching two different data types of two operands together so that they can be properly processed for a given digital signal processing operation. In FIG. 13A, the first operand, operand 1, has a data type of $N_1$ by $S_1$ real and the second operand, operand 2, has a data type of $N_2$ by $S_2$ real. The general rule for operand type matching of two real data types is to determine and select the maximum of $N_1$ or $N_2$ and the maximum of $S_1$ or $S_2$. Alternatively, one can determine and discard the minimum of $N_1$ or $N_2$ and the minimum of $S_1$ or $S_2$ to provide operand type matching. Operand data type matching provides an indication of the number of signal-processing units that the operands are to be processed by (maximum of $N_1$ or $N_2$) and the bit width of both operands (maximum of $S_1$ or $S_2$). For the different operand types the multipliers and adders of the signal processing units are provided with the best operand type match of two different operand data types in order to obtain a result. The output results from the operation preformed on the disparate operands is in the form of the matched data type.

Referring now to FIG. 13B, both the first operand, operand 1, and the second operand, operand 2, are complex data types. The general rule for operand type matching of two complex types of operands is the similar for matching two real data types but resulting in a complex data type. The operand data type matching for the complex data types is to determine and select the maximum of $N_1$ or $N_2$ and the maximum of $S_1$ or $S_2$.

Referring now to FIG. 13C, the first operand, operand 1, is a real data type while the second operand, operand 2, is a complex data type. The general rule for operand data type matching of a real data type and a complex data type is to select the maximum of $N_1$ or $N_2$ and the maximum of $S_1$ or $S_2$ which has a complex data type match. The maximum of $N_1$ or $N_2$ represents the number of signal-processing units needed for processing the real or the imaginary term and the maximum of $S_1$ or $S_2$ represents the bit width of the operand that is to be aligned into the signal-processing units. Multiplexers 1101 1102, 1104, and 1106 in each instance of the data typer and aligner 502, perform the data type matching between operand 1 and operand 2 from the X bus 531 or the Y bus 533 in response to appropriate multiplexer control signals. Permutation and alignment is automatically selected by the respective core processor 200 to provide the data type matching for the two operands through control of the bus multiplexers into each of the signal processing units.

In addition to automatic data type matching, the invention operationally matches the data types in response to the operation to be performed (ADD, SUB, MULT, DIVIDE, etc.), the number of functional units (adders and multipliers) and their respective bit widths in each of signal processing units 300A–300D, the bit width of automatic data type match for the two operands, and whether real or complex data types are involved and scalar or vector functions are to be performed. Each of the signal processing units 300A–300D has two multipliers and three adders. In the preferred embodiment of the invention, each of the multipliers are sixteen bits wide and each of the adders is forty bits wide. Multiple operands of the same data type can be easily processed after setting up nominal data types and reading new data as the new operands and repeating the multiplication, addition or other type of signal processing operation.

Figure 15B:
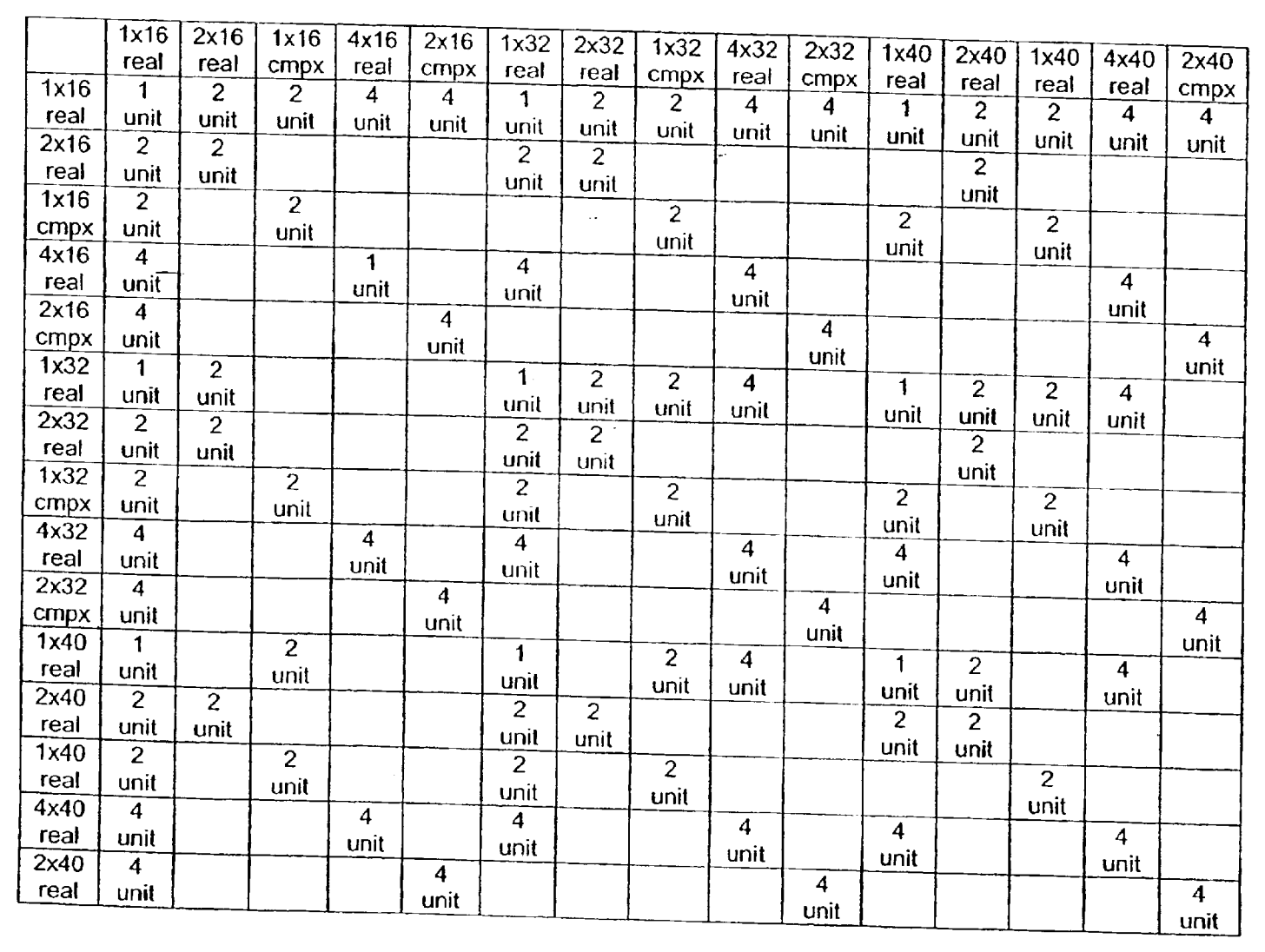

Referring now to FIGS. 14, 15A and 15B, exemplary charts showing operational matching of data types provided by the invention are illustrated. In each of FIGS. 14, 15A, and 15B, a data type for a first operand is indicated along the top row and a data type for a second operand is indicated along the left most column. The matrix between the top row and the left most column in each of the figures indicates the operational matching provided by the embodiment of the invention.

In FIG. 14, an exemplary chart showing the data type matching for a multiplication operation by the multipliers of the signal processing units is illustrated. Operands having data types of four and eight bits are not illustrated in FIG. 14 with it being understood that these data types are converted into sixteen bit operands. In FIG. 14, the empty cells are disallowed operations for the embodiment described herein. However, if the number of signal processing units is expanded from four and the data bit width of the multipliers is expanded from sixteen bits, additional operations can be performed for other operand data type combinations. In each completed cell of FIG. 14, the operation requires two cycles for a vector operation and three cycles for a real data type scalar operation. Scalar multiplication of a complex operand with another operand is not performed because two values, a real and an imaginary number, always remain as the result. Each completed cell indicates the number of signal processing units used to perform the multiplication operation. For example, a multiplication of a 1×16C operand with a 1×16C operand indicates that four signal processing units are utilized. In the case of a complex multiplication, the operands are (r1+ji1) and (r2+ji2) where r1 and r2 are the real terms and i1 and i2 are the imaginary terms. The result of the complex multiplication is [(r1×r2)−(i1×i2)] for the real term and [(r1×i2)+(r2×i1)] for the imaginary term. Thus, four signal processing units process the multiplication of the parentheticals together in the same cycle. The remaining add and subtract operations for the real and imaginary terms respectively are then performed in two signal processing units together on the next cycle to obtain the final results. Consider as another example, a multiplication of a 1×16R operand with a 1×32C operand. In this case, FIG. 14 indicates that four signal processing units are utilized. The operands are r1 and (r2+ji2) where r1 and r2 are real numbers and i2 is an imaginary number. The result of the operation is going to be [(r1×r2)] for the real part of the result and [(r1×i2)] for the imaginary part of the result.

Because the complex operand is thirty two bits wide, the real and imaginary terms are split into half words. Thus the operation becomes [(r1×r2UHW)+(r1×r2LHW)] for the real part and [(r1×i2UHW)+(r1×i2LHW)] where UHW is the upper half word and LHW is the lower half word of each value respectively. Thus, each of four signal processing units performs the multiplication of the parentheticals together in one cycle while the addition of terms is performed in two signal processing units on the next cycle.

Referring now to FIG. 15A, an exemplary chart showing the data type matching for scalar addition by the adders of the signal processing units is illustrated. Operands having data types of four and eight bits are not illustrated in FIG. 15A with it being understood that these data types are converted into sixteen bit operands. Note that no scalar addition is performed using a complex operand due to the fact that two values, a real number and an imaginary number, always results in an operation involving a complex operand. In FIG. 15A, the empty cells are disallowed operations for the embodiment described herein. However, if the number of signal processing units is expanded from four and the data bit width of the adders is expanded from forty bits, additional operations can be performed for other operand data type combinations. In each completed cell of FIG. 15A, the scalar add operation can be completed in one cycle if both operands are readily available. Each completed cell indicates the number of signal processing units used to perform the scalar addition operation.

Consider for example a 1×32R operand and a 2×16R operand where r1 is the first operand being 32 bits wide and r2 and r3 is the second set of operands each being sixteen bits wide. The chart of FIG. 15A indicates that two signal processing units are utilized. The scalar result is [(r1+r2)+(r1+r3)]. Two signal processing units perform the addition operation in the parenthetical using their two forty bit adders in one cycle while a second addition in one of the two signal processing units combines the intermediate result in a second cycle.

Referring now to FIG. 15B, an exemplary chart showing the data type matching for the vector addition by the adders of the signal processing units is illustrated. Operands having data types of four and eight bits are not illustrated in FIG. 15B with it being understood that these data types are converted into sixteen bit operands. In FIG. 15B, the empty cells are disallowed operations for the embodiment described herein. However, if the number of signal processing units is expanded from four and the data bit width of the adders is expanded from forty bits, additional operations can be performed for other operand data type combinations. In each completed cell of FIG. 15B, the vector add operation can be completed in one cycle if both operands are readily available. Each completed cell indicates the number of signal processing units used to perform the vector addition operation. Operands having complex data types can be used in performing vector addition.

Consider for example a 1×16R operand and a 1×32C operand where r1 is the first operand being 16 bits wide and r2 and i2 are the second operand each being thirty two bits wide. The chart of FIG. 15B indicates that two signal processing units are utilized. The real 1×16R operand is converted into 1×16C complex operand with an imaginary part of zero. In one signal processing unit the real parts are added together performing (r1+r2) while in another signal processing unit the imaginary component i2 is added to zero performing (0+i2). The vector result is [(r1+r2)] as the real component and i2 as the imaginary component. The signal processing units perform the addition operation in the parentheticals using a forty bit adder.

Consider as another example a 1×16C operand and a 1×32C operand For the 1×16C operand r1 and i1 are the real and imaginary parts respectively of the first operand each being 16 bits wide and r2 and i2 are the real and imaginary terms of second operand each being thirty two bits wide. The chart of FIG. 15B indicates that two signal processing units are utilized. The vector result is [(r1+r2)] as the real component and [(i1+i2)] as the imaginary component. Two signal processing units perform the addition operations in the parentheticals using forty bit adders.

Figure 16:
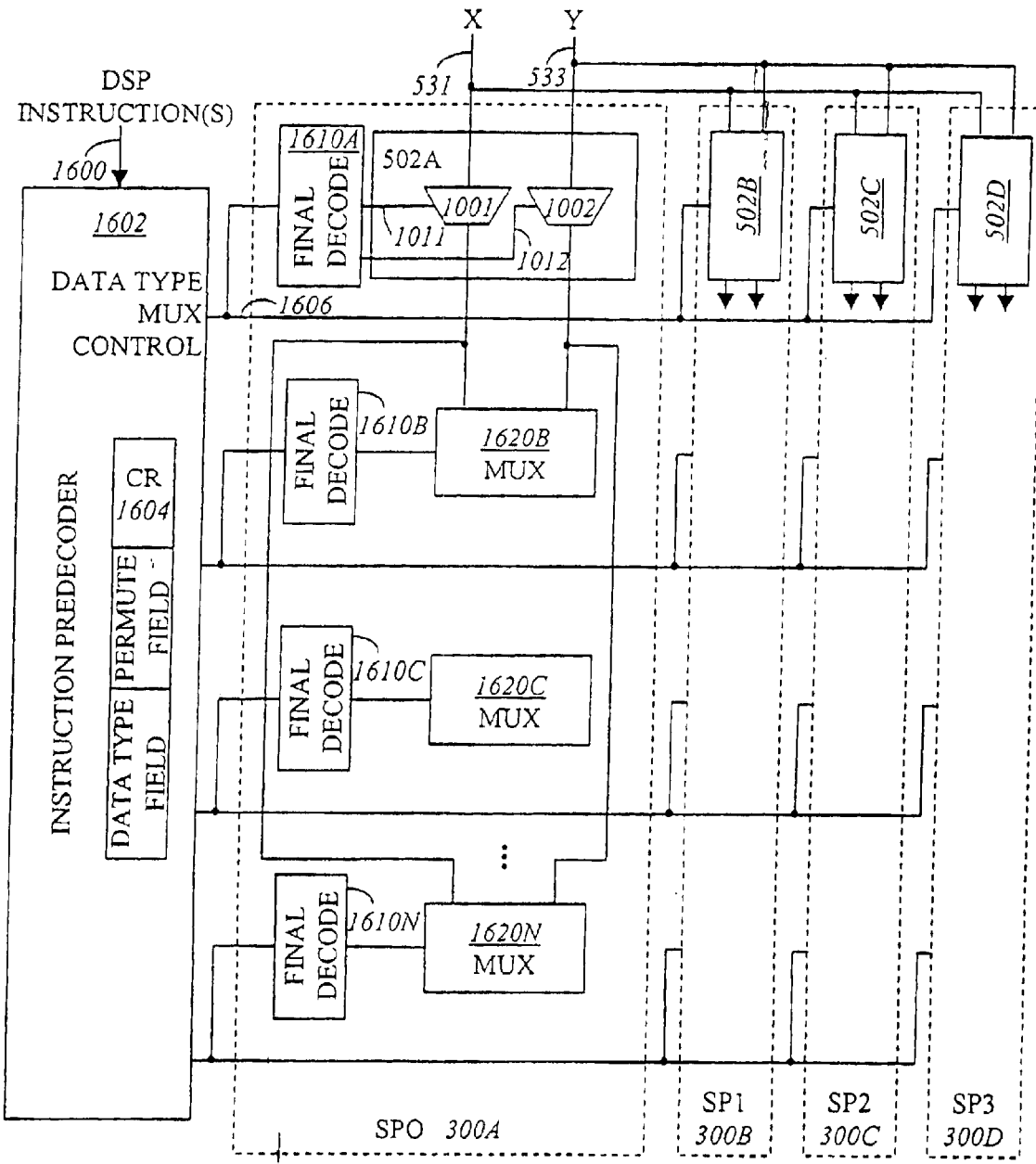
FIG. 16 is a block diagram of the control of the bus multiplexers included in the data typer and aligner of each signal processing unit.

Referring now to FIG. 16, a block diagram illustrating the control signal generation for the bus multiplexers included in each of the data typer and aligners of each signal processing unit. Control signals provided to each of the bus multiplexers of each data typer and aligner provide selective control to perform automatic data typing and alignment and user selected permutations. Control signals to multiplexers 1101 and 1102 of the bus multiplexer for the X bus in each of the data typer aligners selects the data type and alignment for one operand into each of the signal processing units. Controls signals to multiplexers 1104 and 1106 of the bus multiplexer for the Y bus in each of the data typer and aligners selects the data type and alignment for the second operand into each of the signal processing units. Automatic data type matching is provided through control of the bus multiplexers in each signal processor in response to decoding the data type fields associated with each operand from the control register or the instruction itself. The resultant operands output from each of the bus multiplexers in each signal processing unit is coupled into the multiplexer 514A of the multiplier 504A, multiplexer 520A of adder 510A, and multiplexer 520B of adder 510B in each signal processing unit as illustrated in FIG. 5B.

In FIG. 16, one or more DSP instructions 1600 are coupled into an instruction predecoder 1602. The instruction predecoder 1602 may include one or more control registers ("CR") 1604 which include a data type field and a permute field to inform the predecoder 1602 of the data type of the operands and how they are to be read into each of the signal processing units 300 (SP0 300A, SP1 300B, SP2 300C, and SP3 300D). The one or more DSP instructions 1600 directly or indirectly through the one or more control registers 1604, indicate each data type for two operands in two data type fields and any permutation of the data bus in two permute fields. The instruction predecoder 1602 automatically determines the best data type match by comparing the two data types for each operand. The instruction predecoder 1602 also reads the permute fields of each operand. In response to the permute fields and the data types of each operand, the instruction predecoder 1602 generates predecoded control signals 1606 for data typing multiplexing control. The predecoded control signals 1606 are accordingly for the control of the bus multiplexers 1001 and 1002 in each data typer and aligner 502 (data typer and aligner 502A, 502B, 502C, and 502D) in each signal processing unit 300. These predecoded control signals are coupled into the final decoders 1610A in each signal processing unit to generate the multiplexer control signals 1011 and 1012 respectively for each bus multiplexer 1001 and 1002 of each data typer and aligner 502 in each signal processing unit 300. The instruction predecoder 1602 further generates predecoded control signals for other multiplexers 1620B, 1620C through 1620N of each signal processing unit 300. Final decoders 1610B, 1610C through 1610N receive the predecoded control signals to generate the multiplexer control signals for each of the multiplexers 1620B, 1620C through 1620N of each signal processing unit 300. In this manner, the operands on the X bus and the Y bus can be aligned, matched, permuted and selected for performing a digital signal processing operation.

Architecture to Implement Shadow DSP Instructions

Figure 21:
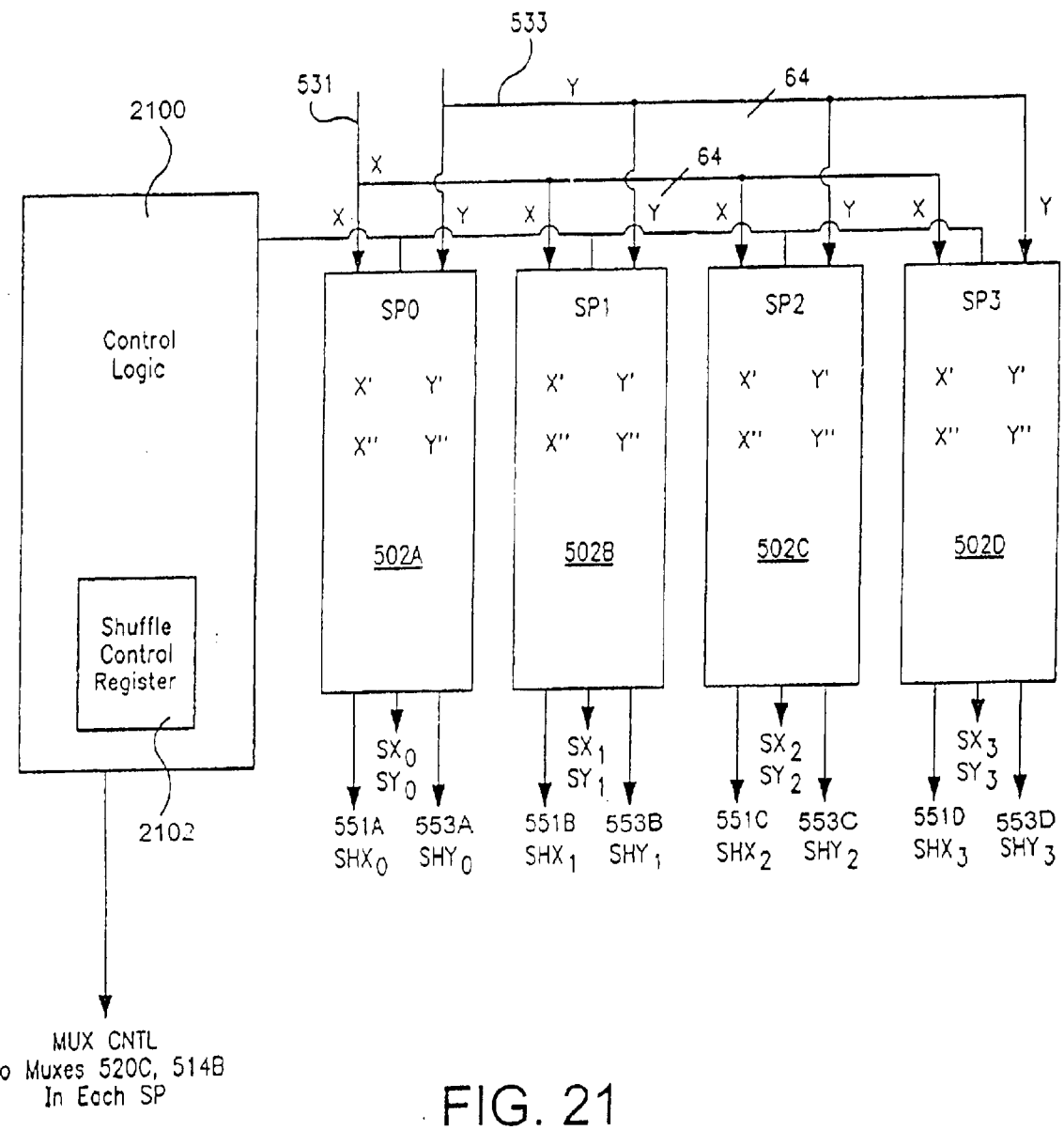
FIG. 21 is a block diagram illustrating an architecture to implement the Shadow DSP instruction according to one embodiment of the invention.

Referring now to FIG. 21, an architecture to implement the single 40-bit extended shadow DSP instruction according to one embodiment of the invention is illustrated. FIG. 21 shows a control logic block 2100 having a shuffle control register 2102 coupled to the data typer and aligner blocks 502A, 502B, 502C, and 502D of each of the Signal Processors (SPs) SP0, SP1, SP2, and SP3, respectively, of a core processor 200 (FIG. 3). The control logic block 2100 is also coupled to the multiplexers 520C and 514B of the shadow stage 562 of each SP (FIG. 5B).

The x input bus 531 and y input bus 533 are coupled to the data typer and aligner blocks (DTABs) 502A, 502B, 502C, and 502D of each of the Signal Processors SP0, SP1, SP2, and SP3, respectively. Each DTAB provides x and y data values to the functional blocks (e.g. multiplier M1 504A, compressor 506, adder A1 510A, and adder A2 510B of FIG. 5B) of its respective primary stage. Also, each DTAB of each SP stores delayed data values of the x and y busses: X', x", y', and y" in delayed data registers to provide outputs to the functional blocks (e.g. adder A3 510C and multiplier M2 504B) of its respective shadow stage 562 via data busses 551 and 553 (FIG. 5B).

Referring briefly to FIG. 22A, x"=[$SX_{10}$, $SX_{11}$, $SX_{12}$, $SX_{13}$] and x"=[$SX_{20}$, $SX_{21}$, $SX_{22}$, $SX_{23}$]. The delayed values take the form $SX_{ab}$, where: S denotes source; a=delay; and b=SP unit number (e.g. SP0, SP1, SP2, SP3). The y' and y" values are of similar form, particularly, y'=[$SY_{10}$, $SY_{11}$, $SY_{12}$, $SY_{13}$] and y"=[$SY_{20}$, $SY_{21}$, $SY_{22}$, $SY_{23}$].

As shown in FIG. 21, DTAB 502A outputs source value $SX_0$ and $SY_0$ (where the subscripted value denotes the SP number) directly from the x and y input busses into the primary stage 561 of SP0. DTAB 502A also outputs shadow values $SHX_0$ and $SHY_0$ (where the subscripted value denotes the SP number) which are selected from the delayed data values (x', x", y', and y"), respectively. These delayed values are stored in delayed data registers, as will be discussed, and are outputted via data busses 551A and 553A, respectively, to the shadow stage 562 of SP0. Similarly, DTAB 502B outputs source value $SX_1$ and $SY_1$ into the primary stage 561 and shadow values $SHX_1$ and $SHY_1$ via data busses 551B and 553B to the shadow stage 562 of SP1; DTAB 502C outputs source value $SX_2$ and $SY_2$ into the primary stage and shadow values $SHX_2$ and $SHY_2$ via data busses 551C and 553C to the shadow stage of SP2; and DTAB 502D outputs source value $SX_3$ and $SY_3$ into the primary stage and shadow values $SHX_3$ and $SHY_3$ via data busses 551D and 553D to the shadow stage of SP3.

As previously discussed, the Application Specific Signal Processor (ASSP) according to one embodiment of the invention may be utilized in telecommunication systems to implement digital filtering functions. One common type of digital filter function is finite impulse response (FIR) filter having the form $Z_n = x_0 y_0 + x_1 y_1 + x_2 y_2 + \ldots + x_N y_N$ where $y_n$ are fixed filter coefficients numbering from 1 to N and $x_n$ are the data samples.

As shown in FIG. 22B, the FIR filter of the form $Z_0 = x_0 y_0 + x_1 y_1 + x_2 y_2 + \ldots + x_N y_N$ may be used with the invention. The computations for this equation may be spread across the different (SPs) as shown in FIG. 22B and a specific portion of the equation can be computed during every cycle (denoted cycle #). For example, within the primary stages of the SPs, during cycle #1: SP0 computes $x_0 y_0$, SP1 computes $x_1 y_1$, SP2 computes $x_2 y_2$, and SP3 computes $x_3 y_3$, and during cycle #2: SP0 computes $x_4 y_4$, SP1 computes $x_5 y_5$, SP2 computes $x_6 y_6$, and SP3 computes $x_7 y_7$, etc. As previously discussed the single 40-bit Shadow DSP instruction includes a pair of 20-bit dyadic sub-instructions: a primary dyadic DSP sub-instruction that executes in the primary stage based upon current data and a shadow dyadic DSP sub-instruction that executes, simultaneously, in the shadow stage based upon delayed data locally stored within delayed data registers.

As shown in FIG. 22B, after cycle #1 and cycle #2 in which the delayed data (x', x", y', and y") is stored, the shadow stages can simultaneously calculate the next output of the FIR filter, using locally stored delayed data, of the form $Z_1 = x_1 y_0 + x_2 y_1 + x_3 y_2 + \ldots + x_{N+1} y_N$. In this example case, the control logic 2100 specifies that the shadow stages shuffle the x' values left by one. The computations for this equation are spread across the shadow stages of the different SPs as shown in FIG. 22B and a specific portion of the equation can be computed during each cycle. For example during cycle #3: SP0 computes $x_1 y_0$, SP1 computes $x_2 y_1$, SP2 computes $x_3 y_2$, and SP3 computes $x_4 y_3$, and during cycle #4: SP0 computes $x_5 y_4$, SP1 computes $x_6 y_5$, SP2 computes $x_7 y_6$, and SP3 computes $x_8 y_7$, etc. In this way, the invention efficiently executes DSP instructions by simultaneously executing primary DSP sub-instructions (based upon current data) and shadow DSP sub-instructions (based upon delayed locally stored data) with a single 40-bit extended shadow DSP instruction thereby performing four operations per single instruction cycle. Furthermore, as shown in FIG. 22B, subsequent cycles of the FIR filter can be simultaneously computed using the primary and shadow stages.

The shadow stage computations shown in FIG. 22B utilize data that it is delayed and locally stored to increase the efficiency of the digital signal processing by the SP. Cycle #3 of the shadow stage computations utilizes the first 3 x operands ($x_1$, $x_2$, and $x_3$) of cycle #1 of the primary stage and the first x operand ($x_4$) of cycle #2 of the primary stage and the y operands remain the same. Thus, for the shadow stage computations the $x_0$ operand is discarded and the x' operands of the primary stage are simply "shuffled left" by one and re-used. This same "shuffle left" operation is clearly shown in cycle #4 of the shadow stage computations.

The ereg1 and ereg2 fields of the shadow DSP sub-instruction (FIGS. 6E and 6I), previously discussed, specify to the control logic 2100 the data to be selected. For the values SX1 (denoting x'), SX2 (denoting x"), SY1 (denoting y'), and SY2 (denoting y"), specified in the ereg fields, the control logic simply selects the specified delayed data for the shadow stages without shuffling. Also, the shadow stages can use data from the accumulator as specified by the ereg fields (e.g. A0, A1, T, TR).

Figure 22C:
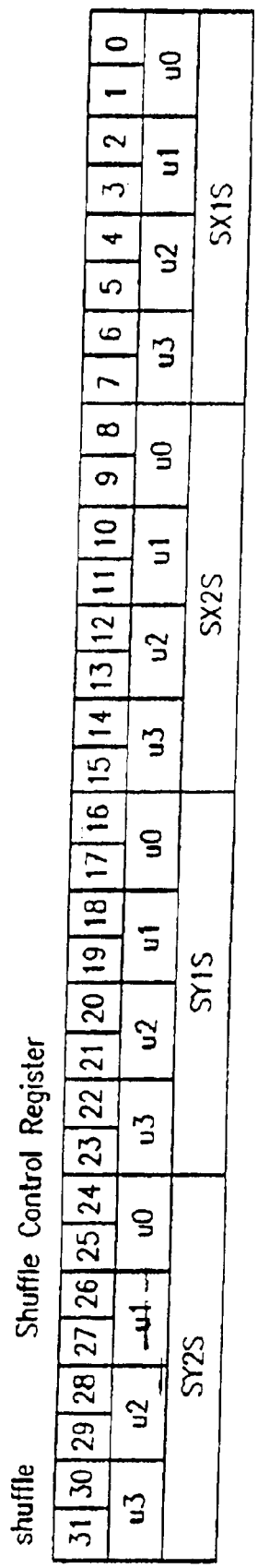
FIG. 22C illustrates a shuffle control register according to one embodiment of the invention.

FIGS. 22C illustrates a shuffle control register 2102 according to one embodiment of the invention. For the values SX1s, SX2s, SY1s, and SY2s specified in the ereg fields, the shuffle control register 2102 designates a preset shuffle control instruction to direct the control logic 2100 to select delayed data in a shuffled manner for use by shadow stages 562 of the SPs 300. Based upon this preset instruction, the control logic 2100 controls a shadow selector of each DTAB 502 of each SP 300 to select delayed data stored in delayed data registers for use by each shadow stage 562 of each SP 300, respectively.

As shown in FIG. 22C, an exemplary bit map for a shuffle control register 2102 for use with the control logic 2100 is disclosed where the term u denotes SP unit number, e.g. u3=SP3, u2=SP2, u1=SP1, and u0=SP0. In this embodiment, sources are shuffled using the following bit diagram:

00 SP Unit N+1, SX1: denotes shuffling delayed data x' to the right by one.
01 SP Unit N+1, SX2: denotes shuffling delayed data x" to the right by one.
10 SP Unit N−1, SX1: denotes shuffling delayed data x' to the left by one.
11 SP Unit N−1, SX2: denotes shuffling delayed data x" to the left by one.

For example, to shuffle delayed data x' to the left by one as illustrated in FIG. 22B and as previously described, the following bits would be programmed into the u3, u2, u1, and u0 bit fields (bits 0–7) of the SX1s portion of the bit map for the shuffle control register 2102: 10101010. Similar coding can be used to shuffle delayed y data (e.g. y' and y") as well.

It will be appreciated by those skilled in the art that the control logic can be programmed to shuffle delayed data values left or right by one step as disclosed in the bit map for the shuffle control register in FIG. 22C. Furthermore, it should be appreciated that the shuffle control register could also be programmed to shuffle delayed data by any number of steps (e.g. one, two, three . . . ) in either direction. Additionally, it will be appreciated by those skilled in the art that a wide a variety of block digital filters can be implemented with the invention besides the FIR filter previously described with reference to FIGS. 22A–22C.

Figure 23:
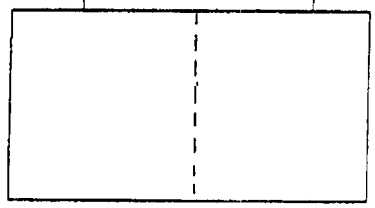
FIG. 23A illustrates the architecture of a data typer and aligner (DTAB) of a signal processing unit (SP2) to select current data for a primary stage and delayed data for use by a shadow stage from the x bus according to one embodiment of the invention.
FIG. 23B illustrates the architecture of a data typer and aligner (DTAB) of a signal processing unit (SP2) to select current data for a primary stage and delayed data for use by a shadow stage from the y bus according to one embodiment of the invention.
Figure 23A:
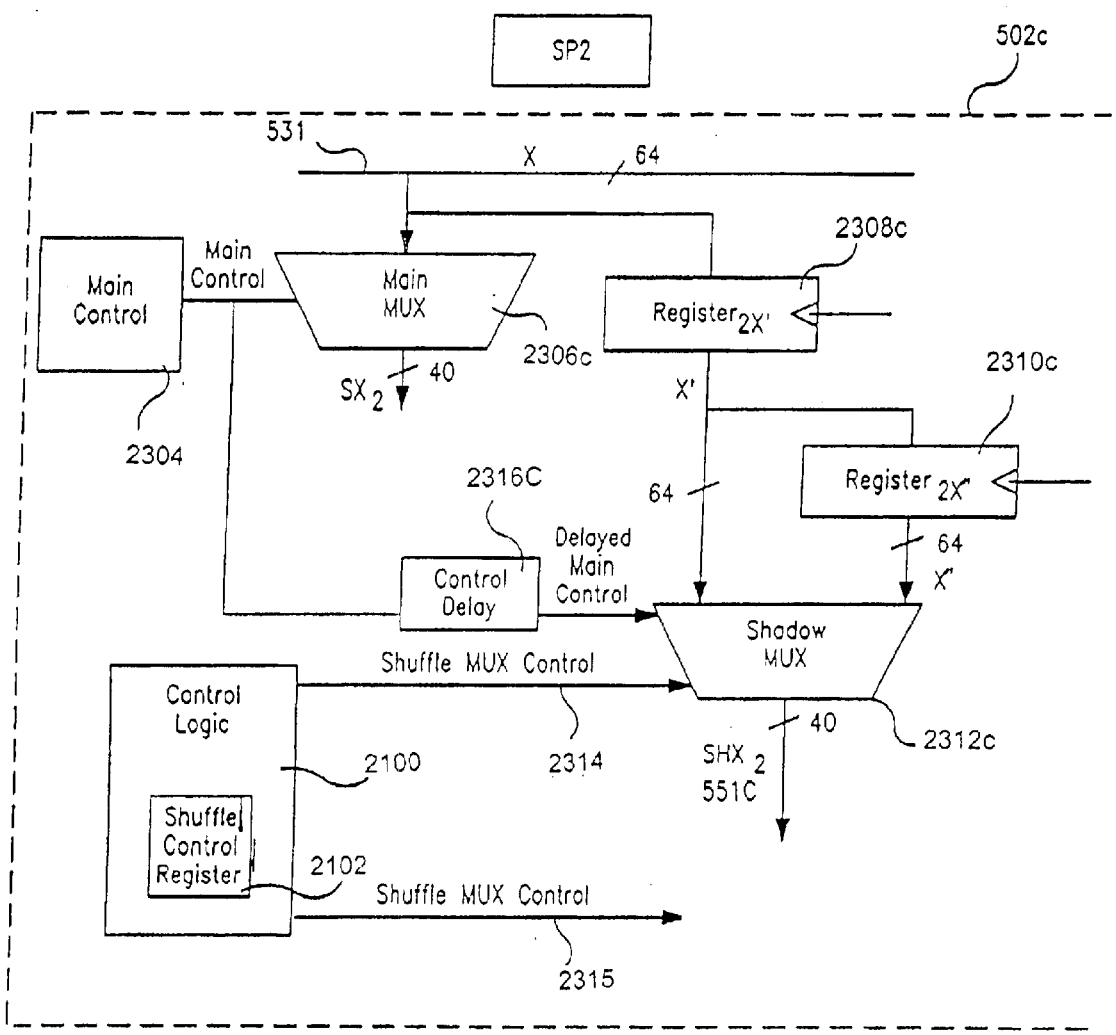

FIG. 23A illustrates the architecture of a data typer and aligner (DTAB) 502 of a signal processing unit 300 to select current data for the primary stage 561 and delayed data for use by the shadow stage 562 of an SP from the x bus 531. Particularly, FIG. 23A illustrates DTAB 502C of SP2 300C (shown in FIG. 21) to select source value $SX_2$ for output to the primary stage 561, as specified by the primary DSP sub-instruction, and to select shadow value $SHX_2$ from delayed data, x' and x", for output to the shadow stage 562 as specified by the shadow DSP sub-instruction.

DTAB 502C includes a main control 2304 that provides a main control signal to control a main multiplexer 2306C to select SX2 for output to the primary stage 561 of SP 300C in accordance with the primary DSP sub-instruction. The main control signal also provides data typing and formatting.

DTAB 502C further includes a shadow selector, such as a shadow multiplexer 2312C, to select shadow value $SHX_2$ from the delayed data, x' and x", as specified by a shuffle multiplexer control signal 2314 generated by the control logic 2100. The control logic 2100, in conjunction with the shuffle control register 2102, implements the requested delayed data selection of the shadow DSP sub-instruction, as previously discussed, by generating and transmitting the shuffle multiplexer control signal 2314 to the shadow multiplexer 2312C.

In accordance with shuffle multiplexer control signal 2314, the shadow multiplexer 2312C selects the specified delayed data value from, $x'=[SX_{10}, SX_{11}, SX_{12}, SX_{13}]$ and $x"=[SX_{20}, SX_{21}, SX_{22}, SX_{23}]$ (as previously discussed). The x" delayed data values are stored in Register$_{2x'}$ 2308C and the x" delayed data values are stored in Register$_{2x"}$ 2310C for access by the shadow multiplexer 2312C. Also control delay 2316C provides a delayed main control signal for the proper timing of the shadow multiplexer 2312C. The delayed main control signal also provides data typing and formatting.

Based upon the shuffle multiplexer control signal 2314, the shadow multiplexer 512C selects the shadow value $SHX_2$ from the delayed data values and outputs it to the shadow stage 562 of SP 300C via data bus 551C.

It should be appreciated that DTABs 502A, 502B, 502C, and 502D of SP0 300A, SP1 300B, SP2 300C, and SP3 300D, respectively, for selecting delayed x data values are all of similar architecture as described in FIG. 23A. Furthermore, it should be appreciated that each DTAB 502A, 502B, 502C, and 502D, has a shadow multiplexer 2312A, 2312B, 2312C, and 2312D, respectively, which will be discussed in detail later.

Figure 23B:
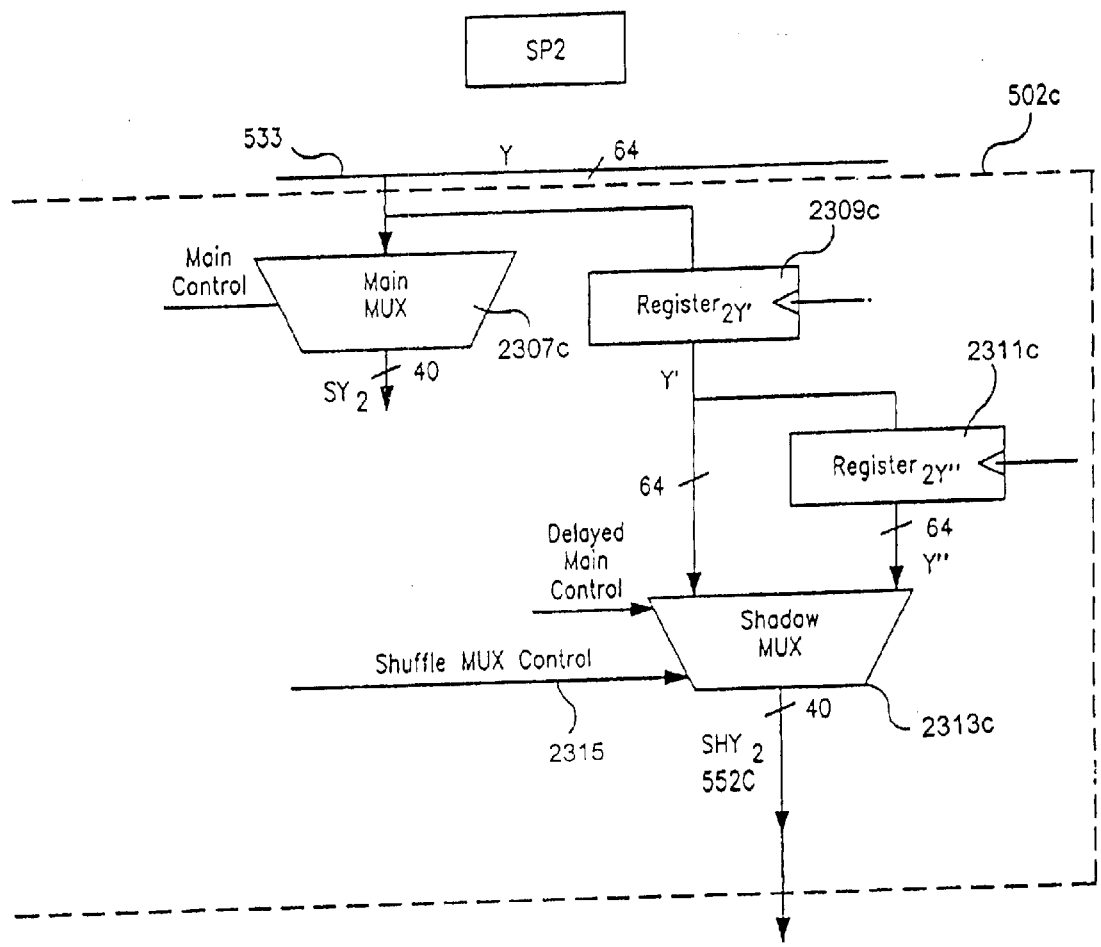

FIG. 23B illustrates the architecture of a data typer and aligner (DTAB) 502 of a signal processing unit 300 to select current data for the primary stage 561 and delayed data for use by the shadow stage 562 of an SP from the y bus 533. Particularly, FIG. 23B illustrates DTAB 502C of SP2 300C (shown in FIG. 21) to select source value SY2 for output to the primary stage 561, as specified by the primary DSP sub-instruction, and to select shadow value $SHY_2$ from delayed data, y' and y", to output to the shadow stage 562 as specified by the shadow DSP sub-instruction.

DTAB 502C includes a main control 2304 (FIG. 23A) that provide a main control signal to control a main multiplexer 2307C to select SY2 for output to the primary stage 561 of the SP 300C in accordance with the primary DSP sub-instruction. The main control signal also provides data typing and formatting.

DTAB 502C further includes a shadow selector, such as a shadow multiplexer 2313C, to select shadow value $SHY_2$ from the delayed data, y' and y", as specified by a shuffle multiplexer control signal 2315 generated by the control logic 2100. The control logic 2100, in conjunction with the shuffle control register 2102, implements the requested delayed data selection of the shadow DSP sub-instruction, as previously discussed, by generating and transmitting the shuffle multiplexer control signal 2315 to the shadow multiplexer 2313C.

In accordance with shuffle multiplexer control signal 2315, the shadow multiplexer 2313C selects the specified delayed data value from, $y'=[SY_{10}, SY_{11}, SY_{12}, SY_{13}]$ and $y"=[SY_{20}, SY_{21}, SY_{22}, SY_{23}]$ (as previously discussed). The y' delayed data values are stored in Register$_{2y'}$ 2309C and the y" delayed data values are stored in Register$_{2y"}$ 2311C for access by the shadow multiplexer 2313C. Also control delay 2316C (FIG. 23A) provides a delayed main control signal for the proper timing of the shadow multiplexer 2313C. The main control signal also provides data typing and formatting. Based upon the shuffle multiplexer control signal 2315, the shadow multiplexer 513C selects the shadow value $SHY_2$ from the delayed data values and outputs it to the shadow stage 562 of SP 300C via data bus 553C.

It should be appreciated that DTABs 502A, 502B, 502C, and 502D of SP0 300A, SP1 300B, SP2 300C, and 300D, respectively, for selecting delayed y data values are all of similar architecture as described in FIG. 23B. Furthermore, it should be appreciated that each DTAB 502A, 502B, 502C, and 502D, has a shadow multiplexer 2313A, 2313B, 2313C, and 2313D, respectively.

FIGS. 24A–24D illustrate the architecture of each shadow multiplexer 2312 for each data typer and aligner (DTAB) 502 of each signal processing units (SP) 300 to select x' and x" delayed data from the delayed data registers (e.g. Register$_{x'}$ 2308 Register$_{x"}$ 2310) for use by the shadow stages 562 of the SPs.

Figure 24A:
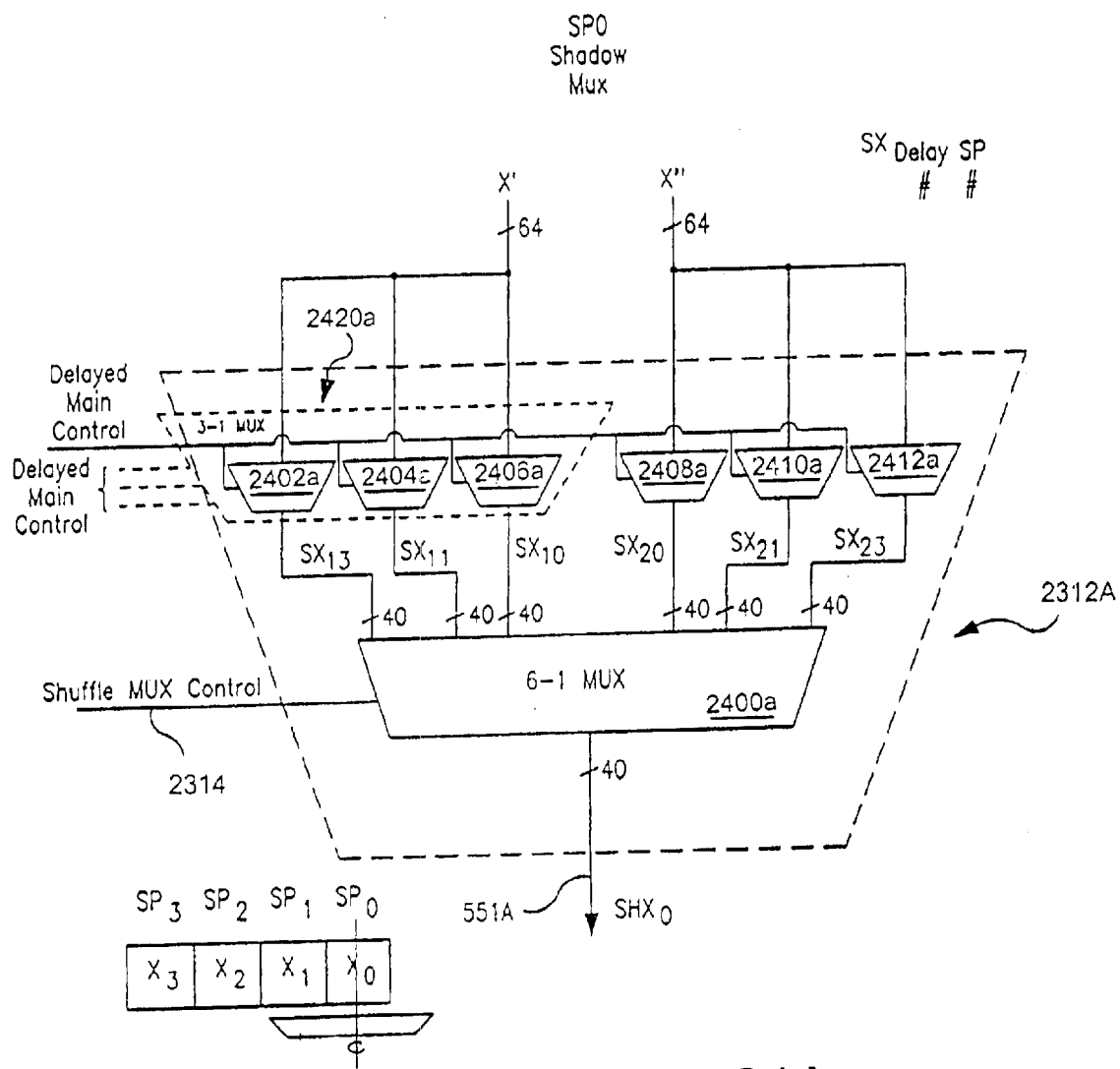
FIGS. 24A, 24B, 24C, and 24D illustrate the architecture of each shadow multiplexer of each DTAB for each signal processing unit (SP0, SP1, SP2, and SP3), respectively, according to one embodiment of the invention.

FIG. 24A illustrates the architecture of the shadow multiplexer 2312A of DTAB 502A for SP0 300A. The shadow multiplexer 2312A can select delayed x values (x' and x") as directed by the shuffle multiplexer control signal 2314 (e.g. shuffle left or right by one or no shuffle), to select the shadow value $SHX_0$. The shadow value $SHX_0$ is then outputted to the shadow stage 562 of SP 300A via data bus 551A. As previously discussed, x'=[$SX_{10}$, $SX_{11}$, $SX_{12}$, $SX_{13}$] and x"=[$SX_{20}$, $SX_{21}$, $SX_{22}$, $SX_{23}$] where the values take the form $SX_{ab}$ in which: S denotes source; a=delay; and b=SP unit number (e.g. SP0, SP1, SP2, SP3).

The shadow multiplexer 2312A includes a 6-1 multiplexer 2400a for selecting one of $SX_{13}$, $SX_{11}$, $SX_{10}$, $SX_{20}$, $SX_{21}$, $SX_{23}$ as directed by the shuffle multiplexer control signal 2314. The shadow multiplexer 2312A further includes a plurality of three multiplexers 2402a, 2404a, 2406a, for selecting $SX_{13}$, $SX_{11}$, and $SX_{10}$, respectively. Each multiplexer is also connected to the delayed main control signal for proper timing. The delayed main control signal also provides data typing and formatting.

Alternatively, a 3-1 multiplexer 2420a could be used for any plurality of three multiplexers. The shadow multiplexer 2312A also includes another plurality of three multiplexers 2408a, 2410a, 2412a, for selecting $SX_{20}$, $SX_{21}$, $SX_{23}$ respectively.

Based upon the shuffle multiplexer control signal 2314, the shadow multiplexer 2312A via 6-1 multiplexer 2400a selects one of $SX_{13}$, $SX_{11}$, $SX_{10}$, $SX_{20}$, $SX_{21}$, $SX_{23}$ for the shadow value $SHX_0$ to output to the shadow stage 562 of SP0 300A via data bus 551A. As previously discussed, the control logic 2100, in conjunction with the shuffle control register 2102, implements the requested delayed data selection of the shadow DSP sub-instruction by generating and transmitting the shuffle multiplexer control signal 2314 to the 6-1 multiplexer 2400a.

For example, if ereg1 of the shadow DSP sub-instruction specifies SX1s which, as discussed in the previous example of FIG. 22B, is programmed to be a shuffle delayed data x' to the left by one then the 6-1 multiplexer 2400a would pick the delayed data value $SX_{11}$ as shadow value $SHX_0$ to be outputted to the shadow stage. In the example of FIG. 22B under Shadow Stage Computations at Cycle #3, this corresponds to picking $x_1$ which can then be multiplied $y_0$ yielding $x_1y_0$ to be computed by SP0. Alternatively, if ereg1 is set to SX1 (denoting pick delayed data x' without shuffling) the control logic 2100 doesn't use the shuffle control register 2102 and via the shuffle multiplexer control signal 2314 directs multiplexer 2400a to pick the delayed data value $SX_{10}$ as the shadow value $SHX_0$ to be outputted to the shadow stage.

It should be appreciated that as previously discussed that shuffle multiplexer control signal can control multiplexer 2400a to pick one of the values $SX_{13}$, $SX_{11}$, $SX_{21}$, $SX_{23}$ to shuffle the x' and x" delayed data left or right by one as programmed by the shuffle control register 2102. Further, in other embodiments, the shuffle control register 2102 could be programmed to shuffle delayed data by any number of steps (e.g. one, two, three . . . ) in either direction.

Figure 24B:
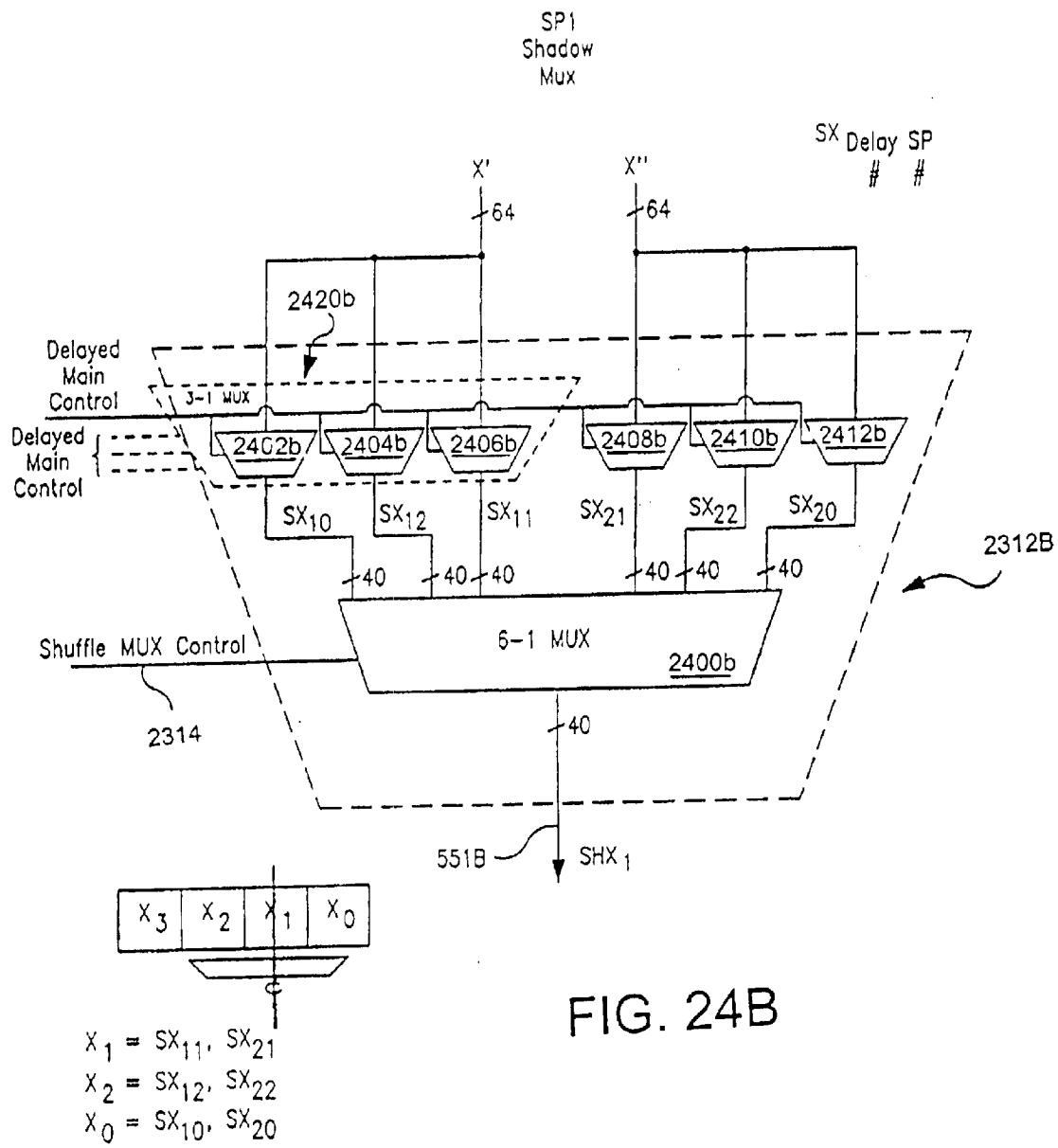
Figure 24C:
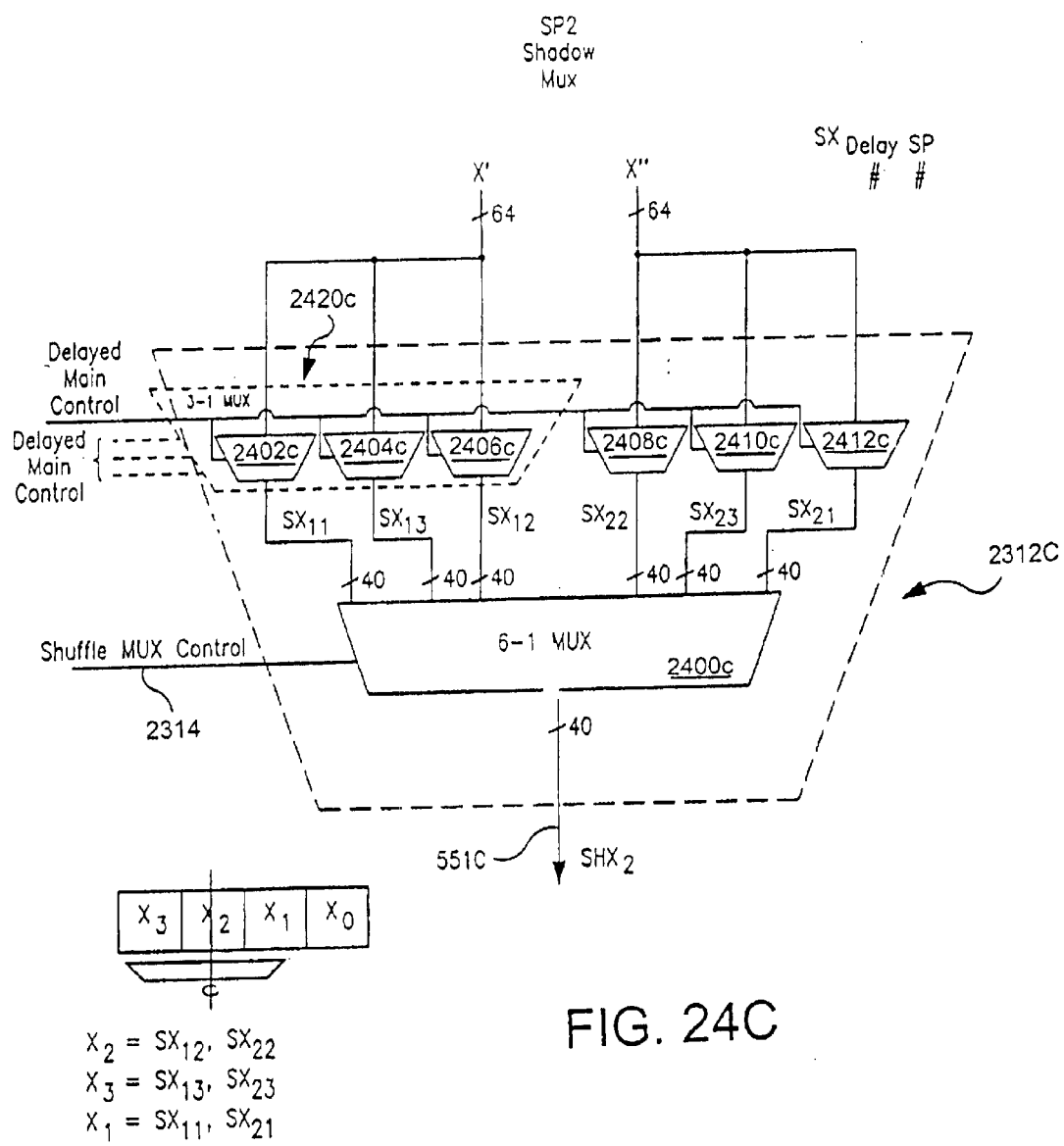
Figure 24D:
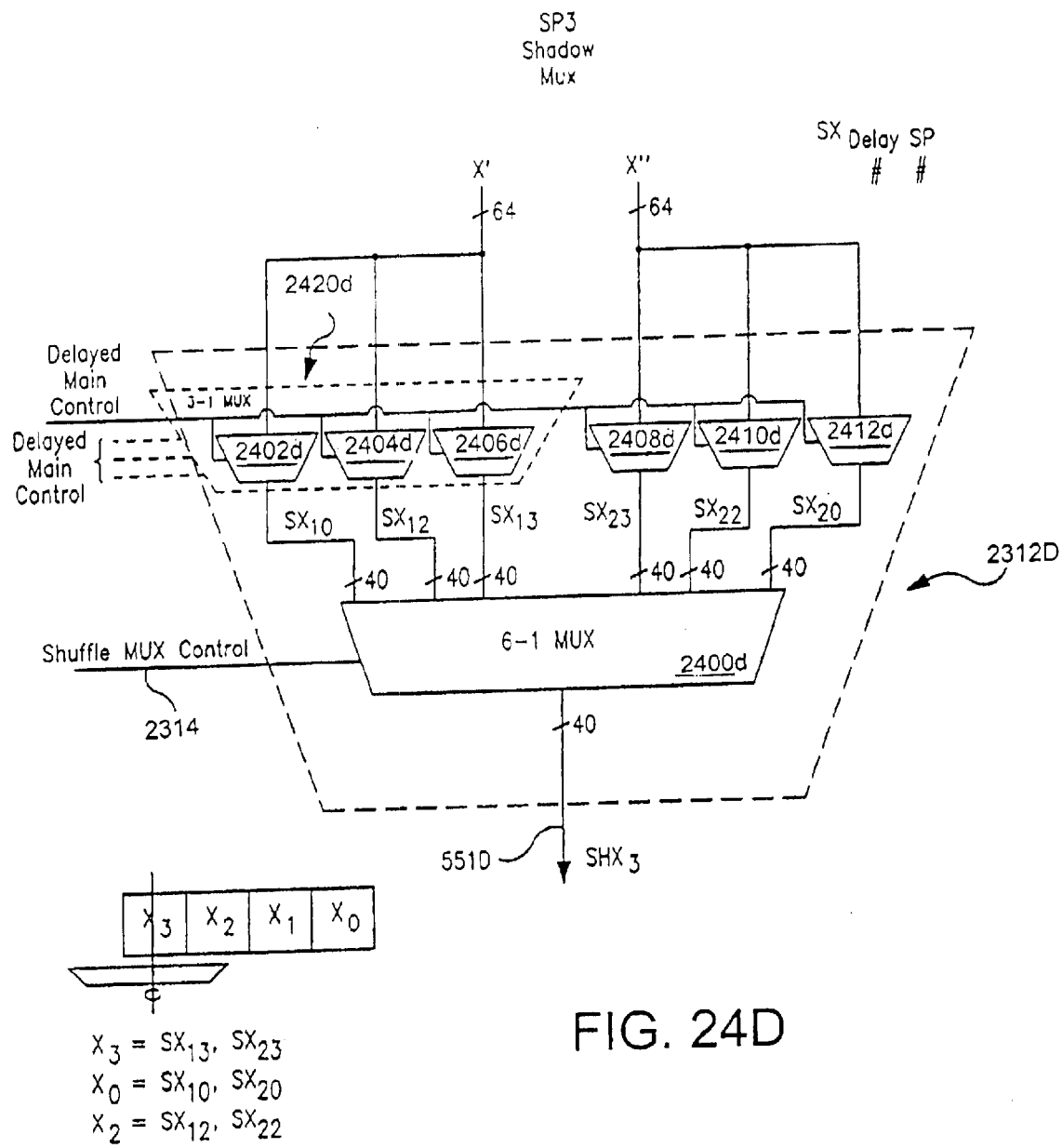

The architecture of the other shadow multiplexers 2312B, C, D for DTABs 502B, C, D of the other SPs 300B, C, D to select x' and x" delayed data for use by the shadow stages 562, is substantially the same as that previously described for shadow multiplexer 2312A, as can be seen in FIGS. 24B–24D. Therefore, shadow multiplexers 2312B, C, D will only be briefly described for brevity, as it should be apparent to those skilled in the art, that the previous explanation of multiplexer 2312A applies to the description of shadow multiplexers 2312B, C, D.

FIG. 24B illustrates the architecture of the shadow multiplexer 2312B of DTAB 502B for SP1 300B. The shadow multiplexer 2312B can select delayed x values (x' and x") as directed by the shuffle multiplexer control signal 2314 (e.g. shuffle left or right by one or no shuffle), to select the shadow value $SHX_1$. The shadow value $SHX_1$ is then outputted to the shadow stage 562 of SP 300B via data bus 551B. The shadow multiplexer 2312B includes a 6-1 multiplexer 2400b for selecting one of $SX_{10}$, $SX_{12}$, $SX_{11}$, $SX_{21}$, $SX_{22}$, $SX_{20}$ as directed by the shuffle multiplexer control signal 2314. The shadow multiplexer 2312A further includes a plurality of three multiplexers 2402b, 2404b, 2406b, for selecting $SX_{10}$, $SX_{12}$, and $SX_{11}$, respectively. The shadow multiplexer 2312B also includes another plurality of three multiplexers 2408b, 2410b, 2412b, for selecting $SX_{21}$, $SX_{22}$, $SX_{20}$, respectively. Based upon the shuffle multiplexer control signal 2314, the shadow multiplexer 2312B via 6-1 multiplexer 2400b selects one of $SX_{10}$, $SX_{12}$, $SX_{11}$, $SX_{21}$, $SX_{22}$, $SX_{20}$ for the shadow value SHX1 to output to the shadow stage 562 of SP1 300B via data bus 551B. As previously discussed, the control logic 2100, in conjunction with the shuffle control register 2102, implements the requested delayed data selection of the shadow DSP sub-instruction by generating and transmitting the shuffle multiplexer control signal 2314 to the 6-1 multiplexer 2400b.

For example, if ereg1 of the shadow DSP sub-instruction specifies SX1s which, as discussed in the previous example of FIG. 22B, is programmed to be a shuffle delayed data x' to the left by one then the 6-1 multiplexer 2400b would pick the delayed data value $SX_{12}$ as shadow value $SHX_1$ to be outputted to the shadow stage. In the example of FIG. 22B under Shadow Stage Computations at Cycle #3, this corresponds to picking $x_2$ which can then be multiplied $y_1$ yielding $x_2y_1$ to be computed by SP1. Alternatively, if ereg1 is set to SX1 (denoting pick delayed data x' without shuffling) the control logic 2100 doesn't use the shuffle control register 2102 and via the shuffle multiplexer control signal 2314 directs multiplexer 2400b to pick the delayed data value $SX_{11}$ as the shadow value $SHX_1$ to be outputted to the shadow stage.

FIG. 24C illustrates the architecture of the shadow multiplexer 2312C of DTAB 502C for SP2 300C. The shadow multiplexer 2312C can select delayed x values (x' and x") as directed by the shuffle multiplexer control signal 2314 (e.g. shuffle left or right by one or no shuffle), to select the shadow value $SHX_2$. The shadow value $SHX_2$ is then outputted to the shadow stage 562 of SP 300C via data bus 551C. The shadow multiplexer 2312C includes a 6-1 multiplexer 2400c for selecting one of $SX_{11}$, $SX_{13}$, $SX_{12}$, $SX_{22}$, $SX_{23}$, $SX_{21}$ as directed by the shuffle multiplexer control signal 2314. The shadow multiplexer 2312C further includes a plurality of three multiplexers 2402c, 2404c, 2406c, for selecting $SX_{11}$, $SX_{13}$, $SX_{12}$, respectively. The shadow multiplexer 2312C also includes another plurality of three multiplexers 2408c, 2410c, 2412c, for selecting $SX_{22}$, $SX_{23}$, $SX_{21}$, respectively. Based upon the shuffle multiplexer control signal 2314, the shadow multiplexer 2312C via 6-1 multiplexer 2400c selects one of $SX_{11}$, $SX_{13}$, $SX_{12}$, $SX_{22}$, $SX_{23}$, $SX_{21}$ for the shadow value $SHX_2$ to output to the shadow stage 562 of SP2 300C via data bus 551C. As previously discussed, the control logic 2100, in conjunction with the shuffle control register 2102, implements the requested delayed data selection of the shadow DSP sub-instruction by generating and transmitting the shuffle multiplexer control signal 2314 to the 6-1 multiplexer 2400c.

For example, if ereg1 of the shadow DSP sub-instruction specifies SX1s which, as discussed in the previous example of FIG. 22B, is programmed to be a shuffle delayed data x' to the left by one then the 6-1 multiplexer 2400c would pick the delayed data value $SX_{13}$ as shadow value $SHX_2$ to be outputted to the shadow stage. In the example of FIG. 22B under Shadow Stage Computations at Cycle #3, this corresponds to picking $x_3$ which can then be multiplied $Y_2$ yielding $x_3y_2$ to be computed by SP2. Alternatively, if ereg1 is set to SX1 (denoting pick delayed data x' without shuffling) the control logic 2100 doesn't use the shuffle control register 2102 and via the shuffle multiplexer control signal 2314 directs multiplexer 2400c to pick the delayed data value $SX_{12}$ as the shadow value $SHX_2$ to be outputted to the shadow stage.

FIG. 24D illustrates the architecture of the shadow multiplexer 2312D of DTAB 502D for SP3 300D. The shadow multiplexer 2312D can select delayed x values (x' and x") as directed by the shuffle multiplexer control signal 2314 (e.g. shuffle left or right by one or no shuffle), to select the shadow value $SHX_3$. The shadow value $SHX_3$ is then outputted to the shadow stage 562 of SP 300D via data bus 551D. The shadow multiplexer 2312D includes a 6-1 multiplexer 2400d for selecting one of $SX_{10}$, $SX_{12}$, $SX_{13}$, $SX_{23}$, $SX_{22}$, $SX_{20}$ as directed by the shuffle multiplexer control signal 2314. The shadow multiplexer 2312D further includes a plurality of three multiplexers 2402d, 2404d, 2406d, for selecting $SX_{10}$, $SX_{12}$, $SX_{13}$, respectively. The shadow multiplexer 2312D also includes another plurality of three multiplexers 2408d, 2410d, 2412d, for selecting $SX_{23}$, $SX_{22}$, $SX_{20}$, respectively. Based upon the shuffle multiplexer control signal 2314, the shadow multiplexer 2312D via 6-1 multiplexer 2400d selects one of $SX_{10}$, $SX_{12}$, $SX_{13}$, $SX_{23}$, $SX_{22}$, $SX_{20}$ for the shadow value $SHX_3$ to output to the shadow stage 562 of SP3 300D via data bus 551D. As previously discussed, the control logic 2100, in conjunction with the shuffle control register 2102, implements the requested delayed data selection of the shadow DSP sub-instruction by generating and transmitting the shuffle multiplexer control signal 2314 to the 6-1 multiplexer 2400d.

For example, if ereg1 of the shadow DSP sub-instruction specifies SX1s which, as discussed in the previous example of FIG. 22B, is programmed to be a shuffle delayed data x' to the left by one then the 6-1 multiplexer 2400d would pick the delayed data value $SX_{20}$ as shadow value $SHX_3$ to be outputted to the shadow stage. Thus, in this instance, the value comes from the x" delayed data. In the example of FIG. 22B under Shadow Stage Computations at Cycle #3, this corresponds to picking $x_4$ which can then be multiplied $y_3$ yielding $x_4y_3$ to be computed by SP3. Alternatively, if ereg1 is set to SX1 (denoting pick delayed data x' without shuffling) the control logic 2100 doesn't use the shuffle control register 2102 and via the shuffle multiplexer control signal 2314 directs multiplexer 2400d to pick the delayed data value $SX_{13}$ as the shadow value $SHX_3$ to be outputted to the shadow stage.

As previously discussed each DTAB 502A, 502B, 502C, and 502D, has a shadow multiplexer 2313A, 2313B, 2313C, and 2313D, respectively, to select y' and y" delayed data from delayed data registers for use by the shadow stages 562 of the SPs. It should be appreciated by those skilled in the art that the architecture of these shadow multiplexers for selecting y' and y" delayed data is substantially the same as that previously described for the shadow multiplexers 2312A, 2312B, 2312C, and 2312D with reference to FIGS. 24A–24D, and that these shadow multiplexers function in substantially the same way using y' and y" delayed data instead of x' and x" delayed data. Therefore, for brevity, they will not be described.

Figure 25:
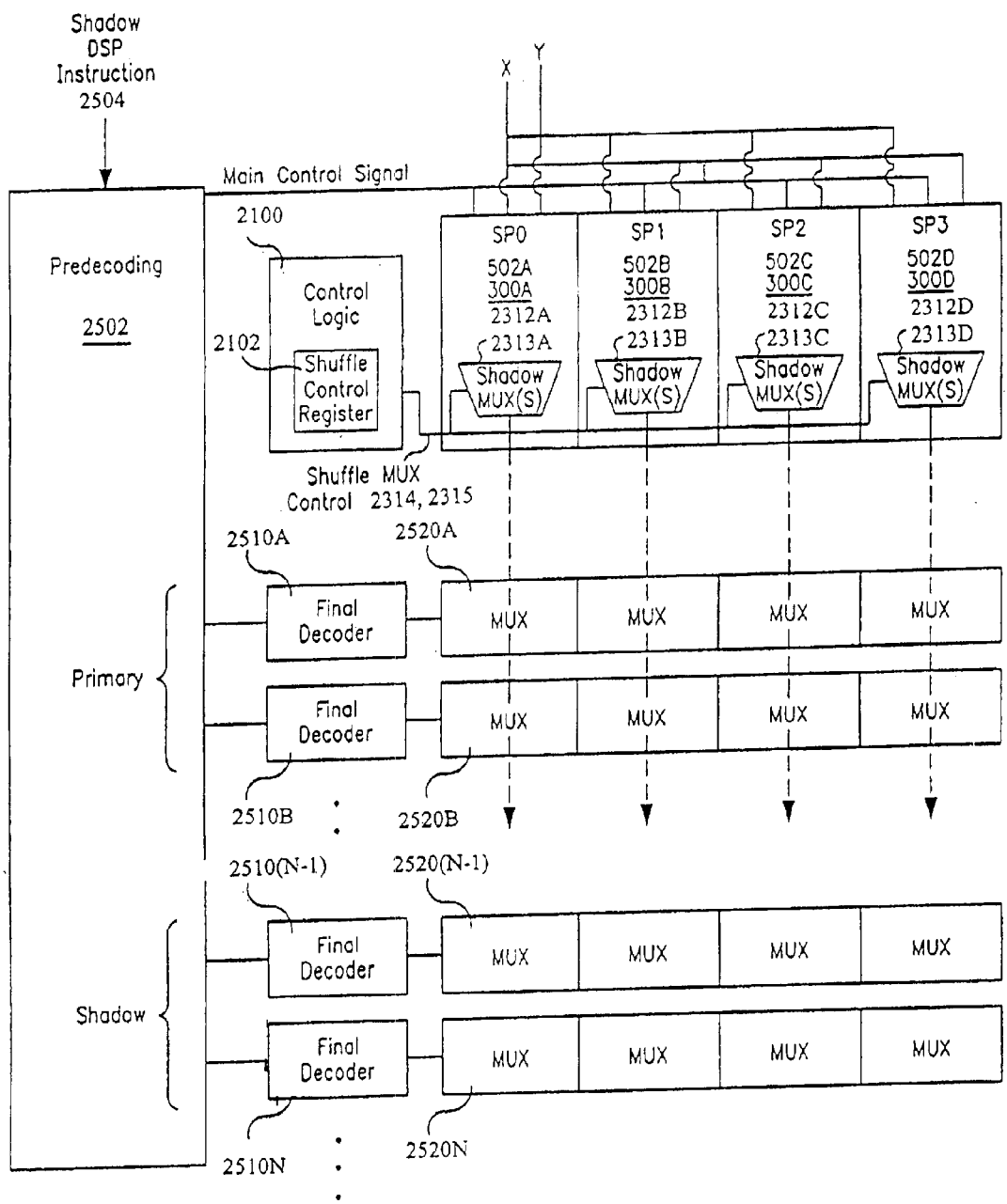
FIG. 25 is a block diagram illustrating the instruction decoding for configuring the blocks of the signal processing units according to one embodiment of the invention.

Referring now to FIG. 25, a block diagram illustrates the instruction decoding for configuring the blocks of the signal processing units (SPs) 300A–D. A Shadow DSP instruction 2504 including a primary DSP sub-instruction and a shadow DSP sub-instruction enters a predecoding block 2502. The predecoding block 2502 is coupled to each data typer and aligner block (DTAB) 502A, 502B, 502C, and 502D of each SP, respectively, to provide main control signals to select source values (e.g. $SX_0$, $SX_1$, $SX_2$, $SX_3$ etc.) for output to the primary stages 561 of the SPs 300 in accordance with the primary DSP sub-instruction. The main control signal also provides data typing and formatting for both the source values and the shadow values (e.g. $SHX_0$ $SHX_1$ $SHX_2$ $SHX_3$ etc.)

As shown in FIG. 25, the control logic 2100 and shuffle control register 2102 are coupled to the shadow multiplexers (2312A, 2313A, 2312B, 2313B etc.) to provide the shuffle multiplexer control signals 2314 and 2315 to the shadow multiplexers. As previously discussed, the shuffle multiplexer control signal causes the shadow multiplexers to select shadow values SHX from delayed data to implement the requested delayed data selection of the shadow DSP sub-instruction.

Each signal processor 300 includes the final decoders 2510A through 2510N, and multiplexers 2510A through 2510N. The multiplexers 2510A through 2510N are representative of the multiplexers 514A, 516, 520A, 520B, 522, 520C, and 514B in FIG. 5B. The predecoding 2502 is provided by the RISC control unit 302 and the pipe control 304. An instruction is provided to the predecoding 2502 such as a Shadow DSP instruction 2504. The predecoding 2502 provides preliminary signals to the appropriate final decoders 2510A through 2510N on how the multiplexers 2520A through 2520N are to be selected for the given instruction.

Referring back to FIG. 5B, in the primary dyadic DSP sub-instruction of the single 40-bit extended Shadow DSP instruction, the MAIN OP and SUB OP are generally performed by the blocks of the multiplier M1 504A, compressor 506, adder A1 510A, and adder A2 510B. The result is stored in one of the registers within the accumulator register AR 512.

For example, if the primary dyadic DSP sub-instruction is to perform a MULT and an ADD, then the MULT operation of the MAIN OP is performed by the multiplier M1 504A and the SUB OP is performed by the adder A1 510A. The predecoding 2502 and the final decoders 2510A through 2510N appropriately select the respective multiplexers 2520A and 2520N to select the MAIN OP to be performed by multiplier M1 504A and the SUB OP to be performed by adder A1 510A. In the exemplary case, multiplexer 514A selects inputs from the data typer and aligner 502 in order for multiplier M1 504A to perform the MULT operation, multiplexer 520A selects an output from the data typer and aligner 502 for adder A1 510 to perform the ADD operation, and multiplexer 522 selects the output from adder 510A for accumulation in the accumulator 512. The MAIN OP and SUB OP can be either executed sequentially (i.e. serial execution on parallel words) or in parallel (i.e. parallel execution on parallel words). If implemented sequentially, the result of the MAIN OP may be an operand of the SUB OP.

For the shadow dyadic DSP sub-instruction of the Shadow DSP instruction, the MAIN OP and SUB OP are generally performed by the blocks of the adder A3 510C and multiplier M2 504B. The result is stored in one of the registers within the accumulator register AR 512.

For example, if the shadow dyadic DSP sub-instruction is to perform a MULT and an ADD, then the MULT operation of the MAIN OP is performed by the multiplier M2 504B and the SUB OP is performed by the adder A3 510C. The predecoding 2502 and the final decoders 2510A through 2510N appropriately select the respective multiplexers 2520A through 2520N to select the MAIN OP to be performed by multiplier M2 504B and the SUB OP to be performed by adder A3 510C. In the exemplary case, multiplexer 514B selects inputs (e.g. Shadow values SHX) from the data typer and aligner 502 in order for multiplier M2 504B to perform the MULT operation, multiplexer 520C selects an output from the accumulator 512 for adder A3 510C to perform the ADD operation, and multiplexer 522 selects the output from multiplier M2 504B for accumulation in the accumulator 512. Again, as in the primary stage, the MAIN OP and SUB OP can be either executed sequentially (i.e. serial execution on parallel words) or in parallel (i.e. parallel execution on parallel words). If implemented sequentially, the result of the MAIN OP may be an operand of the SUB OP.

The final decoders 2510A through 2510N have their own control logic to properly time the sequence of multiplexer selection for each element of the signal processor 300 to match the pipeline execution of how the MAIN OP and SUB OP are executed, including sequential or parallel execution. The RISC control unit 302 and the pipe control 304 in conjunction with the final decoders 2510A through 2510N pipelines instruction execution by pipelining the instruction itself and by providing pipelined control signals. This allows for the data path to be reconfigured by the software instructions each cycle.

The ISA of the invention is adapted to DSP algorithmic structures providing compact hardware to consume low-power which can be scaled to higher computational requirements. The signal processing units have direct access to operands in memory to reduce processing overhead associated with load and store instructions. The pipelined instruction execution is provided so that instructions may be issued every cycle. The signal processing units can be configured cycle by cycle DSP instructions can be efficiently executed by using a Shadow DSP instruction which allows for the simultaneously execution of the primary DSP sub-instruction(based upon current data) and the shadow DSP sub-instruction (based upon delayed locally stored data) thereby performing four operations per single instruction cycle.

Reconfigurable Global Buffer Memory

The global buffer memory 210 in the ASSP 150 is a reconfigurable memory including memory cells and a reconfigurable memory controller. Thus, the global buffer memory 210 is also referred to herein as a reconfigurable global buffer memory 210. To support the reconfigurable memory, memory cells are tested to determine if there is a failure in the cell or a failure in accessing the cell during a read or write operation. After determining where any failure exists, the address locations associated with the physical locations of unusable memory cells or memory blocks are mapped out to avoid addressing them. Memory blocks may also be referred to as memory banks. This allows the logical addressing to work around the unusable memory cells or memory blocks. While mapping out unusable memory locations or memory blocks reduces the total capacity, the reconfigurable memory has sufficient capacity for the integrated circuit to remain functionally usable at a reduced functional percentage.

Figure 26:
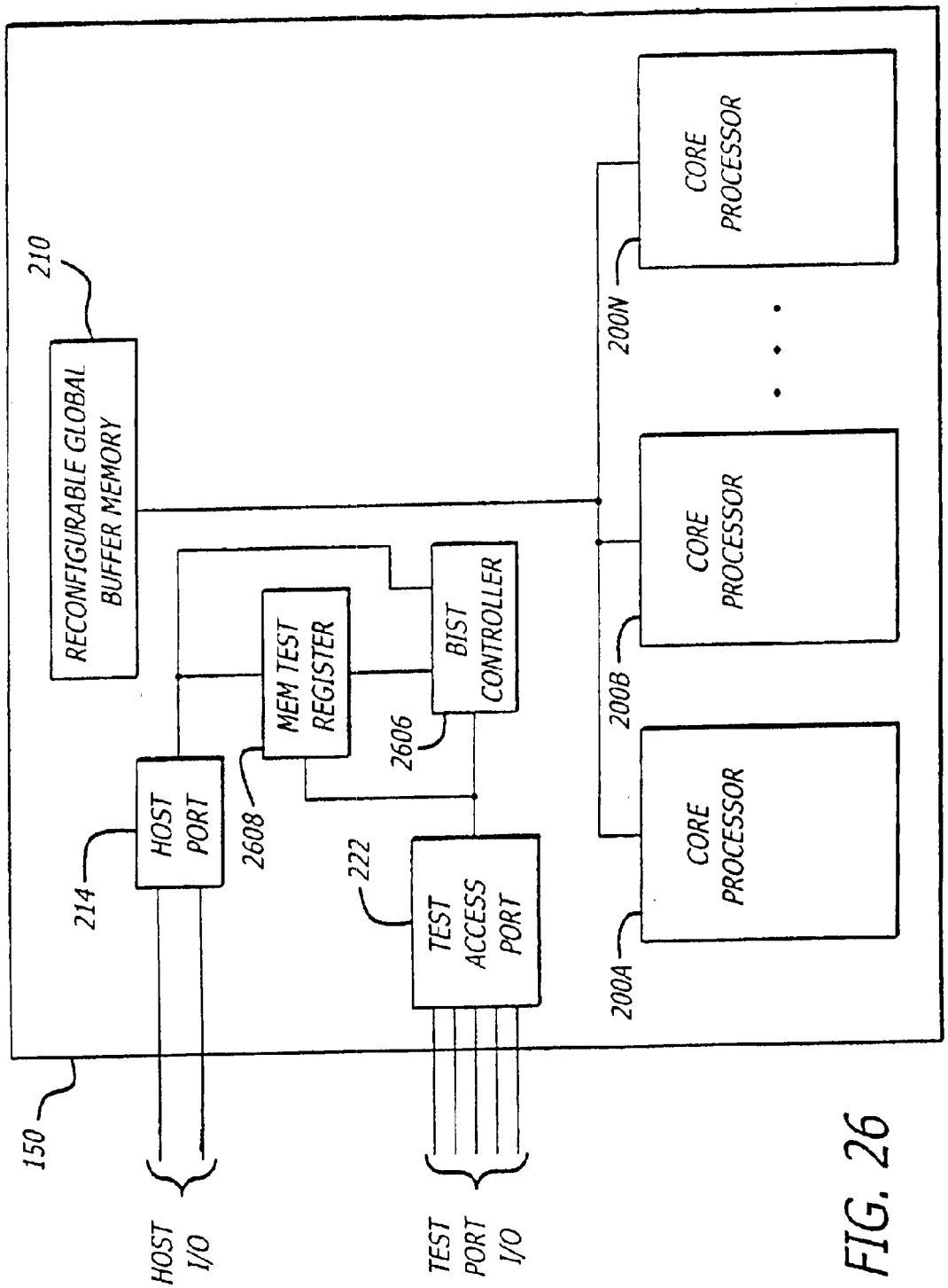
FIG. 26 is a block diagram of an integrated circuit including an embodiment of the reconfigurable memory of the invention.

Referring now to FIG. 26, the ASSP integrated circuit 150 including a reconfigurable memory 210 is illustrated. The reconfigurable memory 210 is reconfigurable in that it can map out bad or unusable memory cells. Memory blocks of the reconfigurable memory 210 having a bad memory cell therein can be mapped out so that they are not addressed. To further support the reconfigurable memory 210, the ASSP integrated circuit 150 includes a test access port (TAP) 222, a built in self-tester (BIST) 2606, a host port 214, and a memory test register 2608. The reconfigurable memory 210 in one embodiment is a global memory such that data and code of programs can be shared by one or more core processors 200A through 200N. The one or more core processors 200A through 200N are digital signal processing units to process one or more communication channels.

The built-in-self-tester 2606 within the ASSP integrated circuit 150 in one embodiment is a memory tester to test each and every memory block and memory cell of the reconfigurable memory 210 in order to determine or detect which memory blocks and memory cells are bad. After testing the reconfigurable memory 210, the unusable or bad memory cells and memory blocks can be mapped out by reprogramming the relationship between the logical address space and the physical address space. The BIST 2606 is a hardware BIST and includes one or more controllers, a state machine, a comparator, and other control logic. The one or more controllers controls the testing of memory blocks 2712 in the reconfigurable memory 210. To speed testing, the one or more controllers operate in parallel each testing a one or more memory blocks at a time. This reduces testing time and testing costs and the time for realignment of the logical addresses by a system. It is preferable to not test all memory blocks at the same time in order to avoid peak power consumption. In one embodiment, three controllers are provided each to test six memory blocks in a reconfigurable memory having eighteen memory blocks. The state machine under an algorithm is used to generate the addresses and the data of a test pattern to test the reconfigurable memory 210. The comparator within the BIST 2606 performs a comparison between the actual test results and the expected test results to determine if a memory block or memory cell within the reconfigurable memory passed or failed a test.

The test access port 222 is a Joint Test Action Group (JTAG) serial test port in one embodiment. Testing of the reconfigurable memory 210 can be initiated externally through the test access port 222, the host port 214 or another access port that can communicate with the built-in-self-tester 2606 and the test register 2608. In the case that the test access port 222 is a JTAG test port, testing can be initiated externally by data communication over the input and/or output pins of the test access port 222. In the case that the host port 214 is used to initiate testing of the reconfigurable memory, the data communication to initiate the testing is performed externally in parallel over parallel input and/or output pins of the host port 214. To initiate and perform testing of the reconfigurable memory, the host port 214 couples to the memory test register 2608 and the BIST 2606. To initiate and perform testing of the reconfigurable memory, the test access port 222 couples to the memory test register 2608 and the BIST 2606. The testing can be kicked off externally by a host controller by writing to the memory test register 2608 and setting a BIST start indicator 3008 (shown in FIG. 30) of the register 2608. Alternatively, it can be kicked off through the test access port 222.

The reconfigurable memory 210 is sized accordingly (i.e., it has a maximum capacity) such that reductions in memory capacity can still provide a functional device. For example, the reconfigurable memory 210 may have eight (8) megabits of maximum memory capacity configured as sixteen (16) blocks of five-hundred-twelve (512) kilobits. If one or more memory cells in one memory block goes bad, it can be mapped out reducing the total memory capacity. In the case of the example where a whole memory block is mapped out, the total memory capacity is reduced by five-hundred-twelve (512) kilobits. If additional blocks of memory are mapped out, the total memory capacity is reduced in additional increments of five-hundred-twelve (512) kilobits. A minimum capacity of the reconfigurable memory 210 may be a single block of memory such that the ASSP integrated circuit 150 can remain functional. In the exemplary reconfigurable memory 210, one memory block is five-hundred-twelve (512) kilobits of memory capacity.

The total memory capacity of the reconfigurable memory 210 can be binned out during testing at the factory similar to frequency binning of integrated circuits, such as microprocessors. For example with a maximum total capacity of eight (8) megabits, the reconfigurable memory can be binned out in increments of five-hundred-twelve (512) kilobits according to the total usable memory space therein. That is, the ASSP integrated circuit 150 having the reconfigurable memory 210 may be binned out into bins of 8 meg, 7.5 meg, 7 meg, 6.5 meg, 6 meg, 5.5 meg, 5 meg, 4.5 meg, 4 meg and so on and so forth. Other bin sizes and increments of mapping out memory capacity can be used.

Similar to price points for various frequency bins, price points can be established for various levels of memory capacity of the reconfigurable memory 210. The price of the ASSP integrated circuit 150 can be adjusted at each bin for the reduction in capacity of the reconfigurable memory 210. The price points can be established because of different device yields which is inversely proportional to the device manufacturing costs.

The binning of the ASSP integrated circuit 150 for different memory capacities of the reconfigurable memory allows for increased die yield over a silicon wafer. For example, assume that only 10% of the die on a wafer test out to have a reconfigurable memory 210 with a maximum capacity. Assuming the reconfigurable memory 210 is binned out at 7 megabits of capacity and has five-hundred-twelve kilobit (512 k bit) memory blocks, by allowing two memory blocks each of 512 k bits to be defective, the yield of die per wafer can increase to approximately 25% for example. A greater percentage yield can be achieved for the ASSP integrated circuit 150 using lower memory capacity binning for the reconfigurable memory 210. Thus, manufacturing costs and price can be reduced for an ASSP integrated circuit 150 including a reconfigurable memory 210 when binning is used.

In the case that the core processors 200A–200N are digital signal processing units and the reconfigurable memory 210 is a global memory supporting a number of communication channels, the reduction in total memory capacity reduces the number of communication channels supported. With binning of the memory capacity of the reconfigurable memory and the respective channel capacity, the price and cost of manufacture of the ASSP integrated circuit 150 can be reduced.

Figure 27:
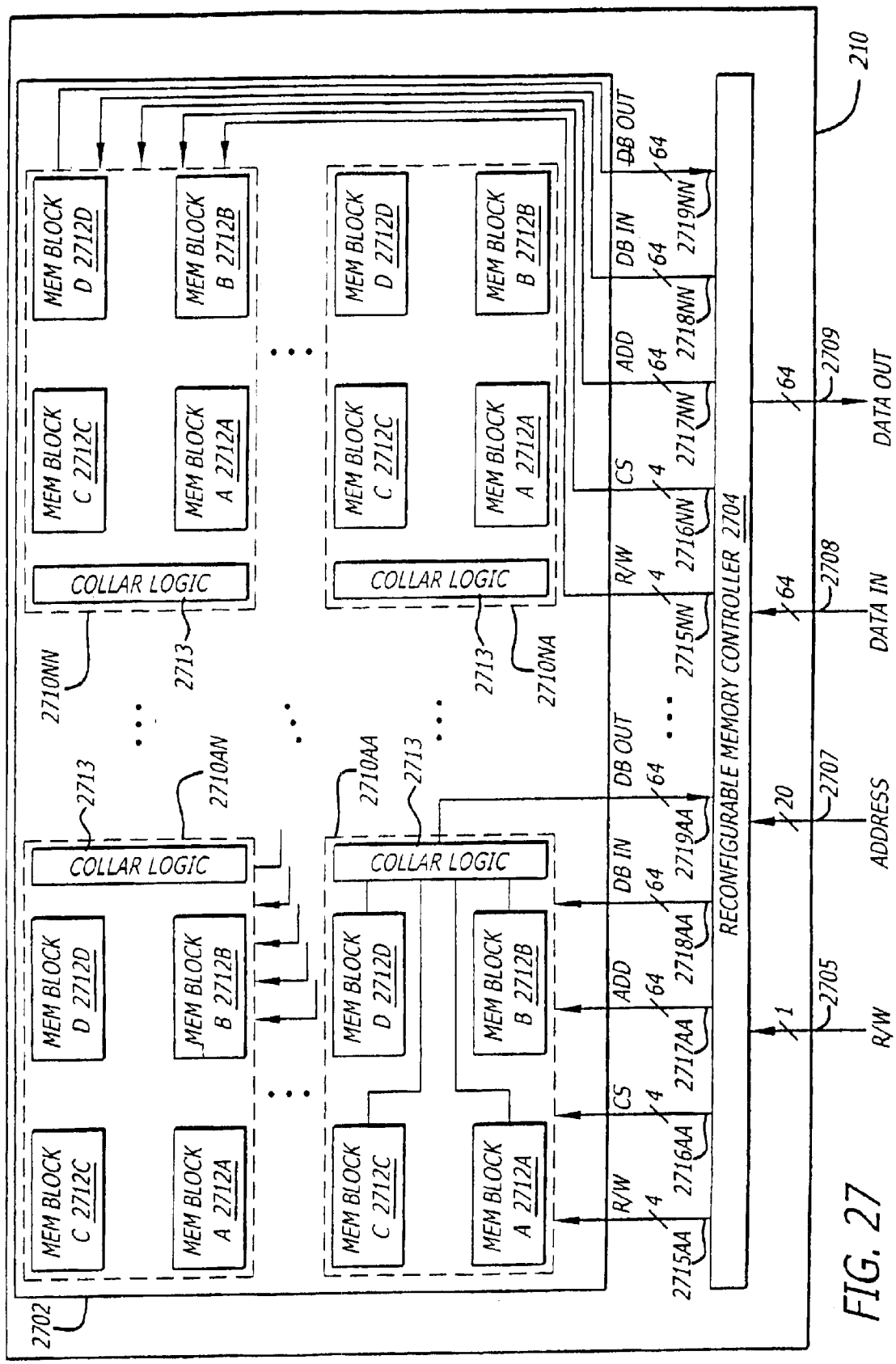
FIG. 27 is a block diagram of an embodiment of the reconfigurable memory of the invention.
Figure 28:
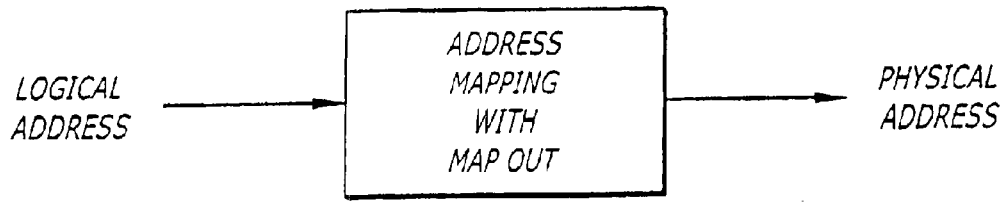
FIG. 28 is a functional block diagram of the address mapping provided by the reconfigurable memory controller of the invention.

Referring now to FIG. 27, a block diagram of the reconfigurable memory 210 is illustrated. The reconfigurable memory 210 includes a memory array 2702 and a reconfigurable memory controller 2704. The memory array 2702 is organized into one or more clusters 2710AA–2710NN. The one or more clusters 2710AA–2710NN are generally referred to as clusters 2710. Each cluster 2710 includes a memory block A 2712A, a memory block B 2712B, a memory block C 2712C, and a memory block D 2712D generally referred to as memory block 2712. Each of the memory blocks 2712 is in and of itself a memory unit including row and column address decoders, sense amplifiers, and tri-state drivers. The sense amplifiers are used to determine the data stored into memory cells which are addressed by row and column address decoders during a read operation. The tri-state drivers can be used to drive data into the memory cells addressed by row and column address decoders during a memory write operation. Each cluster 2710 in the memory array 2702 includes four memory blocks 2712 and signals for each. These signals received by each cluster 2710 are generally four read/write strobes R/W 2715 and four chip select signals CS 2716, one for each memory block; and an address bus ADD 2717, a data bus input DB IN 2718, and a data bus output DB OUT 2719 for each memory block. Each instance of these signals for each cluster includes a two letter extension on its reference number associated with the respective cluster as illustrated in FIG. 27. For example, cluster 2710AA receives four read/write strobes R/W 2715AA, four chip select signals CS 2716AA, one for each memory block; an address bus ADD 2717AA, a data bus input DB IN 2718AA, and a data bus output DB OUT 2719AA. In one embodiment, each address bus ADD 2717 is sixteen bits wide to address sixty-four (64 k) kilo-words in each memory block using eight (8) bit words, and each data bus input DB IN 2718 and data bus output DB OUT 2719 is sixty-four bits wide. Each of the memory blocks 2712A–2712D in each cluster 2710 receives one of the R/W strobes 2715 and one of the chip select signals CS 2716. Each of the memory blocks 2712A–2712D in each cluster 2710 couple to its respective address bus ADD 2717, data bus input 2718 and data bus output 2719 for each respective cluster. The chip select signals CS 2716 represent a decoding of the upper address bits of the address bus 2707 while the signals on each respective address bus ADD 2717 for each memory block are a function of the lower address bits of the address bus 2707.

The reconfigurable memory controller 2704 receives a read/write strobe R/W 2705, an address bus 2707, a data input bus 2708 and a data output bus 2709. Reconfigurable memory controller 2704 receives the read/write strobe R/W 2705 and the address bus 2707 to address the memory blocks and clusters in the memory array 2702 by generating the appropriate signals on each cluster's four read/write strobes R/W 2715, four chip select signals CS 2716, and address bus ADD 2717.

The reconfigurable memory controller 2704 also maps out the addresses of bad memory cells and bad memory blocks and then re-align the logical addressing to the physical addressing so as to achieve a continuous logical address map. For example, if during testing it is determined that the memory block B 2712B in FIG. 27 has a bad memory cell, it is mapped out from the address space by the reconfigurable memory controller 2704. The reconfigurable memory controller 2704 transparently maps out addresses such that the address space remains linearly configured from an address of zero to the usable capacity of the memory array 2702. After selectively configuring the reconfigurable memory controller 2704, a user or programmer can write to or read from the reconfigurable memory in a contiguous manner. In the case that the memory block B 2712B having the failure is mapped out, the maximum logical address of the address space, representing the usable capacity that is addressable in the memory array 2702, is reduced from the maximum physical address.

The reconfigurable memory controller 2704 includes configuration registers which can be externally programmed in order to realign the logical addressing and map out bad memory blocks. The registers in one embodiment are externally programmed when the ASSP 150 is embedded within a system. Upon initialization, the reconfigurable global buffer memory 210 is tested and the initialization software programs the configuration registers to map out and realign the logical addressing. In another embodiment, the configuration registers are non-volatile or have a fuse-link type of programmability and can be programmed at the factory. In this case, the integrated circuit is tested in wafer or packaged form at the factory and the configuration registers are programmed as well accordingly. In either embodiment, the testing and reconfiguration of the reconfigurable memory can be transparent to the system designer and user of the printed circuit board incorporating the ASSP integrated circuit 150. The testing of the reconfigurable global buffer memory 210 can be done by the integrated circuit itself by using the BIST when in a system. Alternatively, the reconfigurable global buffer memory 210 can be externally tested by production test software through the pins of a packaged integrated circuit or the pads of a die of the integrated circuit in wafer form.

Referring now to FIG. 3, the basic addressing functionality of the reconfigurable memory controller 2704 is illustrated. Reconfigurable memory controller 2704 receives a logical address and generates a physical address output which is coupled into the memory array 2702. The reconfigurable memory controller 2704 further maps out addresses of bad memory blocks and bad memory cells and includes the configuration registers to realign the logical address map. In programming, the logical address map can be flexibly realigned including a realignment into a continuous linear address range.

Referring now to FIG. 4, an exemplary address space of a reconfigurable global buffer memory illustrating how address mapping of logical addresses into physical addresses with mapping out of addresses of bad memory blocks and bad memory cells is provided. Each memory block is assumed to access eight (8) bits with each address. If each memory block has five-hundred twelve (512 k) kilo-bits, then each memory block will have sixty-four (64 k) kilo-words of address space with each word being 8 bits wide. In the example of FIG. 4, the memory block D1 can correspond to memory block D 2712D of the memory cluster 2710AA and has an unusable memory cell. It is desirable to reconfigure the reconfigurable global buffer memory 2710 so that the memory block D1 is mapped out and a linear logical address space is maintained. In FIG. 4, the logical addresses and the logical bit sequence accessed by the logical addresses of the reconfigurable memory are on the left. The physical addresses and the physical bit sequence accessed thereby of the reconfigurable memory are on the right. The physical address space varies from a zero k-word address (0 k) to a maximal address (MAX/8 word) corresponding to the maximum capacity (MAX bits) of the reconfigurable global buffer memory 210. The logical address space varies from a zero k-word address (0 k) to the maximum addressable range less the number of mapped out addresses (MAX/8−MOA).

In the example of FIG. 4, a single memory block D1 2712D having a physical bit sequence from 1536 k-bit to (2048 k−1)-bit is mapped out due to a bad memory cell. In this case, the logical address and the physical address for logical bit sequence from 0 k-bit to (1536 k−1)-bit in memory blocks A1 2712A, B1 2712B, and C1 2712C are equal. Thereafter the logical address and physical address are not equal. In order to map out the single memory block D1 2712D, the logical address for logical bit sequence from 1536 k-bit to (MAX-512K)-bit is shifted by 512 k bits to obtain the physical address. For example, the logical address (192 k-word) for logical bit 1536 k is mapped to the physical address (256 k-word) for physical bit 2048 k. In this manner, the software can see a continuous contiguous memory space even though a block of memory has been removed.

Figure 30:
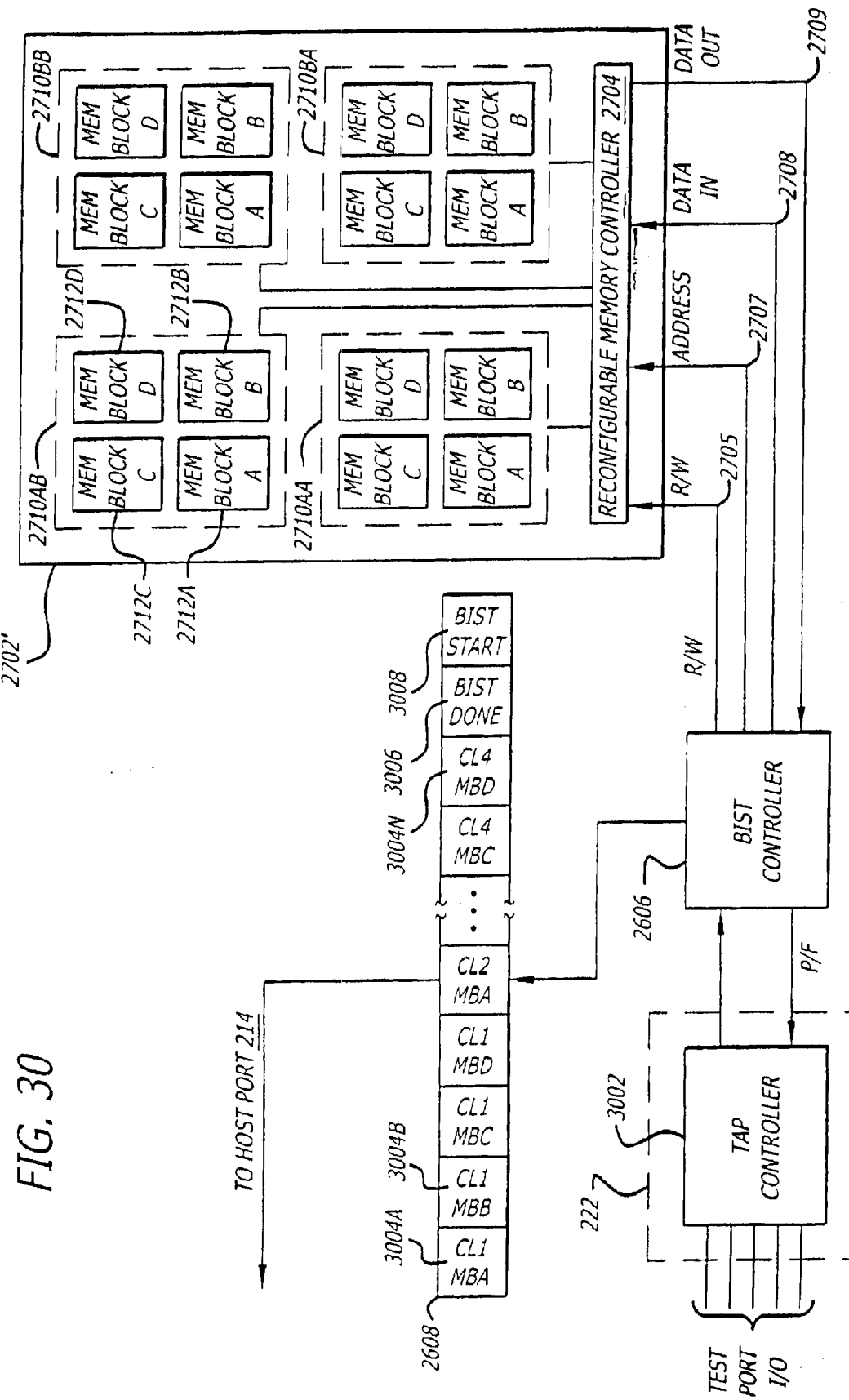
FIG. 30 is a block diagram of an embodiment of the reconfigurable memory of the invention and functional blocks used to test the reconfigurable memory.

Referring now to FIG. 30, an exemplary reconfigurable global buffer memory 2710', the test access port 222, the BIST controller 2606, and the memory test register 2608 are illustrated. The reconfigurable global buffer memory 2710' has four clusters, cluster 2710AA, cluster 2710AB, cluster 2710BA, and cluster 2710BB. Each of the memory clusters 2710 includes memory block A, memory block B, memory block C, and memory block D. The reconfigurable global buffer memory 2710' in one embodiment is organized into sixteen (16) memory blocks each having five-hundred-twelve (512) kilobits, containing a maximum capacity of eight (8) megabits. The reconfigurable global buffer memory 2710' further includes the reconfigurable global buffer memory controller 2704.

The serial test access port 222 includes a TAP controller 3002 coupled to the BIST controller 2606. The memory test register 2608 includes a pass/fail indicator 3004A–3004N for each memory block of each cluster within the reconfigurable global buffer memory 2710'. The pass/fail indicators 3004A–3004N are labeled in FIG. 30 as CL1 MBA 3004A for cluster 1, memory block A through CL4 MBD 3004N for cluster 4, memory block D. The memory test register 2608 further includes a BIST (built-in self tester) done indicator 3006 and a BIST start indicator 3008. The BIST done indicator 3006 is generally a flag to indicate that the built-in self test of the reconfigurable global buffer memory 2710' has been completed or not. The BIST start indicator 3008 is used to kick off the memory test. Each pass/fail indicator 3004A–3004N within the memory test register 2608 is set to indicate whether the corresponding memory block has passed or failed testing. In one embodiment, each of the pass/failed indicators 3004A–3004N, the BIST done indicator 3006, and the BIST start indicator 3008 is represented using a 1-bit value.

In order to test the reconfigurable global buffer memory 2710', the BIST controller 2606 generates test signals. Test signals generated by the BIST controller 2606 strobe the Read/Write signal line 2705, signal addresses on the address bus 2707, and writes test data on the data input bus 2708. The BIST controller 2606 further reads out data from memory locations within the reconfigurable global buffer memory array 2710' over the data output bus 2709. The BIST controller 2606 compares expected data output from the reconfigurable global buffer memory with the actual data output on the data output bus 2709. The expected data output is predetermined from the type of memory test and the respective test signals which are provided to the reconfigurable global buffer memory. One or more known memory tests, such as a March test, can be used in testing the reconfigurable global buffer memory.

The BIST controller 2606 sets the pass/fail indicators 3004A–3004N within the memory test register 2608 indicating either a pass or fail for each respective memory block based on the comparison between expected data output and the actual data output. The BIST controller 2606 further indicates to the TAP controller 3002 whether a memory block has passed or failed testing so that it can be externally signaled out through the serial test access port 222 as well. Upon completion of the testing of the reconfigurable global buffer memory, the BIST controller 2606 sets the BIST done indicator 3006 indicating that testing is completed.

The memory test register 2608 is externally accessible by a host system through the host port 214. The access to the memory test register 2608 can be I/O mapped or memory mapped within the ASSP integrated circuit 150. As further explained herein, a host system also has access to the reconfigurable memory controller 2704 through the host port 214 to set registers therein for controlling the mapping out of memory blocks having bad memory cells. After completion of testing, the host system may desire to set registers within the reconfigurable memory controller 2704 to control addressing of the reconfigurable global buffer memory 210.

Figure 31:
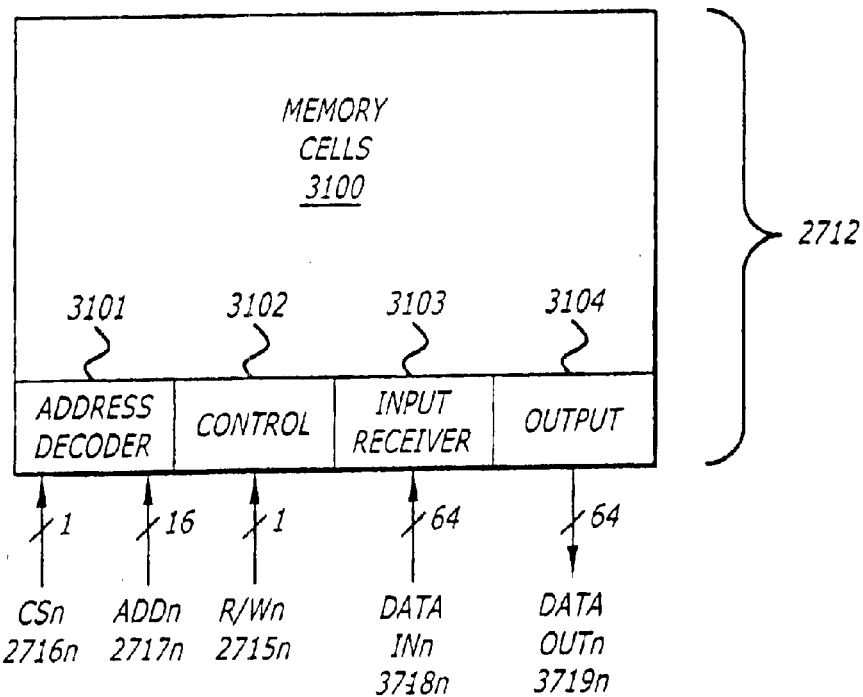
FIG. 31 is a block diagram of an exemplary memory block for an embodiment of the reconfigurable memory of the invention.

Referring now to FIG. 31, an instance of a memory block 2712 is illustrated. Each memory block 2712 includes an array of memory cells 3100, an address decoder 3101, a controller 3102, an input receiver 3103 and output block 3104. A word of memory cells can be accessed within the array of memory cells 3100 of the memory block 2712. Each word of memory within the memory block 2712 is W bits wide. In one embodiment, a word is 64-bit wide and can be obtained in one access.

There are "N" memory blocks 2712 within the reconfigurable global buffer memory 210 while there are "M" clusters 2710. The use of "n" and "m" with a reference number represents an instance of each. Each memory block 2712 in a cluster 2710 receives a chip select signal CS 2716n of the chip select signals CS 2716 and a read/write strobe R/W 2715n of the read write strobes R/W 2715. Each memory block 2712 in a cluster 2710 further couples to the an address bus ADD 2717n, a data in bus DATA INn 3718n and a data out bus DATA OUTn 3719n for the respective memory block and memory cluster. That is, there are N chip select signals CS 2716 and N read/write strobes R/W 2715 respectively one for each CS 2716n and one for each R/W 2715n. There are N address buses 2717n, N data in buses 3718n, and N data out buses 3719n for each of the M memory clusters.

The array of memory cells 3100 in the memory block 2712 are organized into columns and rows. The address decoder 3101 can include a row address decoder and a column address decoder in order to access the memory cells and read or write data therein. The output block 3104 includes a sense amplifier array and latches in order to read data out from memory cells selected by the address decoders and store it into the latches. The latches of the output block 3104 drive data onto the data bus 2719. Another set of latches can also store data off of the input data bus 2718m that is to be written into the memory block 2712.

Each chips select signal CS 2716n is an enable or activate signal that enables access to each respective memory block 2712 and is derived from the upper bits of the address bus 2717n. The lower bits of the address bus 2717n further addresses a word or words within the array of memory cells 3100 in the enabled memory block 2712 of a respective memory cluster 2710. The read/write strobe R/W 2715n indicates whether data on the data in bus 2718m is to be written into the memory block 2712 or if data is to be read out from the memory cells 3100 onto the data out bus 3719n.

Figure 32:
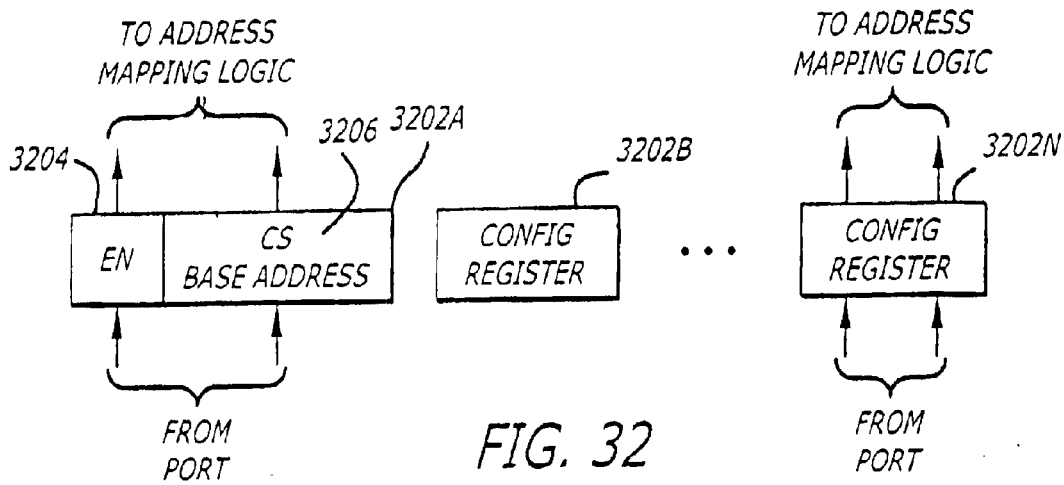
FIG. 32 is a block diagram of configuration registers for the reconfigurable memory controller of FIGS. 27 and 30.
Figure 29:
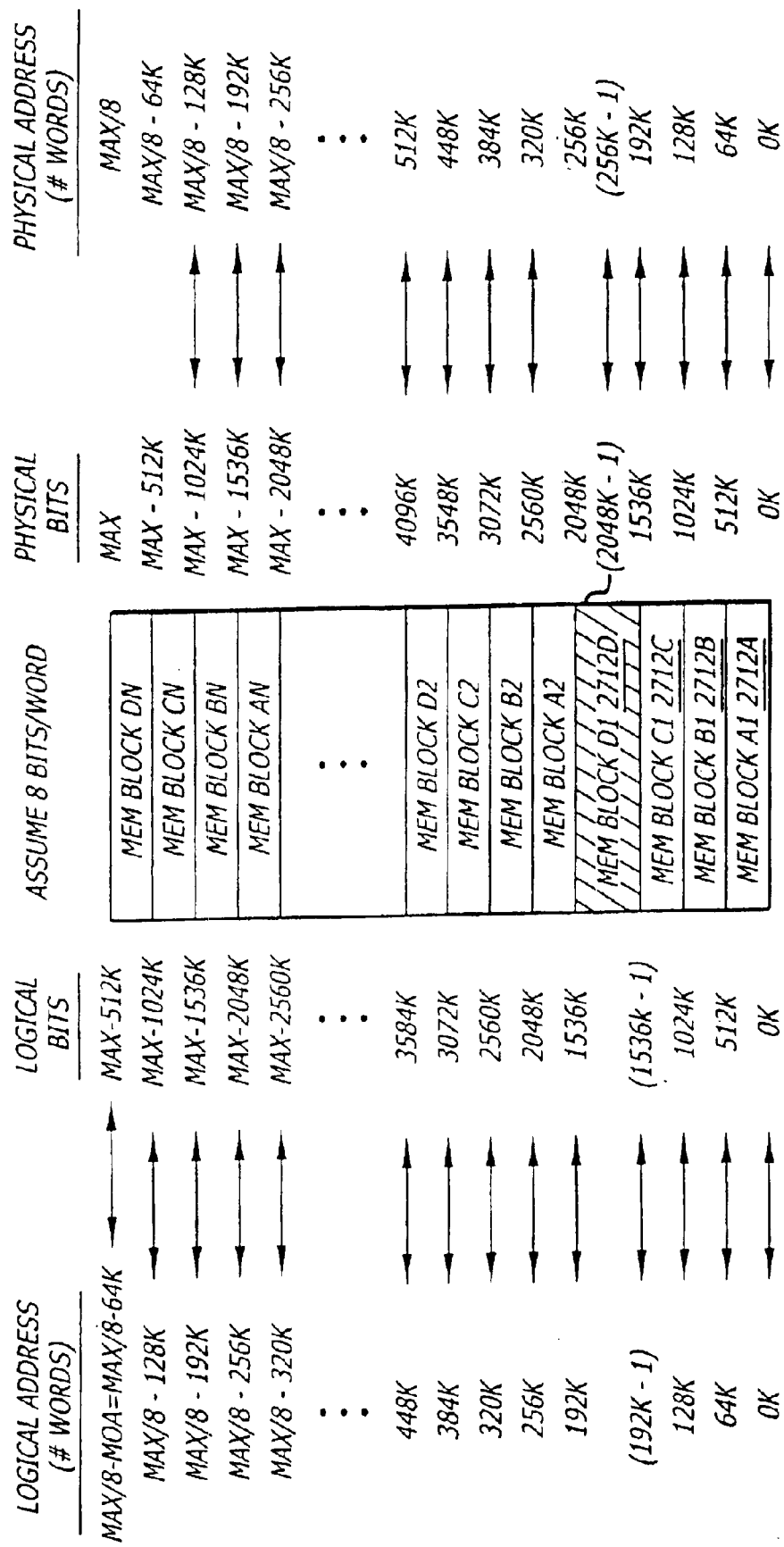
FIG. 29 is an exemplary diagram illustrating mapping out memory locations and the relationship of logical and physical addressing of address space in the reconfigurable memory of the invention.

Referring now to FIG. 32, the reconfigurable memory controller 2704 includes an array of configuration registers 3202A–3202N. Each configuration register 3202A–3202N includes an enable bit 3204 and a chip select base address 3206 and is associated with a respective memory block 2712 in the reconfigurable global buffer memory 210. The chip select base address 3206 allows the addressing for a memory block 2712 to be selectively offset in order to start addressing the memory block at a different address. This allows blocks with bad memory cells to be worked around. The value of the chip select base address 3206 can be anything and need not be limited to establish a linear address space. A non-linear address space can be utilized for some reason. It should be noted that the chip set base address 3206 can also be referred to as a memory block base address.

Each configuration register 3202A–3202N can be loaded in parallel through the host port 214. The information stored within the enable bit 3204 in each configuration register 3202A–3202N, is utilized by the address mapping logic within the reconfigurable memory controller to map out unusable blocks or unusable memory cells. The information stored within the chip select base address 3206 in each configuration register 3202A–3202N can be used to provide a continuous linear memory space of logical addressing. Alternatively, the information stored within the chip select base address 3206 in each configuration register 3202A–3204N can be used to provide a non-linear memory space of logical addressing. The configuration registers 3202A–3202N are usually loaded after the reconfigurable global buffer memory 210 has been tested. During reset of the integrated circuit, such as during power on reset, the enable bit 3204 in each configuration register is set so as to enable access to each memory block 2712 for testing. The information stored within the chip select base address 3206 of each configuration register is defaulted to provide access and test each memory cell within the reconfigurable global buffer memory 210 during reset of the integrated circuit. In one embodiment, the default information stored in the chip select base address 3206 of each configuration register provides linear logical addressing and a one to one mapping to physical addressing. The linear logical addressing is provided at default by setting the value of the chip select base addresses 3206 to start at zero for configuration register 3202A and increment thereon for each of the configuration registers 3202B to 3202N. In any case, the default information should allow the total capacity of the reconfigurable global buffer memory 210 to be tested in order to determine which memory cells and memory blocks are unusable.

To reprogram the reconfigurable global buffer memory 210, software executing on an external host controller or within the ASSP integrated circuit 150 can read the pass/fail information within the test register 2608 and set/clear the enable bit 3204 and the values of the chip select base address 3206 in each configuration register 3202 accordingly for each memory block 2712. The values of the chip select base address 3206, the most significant address bits, set by the external host controller can linearize the logical addressing by setting a linear sequence of 0, 1, 2, 3 and so on, incrementing by one. Alternatively, a different logical addressing scheme can be utilized by programming the values of the chip select base address 3206 differently.

Figure 33A:
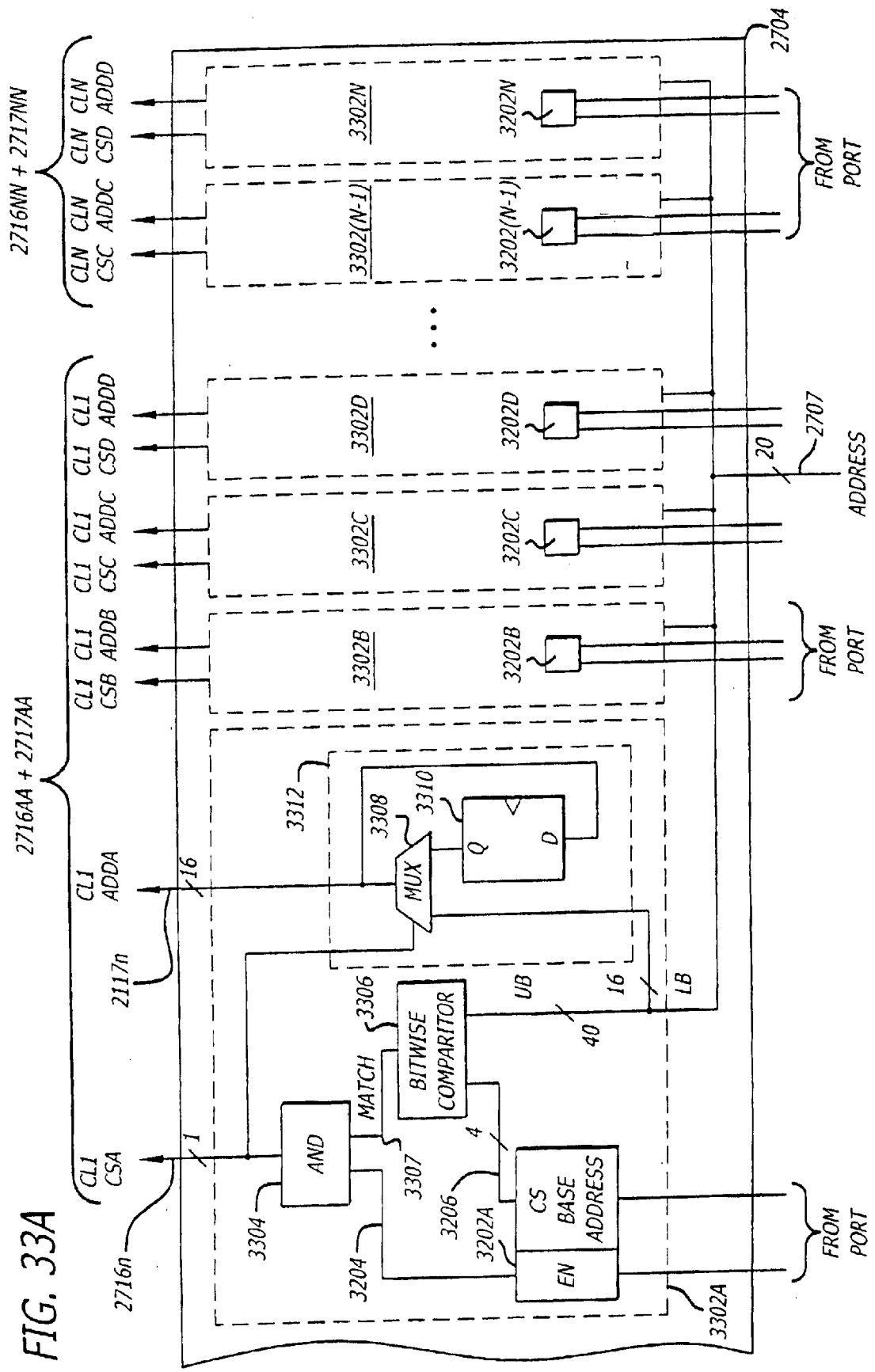
FIG. 33A is a detailed block diagram of address mapping logic within the reconfigurable memory controller of FIGS. 27 and 30.

Referring now to FIG. 33A, a detailed block diagram of the reconfigurable memory controller 2704 is illustrated for addressing each of the memory blocks within the reconfigurable global buffer memory 210. For N memory blocks 2712, the reconfigurable memory controller 2704 includes N address mappers 3302A–3302N, generally each instance is referred to as address mapper 3302. The N address mappers 3302A–3302N generate each chip select signal 2716n and address 2717n respectively for each memory block. The bits of the address bus 2707 are split into upper bits and lower bits of the address bus 2707 within each address mapper 3302. The upper bits of the address bus 2707 are used to generate the chip select or enable for each block of memory while the lower bits of the address bus 2707 are used to generate the address CLi Addn 2717n for the memory locations within a memory block 2712 selected by the chip select. The collective address buses CLi Addn 2717*n* of each memory cluster 2710 are each respectively referred to as address bus ADD 2717AA–2717NN illustrated in FIG. 27.

Each of the N address mappers 3302A–3302N include a respective configuration register 3202A–3202N as illustrated. The enable bit 3204 of each configuration register 3202 is coupled into an AND gate 3304. Each of the chip select base addresses 3206 of each of the configuration registers 3202 is coupled into a bit wise comparator 3306.

Each enable bit 3204 in each configuration register 3202 controls whether or not the respective memory block 2712 is to be mapped out or not. If the enable bit 3204 is set, the respective memory block 2712 is not mapped out. If the enable bit 3204 is not set, the respective memory block 2712 is mapped out. The enable bit 3204 gates the generation of the chip select signal 2716*n*. If the enable bit 3204 is set, the chip select signal 2716*n* can be generated through the AND gate 3304 if the upper addresses match the chip select base address. In this case, the respective memory block 2712 is not mapped out. If the enable bit 3204 is not set, the chip select signal 2716*n* can not be generated through the AND gate 3304 regardless of any address value and the respective memory block 2712 is mapped out.

The upper bits of the address data bus 2707 are coupled into the bit wise comparator 3306 to be compared with the chip select base address 3206. First, the bit wise comparator 3306 essentially takes a logical exclusive NOR (XNOR) of each respective bit of the upper bits of the address data bus 2707 and the chip select base address 3206. The comparator then logically ANDs together each of the XNOR results of this initial bit comparison to determine if all the upper bits of the address data bus 2707 match all the bits of the chip select base address 3206 to generate a match output 3307. If there is any difference in the bits, the match output 3307 is not generated and the respective memory block 2712 is not enabled. The match output 3307 of the bit wise comparator 3306 is coupled into the AND gate 3304. The output of the AND gate 3304 in each of the address mappers 3302A–3302N is the respective chip select signal 2716*n* for each memory block 2712 in each cluster 2710.

The lower bits of the address bus 2707 are coupled into a bus multiplexer (MUX) 3308 in each of the address mappers 3302A–3302N. Each of the address mappers 3302A–3302N further includes a register 3310 to store a change in a bus state of each respective address bus 2717*n*. The bus multiplexer 3308 and the register 3310 form a bus state keeper 3312 in each address mapper 3302.

In each address mapper 3302, the multiplexer 3308 and register 3310 are coupled together as shown in address mapper 3302A. The output from each respective register 3310 is coupled into an input of each respective bus MUX 3308 in the address mappers 3302A–3302N. The other bus input into the bus multiplexer 3308 is the lower bits of the address bus 2707. The chip select signal 2716*n* for each respective address mapper 3302 controls the selection made by each respective bus MUX 3308. In the case that the respective memory block 2712 is to be addressed as signaled by the chip select signal CS 2716*n*, then a new address is selected from the lower bits of the address bus 2707. In the case that the respective memory block 2712 is not to be addressed, then the state of the respective address bus 2717 previously stored within the register 3301 is selected to be output from the MUX 3308 by the chip selected signal CS 2716*n*. In this manner, the multiplexer 3308 and register 3310 recycle the same lower bits of address until the respective memory block 2712 is selected for access by the upper bits of the address bus 2707. Keeping the state of the bus 2716 from changing, conserves power by avoiding a charging and discharging the capacitance of the address bus 2717*n* until necessary. The operation of each bus state keeper 3312 is similar to that of the bus state keepers 3402 further described below with reference to FIG. 33B. The multiplexer 3308 in each of the address mappers is typically controlled by the chip select signals to demultiplex the address bus 2707 into one of the address buses 2717.

Figure 33B:
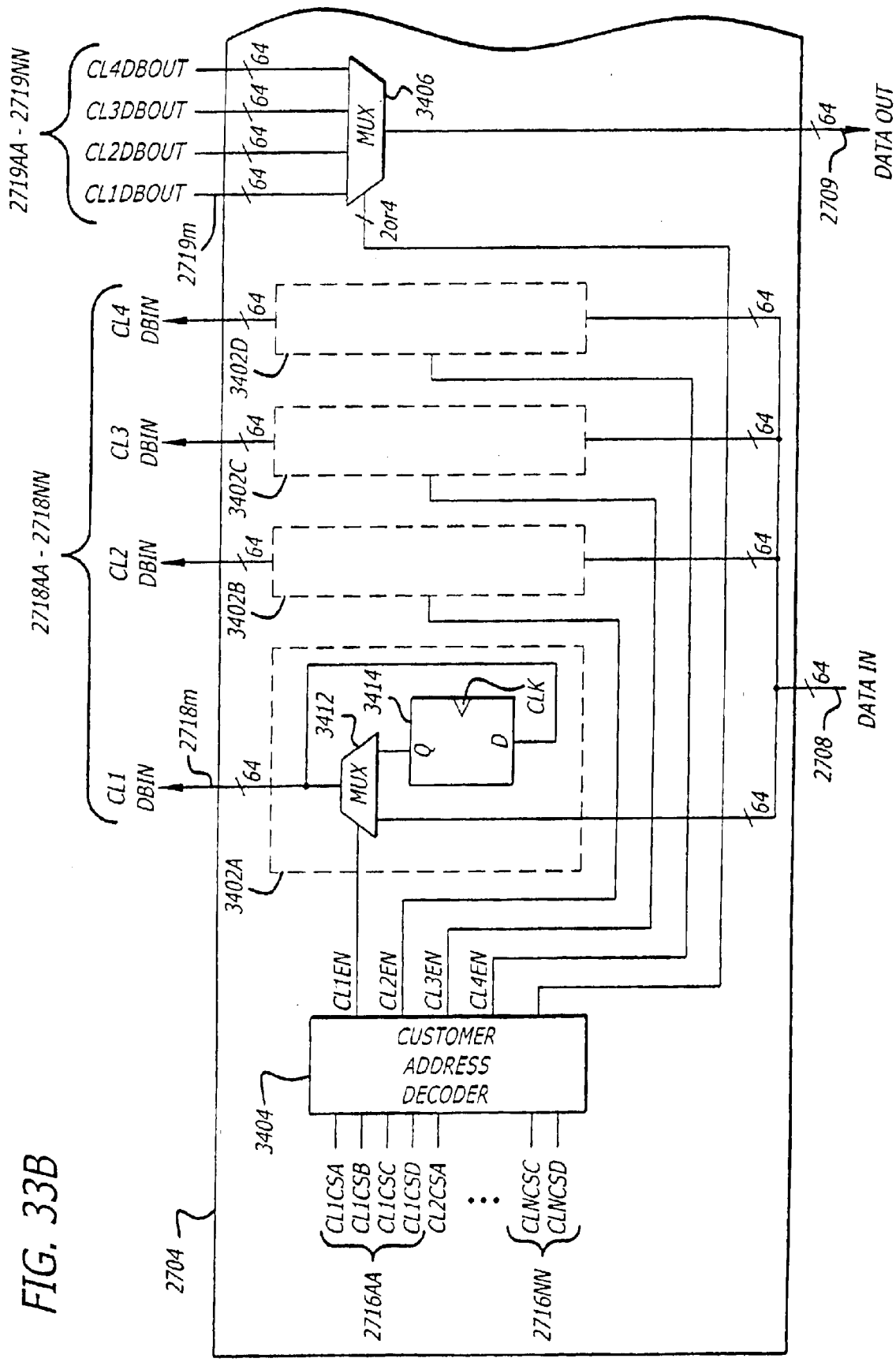
FIG. 33B is a detailed block diagram of data read and write logic within the reconfigurable memory controller of FIGS. 27 and 30.

Referring now to FIG. 33B, a block diagram of the data input/output control provided by the reconfigurable memory control 2704 for the reconfigurable global buffer memory 210 is illustrated. The reconfigurable memory controller 2704 receives the data bus input 2708 and provides the data bus output 2709 for the reconfigurable global buffer memory 210. The reconfigurable memory controller 2704 couples to the data input buses 2718 and data output buses 2719 of each memory cluster 2712 to write and read data there between.

The reconfigurable memory controller 2704 includes a bus state keeper 3402 for each cluster 2712 labeled bus state keepers 3402A–3402D, a cluster address decoder 3404, and a bus multiplexer 3406. The bus multiplexer 3406 receives as input each of the data out buses 2719AA–2719NN of each cluster 2712 in the reconfigurable global buffer memory. It is controlled by a cluster selection control signal from the cluster address decoder 3404. The output of the bus multiplexer 3406 couples to and generates signals on the data output bus 2709 of the reconfigurable global buffer memory 210. The embodiment of the bus multiplexer 3406 corresponding to exemplary embodiment of FIG. 33B is a four-to-one bus multiplexer and receives as input each of the data out buses 2719AA–2719BB of each cluster 2712. In FIG. 33B, the data out buses for the four cluster embodiment of FIG. 30 are CL1 DBout 2719AA, CL2 DBout 2719AB, CL3 DBout 2719BA and CL4 DBout 2719BB.

Each of the bus state keepers 3402 includes a two-to-one bus multiplexer 3412 and a register 3414 coupled together as shown by bus state keeper 3402A in FIG. 33B. The data input bus 2708 is coupled into one bus input of each bus multiplexer 3412 and the output of each respective register 3414 is coupled into the other bus input of each respective bus multiplexer 3412. Each respective register 3414 stores the state of each bit of the respective data input bus 2718 when it changes state. The register 3414 keeps the stored state on the bus 2718 until the state of the respective bus 2718 is to be updated. The state of a respective bus 2718 is updated or changed when the bus multiplexer 3412 is controlled to select the data bus input 2708 as its output onto the bus 2718. Otherwise, with the bus multiplexer 3412 selecting the output of the register 3414 as its output, the state on the bus 2718 is recirculated when the register 3414 is clocked. In one embodiment, a system clock can be used to clock the register 3414.

The cluster address decoder 3404 receives all of the chip select signals 2716 for each memory block 2712 of each cluster 2710 and controls each bus multiplexer 3412 in the bus state keepers 3402 and the bus multiplexer 3406. The chip select signals 2716 are responsive to the upper bits of the address bus and the chip select base address 3206 of a respective configuration register. In response to a selected chip select signal 2716 of a respective memory block, the cluster address decoder 3404 enables data to flow into and out of the respective cluster where the respective memory block resides. In effect, the cluster address decoder 3404 logically ORs the chip select signals 2716 for memory blocks within each cluster together. If any memory block is selected within the cluster, the data paths into and out of that cluster through the reconfigurable memory controller 2704 are enabled. The cluster address decoder 3404 selectively controls the bus multiplexers 3412 of the bus state keepers 3402 to select the data input bus 2708 as its output onto data bus 2718 in response to the chip select signals 2716. The cluster address decoder 3404 logically controls the bus multiplexers 3412 in all the bus state keepers 3402 as a bus demultiplexer. That is, the data input bus 2708 is selected for output on one of the buses 2718 in response to signals from the cluster address decoder 3404.

For example, assume that the upper address bits and the chip select base address generates cluster 2 chip select A to enable access to memory block A in cluster 2. The cluster address decoder 3404 generates a cluster 2 enable signal CL2EN which is coupled into the bus multiplexer 3412 of the bus state keeper 3402B. This controls the bus multiplexer 3412 in the bus state keeper 3402B to allow the information on the data input bus 2708 to be transmitted to the cluster 2 bus data bus input CL2DBIN 2718AB.

Because the chip select base address 3206 is programmable in each configuration register 3202, a memory block can be rearranged to be addressed with a different cluster of memory blocks. That is, the memory blocks 2712 can be addressed across cluster boundaries due to the programmability of the chip select base address 3206 and the bus multiplexers 3412 in the bus state keepers 3402 and the bus multiplexer 3406 for the data input and output busses. This allows adaptive control of the addressing of the memory blocks within the reconfigurable memory to achieve any desirable logical address space.

The bus multiplexer 3406 multiplexes the data output buses 2719 from each cluster 2710 into the data output bus 2709 of the reconfigurable global buffer memory 210. Each bus 2719 of the clusters 2710 is coupled to an input of the bus multiplexer 3406. The output of the bus multiplexer 3406 is coupled to the data output bus 2709 to generate data signals thereon. Control signals from the cluster address decoder 3404 are coupled into the selection input of the bus multiplexer 3406 to select which cluster data bus output 2719 is multiplexed onto the data bus output 2709 through the reconfigurable memory controller 2704. The control signals from the address decoder 3404 can be the same or function similar to the cluster enable signals CL1EN through CL4EN or they may be different in that they are for a read operation as opposed to a write operation. The control signals may also be encoded to control the bus multiplexer 3406. The control signals select the active cluster where a word of memory in a memory block therein was accessed. For example assume that a word of memory in memory block A of cluster 3 was accessed by the address during a read operation. The control signals from the cluster address decoder 3404 set up the bus multiplexer 3406 to select the cluster 3 data bus output as its output onto the data output bus 2709. In this manner the data read out from a selected memory block in a selected cluster is read out onto the data output bus 2709 or the reconfigurable global buffer memory.

Avoiding changes of state in buses can conserve considerable power when the buses have significant capacitive loading. This is particularly true when there are many buses which have capacitive loading or a bus is wide having a high number of bit or signal lines. In the reconfigurable global buffer memory 210' for example, there are four input data buses 2718, four output data buses 2719, four address buses 2717, sixteen chip select lines 2716, and sixteen read/write strobes 2715 between the reconfigurable memory controller 2704 and all the memory blocks 2712 of the memory array 2702. Each of the data buses 2718 and 2719 have sixty-four signal lines and each of the address buses 2717 have sixteen signal lines in the reconfigurable global buffer memory 210'. The length of the input data buses 2718, output data buses 2719, address buses 2717, chip select lines 2716, and read/write strobes 2715 between the reconfigurable memory controller 2704 and all the memory blocks 2712 of the memory array 2702 can also be rather long. The number of signal lines in each bus, the length of routing, and the frequency of changes of a signal on the signal lines affects the amount of power consumption in the reconfigurable memory. While the length of the signal lines is somewhat fixed by the design and layout of the reconfigurable global buffer memory, the number of signal lines changing state can functionally be less in order to conserve power. That is, if charges stored on the capacitance of all the signal lines are not constantly dissipated actively to ground or if charges are not constantly added actively to the dissipated capacitance of all the signal lines, power can be conserved within an integrated circuit.

The reconfigurable global buffer memory 210 is organized into memory clusters 2710 and memory blocks 2712. As a result, not all bit lines within the memory blocks need to change state. Furthermore, only one address bus 2717 and one data input bus 2718 (write) or one data output bus 2719 (read) typically needs to change state between one memory block 2712 and the reconfigurable memory controller 2704 at a time. All other address buses 2717 and data buses 2718 and 2719 can remain in a stable state to conserve power. The address mappers 3302A–3302N generating the chip select signals 2716, selectively control which input data bus and output data bus are active for one selected cluster. In this manner, power consumption can be reduced because not all bit lines of the data buses for all the clusters need to change state. Their states can be kept by the bus state keepers 3312 and 3402. The use of the bus state keepers can be generalized to parallel buses between the same two functional blocks, each using a multiplexer and a register to maintain a stable stored state but for the one that is predetermined to change state as indicated by an address or a control signal.

Figure 34:
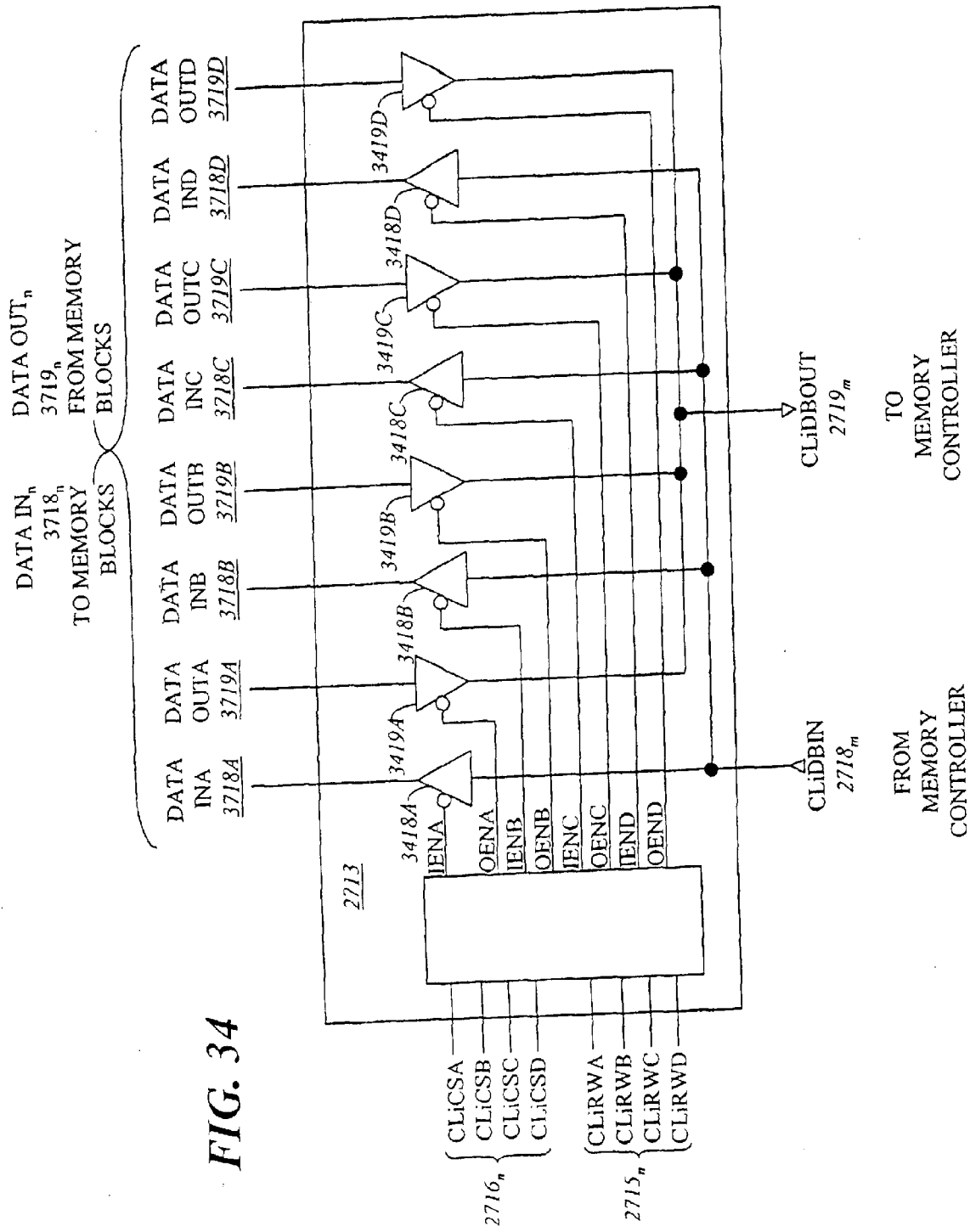
FIG. 34 is a detailed block diagram of a collar logic block for each memory cluster according to one embodiment of the invention.

Referring now to FIG. 34, a detailed block diagram of an exemplary embodiment of the collar logic block 2713 for each memory cluster 2710 is illustrated. The collar logic 2713 includes a controller 3410, a plurality of input receivers 3418 and a plurality of tristate bus drivers 3419. FIG. 34 illustrates four input receivers 3418A–3418D and four tristate bus drivers 3419 corresponding to the reconfigurable memory of FIG. 30. The input receivers 3418A–3418D receive data off of the cluster data bus input CLiDBIN 2718$m$ and couple it into the respective input of a memory block on one of DATAINn buses 3718$n$. The input receivers 3418A–3418D are each respectively enabled by a separate input enable signal IENn respectively labeled IENA, IENB, IENC, and IEND in FIG. 34. The tristate bus drivers 3419A–3419D receive data output from the output latches of the memory blocks on the DATA OUTn buses 3719$n$. One of the tristate bus drivers 3419A–3419D selectively drives the cluster output data bus CliDBOUT 2719$m$. The tristate bus drivers 3419A–3419D are each respectively enabled by a separate output enable signal OENn respectively labeled OENA, OENB, OENC, and OEND in FIG. 34.

The controller generates the input enable signals IENn and the output enable signals OENn in response to the chip select signals CLiCSn 2716$n$ and the read/write strobes CLiR/Wn 2715$n$ for each memory block in the respective cluster. In order to maintain the state of the cluster output data bus CliDBOUT 2719$m$ and conserve power, the one tristate bus driver selectively driving the cluster output data bus CliDBOUT 2719*m* continues to do so until another tristate bus driver is selected to drive data. That is, one of the tristate bus drivers continues driving the cluster output data bus CliDBOUT 2719*m* to hold its state even though no further access has occurred to the respective memory cluster. In order to do so, the controller 3410 keeps the one tristate driver enabled through its respective output enable signal OENn. In this manner, the cluster output data bus CliDBOUT 2719*m* can remain in a steady state when the memory cluster is not being accessed and conserve power. When the memory cluster is accessed, one tristate driver drives data onto the cluster output data bus CliDBOUT 2719*m*. The one active chip select signal CLi CSn 2716*n*, if any, for the given memory cluster selects which of the DATA OUTn buses 3719*n* (3719A, 3719B, 3719C, or 3719D) should be coupled onto the CliDBOUT bus 2719*m*.

Figure 35:
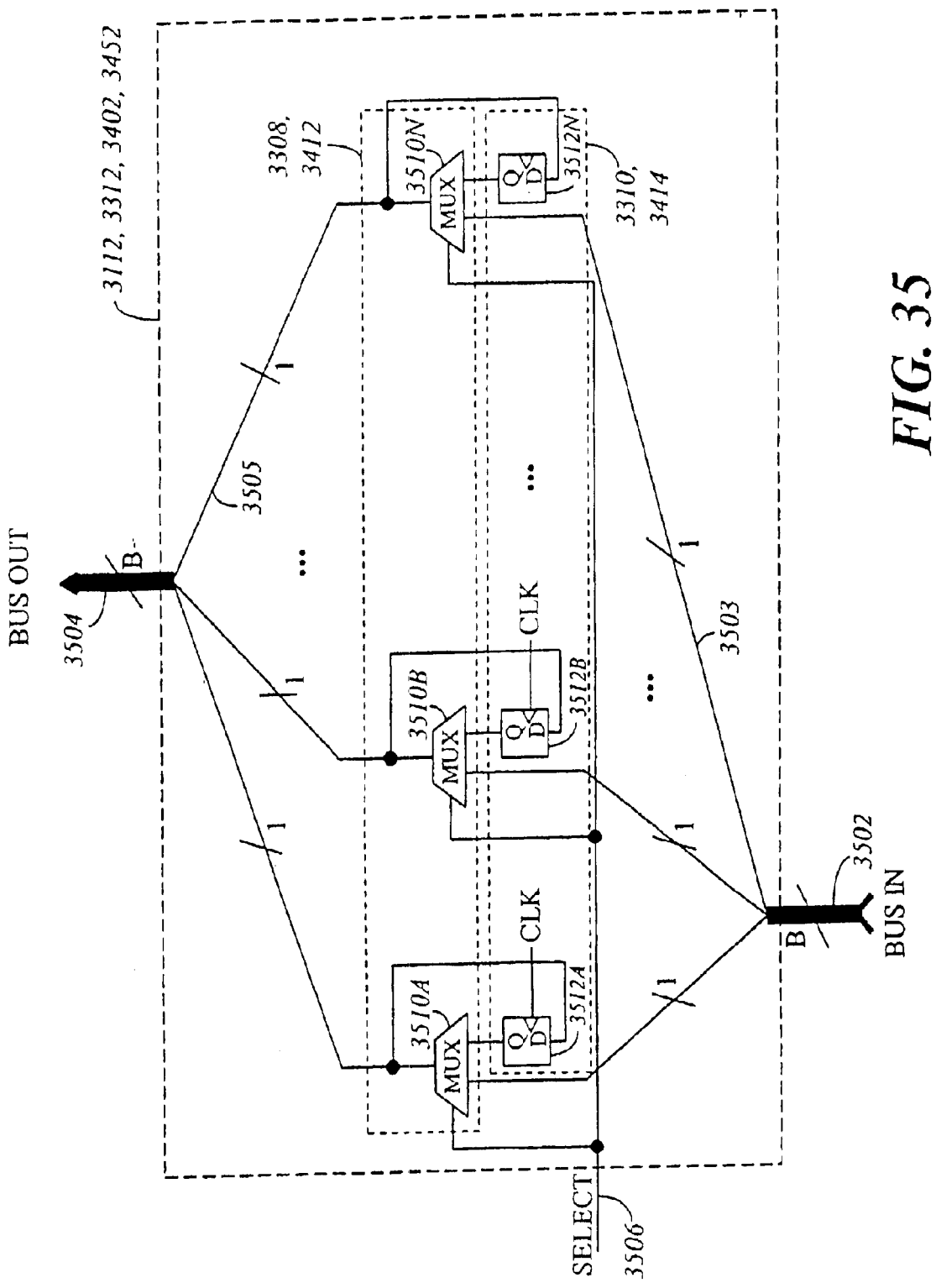
FIG. 35 is a detailed block diagram of a bus keeper.

Referring now to FIG. 35, a detailed block diagram of a bus keeper 3312 or 3402 is illustrated. An input bus 3502 of B bits width is input into the bus keeper and each individual input bit 3503 is broken out from the input bus 3502. An output bus 3504 is formed by bundling each individual output bit 3505 together. Each individual input bit 3503 of the input bus 3502 is routed to a respective input of respective single bit multiplexers 3510A–3510N. The single bit multiplexers 3510A–3510N form a bus multiplexer 3308 or 3412. A select signal 3506 is routed to each select input of the multiplexers 3510A–3510N. A plurality of single bit D flip/flops 3512A–3512N form the bus registers 3310 or 3414. The respective output bit 3505 of each multiplexer 3510A–3510N is routed to the D input of each respective D flip flop 3512A–3512N. The Q output of each respective D flip flop 3512A–3512N is coupled into a respective input of each respective multiplexer 3510A–3510N.

Off Boundary Memory Access

The invention further provides a method to provide off boundary memory access and an apparatus for an off boundary memory. In one embodiment, an off boundary memory includes a right memory array having a plurality of right memory rows and a left memory array having a plurality of left memory rows. This forms a memory having a plurality of row lines, each row line having a right memory row and a left memory row, respectively. An off boundary row address decoder is coupled to both the right and left memory arrays and is capable of performing an off boundary memory access which includes accessing a desired plurality of memory addresses from one of a right or left memory row of a row line and from one of a left or right memory row of an adjacent row line at substantially the same time within one memory access cycle.

Thus, a plurality of data words can be accessed from any point in memory at substantially the same time within one memory access cycle. This avoids limitations of previous memories which often need two memory access cycles (i.e. requiring an extra re-alignment instruction) when an off boundary memory access is required.

Furthermore, the invention for an off boundary memory works with the architecture of the core signal processor 200 for performing digital signal processing instructions. As shown in FIG. 3, in one embodiment, the core signal processor 200 has four signal processing units 300A–D coupled to a local data memory 202 by a data bus 203. The local data memory 202 is an off boundary memory in one embodiment and is also referred to herein as off boundary local data memory 202. By using the off boundary local data memory 202 according to one embodiment of the invention, data can be more efficiently fed to signal processing units 300. For example, four data words can be accessed from the off boundary local data memory 202 at a time and each data word can be fed to a signal processing unit 300 simultaneously for digital signal processing. If the starting address of a data word requires an off boundary local data memory access this does not significantly slow down the operation of the four signal processors as the four data words can be accessed from the off boundary local memory at substantially the same time within one memory cycle. In this way, the invention for an off boundary local data memory increases the efficiency of the execution of digital signal processing (DSP) instructions on accessed data by the four signal processing units.

Referring now to FIG. 2, a block diagram of the application specific signal processor (ASSP) 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to an optional external local memory. The ASSP 150 includes an external host interface 214 for interfacing to an external host processor. Further included within the ASSP 150 are timers 216, clock generators and a phase-lock loop 218, miscellaneous control logic 220, and a Joint Test Action Group (JTAG) test access port 222 for boundary scan testing. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level. Further, the signal processing units 300A–300D are each connected to data memory 202, to each other, and to the RISC 302, via data bus 203, for the exchange of data (e.g. operands).

The signal processing tasks are performed on the data paths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory, resulting in very efficient data processing. Thus, the instruction set architecture of the invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 36A:
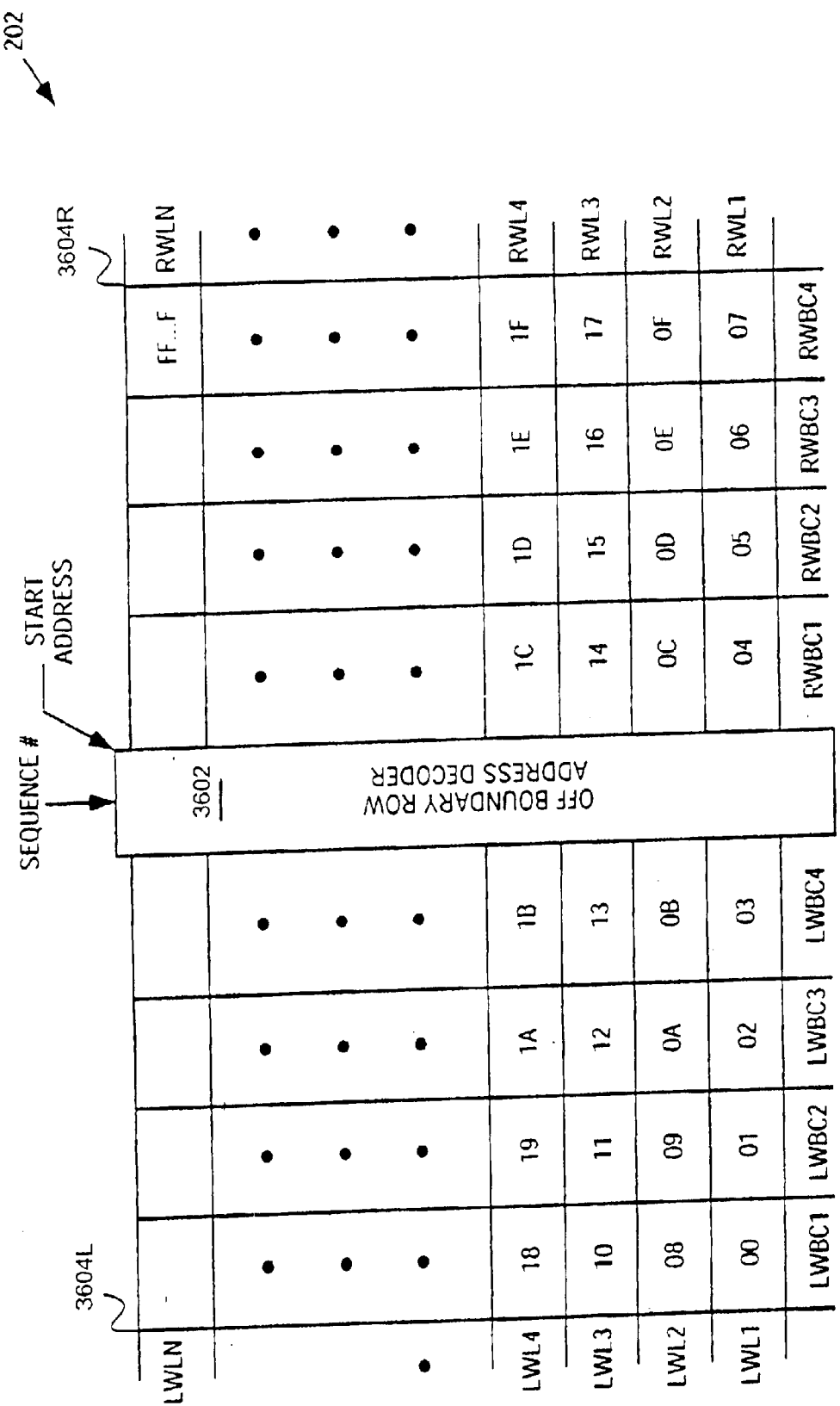
FIG. 36A is a diagram illustrating the functionality of an off boundary access memory according to one embodiment of the invention.

FIG. 36A is a diagram illustrating the functionality of an off boundary access memory according to one embodiment of the invention. Referring now to FIG. 36A, addresses associated with the words of the local data access memory 202 (FIG. 3) are illustrated. Each word can have W bits. In one embodiment the words are 16 bits wide. However other word sizes are possible, e.g. 8 bits, 32 bits, 64 bits, etc. The addresses are shown in hexadecimal beginning with the hex address 00 ($00_h$) as the first word within the memory. Further, the local data memory 202 is divided into a right memory array 3604R and a left memory array 3604L.

An off boundary row address decoder 3602 according to one embodiment of the invention is coupled to the right memory array 3604R and the left memory array 3604L. The off boundary row address decoder 3602 divides the local data memory 202 into row lines (sometimes referred to as word lines) for the left memory array (e.g. left memory row lines) and right memory array 3604R (e.g. right memory row lines), as will be discussed later. Each row line includes a right memory row and a left memory row, respectively. The row lines are denoted at the far left and far right of each memory row, respectively (e.g. Right Word Lines (RWL1 . . . RWLN), Left Word Lines (LWL1 . . . LWLN)).

The local data memory 202 illustrated in FIG. 36A is eight columns across but can be expanded to have other numbers of columns (e.g. each word within a respective column) that are accessible within each row. For each column there is an indicator of the bit line that is selected to select each word, respectively (e.g. left word bit columns LWBCs and right word bit columns RWBCs). For example, to select the word address hex 00 ($00_h$) the left word bit column 1 (LWBC1) is selected while the left row line 1 (LWL1) is selected. As another example to access the word at address $04_h$, the right row line 1 (RWL1) is selected and the right word bit column 1 (RWBC1) is selected.

To access more than one word, a sequence of one, two, three or four words is selected for access beginning with the starting address. The off boundary row address decoder receives the start address and the sequence number, to represent more than one, two, three, or four words, which are to be accessed at substantially the same time. If additional words are provided then other decoding is provided and additional word sequences can be read or written into the memory 202.

Determining whether or not a memory access for a desired plurality of memory addresses is an off boundary memory access depends on a number of factors including the starting address and the sequence number for the number of words to be accessed. Generally, an off boundary access occurs when the starting address begins in the right word bit column 2 (RWBC2) or greater and the sequence number designates a word in a row which is accessed by an adjacent left world line (LWL) (e.g. in a higher or lower row).

For example, for the starting address of $07_h$, the right word line 1 (RWL1) is enabled and the bit line for the right word bit column 4 (RWBC4) is enabled to select address $07_h$. With a sequence number of two, three, or four, additional addresses are selectable at the data addresses $08_h$, $09_h$, and $0A_h$, respectively. For example, if the sequence number is 2, the data at the addresses $07_h$ and $08_h$ are to be accessed. This requires an off boundary access. Data at address $08_h$ is selected by enabling the left word line 2 (LWL2) and the left word bit column 1 (LWBC1). In order to access data at address $08_h$, the left word line 2 (LWL2) is turned on and the left word line 1 (LWL1) is turned off. Accordingly, in this example, the local memory 202 accesses both sets of data at addresses $07_h$ and $08_h$, within approximately one memory cycle at substantially the same time.

As an example of a non-off boundary access, consider a case where the address $0B_h$ is the starting address and the sequence number is 4. In this case data at address $0B_h$, $0C_h$, $0D_h$ and $0E_h$ are to be accessed as a group, together. In this case there is not an off boundary memory access and similarly positioned word lines, left word line 2 (LWL2) and right word line 2 (RWR2) are access together. The bit lines are selected by activating the appropriate column addressing (e.g. the left and right word bit columns) via a left sense amp array and a right sense amp array, as will be discussed. In FIG. 36A this would be a LWBC4, RWBC1, RWBC2, and RWBC3.

With a sequence number of 4 as a limit for the number of sequences of words that can be selected, starting addresses that result in column selection of LWBC1–LWBC4 and RWBC1 do not result in an off boundary memory access. On the other hand, starting addresses that result in word bit columns RWBC2, RWBC3, and RWBC4 being selected, can result in an off boundary memory access if the sequence number is appropriate. As previously discussed, an off boundary memory access occurs when the addresses for each word selected from left to right results in moving from a lower right word line to a next higher left word line. Alternatively, in case the row address decoding was from right to left (instead of left to right), the opposite would occur in which the operation would move from a higher right word line to the next lower the left word line. Also, if this were the case, the column decoding would be swapped.

Figure 36C:
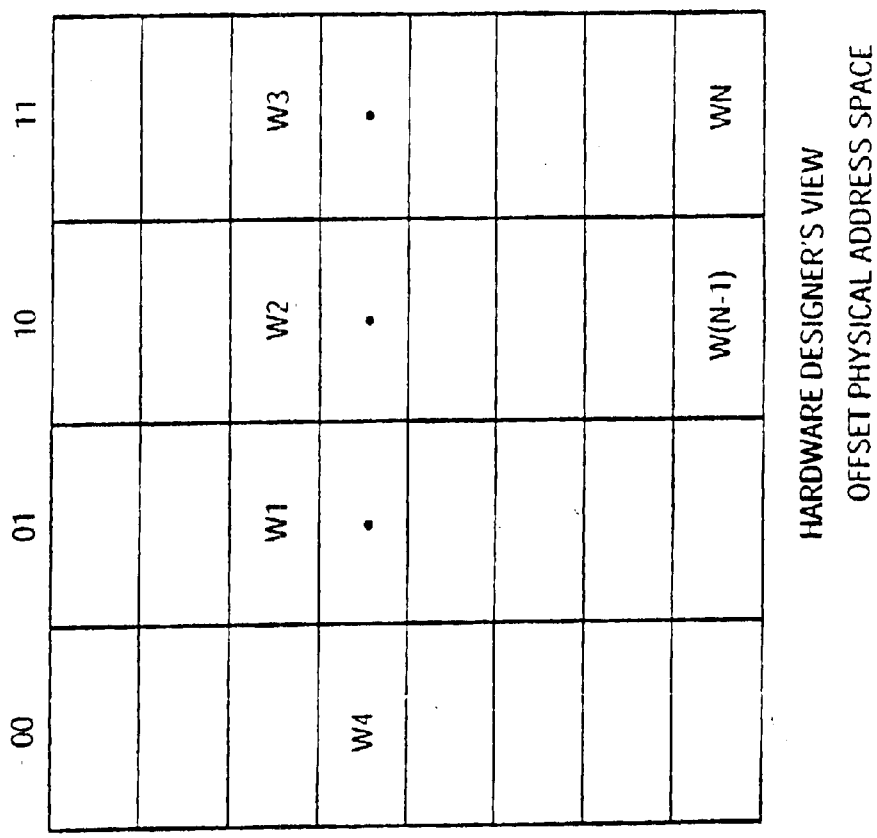
FIG. 36C is diagram illustrating a local data memory from a hardware designer's point of view according to one embodiment of the invention.
Figure 36B:
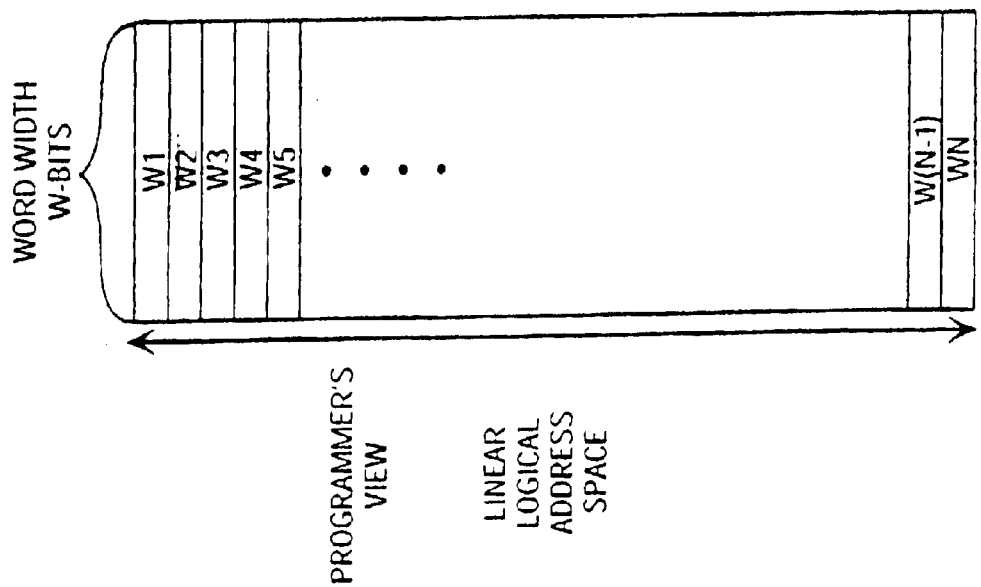
FIG. 36B is diagram illustrating a programmer's view of a local data memory according to one embodiment of the invention.

FIG. 36B is diagram illustrating a programmer's view of a local data memory according to one embodiment of the invention. Referring now to FIG. 36B, the local data memory 202 is accessible by a programmer from a starting rear address W1. Each word is W bits wide and the addresses progress in a linear fashion over a linear logical address space from word W1 to word WN. Unfortunately, it is difficult to provide a linear logical memory address space in such a fashion in hardware.

FIG. 36C is diagram illustrating a local data memory 202 from a hardware designer's point of view according to one embodiment of the invention. Referring now to FIG. 36C, the starting location of the programmers data is generally started back with an offset such that grid one (01) is located somewhere inside of the memory. Memory access then proceeds to the next word in sequence from W1, W2, W3 and W4. However, it does not do so in linear fashion because it must transition from the word position W3 in memory to the starting position W4 in memory thereby changing the row address. Each time the memory access of a next word requires changing from one row to the next, an off boundary memory access occurs. This would ordinarily require an additional cycle to access the next row. For example, if all four words are desired to be accessed at once e.g. W1, W2, W3 and W4, at least two access cycles would normally be required. The first access would be capable of generating a row address for the words W1, W2 and W3. A next cycle would be required to change to the row access for the word W4. It is desirable to avoid the additional access cycle (e.g. a re-alignment instruction) with an off boundary data memory that can access all four words at substantially the same time within in one cycle, as will now be discussed.

Figure 37:
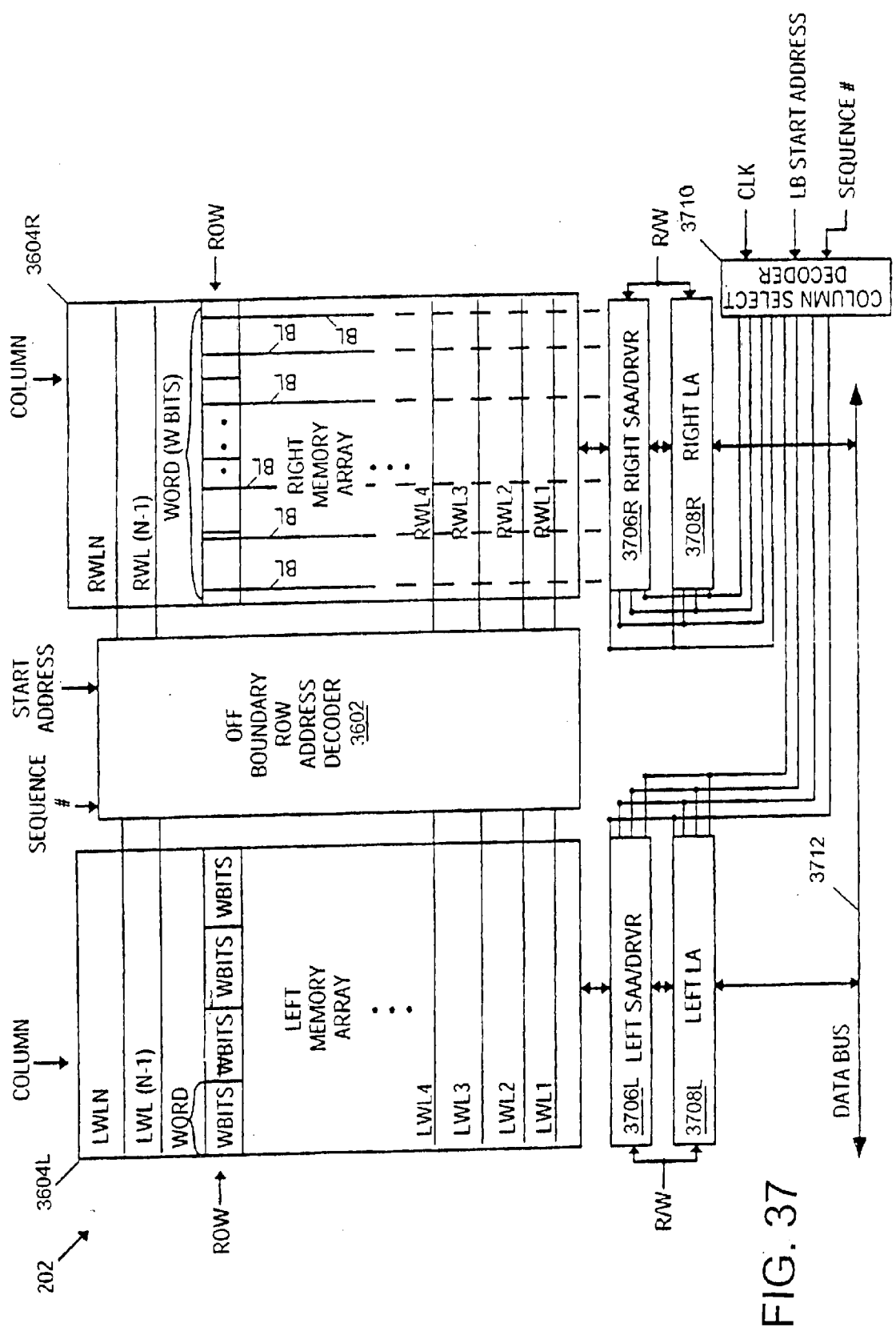
FIG. 37 is a diagram illustrating an off boundary access local data memory according to one embodiment of the invention.

FIG. 37 is a diagram illustrating an off boundary access local data memory according to one embodiment of the invention. Referring now to FIG. 37, the off boundary access local data memory 202 includes an off boundary row address decoder 3602, a left memory array 3604L having a plurality of left memory rows, a right memory array 3604R having a plurality of right memory rows, a left sense amplifier array/driver 3706L, a right sense amplifier array/driver 3706R, a left latch array 3708L, a right latch array 3708R, and a column select decoder 3710. A row line, or termed word line, includes a right memory and a left memory row, respectively.

The column select decoder 3710 receives a starting address for addressing a sequence of words out of the memory arrays 3604L and/or 3604R.

Off boundary row address decoder 3602 is coupled to the right and left memory arrays and turns on the appropriate word line/row for the left memory array 3604L and the right memory array 3604R. The word lines in left memory array are labeled left word line 1 (LWL1)—left word line N (LWLN) whereas the word lines in the right memory array 3604R are labeled right word line 1 (RWL1)—right word line N (RWLN) (see also FIG. 3A). The data in the memory cells in each of the left memory array and right memory arrays are accessible by bit lines which occur in the columns in each of the arrays (e.g. LWBC1–LWBC4 and RWBC1–RWBC4 as shown in FIG. 3A). The bit lines for the bits of the each word can be grouped as shown in the left memory array 3604L or can be spread across the entire memory array as illustrated in the right memory array 3604R. The left memory array 3604L and the right memory array 3604R include memory cells to store data for the data memory 202. Each of the memory cells receives a wave line and a bit line depending upon the type of memory cell.

The left and right sense amplify array/drivers 3706L and 3706R either read data from the memory cells or write data into the memory cells depending upon the read/write signal (R/W) in conjunction with the memory cells that are accessed. The left and right latch arrays 3708L and 3708R either write data onto the data bus 203 read from the memory 202 or read data from the data bus 203 for writing into the memory 202. The column select decoder 3710 receives the least significant bits of a starting address in order to appropriately turn on the sense amplifier arrays and to then latch the data signal.

The column select decoder 3710 only turns on those sense amplifiers that are necessary in order to read out the appropriate sequence of data in order to reduce power consumption. The column select decoder 3710 separately drives the left sense amplifier 3706L and the right sense amplifier 3706R to provide support for the off boundary memory access.

The column select decoder 3710 also receives a sequence number. The sequence number represents the number of words in sequence to be accessed starting with the starting address. In one embodiment the memory is 2K×16 bits. If each of the memory arrays are 4 width wide, an array in that case is 256 rows high×128 bits wide. Moreover, each of the word lines are capable of accessing four words at a time or 4×16 bits, or 64 bits.

The off boundary row address decoder 3602 provides support for off boundary memory access by enabling a right word line of one row while at substantially the same time enabling the left word line of a different row. For example, the off boundary row address decoder 3602 enables the right word line 1 (RWL1) to access certain data locations in the right memory array 3714R while at substantially the same time enabling the left word line 2 (LWL2) to address the next higher words of data that are desired within approximately one memory cycle.

Figure 38B:
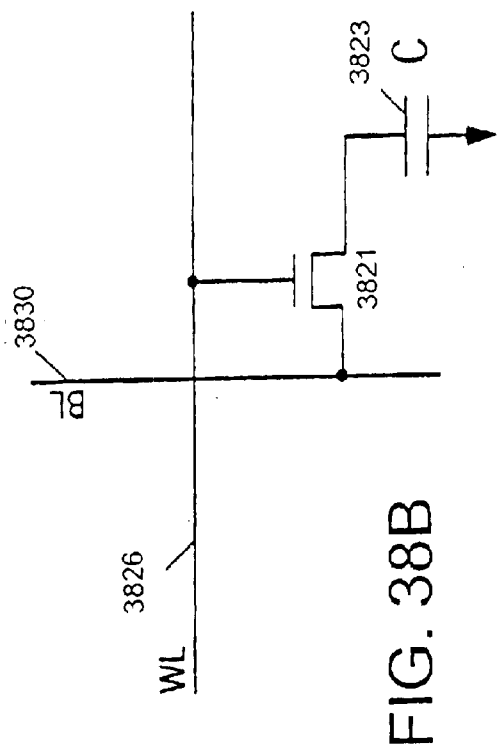
FIG. 38B is a diagram illustrating a dynamic memory cell according to one embodiment of the invention.
Figure 38A:
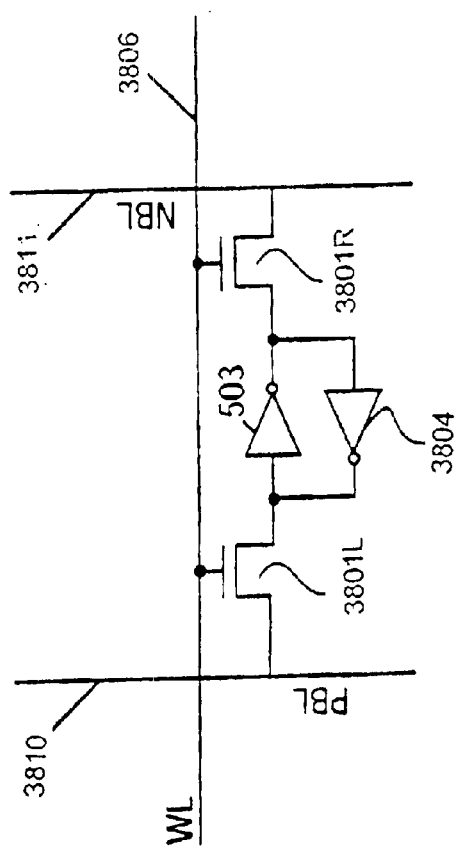
FIG. 38A is a diagram illustrating a static memory cell according to one embodiment of the invention.

FIG. 38A is a diagram illustrating a static memory cell according to one embodiment of the invention. FIG. 38B is a diagram illustrating a dynamic memory cell according to another embodiment of the invention. Referring now to FIGS. 38A and 38B, exemplary memory cells of the memory arrays 3604L and 3604R are illustrated and discussed.

The static memory cell in FIG. 38A includes a first switch 3801L, a second switch 3801R, and a pair of cross-coupled inverters 3803 and 3804. The switches 3801L and 3801R are controlled by the row line 3806 to allow access to the data stored in the pair of inverters 3803 and 3804. The switch 3801L is coupled on one side to the positive bit line 3810 and the parallel cross-coupled inverter's on and off bit sides, respectively, on an opposite side. Conversely, the switch 3801R is coupled to the negative bit line NBL 3811 on one side and the parallel cross-coupled inverter's on and off bit sides, respectively, on an opposite side. The static memory cell depicted in FIG. 38A can receive a differential signal between the positive bit line PBL 3810 and the negative bit line NBL 3811. The pair of cross coupled inverters 3803 and 3804 can ride out a differential signal onto the positive line PBL 3810 and the negative bit line NBL 3811. Each static memory cell is static in the sense that the data that is stored by the cross coupled inverters 3803 and 3804 is typically not destroyed when it is accessed.

FIG. 38B is a diagram illustrating a dynamic memory cell according to another embodiment of the invention. The dynamic memory cell includes a switch 3821 and a capacitor 3823 that is coupled to the switch 3821. Switch 3821 is controlled by a row line 3826. The switch is coupled on one side to a single bit line 3830 and one plate of the capacitor 3823 on an opposite side. The dynamic memory cell because of its fewer components is much smaller than the static memory cell of FIG. 38A. However, the charge ordinarily stored on the capacitor 3823 is destroyed when the memory is let out onto the bit line 3830. In this case a thresh cycle may be necessary in order to write the data that was previously let out back into the cells to store it once again.

In each of these memory cells the row or grid line is generally in the row of cells and the bit line is in the column of the cells. To form a word of memory cells a number of them may be grouped together in a row. Each of the bit lines from the memory cells couple into the left or right sense amplifier array 3706L or 3706R.

Figure 39:
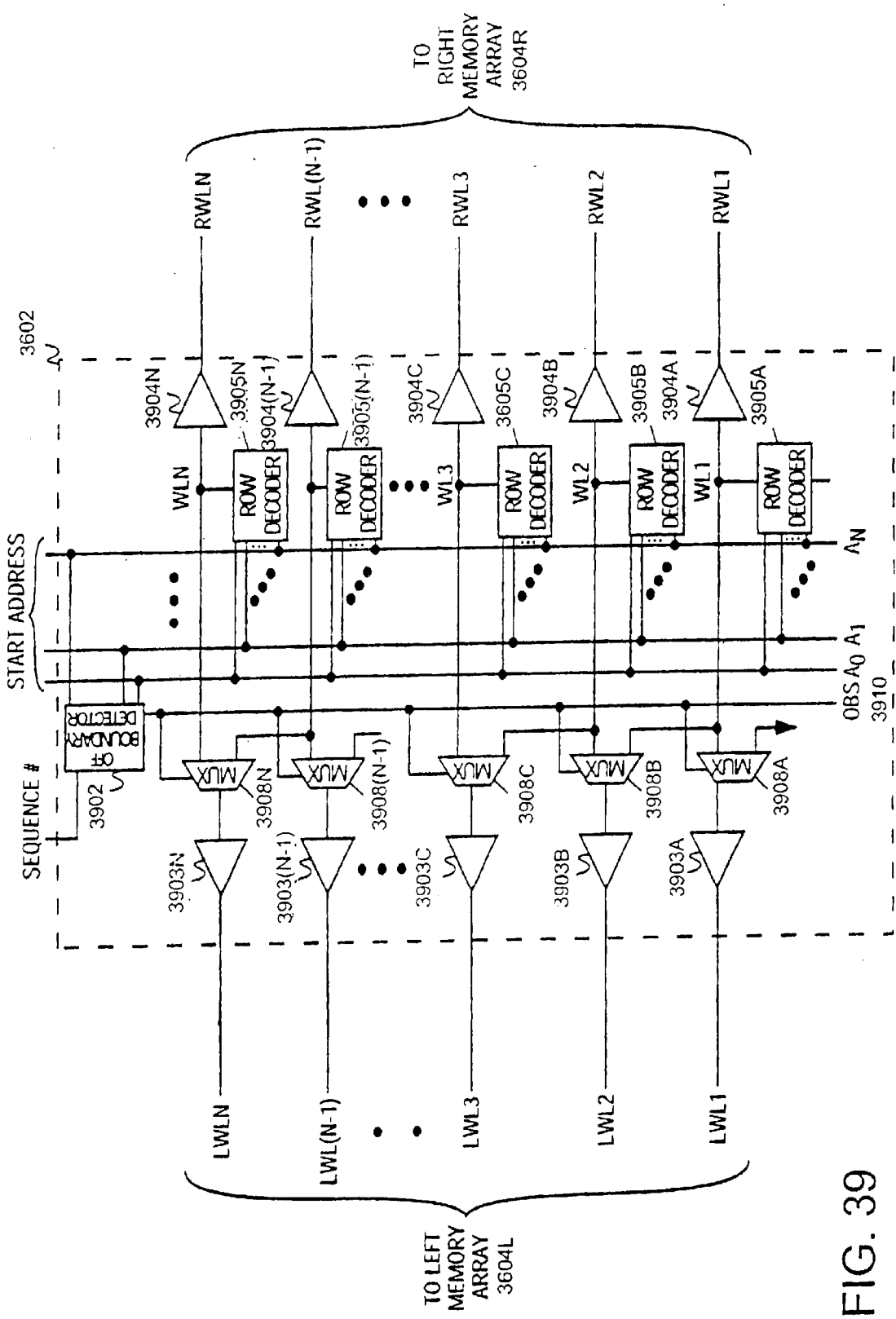
FIG. 39 is a block diagram illustrating the off boundary row address decoder according to one embodiment of the invention.

FIG. 39 is a block diagram illustrating the off boundary row address decoder 3602 according to one embodiment of the invention. Referring now to FIG. 39, the off boundary row address decoder 3602 receives the starting address and the sequence number for the number of words that are desired to be accessed out of the local data memory 202. The starting address is provided as an address $A_0$–$A_N$. Off boundary row address decoder 3602 includes an off boundary detector 3902, a plurality of first word line buffers 3903A–3903N, and a plurality of second word line buffers 3904A–3904N, N row decoders 3905A–3905N, and N multiplexers 3908A–3908N.

The N second word line buffers 3904A–3904N buffer the load from the row lines of the right memory array 3604R. The N first word line buffers 3903A–3903N buffer the load from the row lines of the left memory array 3604L.

Each of the row decoders 3905A–3905N receive the starting address. Each row decoder decodes a unique address for the words that are contained in each row line. Each row decoder is coupled to a respective left and right memory row of a row line. For example, row decoder 3905A will generate an output signal (e.g. word line signal) in response to a starting address of $00_h$ though $07_h$ (see FIG. 3A). Each of the row decoders generates an output signal in response to a range of words having a respective starting address. Only one of the row decoders 3905A–3905N generates a word line signal at a time.

The multiplexers 3908A–3908N are provided in order to select a different word line (i.e. row) from that of the word line (i.e. row) originally selected by the respective row decoder (e.g. from a right word line to a next higher left word line). Except for the multiplexer 3908A, each multiplexer 3908B–3908N receives as an input the lower row decoder signal from the lower respective row decoder and its own row decoder signal from its own respective row decoder.

For example, multiplexer 3908B receives a word line 1 signal (for row 1) from the row decoder 3905A as well as the word line 2 signal (for row 2) from the row decoder 3905B. It should be noted that multiplexer 3908A receives ground as one input and the word line 1 signal from the row decoder 3905A. In this case the multiplexer 3908A selects between its own row decoder signal, or ground, to turn off the switches coupled to the left row line 1. Also, multiplexer 3908A has one of its sets of inputs coupled to ground in case the second word line, left word line 2 (LWL2), is selected so that LWL1 is then grounded.

Each of the multiplexers 3908A–3908N receives an off boundary signal OBS 3910 as its control input. The off boundary signal OBS 3910 is generated by the off boundary detector 3902 in response to the starting address and the sequence number. The off boundary detector is also responsive to the organization of memory arrays and in particular the number of words across each of the left and right memory arrays. That is the logic within the off boundary detector is tailored towards the organization of the memory array. The off boundary detector 3902 knowing the starting address determines in which column the starting address begins and whether or not the sequence number requires enabling of the next higher word line where other words may be located. If the starting address and the sequence of words requires enabling the next higher word line, then the off boundary signal is generated and the multiplexers are appropriately controlled so that the lower word line controlling the right memory array is coupled into the upper next higher word line of the left memory array. In this manner the off boundary rear address decoder 3602 provides off boundary memory accessing.

With reference to FIG. 39 in conjunction with FIG. 36A, the operation of the off boundary row address decoder 3602 will now be discussed for illustrative purposes. For example, assume the off boundary row address decoder 3602, including the off boundary detector 3902, receives a start address (e.g. provided as an address $A_0$–$A_N$) corresponding to the word address $07_h$ and a sequence number of 4 thus requesting a desired plurality of memory addresses of $07_h$, $08_h$, $09_h$, and $0A_h$.

Each of the row decoders 3905A–3905N receives this starting address. In this example, row decoder 3905A, which generates an output signal (e.g. word line signal) in response to a starting address of $00_h$ though $07_h$, generates an output signal for the memory address $07_h$. For the starting address of $07_h$, the row decoder 3905A enables the right word line 1 (RWL1) and the bit line for the right word bit column 4 (RWBC4) to select address $07_h$ in the right memory array 3604R.

Because a sequence number of four has been selected, such that the data at addresses $08_h$, $09_h$, and $0A_h$ have been selected, and since $07_h$ is at the far right end of right word line 1 (RWL1), the off boundary detector 3902 determines that an off boundary access is required. Accordingly, the off boundary detector generates an off boundary signal OBS 3910 as a control input to the multiplexers 3905A–3905N. Particularly, the off boundary signal OBS 3910 in this instance controls multiplexer 3908A and 3908B so that after data address $07_h$ is accessed, multiplexer 3908A is grounded and multiplexer 3908B is enabled to select a different row line, left word line 2 (LWL2). Thus, data can be accessed from the right word line 1 (RWL1) to the next higher left word line 2 (LWL2) from the data memory 202.

Multiplexer 3908B enables row decoder 3905B to transmit output signals (e.g. word line signals) to the left memory array 3604L for accessing memory addresses $08_h$, $09_h$, and $0A_h$. For the address of $08_h$, the row decoder 3905B enables the left word line 2 (LWL2) and the left word bit column 1 (LWBC1) to be selected. Further, for the address of $09_h$, the row decoder 3905B enables the left word line 2 (LWL2) and the left word bit column 2 (LWBC2) to be selected, and for the address of $0A_h$, the row decoder 3905B enables the left word line 2 (LWL2) and the left word bit column 3 (LWBC3) to be selected. Accordingly, the off boundary detector allows memory access to the sets of data at addresses $07_h$, $08_h$, $09_h$, and $0A_h$ within one memory cycle at substantially the same time.

The off boundary memory access in the invention provides a single memory access cycle used to access a plurality of data words across memory boundaries. This avoids using two memory access cycles which conserves power. The number of data words to be accessed in parallel together is selectable. Only those memory locations and memory buses are activated and experience charge dissipation so that power is further conserved.

Self-Timed Memory Activation Logic

Referring now to FIG. 40, local data memory 202 is illustrated within a digital signal processing (DSP) integrated circuit 150. In a DSP, accessing data within memory is a frequent occurrence. Memory within a digital signal processor is often used to store data samples in coefficients of digital filters. If the amount of charge changing state on a pair of bit lines to read out the state stored in a memory device is reduced, power consumption can be reduced.

Referring now to FIG. 40, a functional block diagram of the local data memory 202 is illustrated. The local data memory 202 includes the memory array 3604, a row address decoder 3602, a sense amp array and column decoder 3706, and a self-time logic block 4006. The memory array 3604 consists of memory cells organized in rows and columns. The memory cells may be dynamic memory cells, static memory cells or non-volatile programmable memory cells. The row address decoder 3602 generates a signal on one of the word lines in order to address a row of memory cells in the memory array 3604. The column decoder within the sense amp array and column decoder 3706 selects which columns within the row of memory cells are to be accessed. The sense amplifiers within the sense amp array of the sense amp array and column decoder 3706 determine whether a logical one or zero has been stored within the accessed memory cells during a read operation.

The self-time logic 4006 of the local data memory 202 receives a clock input signal CLK 4008 and a memory enable input signal MEN 4009. The memory enable signal MEN 4009 functions similar to a chip select signal by enabling and disabling access to the memory array 3604. The self-time logic 4006 gates the clock input signal CLK 4008 with the memory enable signal MEN 4009 to control access to the memory array 3604. The self-time logic 4006 generates a self-timed memory clock signal ST MEM CLK 4010 which is coupled into the row address decoder 3602 and the sense amp array and column decoder 3706.

The self-timed memory clock signal ST MEM CLK 4010 is coupled into the row address decoder 3602 in order to appropriately time the selection of a row of memory cells. Additionally, the self-timed memory clock signal ST MEM CLK 4010 generated by self-time logic 4006 can appropriately time enablement of the sense amp array during read accesses of the data memory and an array of tristate drivers (not shown) to drive the bit lines during write accesses. With appropriate timing of the self timed memory clock signal ST MEM CLK 4010, the instantaneous power consumption can be reduced as well as the average power consumption over frequent accesses into the local data memory 202.

Figure 41:
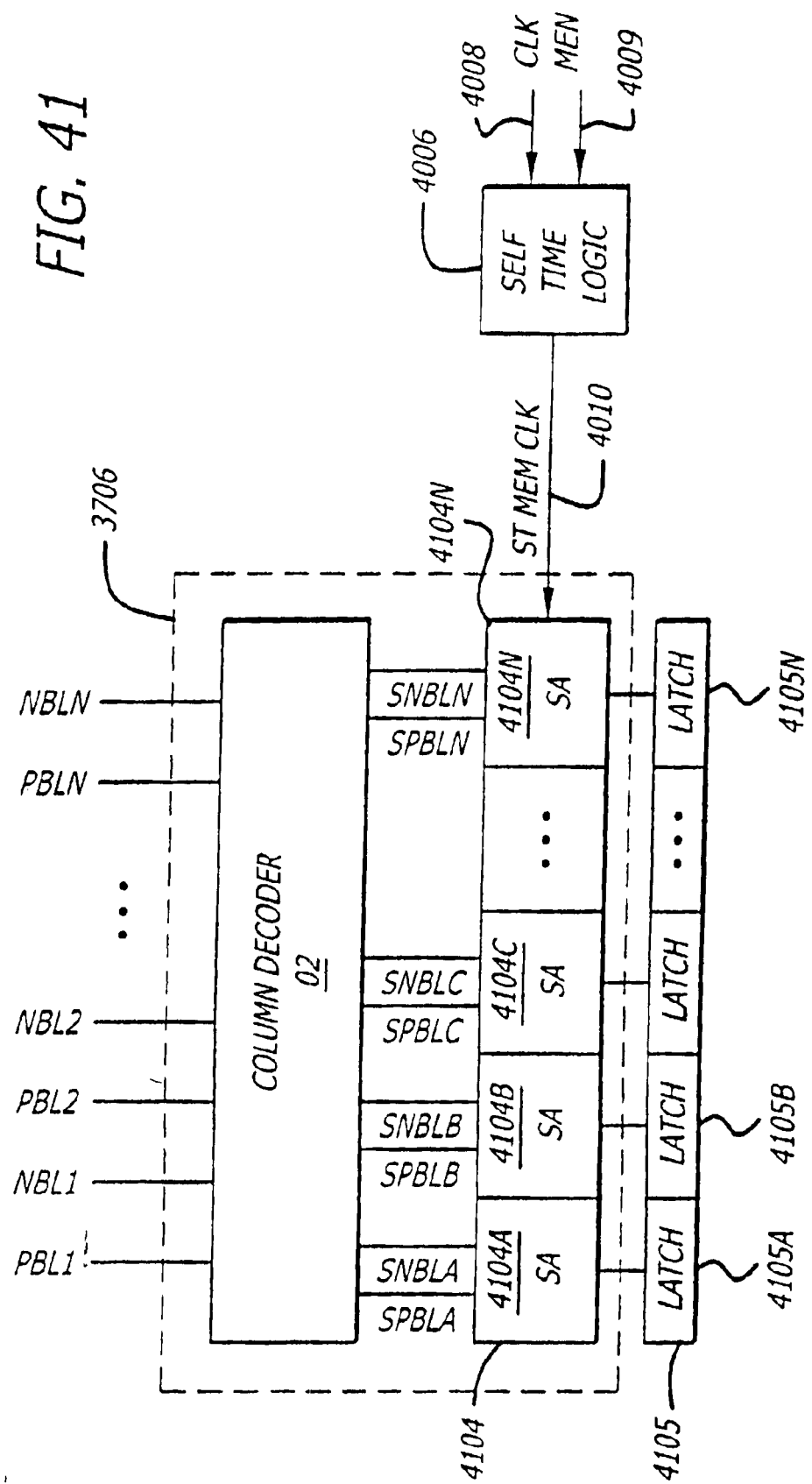
FIG. 41 is a detailed functional block diagram of the sense amplifier array and column decoder for an embodiment of the invention.

Referring now to FIG. 41, a functional block diagram of the sense amp array and column decoder 3706 is illustrated coupled to the self-time logic 4006. As discussed previously, the self-time logic 4006 generates the self-timed memory clock signal ST MEM CLK 4010. The self-timed memory clock signal ST MEM CLK 4010 is coupled into the sense amp array and column decoder 3706. The sense amp array and column array and column decoder 3706 includes a column decoder 4102 and N sense amplifiers SA 4104A–4104N. The self-timed memory clock signal ST MEM CLK 4010 is coupled into each of the sense amplifiers SA 4104A–4104N.

The column decoder 4102 couples to positive bit lines (PBL1–PBLN) and negative bit lines (NBL1–NBLN) of each of the columns of memory cells within the memory array 3604. In FIG. 41, the columns of bit lines for the memory cells are labeled PBL1 through PBLN for the positive bit lines and NBL1 through NBLN for the negative bit lines. In one embodiment, positive bit lines (PBL1–PBLN) and negative bit lines (NBL1–NBLN) of each of the columns of memory cells within the memory array 3604 are precharged high. The column decoder 4102 selects the positive and negative bit lines which are to be multiplexed into the array of sense amplifiers SA 4104A–4104N. The selected positive bit lines (PBL1–PBLN) and negative bit lines (NBL1–NBLN) of the memory array are multiplexed into the sense amplifiers over the signal lines labeled SPBLA through SPBLM for positive bit lines and SNBLA through SNBLM for negative bit lines. In one embodiment, each of the sense amplifiers SA 4104A–4104N receives signals from a respective pair of bit lines, a positive bit line SPBLi (i.e. one of SPBLA–SPBLM) and a negative bit line SNBLi (i.e. one of SNBLA–SNBLM). The output from each of the sense amplifiers SA 4104A–4104N is coupled into a latch 4105A–4105N in an array of latches 4105 to store data.

Referring now to FIG. 42, a functional block diagram of the self-time logic 4006 is illustrated. The self-time logic 4006 includes a pair of inverters 4201 and 4202, an odd number of inverters 4204–4206, a first NAND gate 4210, an inverter 4211, a second NAND gate 4215, and an inverter/buffer 4216 coupled together as illustrated in FIG. 42. The first inverter 4201 receives the clock input 4008. The first NAND gate 4215 receives the memory enable input signal MEN 4009. The inverter/buffer 4216 receives the output of the NAND gate 4215 in order to generate the self-timed memory clock ST MEM CLK 4010 as the output from the self timed logic 4006. The odd number of inverters 4204–4206 generates a delay that allows for the generation of the self-timed memory clock ST MEM CLK 4010. The odd number for the odd number of inverters 4204–4206 can be made selectable in that a pair of inverters can be deleted or added in order to vary the pulse width of the pulses in the self-timed memory clock signal ST MEM CLK 4010. The selection of the number of inverters can be controlled by control logic, fuse link methods or laser trim methods.

Referring now to FIG. 43, wave forms for the clock input signal 4008 in the self-timed memory clock signal ST MEM CLK 4010 which is generated by the self-time logic 4006 are illustrated. FIG. 43 depicts the wave form of the self-timed memory clock ST MEM CLK 4010 under the presumption that the memory-enabled signal 4009 has been enabled. If the memory-enabled signal 4009 is not enabled but disabled, the self-timed memory clock pulse is not generated.

When the clock input signal 4008 has a positive going pulse such as pulse 4301, it's rising edge generates a pulse in the self-timed memory clock signal ST MEM CLK 4010. The pulse width of each of the pulses in the self-timed memory clock ST MEM CLK 4010 are a function of the signal delay through the odd numbered inverters 4204–4206. The greater the delay provided by the odd inverters 4204–4206, the larger is the pulse width of pulses 4302 in the self-timed memory clock signal ST MEM CLK 4010. The odd number of inverters in the odd inverters 4204–4206 is shown in FIG. 42 but can also be 1, 5, 7, 9 or more odd number of inverters. The NAND gate 4210 generates a momentary pulse due to a difference between the timing of the non-delayed input into the NAND gate 4210 and the odd inverters 4204–4206 and the timing of the delayed input into the NAND gate from the output of the odd inverters 4204–4206. The momentary pulse is periodically generated as pulses 4302 in the self-timed memory clock signal ST MEM CLK 4010. Because the delay circuitry (inverters 4204–4206) and the NAND gate 4210 are somewhat matched, the pulse width PW of the pulses 4302 scale with temperature, voltage, and process changes. That is, with faster transistors due to process temperature or voltage of the power supply, a narrower pulse width is only needed to resolve a memory access. With slower transistors due to process temperature or voltage of the power supply, a longer pulse width is provided to resolve a memory access.

Figure 44A:
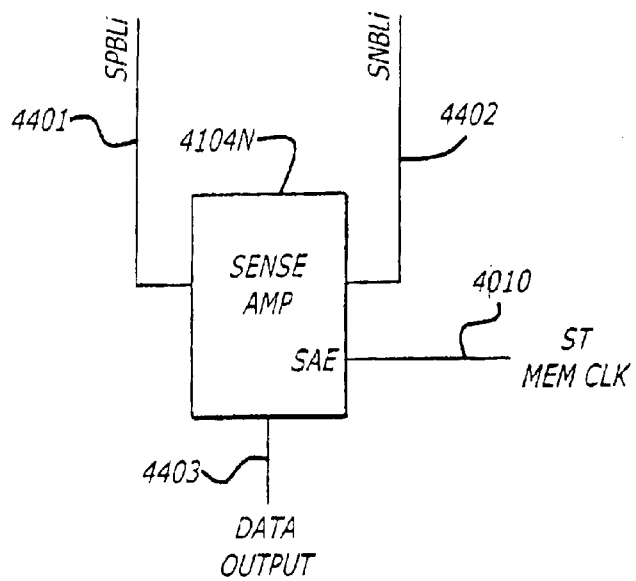
FIG. 44A is a block diagram of a sense amplifier of the sense amplifier array.

Referring now to FIG. 44A, a block diagram of a sense amplifier 4104N is illustrated. The sense amp 4104N receives a positive bit line SPBLi 4401 and a negative bit line SNBLi 4402 as its data inputs to generate a data output 4403. The sense amp receives the self-timed memory clock signal ST MEM CLK 4010 at its sense amp enable input SAE. When enabled by pulses of the self-time memory clock ST MEM CLK210, the sense amp 4104N attempts to make a determination between a signal on the positive bit line SPBLi 4401 and the negative bit line SNBLi 4402. The sense amp 4104N looks for a differential between voltage levels on each of these bit lines 4401 and 4402. For a power supply voltage supply of approximately 1.8 volts, the sense amp can resolve a differential of 160 mv between the bit lines to generate the data output signal 4403 in one embodiment. This amounts to approximately 10% of the power supply voltage level of 1.8 volts. The sense amp 4104N generates a logical one (high level) or a logical zero (low level) on the data output 4403 after resolving a voltage change on a bit line. After a read access to the memory, the output from the sense amp 4104N is latched and the sense amp 4104N is disabled.

Figure 44B:
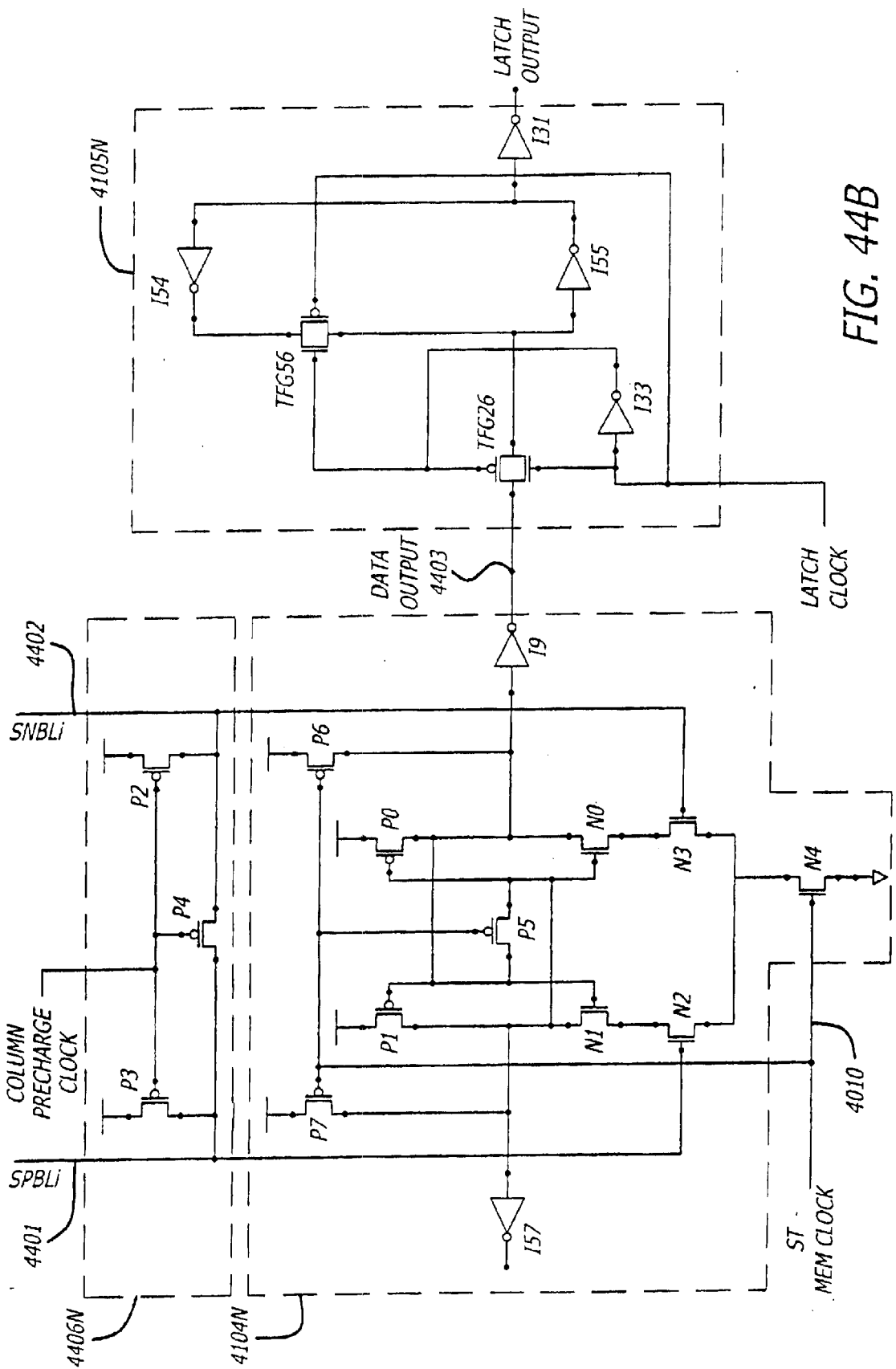
FIG. 44B is a schematic diagram of a sense amplifier of the sense amplifier array coupled to an output latch and precharge circuitry.

Referring now to FIG. 44B, a schematic diagram of one embodiment for the sense amplifier 4104N of the sense amplifier array coupled to an output latch 4105N and precharge circuitry 4406N is illustrated. The sense amplifier 4104N includes transistors N0–N4, transistors P0, P1, P5, P6, and P7, and inverters I9 and I57 as shown and coupled together in FIG. 44B. The precharge circuitry 4406N includes transistors P2–P4 as shown and coupled together in FIG. 44B. The latch 4105N includes inverters I31, I33, I54, and I55 and transfer gates TFG 26 and TFG 56 as shown and coupled together in FIG. 44B. The transistors N0–N4 and P0–P7 each have a source, drain and gate.

In one embodiment, the transistors P2–P4 of the precharge circuitry 4406N have the minimum possible size channel lengths with the widths of transistors P2–P3 each being two microns and the width of transistor P4 being one micron. The precharge circuitry 4406N precharges and equalizes the charges on the positive bit line SPBLi 4401 and the negative bit line SNBLi 4402 prior to accessing a memory cell. The precharge circuitry 4406N is enabled by a column precharge clock coupled to the gates of transistors P2, P3, and P4. When the column precharge clock is active (e.g. low), the transistors P2, P3 and P4 are turned ON to charge and equalize the charges and voltage level on the positive bit line SPBLi 4401 and the negative bit line SNBLi 4402. The column precharge clock is turned OFF prior to a memory cell being accessed.

Inverter I9 of the sense amplifier 4104N buffers the load placed on the data output 4403. The inverter I57, being the same size as inverter I9, provides equal capacitive loading to the opposite side of the sense amplifier 4104N.

In one embodiment of the sense amplifier 4104N, transistors N0–N4 are n-channel field effect transistors (NFETS) and P0, P1, P5, P6 and P7 are p-channel field effect transistors (PFETS) with channel lengths of the transistors N0–N4 and transistors P0, P1, P5, P6, and P7 are the minimum possible size channel lengths for n-type and p-type transistors respectively and the widths of transistors N0–N4 are each six microns while the widths of transistors P0–P1 are each two microns, the widths of transistors P6–P7 are each one and one-half microns, the width of transistor P5 is one-half micron.

The voltage level or charges on the positive bit line SPBLi 4401 and the negative bit line SNBLi 4402 are differentiated by the sense amplifier 4104N when the self-timed memory clock ST MEM CLOCK 4010 is asserted. The positive bit line SPBLi 4401 and the negative bit line SNBLi 4402 couple to the gates of the differential pair of transistors N2 and N3. The self-timed memory clock ST MEM CLOCK 4010 couples to the gates of transistors N4, P5, P6 and P7 in order to enable the sense amplifier. When the self-timed memory clock ST MEM CLOCK 4010 is not asserted (e.g. a low level), transistor N4 is OFF disabling the differential pair of transistors N2 and N3, transistors P7 and P6 each pre-charge each side of the sense amplifier and transistor P5 equalizes the charge and voltage level one each side prior to differentiation. When the self-timed memory clock ST MEM CLOCK 4010 is asserted (e.g. a high level), transistors P5, P6, and P7 are OFF, transistor N4 is ON enabling the differential pair of transistors N2 and N3 to differentiate between the higher and lower charge and voltage level on the positive bit line SPBLi 4401 and the negative bit line SNBLi 4402. When the sense amp 4104N is enabled, transistors N0, N1, P0 and P1 amplify the difference established by the differential pair of transistors N2 and N3 in order to generate an output logic level representing a bit read out from a memory cell. Inverter I9 inverts and buffers the output into the latch 4105N.

The latch 4105N is a conventional latch which is clocked by a latch clock. The latch clock is selectively enabled depending upon how may bits are to be read out of the local data memory 202. If only eight bits are to be read out of the local data memory 202, then only eight sense amplifiers 4104N and eight latches 4105N are enabled. If sixteen bits are to be read out of the local data memory 202, then only sixteen sense amplifiers 4104N and sixteen latches 4105N are enabled. If m bits are to be read out of the local data memory 202, then m sense amplifiers 4104N and m latches 4105N are enabled. The timing of the latch clock is similar to that of the self-timed memory clock ST MEM CLK 4010 but with a slight delay. When the latch clock is asserted (e.g. a high logic level), the transfer gate TFG 26 is opened to sample the data output 4403 from the sense amplifier 4104N. When the latch clock is de-asserted (e.g. a low logic level), transfer gate TFG 26 is turned OFF (i.e. closed) and transfer gate TFG 56 is turned ON (i.e. opened) so that the cross-coupled inverters I54 and I55 store the data sampled on the data output 4403 from the sense amplifier 4104N.

Figure 45:
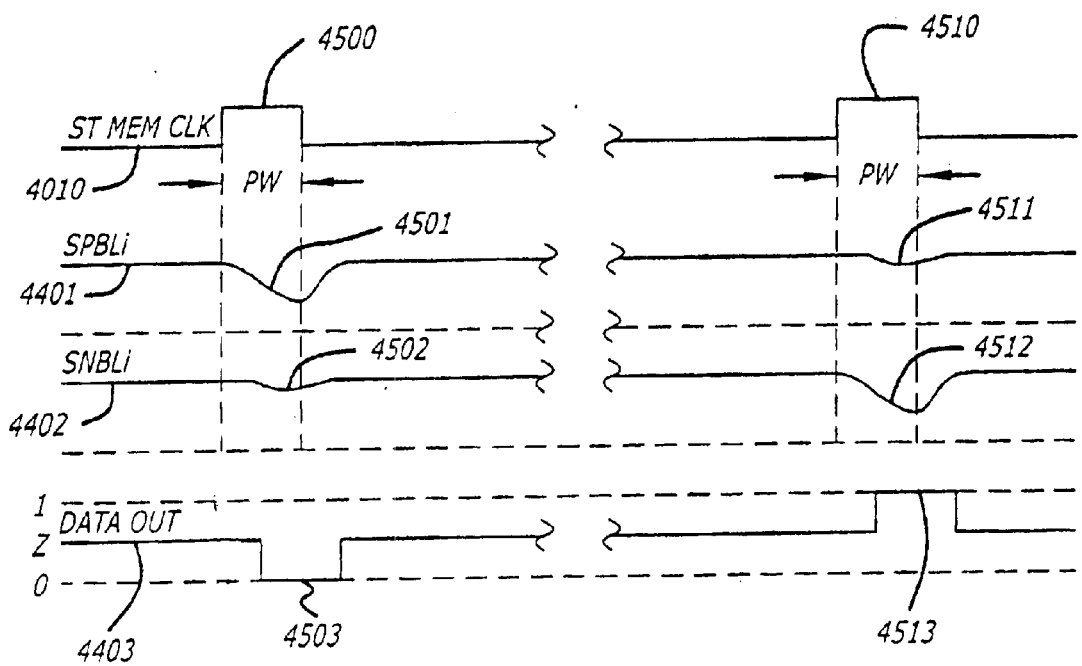
FIG. 45 is waveform diagrams illustrating the operation of the memory and sense amplifier using the self timed memory clock.

Referring now to FIG. 45, wave form diagrams of the functionality of the sense amplifier 4104N are illustrated. The self-timed memory clock ST MEM CLK 4010 has periodic pulses having a pulse width (PW) as illustrated by pulses 4500 and 4510 in FIG. 45. The circuitry of FIG. 42 provides a pulse width PW that is scaled with temperature, voltage, and process changes. That is, the pulse-width tracks changes in external temperature, power supply voltage, and manufacturing process variables.

In FIG. 45, the rising edge of each of the pulses 4500 and 4510 of the self-timed memory clock ST MEM CLK 4010, first enable the row address decoder to select a word line for selection of memory cells in a row of the memory array 3604. The rising edge of the pulses 4500 and 4510 of the self-timed memory clock ST MEM CLK 4010 also enables the sense amplifier 4104N to differentiate between the voltage levels on the positive bit line SPBLi 4401 and the negative bit line SNBLi 4402. As illustrated in FIG. 45, after the self-timed memory clock pulse 4500 or 4510 enable the row address decoder, at least one of the bit lines SPBLi 4401 and SNBLi 4402 experiences a change in voltage level to establish a voltage difference between them. The sense amplifier 4104N differentiates the voltage levels on each bit line and generates the data output signal 4403 as illustrated by the pulse 4503 and the pulse 4513.

In the case of the pulse 4500 of the self-timed memory clock ST MEM CLK 4010, the positive bit line SPBLi 4401 goes low in comparison with the negative bit line SNBLi 4402 as illustrated by the falling voltage level 4501 in the positive bit line and the stable voltage level 4502 in negative bit line. The sense amplifier 4104N differentiates between the voltage levels 4501 and 4502 to generate a zero logic level 4503 representing a logical one or logical zero level stored in the memory cell as the case may be.

For the pulse 4510 of the self-timed memory clock ST MEM CLK 4010, the negative bit line SNBLi 4402 experiences a voltage drop as illustrated by the wave form at position 4512 in comparison with the stability of positive bit line SPBLi 4401 at position 4511. The sense amplifier 4104N differentiates between the voltage levels at points 4511 and 4512 on the wave forms respectively, in order to generate the logical one pulse 4513 in wave form 4403. This logical one pulse 4513 represents a logical zero or one stored in the memory cell as the case may be.

Power consumption is proportional to the pulse width PW in the pulses of the self-timed memory clock ST MEM CLK 4010. The narrower the pulse width needed to resolve a differential between the positive bit line SPBLi 4401 and the negative bit line SNBLi 4402, the greater is the power conservation. This is so because a change in voltage or charge on the positive bit line SPBLi 4401 or the negative bit line SNBLi 4402 can be less with a narrower pulse width for the pulses of the self-timed memory clock ST MEM CLK 4010. The pulse width of the pulses in the self-timed memory clock ST MEM CLK 4010 establishes a short time period for the sense amplifier 4104N to evaluate a difference between the positive bit line SPBLi 4401 and the negative bit line SNBLi 4402. After the falling edge of pulses in the self-timed memory clock ST MEM CLK 4010, the word-lines can be turned OFF so that the charges on positive bit lines (PBL1–PBLN) and negative bit lines (NBL1–NBLN) are not further changed by the memory cells so that power is conserved in the local data memory 202. After the self-timed memory clock ST MEM CLK 4010 is turned OFF, the precharging of the positive bit lines (PBL1–PBLN) and negative bit lines (NBL1–NBLN) can occur. The pulse width of the self-timed memory clock ST MEM CLK 4010 provides less change in charges on positive bit lines (PBL1–PBLN) and negative bit lines (NBL1–NBLN) during memory accesses so that less power is consumed when restoring charges during a pre-charging process.

Power Conservation Through Data Bus Routing

One of the micro architectural techniques to reducing power consumption is the data busing scheme. The busing scheme used in the invention reduces power by a reduction in the switching capacitants of the global data buses.

Figures 46A, 46B:
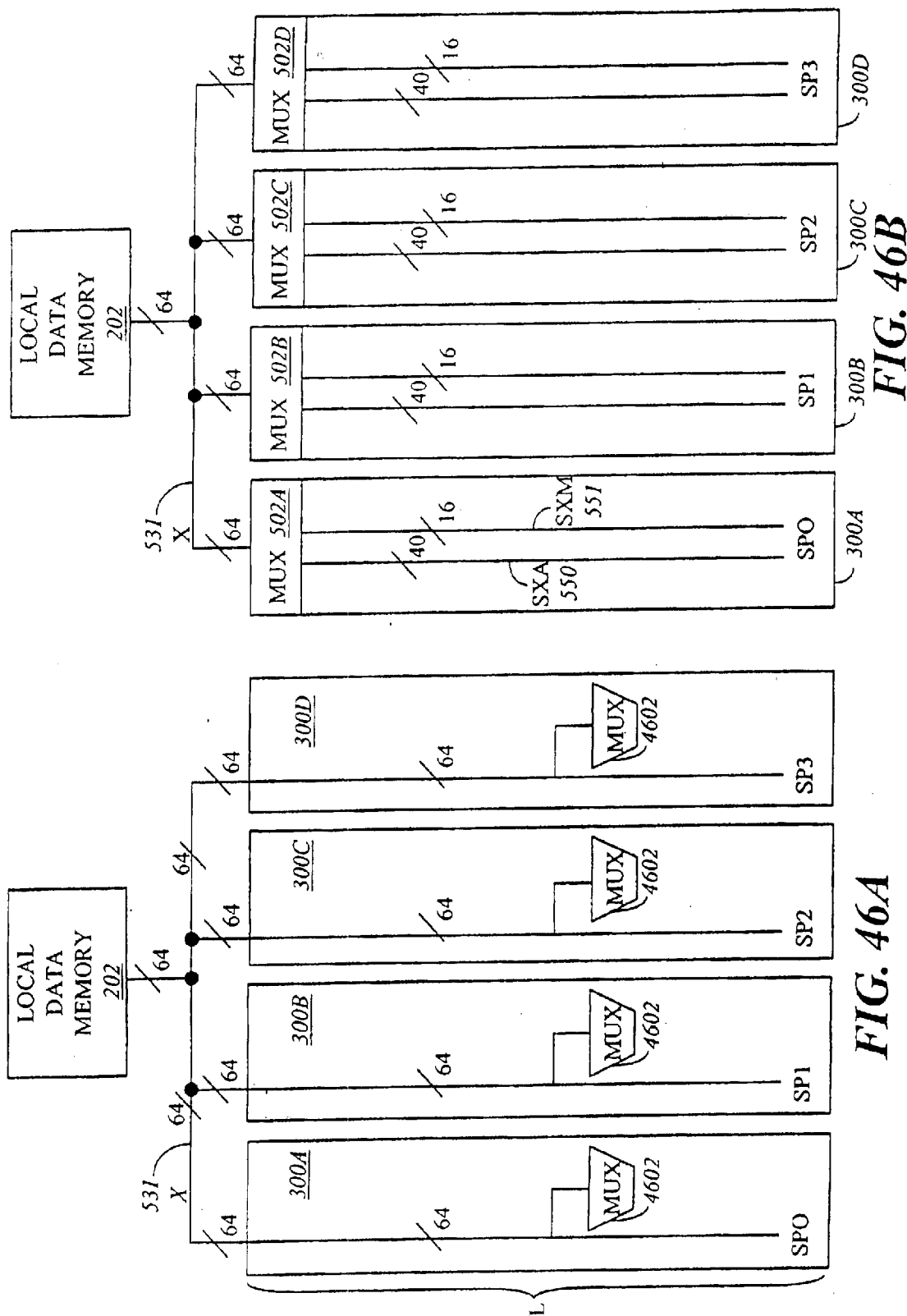
FIG. 46A is a schematic diagram of a standard tree routing for a data bus between the local data memory and each signal processing unit.
FIG. 46B is a schematic diagram of partitioning data bus trunks into smaller data bus limbs to reduce switching capacitances.

Referring now to FIG. 46A, a standard tree routing of the X data bus 531 between the local data memory 202 and into each signal processing unit SP 300A–300D is illustrated. All sixty four bits of the X data bus 531 are routed throughout the length of each signal processing unit SP 300A–300D. A Y data bus 533 and a Z data bus 532, each of sixty four bits may need to be similarly routed through the length of each signal processing unit SP 300A–300D to provide functionality. Internal bus multiplexers MUX 4602 in each signal processing unit can be used in each to select the desired bits locally.

The routing capacitance of a single bit line for a data bus which is routed over extensive lengths can be significant. The routing capacitance is a function of the area of the wire routing across the integrated circuit. A dielectric constant, $\in$, generally sets a unit capacitance for an area A of a given dielectric and spacing or distance d between plates. In a semiconductor process, the spacing and dielectric materials between plates is established along with the minimum line widths. For a given width W of a metal or other routing line at a certain layer, the capacitance per square unit, k, can be determined. $k = \in \times W$. From this the capacitance C from the routing can be determined. C=k times the total length of routing.

In FIG. 46A, the length of routing between the local data memory 202 and the start of each of the signal processing units is L. The length of routing in each of the four signal processing units is 1. In the bussing scheme of FIG. 46A, all sixty four bits of the X data bus 531 are routed into each signal processing unit 300A–D. Thus, C for the X data bus 531 of FIG. 46A can be determined to be $$C=k[(64*L)+(4*64*1)].$$

Referring now to FIG. 46B, data buses trunks are appropriately partitioned into smaller data bus limbs. Each of the data typer and aligners 502A–502D receives all sixty four bits of the X data bus 531 and partitions them into narrow bus widths such as forty bits of the SXA bus 550 or sixteen bits of the of the SXM bus 551 in each signal processing unit 300. The SXA bus 550 is used to couple operands into forty bit adders within each signal processing unit 300. The SYM bus 551 is used to couple operands into sixteen bit multipliers within each signal processing unit 300. Assuming that the length of routing between the local data memory 202 and the start of each of the signal processing units is L and the length of routing in each of the four signal processing units is 1. Thus, C for the embodiment of FIG. 46B can be determined to be $$C=k[(64*L)+(4*40*1)] \text{ for SXA}$$

and $$C=k[(64*L)+(4*16*1)] \text{ for SXM}.$$

For the SXM busses a sixteen fold decrease in capacitance is achieved due to it bus width of sixteen bits. For the SXA busses, a decrease in capacitance is achieved but at a more moderate scale because of its reduction from a sixty four bit bus to a forty bit bus.

The partitioning of the buses in FIG. 46A is performed in such a manner that the instruction cycle times in processing operands is unaffected. That is, there is no wait states for operands that would reduce the data throughput or the frequency of processing instructions.

Power Conservation Through Reconfigurable Memory

As previously discussed with reference to FIGS. 26–35, the global buffer memory 210 is grouped into memory clusters 2710. Each of the memory clusters 2710 has one or more memory blocks 2712. In one embodiment of the global buffer memory 210 there are four memory clusters 2710. The reconfigurable memory controller 2704 provides four separate data input buses, four separate data output buses, four separate address buses, four separate read enable, four separate write enable, and four separate chip select signals.

Referring to FIG. 27, the memory clusters 2710 of the global buffer memory 210 lower power consumption by switching only those busses which need switching to access data from the one or more memory blocks 2712 within one active cluster. The upper two bits of address bus 2707 into the global buffer memory 210 selects which memory block and cluster is to be accessed cycle by cycle. In the case cluster 2710AA is accessed, one of the data bus in DBIN 2718AA or data bus out DBOUT 2719AA are switched and the one address bus for a memory block within the address bus ADD 2717AA is switched. The R/W and the CS strobe for the respective memory block being accessed are also activated. Referring momentarily to FIGS. 33 and 34, the other data input, data output and address buses of the other memory clusters remain in a stable state by the bus state keepers 3402A–3402D and the bus state keeper 3312 in each address mapper 3302A–3302N and the bus state keeper 3452 in each collar logic 2713 of each memory cluster. The detail of an exemplary bus state keeper 3112, 3312, 3402 and 3452 is illustrated in FIG. 35. By keeping the address on the address bus as the prior address into each memory block of each memory cluster, a new address need not be evaluated by each memory and thus switching inside the memory blocks can be avoided as well.

Because the global memory 210 occupies about fifty percent of the area of the application specific signal processor (ASSP) 150 to provide DSP algorithm support and store operands for communication channels, the power savings from avoiding the switching of buses and the evaluation of a memory location in every memory block can be significant.

Power Conservation Through Unified RISC/DSP Instruction Set and Unified Pipeline Unifying the pipeline into one, handling both RISC and DSP instructions, conserves power as well. Unified RISC/DSP instruction set (ISA) and a unified pipeline are previously described with reference to FIGS. 6A–9B. The unified instruction set has separate RISC and DSP instructions which are utilized in the unified RISC/DSP pipeline. Using only one pipeline, less circuit area is used thus reducing the interconnect capacitance and the amount of charge switching thereon to conserve power. Because, the RISC instructions and DSP instructions share the same decoding, less circuitry is needed and less capacitance is switched as a result. Furthermore, the DSP and RISC instructions are separate instructions that are processed differently in the unified pipeline. The RISC instructions are decoded over five stages of the unified RISC/DSP pipeline while DSP instructions are decoded over 10 stages of the unified RISC/DSP pipeline. While a RISC instruction is executed any DSP instruction is inactive. While a DSP instruction is active, the signal processors SP0–SP3 300A–300D are inactive. When the signal processors SP0–SP3 300A–300D are active, the RISC 302 is inactive. In this manner, the RISC 302 and the SPs 300 swap back and forth between which is active depending upon whether a RISC instruction is to be executed or a DSP instruction is to be executed. A series of DSP instructions may be executed without a RISC instruction. For example, data from a communication channel may be processed by the DSP units until a new program needs loading or a communication channel set up or tear down is needed in which case, a RISC instruction may be executed activating the RISC 302 and its associated circuitry and deactivating the SPs 300 and their associated circuit. This functional swapping between control and data processing reduces the number of data busses, the amount of circuitry and the amount of capacitance switching at the same time in order to lower power consumption.

Power consumption is further lowered when the RISC 302 or the signal processors SP0–SP3 300A–300D are inactive by inactivating the data paths therein by using well known gated clocking structures. The gated clocking is provided on an instruction by instruction basis. Each instruction can shut down different parts of the logic circuitry and data paths to reduce switching. Because data busses are typically wide (e.g. 64 bits) in digital signal processors to process more information in parallel, reducing the switching of signals thereon conserves the amount of power consumed.

Referring now to FIG. 8A, the unified instruction pipeline is deeper for DSP instructions than RISC instructions. This allows for instruction by instruction power down of different functional blocks to reduce the switching of charges associated with the capacitance of the circuitry. That is, the type of instruction can gate the clocks of the various functional blocks ON or OFF so that changes in state of the circuitry need not occur.

RISC instructions and DSP instructions have a shared portion 802 of the instruction pipeline. At stage 812 and 814 the instruction is decoded and a RISC instruction may be executed while a DSP instruction may be ready to execute in the stages 822–826 a couple cycles later. Between the RISC execution at stage 814 and the start of DSP execution at stage 822, there are two memory access instruction cycles M0 818 and M1 820 before DSP execution is to occur. These instruction cycles M0 818 and M1 820 are memory access cycles to obtain operands. In some cases, the SPs 300 wait for instruction decoding and the operands. Even in the case between RISC instruction execution and DSP instruction execution, there is plenty of time during the memory access cycles to deactivate the SPs 300 for a couple of cycles to conserve power. In other words, the depth of the shared pipeline provides flexibility in deactivating the RISC and the SP and their respective functional blocks.

Power Conservation Through off Boundary Memory Access

Additionally, reducing the number of cells in a memory which are accessed which thereby reduces the number of bit lines switching can conserve power. Off boundary memory access was previously described with reference to FIGS. 36A–39. Data memory 202 including off boundary memory access has row and address decoders that facilitate accessing a sequence of one to four words at the same time. The selected sequence of words which is desired in the data memory 202, are read out from the memory cells onto the bit lines and coupled onto a data bus. The un-selected sequence of words are not evaluated and their bit lines do not change state to further conserve power. Additionally, only the off boundary row decoder circuit 3602 is needed to read across memory boundaries to provide off boundary memory access. This provides a reduced number of circuits that need change state to provide off boundary memory access.

Power Conservation Through Self Timed Activation

Another reason for power dissipation in a capacitor is the change in voltage V from the addition or removal of charges from the capacitor. If the change in voltage V on the capacitors in a memory array can be reduced, the power consumption can be lowered. Self time memory access was previously described with reference to FIGS. 40–45. A self timed logic circuit is used to generate a self timed memory clock to access data in a memory. The self timed memory clock has a periodic pulse which enables circuitry in the memory for a brief period of time over its pulse width. The amount of charge and voltage change, required on bit lines for resolving a bit of data stored in a memory cell during the pulse width of the self timed memory clock, is reduced by using a sensitive sense amplifier so that power can be conserved. The reduction in the amount of charge and voltage changing state on each pair of bit lines to read out the state stored in a memory device is reduced by use of the self timed activation logic conserves power.

Power Conservation Through Flexible Data Typing

Flexible data typing, permutation and type matching was previously described with reference to FIGS. 10–20. Flexible data typing, permutation and type matching is provided by the data typer and aligner 502 illustrated in FIG. 5B. Flexible data typing, permutation and type matching activates only the number of bits in a bus (i.e. the bus width) which are needed for performing computations in each SP 300. That is, those bits specified by the data type that is to propagate in a bus are those that change state. The other bits can remain in a stable state. In one embodiment for example, the X adder bus SXA 550 is forty bits wide. When a sixteen bit add is performed between two sixteen bit real numbers, only the data bits, the sign bit and one or more of the guard bits need change state over the SXA bus 550 as illustrated by FIG. 12A. The flexible data typing effectively reduces the bit width of the data path. Each of the bus multiplexers in the data path can include a register to cycle data back from the output of the bus multiplexer into one input of the bus multiplexer so that the bus state can be kept in a stable state and conserve power. For example in FIG. 10, the bus multiplexers 1001 and 1002 can include a clocked register to keep the output in a steady state illustrated by registers 1003 and 1004 in each. FIG. 11 illustrates the details of implementing registers 1003 and 1004 to keep the state of the bus and conserve power.

In FIG. 11, the bus multiplexers 1101, 1102, 1104 and 1106 include a clocked register 1111, 1112, 1114, and 1116 respectively. Each of the clocked registers has its D input coupled to the output of the respective bus multiplexer with the Q output coupled to one of the selectable inputs of the respective bus multiplexer. The clock input of the registers is coupled to a system clock. By selecting the register output to be multiplexed out of the bus multiplexer, the state of the output bus is cycled back around onto the output bus to keep its state stable. To change the state on the output bus, the multiplexer is controlled to select an input not coupled to the register holding the prior state of the output bus. The bus multiplexers 1101, 1102, 1104, and 1106 can be further controlled bit by bit in order for some bits of the output bus to change state while other bits of the output bus remain in a stable state. This is accomplished by selecting the registered input for some bits as the output from the respective bus multiplexor while selecting for other bits the input bus as the output. For example if bits 0–4 need only change state of the sixteen bit SXM bus 522, then bits 5–15 can be held in a steady state. In which case, bits 0–4 are set to select bits 0–4 of the X bus 531 while bits 5–15 are selected from bits 5–15 output from the register 1112.

The function of the register and the bus multiplexer are further discussed below with reference to bus state keepers illustrated in FIG. 35. While FIGS. 10 and 11 illustrate one data path including a bus multiplexer with a register to cycle data around to maintain a stable state on a bus, other data paths can have similar apparatus to maintain a bus state and conserve power.

Power Conservation Through Instruction Loop Buffering

Instruction loop buffering was previously described with reference to FIGS. 6A–9A. The loop buffer 750 is included as part F0 fetch control 708 of the unified instruction pipeline as illustrated in FIG. 7. Embodiments of the loop buffer are illustrated in FIGS. 9A and 9B.

After storing the first loop of instructions such as illustrated by FIG. 6A in the loop buffer 750, instructions can be accessed from the loop buffer 750 instead of the memory. Thus, memory accesses are reduced thereby reducing power consumption. Furthermore, the intermediary data buses that would otherwise change state dissipating charges in order to fetch instructions from memory, are not utilized when instructions are executed out of the loop buffer 750. This further conserves power by avoiding charging and discharging buses which are capacitively loaded.

Power Conservation Through Local Buffering of Operands for Shadow DSP

Shadow DSP was previously described with reference to FIGS. 21–25. Power is conserved in this case by localized registers that store operands used by the main DSP units for later use by the shadow DSP units. Referring now to FIGS. 5A–5B and 23A–23B, the data typer and aligner 502 of each SP unit 300 includes registers 2308, 2310, 2309 and 2311. The registers 2308, 2310, 2309 and 2311 store the operands read from memory for the main DSP units in each SP unit 300. Registers 2308 and 2309 delay the operand by one cycle while registers 2310 and 2311 delay the operand by two cycles. Thus, the main DSP units and the shadow DSP units can share the same operands in different cycles and an operand does not need to be re-read from memory for use by the shadow DSP units.

The accumulator register 512 in each SP unit 300 stores the results of computations made by the main DSP units. The shadow DSP units can further process the results with other operands or other or the same results stored in the accumulator register 512. In this case as well, no memory access is need to obtain the operands for the shadow DSP units because the operands are already available locally in the accumulator registers.

Thus, localized registers can store operands previously accessed from memory or otherwise for use again by a functional block or computation unit such as the shadow DSP functional blocks or units. In this manner, power can be conserved by avoiding extra memory accesses and state transitions in data buses that would otherwise be needed.

Power consumption is reduced in a digital signal processing integrated circuit. Instantaneous and average power consumption can be reduced in integrated circuits including a digital signal processing integrated circuit.

While the invention has been described in particular embodiments, it may be implemented in hardware, software, firmware or a combination thereof and utilized in systems, subsystems, components or sub-components thereof. When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information.

Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In any case, the invention should not be construed as limited by such embodiments, but rather construed according to the claims that follow below.

What is claimed is:

1. A method to conserve power in an integrated circuit comprising:

providing a bus multiplexer between a memory storing operands and a functional unit of the integrated circuit, an input of the bus multiplexer coupled to a global bus having a first bit width, the bus multiplexer to receive data from the memory on the global bus; and selectively multiplexing bits of data on the global bus of the first bit width onto bits of a first local bus in the functional unit, the first local bus coupled to a first output of the bus multiplexer and having a second bit width less than the first bit width of the global bus.

2. The method of claim 1, wherein
the second bit width of the first local bus is less than the first bit width of the global bus to lower the switching capacitance.

3. The method of claim 1, wherein
a routing length of the first local bus is greater than a routing length of the global bus.

4. The method of claim 1, further comprising:
selectively multiplexing bits of data on the global bus of the first bit width onto bits of a second local bus in the functional unit, the second local bus coupled to a second output of the bus multiplexer and having a third bit width less than the first bit width of the global bus and the second bit width of the first local bus.

5. The method of claim 4, wherein
the second bit width of the first local bus and the third bit width of the second local bus are less than the first bit width of the global bus to lower the switching capacitance.

6. The method of claim 4, wherein
a routing length of the first local bus and a routing length the second local bus are greater than a routing length of the global bus.

7. The method of claim 1, wherein
the memory is a local data memory and the functional unit is a digital signal processing unit.

8. The method of claim 1, wherein
the first bit width of the global bus is sixty-four, and
the second bit width of the first local bus is forty.

9. The method of claim 1, wherein
the first bit width of the global bus is sixty-four, and
the second bit width of the first local bus is sixteen.

10. The method of claim 4, wherein
the first bit width of the global bus is sixty-four,
the second bit width of the first local bus is forty, and
the third bit width of the second local bus is sixteen.

11. The method of claim 10, wherein
forty parallel bits of data out of sixty-four parallel bits of data from the global bus are selectively coupled onto forty parallel bits of the first local bus, and
sixteen parallel bits of data out of sixty-four parallel bits of data from the global bus are selectively coupled onto sixteen parallel bits of the second local bus.

12. A method of laying out an integrated circuit to lower power consumption, the method comprising:
routing a first bus over a first length coupled between a data memory and a plurality of functional units, the first bus having a first bit width; and
providing each of the plurality of functional units coupled to the first bus, including
providing a bus multiplexer with an input to couple to the first bus and
routing a second bus coupled to a first output of the bus multiplexer within the functional unit over a second length, the second bus having a second bit width less than the first bit width of the first bus.

13. The method of claim 12, wherein
the second bit width of the second bus is less than the first bit width of the first bus to lower the switching capacitance.

14. The method of claim 12, wherein
the first length of the first bus is less than the second length of the second bus.

15. The method of claim 12, wherein
the providing each of the plurality of functional units coupled to the first bus further includes
routing a third bus coupled to a second output of the bus multiplexer within the functional unit over a third length, the third bus having a third bit width less than the first bit width of the first bus.

16. The method of claim 15, wherein
the third bit width of the third bus and the second bit width of the second bus are less than the first bit width of the first bus to lower the switching capacitance.

17. The method of claim 15, wherein
the first length of the first bus is less than the second length of the second bus and
the first length of the first bus is less than the third length of the third bus.

18. The method of claim 12, wherein
the first bit width of the first bus is sixty-four, and
the second bit width of the second bus is forty.

19. The method of claim 12, wherein
the first bit width of the first bus is sixty-four, and
the second bit width of the second bus is sixteen.

20. The method of claim 16, wherein
the first bit width of the first bus is sixty-four,
the second bit width of the second bus is forty, and
the third bit width of the third bus is sixteen.

21. The method of claim 20, wherein
forty parallel bits of data out of sixty-four parallel bits of data from the first bus are selectively coupled onto forty parallel bits of the second bus, and
sixteen parallel bits of data out of sixty-four parallel bits of data from the first bus are selectively coupled onto sixteen parallel bits of the third bus.

22. The method of claim 12, wherein
the first bus and the second bus are routed in one or more layers of metal on the integrated circuit.

23. A method of laying out an integrated circuit to lower power consumption, the method comprising:
forming a plurality of functional units, each of the plurality of functional units including
a first local bus routed within the functional unit, the first local bus having a first length and a first bit width,
a second local bus routed within the functional unit, the second local bus having a second length and a second bit width, and
a bus multiplexer with an input coupled to a global bus and outputs coupled to the first local bus and the second local bus, the bus multiplexer to selectively multiplex bits of data from the global bus to the first local bus and to selectively multiplex bits of data from the global bus to the second local bus;

routing the global bus between a data memory at a first end and each bus multiplexer of the plurality of functional units at a second end, the global bus having a length and a bit width; and wherein the first bit width of the first local bus and the second bit width of the second local bus in each of the plurality of functional units are less than the bit width of the global bus to lower switching capacitance and power consumption.

24. The method of claim 23 wherein the forming of the plurality of functional units includes
laying out a first instance of a functional unit to include the first local bus, the second local bus, and the bus multiplexer coupled together; and
instantiating the layout of the first instance of the functional unit a plurality of times.

25. The method of claim 23, wherein the first local bus and the second local bus are routed in one or more layers of metal on the integrated circuit.

26. The method of claim 23, wherein the first local bus and the second local bus are routed on one layer of metal of the integrated circuit, and the global bus is routed on another layer of metal of the integrated circuit.

27. The method of claim 23, further comprising:

forming a memory in the integrated circuit coupled to the global bus, the memory to store data.

28. The method of claim 23, wherein the bits of data from the global bus selectively multiplexed onto the first local bus differs from the bits of data from the global bus selectively multiplexed onto the second local bus.

29. The method of claim 23, wherein the first bit width of the first local bus is forty, the second bit width of the second local bus is sixteen, and the bit width of the global bus is sixty-four.

30. The method of claim 29, wherein forty parallel bits of data out of sixty-four parallel bits of data from the global bus are selectively coupled onto forty parallel bits of the first local bus, and sixteen parallel bits of data out of sixty-four parallel bits of data from the global bus are selectively coupled onto sixteen parallel bits of the second local bus.

31. An integrated circuit comprising:

a memory to store data;

a global bus coupled to the memory, the global bus having a first bit width of parallel bits; and a functional unit coupled to the global bus, the functional unit including
a bus multiplexer having an input coupled to the global bus, the bus multiplexer to receive data from the memory on the global bus,
a first local bus coupled to a first output of the bus multiplexer, the first local bus having a second bit width of parallel bits, the second bit width of the first local bus less than the first bit width of the global bus, and
wherein the bus multiplexer selects data from a subset of parallel bits of the global bus to be coupled onto the parallel bits of the first local bus.

32. The integrated circuit of claim 31, wherein the second bit width of the first local bus is less than the first bit width of the global bus to lower the switching capacitance.

33. The integrated circuit of claim 31, wherein a length of the first local bus is greater than a length of the global bus.

34. The integrated circuit of claim 31, wherein the functional unit further includes
a second local bus coupled to a second output of the bus multiplexer, the second local bus having a third bit width of parallel bits, the third bit width of the second local bus less than the first bit width of the global bus, and
wherein the bus multiplexer selects data from a subset of parallel bits of the global bus to be coupled onto the parallel bits of the second local bus.

35. The integrated circuit of claim 34, wherein the second bit width of the first local bus and the third bit width of the second local bus are less than the first bit width of the global bus to lower the switching capacitance.

* * * * *

UNITED STATES PATENT AND TRADEMARK OFFICE
CERTIFICATE OF CORRECTION

PATENT NO. : 6,732,203 B2
DATED : May 4, 2004
INVENTOR(S) : Kanapathippillai et al.

It is certified that error appears in the above-identified patent and that said Letters Patent is hereby corrected as shown below:

Column 9,
Line 26, delete "DSO" and insert -- DS0 --.
Lines 30, 40 and 42, delete "100" insert -- 101 --.

Column 43,
Line 64, delete "$X_N + Y_N$" and insert -- $X_N Y_N$ --.

Column 45,
Line 59, delete "x" " and insert -- x' --.

Column 46,
Line 16, delete "SY2" and insert -- $SY_2$ --.

Column 81,
Line 39, at the beginning of line, before "the", insert -- of --.

Signed and Sealed this

Twenty-fourth Day of August, 2004

JON W. DUDAS
*Director of the United States Patent and Trademark Office*